United States Patent
Kung et al.

(10) Patent No.: US 11,339,342 B2
(45) Date of Patent: May 24, 2022

(54) BIOMASS CONVERSION REACTORS AND ASSOCIATED SYSTEMS AND METHODS

(71) Applicant: Massachusetts Institute of Technology, Cambridge, MA (US)

(72) Inventors: Kevin S. Kung, Plano, TX (US); Alexander H. Slocum, Bow, NH (US); Santosh Janardhan Shanbhogue, Newton, MA (US); Ahmed Fouad Ghoniem, Winchester, MA (US); Robert James Stoner, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 34 days.

(21) Appl. No.: 16/613,692

(22) PCT Filed: May 16, 2018

(86) PCT No.: PCT/US2018/033007
§ 371 (c)(1),
(2) Date: Nov. 14, 2019

(87) PCT Pub. No.: WO2018/213474
PCT Pub. Date: Nov. 22, 2018

(65) Prior Publication Data
US 2021/0087487 A1    Mar. 25, 2021

Related U.S. Application Data

(60) Provisional application No. 62/618,589, filed on Jan. 17, 2018, provisional application No. 62/618,583, (Continued)

(51) Int. Cl.
*C10L 9/08* (2006.01)
*C10L 5/44* (2006.01)
(Continued)

(52) U.S. Cl.
CPC ............... *C10L 9/083* (2013.01); *B01J 6/00* (2013.01); *B01J 19/0006* (2013.01);
(Continued)

(58) Field of Classification Search
CPC    B01J 19/0006; B01J 19/0013; B01J 19/0066;
B01J 2219/00051;
(Continued)

(56) References Cited

U.S. PATENT DOCUMENTS 4,249,929 A * 2/1981 Kneer .................. C05F 7/00
71/9
8,203,024 B2 6/2012 Leonhardt
(Continued)

FOREIGN PATENT DOCUMENTS

WO    WO 2012/164162 A1    12/2012
WO    WO 2021/096956 A1    5/2021

OTHER PUBLICATIONS

PCT/US2018/033007, Jul. 12, 2018, International Search Report and Written Opinion.
(Continued)

*Primary Examiner* — Ellen M McAvoy
*Assistant Examiner* — Chantel L Graham
(74) *Attorney, Agent, or Firm* — Wolf, Greenfield & Sacks, P.C.

(57) ABSTRACT

Systems and methods associated with biomass decomposition are generally described. Certain embodiments are related to adjusting a flow rate of a fluid comprising oxygen into a reactor in which biomass is decomposed. The adjustment may be made, at least in part, based upon a measurement of a characteristic of the reactor and/or a characteristic of the biomass. Certain embodiments are related to cooling at least partially decomposed biomass. The biomass may be cooled by flowing a gas over an outlet conduit in which the
(Continued)

biomass is cooled, and then directing the gas to a reactor after it has flowed over the outlet conduit. Certain embodiments are related to systems comprising a reactor and an outlet conduit configured such that greater than or equal to 75% of its axially projected cross-sectional area is occupied by a conveyor. Certain embodiments are related to systems comprising a reactor comprising an elongated compartment having a longitudinal axis arranged substantially vertically and an outlet conduit comprising a conveyor.

20 Claims, 64 Drawing Sheets

Related U.S. Application Data filed on Jan. 17, 2018, provisional application No. 62/506,715, filed on May 16, 2017.

(51) Int. Cl.
  *B01J 6/00* (2006.01)
  *B01J 19/00* (2006.01)
(52) U.S. Cl.
  CPC ........... *B01J 19/0013* (2013.01); *C10L 5/442* (2013.01); *C10L 5/445* (2013.01); *B01J 2219/00051* (2013.01); *B01J 2219/00162* (2013.01); *B01J 2219/00164* (2013.01); *B01J 2219/00186* (2013.01); *C10L 2200/0469* (2013.01); *C10L 2290/02* (2013.01); *C10L 2290/06* (2013.01)
(58) Field of Classification Search
  CPC .... B01J 2219/00121; B01J 2219/00162; B01J 2219/00164; B01J 2219/00186; B01J 2219/00243; B01J 2219/00259; B01J 6/00; C05F 11/00; C05F 17/70; C05F 17/979; C05F 7/00; C10G 1/00; C10L 2200/0469; C10L 2290/02; C10L 2290/06; C10L 5/442; C10L 5/445; C10L 9/083; Y02A 40/20; Y02P 20/145; Y02W 10/40; Y02W 30/40
  See application file for complete search history.

(56) References Cited

U.S. PATENT DOCUMENTS

| | | |
|---|---|---|
| 8,246,788 B2 | 8/2012 | Teal et al. |
| 8,304,590 B2 | 11/2012 | Hopkins et al. |
| 8,361,186 B1 | 1/2013 | Shearer et al. |
| 9,404,135 B2 | 8/2016 | Genta et al. |
| 9,562,194 B2 | 2/2017 | Kellens et al. |
| 9,580,665 B2 | 2/2017 | Olofsson et al. |
| 2009/0007484 A1 | 1/2009 | Smith |
| 2009/0250331 A1 | 10/2009 | Hopkins et al. |
| 2010/0270505 A1 | 10/2010 | Gallaspy et al. |
| 2013/0228444 A1 | 9/2013 | Teal et al. |
| 2014/0208995 A1 | 7/2014 | Olofsson et al. |
| 2014/0325900 A1* | 11/2014 | Olofsson ................ C10L 9/083 44/605 |
| 2015/0143742 A1* | 5/2015 | Prud'Homme ........... C10L 5/40 44/606 |
| 2015/0157661 A1 | 6/2015 | Eddy et al. |

OTHER PUBLICATIONS

PCT/US2018/033007, Nov. 28, 2019, International Preliminary Report on Patentability.
International Search Report and Written Opinion dated Jul. 12, 2018 for Application No. PCT/US2018/033007.
International Preliminary Report on Patentability dated Nov. 28, 2019 for Application No. PCT/UC2018/033007.
Bates et al., Biomass torrefaction: modeling of reaction thermochemistry. Bioresource Technol. 2013;134:331-40.
Bates et al., Biomass torrefaction: modeling of volatile and solid product evolution kinetics. Bioresource Technol. 2012;124:460-9.
Bates et al., Modeling kinetics-transport interactions during biomass torrefaction: the effects of temperature, particle size, and moisture content. Fuel. 2014;137:216-29.
Dewasch et al., A two-dimensional heterogeneous model for fixed bed catalytic reactors. *Chem Eng Sci.* 1971;26:629-34.
Di Blasi, Modeling wood gasification in a countercurrent fixed-bed reactor. AIChE J. 2004; 50(9):2306-19.
Gupta et al., Direct analogy between mass and heat transfer to beds of spheres. *AIChE J.* 1963;9(6):751-4.
Hobbs et al., Combustion and gasification of coals in fixed-beds. Prog Energy Combust Sci. 1993;19:505-86.
Hobbs et al., Modeling fixed-bed coal gasifiers. AIChE J. May 1992;38(5):681-702.
Klote, A general routine for analysis of stack effect. NISTIR 4588. 1991. 32 pages.
Ratte et al., Mathematical modelling of continuous biomass torrefaction reactor: TORSPYD™ column. Biomass Bioenergy. 2011;35:3481-95.
Winslow, Numerical model of coal gasification in a packed bed. Proc Int Symposium Combustion. The Combustion Insitiute, PA. 1976:503-13.
Extended European Search Report dated Jan. 20, 2021 for Application No. EP 18802355.0.
IN 201917051842, Jun. 2, 2021, First Examination Report.
First Examination Report dated Jun. 2, 2021 for Application No. IN 201917051842. 6 pages.

* cited by examiner

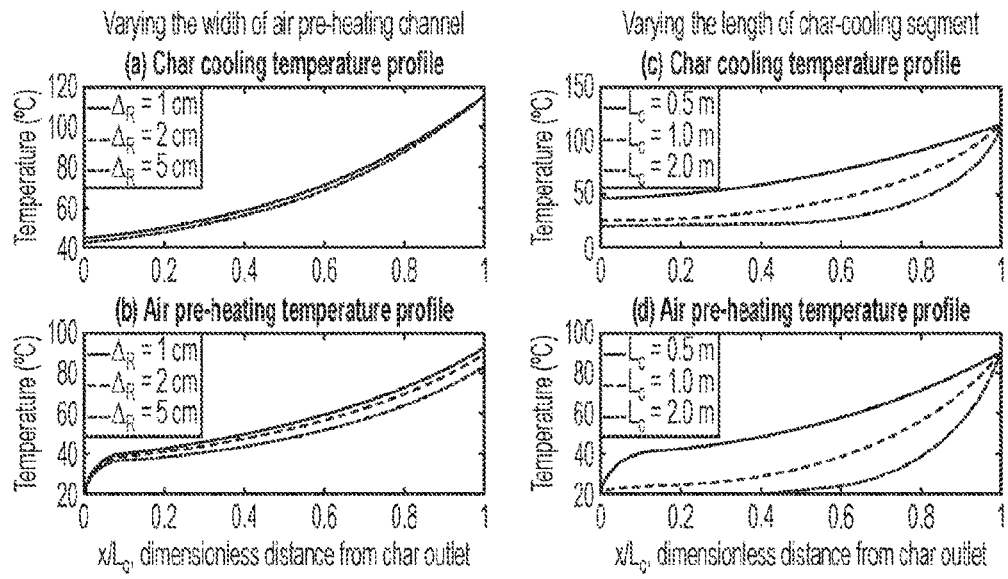
FIG. 58
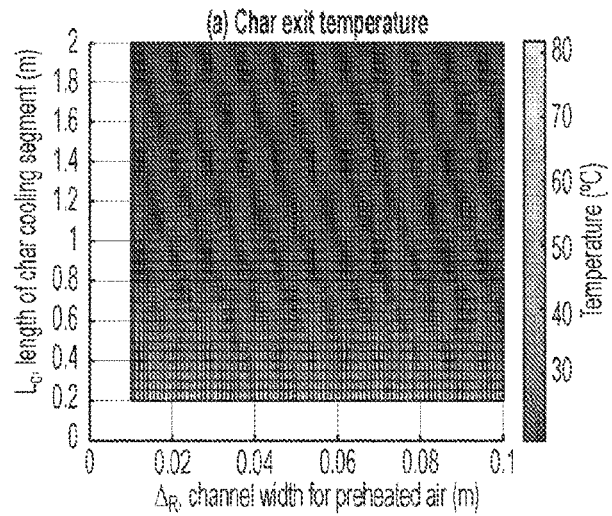
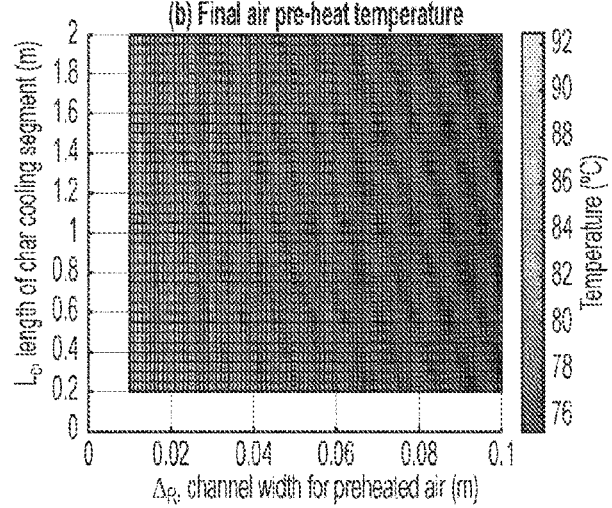
FIG. 59

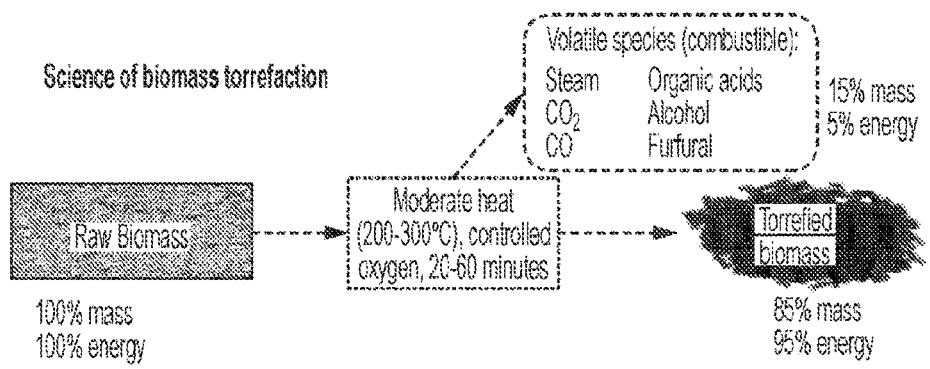

FIG. 90

Benefits of biomass torrefaction

| Criteria | Raw biomass pellets | Torrefied biomass pellets | |
|---|---|---|---|
| Moisture content | 10-50% (hydrophilic) | 1-5% (hydrophobic) | ⎫ Long-term storage |
| Storage shelf-life | Weeks (biodegradation) | Months → years | ⎭ |
| Product consistency | Heterogeneous | Homogeneous | → Feedstock robustness |
| Mass energy density | 10-20 MJ/kg (dry basis) | 20-24 MJ/kg (dry basis) | ⎫ Upgrading, transportability |
| Energy transportation cost | ~2.0¢/GJ/km | ~1.6¢/GJ/km | ⎬ |
| Burning temperature | ~500°C | ~800°C | ⎭ |

FIG. 91

Our concept: portable units capable of decentralized conversion

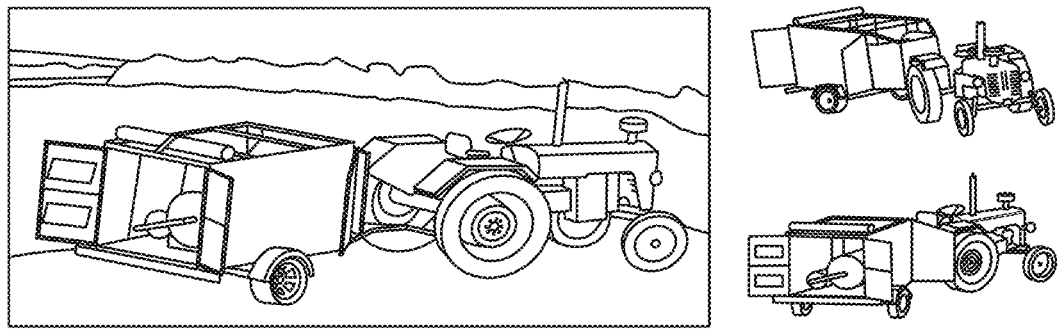

FIG. 92

Defining σ, the normalized air/fuel ratio

- For pine shavings:

$$C_{4.1}H_{6.4}O_{2.8} + 4.3(O_2 + 3.76N_2) \rightarrow 4.1CO_2 + 3.2H_2O + 16.2N_2.$$

- At stoichiometry, there is 5.5 kg of air per 1 kg of pine shavings (5.2% moisture, 1.6% ash).
- Stoichiometric air/fuel mass ratio = $AFR_{stoic}$ = 5.5 ($kg_{air}/kg_{biomass}$).
- σ = normalized air/fuel ratio = $AFR_{actual}/AFR_{stoic}$.
- For torrefaction, we expect σ < 1.

FIG. 93

| Type | Moisture content | Ash content | Stoic. air/fuel ratio | Bulk density | Particle size | Bulk permeability |
|---|---|---|---|---|---|---|
| Pine shavings | 6.3% | 1.6% | 5.26 | 30 kg m$^{-3}$ | 8.4 mm | 1.5 x 10$^{-7}$ m$^2$ |
| Hay | 4.4% | 5.1% | 3.94 | 33 kg m$^{-3}$ | 10.0 mm | 1.0 x 10$^{-7}$ m$^2$ |
| Rice husks | 7.2% | 17.0% | 2.53 | 95 kg m$^{-3}$ | 3.7 mm | 8.6 x 10$^{-9}$ m$^2$ |

Estimated sensible heat loss from exhaust gases

Measured by placing a thermocouple at the exhaust gas outlet.
This is minor compared to the overall thermal loss from exhaust stream.
Therefore, the chemical component may be predominant.

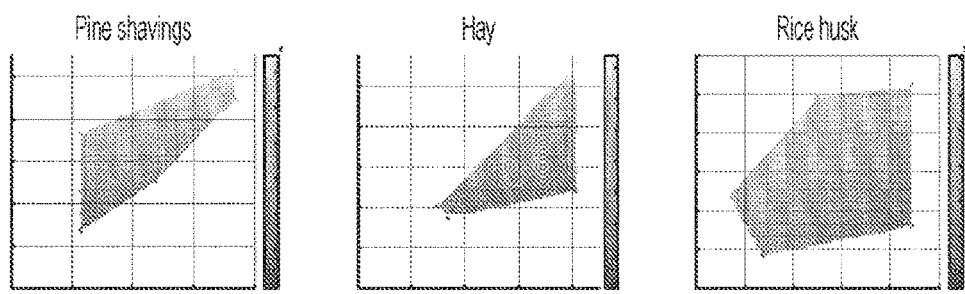

FIG. 100

Side wall heat loss scales down as reactor scales up

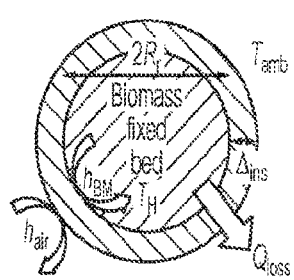

Relative side wall heat losses under various conditions

| Feed rate | Reactor radius | Mild torrefaction | Severe torrefaction |
|---|---|---|---|
| ~ 1 kg/h | 2 inches | 11% | 8% |
| ~ 20 kg/h | 9 inches | 2.5% | 1.8% |
| ~ 200 kg/h | 2.4 feet | 0.78% | 0.57% |

FIG. 101

BIOMASS CONVERSION REACTORS AND ASSOCIATED SYSTEMS AND METHODS

RELATED APPLICATIONS

This application is a U.S. National Stage patent application based on International Application No. PCT/US2018/033007, filed May 16, 2018 and entitled "Biomass Conversion Reactors and Associated Systems and Methods," which is incorporated herein by reference in its entirety for all purposes. International Application No. PCT/US2018/033007 claims priority under 35 U.S.C. § 119(e) to U.S. Provisional Application No. 62/506,715 filed May 16, 2017, and entitled "Biomass Torrefaction Reactor," which is incorporated herein by reference in its entirety for all purposes. International Application No. PCT/US2018/033007 also claims priority under 35 U.S.C. § 119(e) to U.S. Provisional Application No. 62/618,583, filed Jan. 17, 2018, and entitled "Biomass Conversion Reactors and Associated Systems and Methods," which is incorporated herein by reference in its entirety for all purposes. International Application No. PCT/US2018/033007 also claims priority under 35 U.S.C. § 119(e) to U.S. Provisional Application No. 62/618,589 filed Jan. 17, 2018, and entitled "Oxygen Flow Rate Management in Biomass Conversion Reactors," which is incorporated herein by reference in its entirety for all purposes.

TECHNICAL FIELD

Systems and methods associated with biomass conversion are generally described.

BACKGROUND

Biomass—such as post-harvest agricultural residues—represents a vast untapped value for energy and other applications. However, most of the world's biomass resources are located in remote distributed locations, which make the logistics of conversion and utilization expensive. Accordingly, improved systems and methods are needed.

SUMMARY

Systems and methods for biomass conversion are generally described. The subject matter of the present invention involves, in some cases, interrelated products, alternative solutions to a particular problem, and/or a plurality of different uses of one or more systems and/or articles.

In one aspect, methods of decomposing biomass within a reactor to form a primarily solid product are provided. A method of decomposing biomass may comprise adjusting a flow rate of a fluid comprising oxygen into the reactor in which the biomass is decomposed. The adjustment may be made, at least in part, based upon a measurement of a characteristic of the reactor and/or a characteristic of the biomass.

In another aspect, methods of cooling at least partially decomposed biomass in a system configured for biomass decomposition are provided. The system may comprise a reactor in which the biomass is decomposed and an outlet conduit in which the biomass is cooled. A method of cooling at least partially decomposed biomass may comprise flowing a gas over the outlet conduit. The outlet conduit may be fluidically connected to the reactor. The system may be configured to direct the gas to the reactor after it has flowed over the outlet conduit.

In another aspect, systems configured for biomass decomposition are provided. A system may comprise a reactor comprising an inlet fluidically connected to a source of a fluid comprising oxygen. The system may be configured to adjust a flow rate of the fluid comprising the oxygen into the reactor. The adjustment may be made, at least in part, based upon a measurement of a characteristic of the reactor and/or a characteristic of the biomass.

A system configured for biomass decomposition may comprise a reactor and an outlet conduit. The outlet conduit may be configured such that greater than or equal to 75% of its axially projected cross-sectional area is occupied by a conveyor.

In some embodiments, a system configured for biomass decomposition comprises a reactor comprising an elongated compartment having a longitudinal axis and an outlet conduit comprising a conveyor. The longitudinal axis may be arranged substantially vertically.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIGS. 58-59 show charts showing the predicted temperature of fluids flowing over various outlet conduits and the predicted temperature interior to various outlet conduits, according to some embodiments;

FIG. 90 shows a schematic depiction of biomass torrefaction, according to some embodiments;

FIG. 91 shows certain benefits associated with biomass torrefaction, according to some embodiments;

FIG. 92 shows the design of a system configured for biomass decomposition, according to some embodiments;

FIG. 93 shows certain reactions that may occur during biomass decomposition, according to some embodiments;

FIG. 100 shows the estimated sensible heat from various exhaust gases, according to some embodiments;

FIG. 101 shows estimate heat loss through the side walls of a reactor, according to some embodiments;

DETAILED DESCRIPTION

Systems configured for biomass decomposition and methods of decomposing biomass are generally provided. The biomass decomposition may comprise one or more reactions in which the biomass undergoing the decomposition is at least partially transformed from an initial feedstock to a final feedstock that has one or more advantages with respect to the initial feedstock. For instance, biomass decomposition may increase the suitability of the initial biomass for combustion applications, increase the energy density of the initial biomass, and/or reduce the water content of the initial biomass. In some embodiments, biomass decomposition may comprise torrefaction.

In some embodiments, a system configured for biomass decomposition may include one or more features that allow for biomass to be decomposed in an advantageous manner. As an example, a system may be configured to decompose biomass under certain concentrations of various species and the system may comprise one or more features that are configured to sense the amount of those species in the reactor and/or regulate the flow of those species into the reactor. As another example, a system may be configured to decompose biomass in a manner that is cost and/or energy efficient. Some (although not necessarily all) systems described herein may have other advantages, such as one or more advantages further described below.

Certain of the methods described herein may be employed to decompose biomass in an advantageous fashion. For instance, some methods are related to cooling at least partially decomposed biomass in a manner that advantageously warms an input to a reactor within a system for decomposing biomass. Some methods are related to adjusting one or more parameters based upon measurements made of certain characteristics associated with biomass and/or a system in which it decomposes. Some methods may be performed in and/or on systems described herein.

Figure 1:
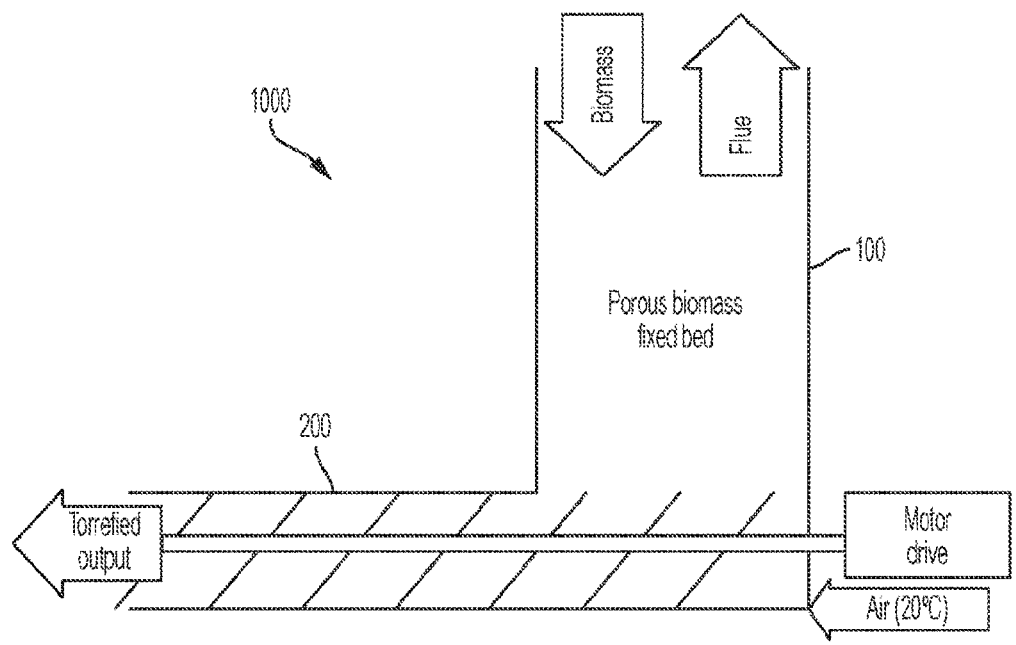
FIG. 1 is a schematic depiction of a system configured for biomass decomposition, according to some embodiments.

As described above, certain embodiments relate to systems configured for biomass decomposition. In some embodiments, a system configured for biomass decomposition comprises a reactor and an outlet conduit. FIG. 1 shows one example of a system 1000 configured for biomass decomposition comprising reactor 100 and outlet conduit 200. As shown in FIG. 1, the reactor may be configured such that biomass (e.g., biomass that is not decomposed or is minimally decomposed) is introduced into the reactor. The biomass may flow through the reactor, in which it at least partially decomposes, and then into the outlet conduit. The at least partially decomposed biomass may then be transported through the outlet conduit and out of the reactor. It should be understood that the design of the reactor and outlet conduit may be other than that shown in FIG. 1. For instance, the reactor and/or outlet conduit may lack one or more features shown in FIG. 1 or include one or more features not shown in FIG. 1 (e.g., features described in further detail below).

Figure 2:
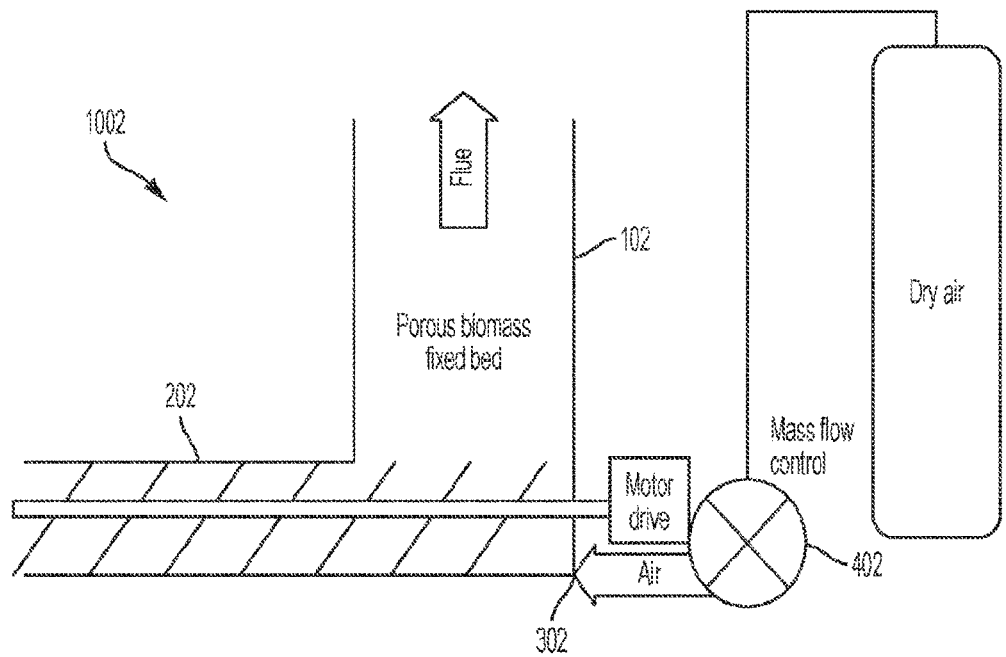
FIG. 2 is a schematic depiction of a system configured for biomass decomposition comprising an air inlet, according to some embodiments.

In some embodiments, a system configured for biomass decomposition may comprise one or more locations at which one or more species may be introduced into the system. For instance, as shown in FIG. 1, a system configured for biomass decomposition may comprise one or more fluid inlets (e.g., one or more gas inlets). The fluid inlets may be fluidically connected to a source of a particular fluid, such as a source of a fluid comprising oxygen, a source of a gas, and/or a source of air. The fluid inlets may be positioned in a variety of suitable locations, as described in further detail below. In some embodiments, a system configured for biomass decomposition may comprise one or more fluid inlets at which the rate of fluid flow into the reactor may be controlled (e.g., by an operator of the system, by an electronic controller). In FIG. 2, system 1002 configured for biomass decomposition comprises reactor 102 and outlet conduit 202. In FIG. 2, the system configured for biomass decomposition further comprises air inlet 302. The rate of flow of air from air inlet 302 into the reactor is controlled by flow controller 402 (e.g., a mass flow controller, a volumetric flow controller, a fan, a regulator configured to regulate flow of compressed air into the reactor, an opening in the reactor with a size configured to control the flow of air in an advantageous manner). In some embodiments, a system comprising one or more fluid inlets at which the rate of fluid flow into the reactor may be controlled may be configured to adjust the rate of fluid flow (e.g., oxygen flow, air flow) through the fluid inlet based, at least in part, upon a measurement of a characteristic of the system (e.g., the reactor) and/or upon a measurement of a characteristic of the biomass (e.g., a characteristic of the biomass being input into the system, a characteristic of the biomass in the system, a characteristic of the biomass exiting the system, a characteristic of one or more exhaust gases produced during biomass decomposition).

Figure 3:
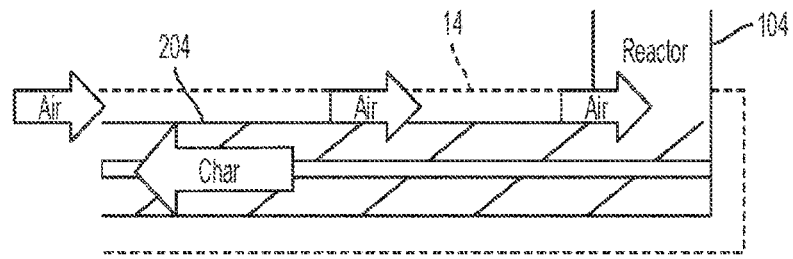
FIGS. 3-5 are schematic depictions of outlet conduits, according to some embodiments.

As described above, in some embodiments, a system for biomass decomposition may be configured to be energy efficient. For instance, a system for biomass decomposition may be configured to employ heat released during biomass cooling to heat the reactor. FIG. 3 shows one non-limiting embodiment of an outlet conduit 204 configured to cool biomass therein and to recover a portion of the energy released by cooling the biomass to heat the reactor. In FIG. 3, the system comprising the outlet conduit is configured to direct air external to the system over the outlet conduit and into reactor 104 fluidically coupled to the outlet conduit. The air external to the system flows between jacket 14 and outlet conduit 204 prior to entering reactor 104. This configuration can, in accordance with certain embodiments, reduce the amount of energy lost to the atmosphere during cooling of biomass in the outlet conduit and/or reduce the energy required to heat the air to the temperature at which it enters the reactor. Certain embodiments are related to methods performed using a system with this design. For instance, a method may comprise flowing a fluid (e.g., a gas, a fluid comprising oxygen, air) over an outlet conduit in a system configured to direct the fluid to a reactor in the system after it has flowed over the outlet conduit. The fluid may be configured to enter the reactor through one or more fluid inlets.

Figure 4:
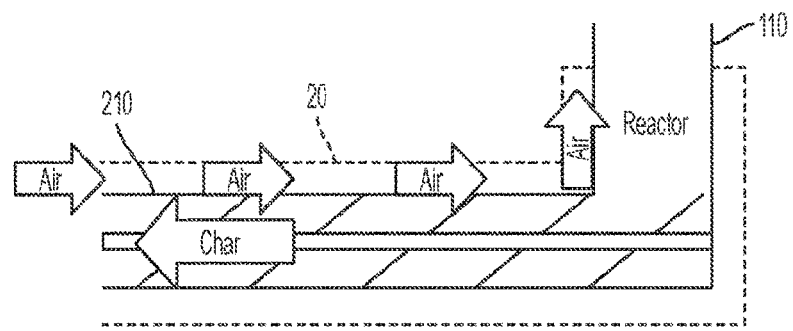

In some embodiments, a system configured to direct a fluid (e.g., a gas, a fluid comprising oxygen) into a reactor after it has flowed over an outlet conduit may do so in a manner similar to that shown in FIG. 3. For example, the system may comprise a jacket positioned around the outlet conduit that directs the fluid to an opening in the reactor through which it may enter the reactor. In some embodiments, a system is configured to direct a fluid into a reactor after it has flowed over an outlet conduit in a manner that is different in one or more ways than that shown in FIG. 3 and/or is configured to direct a fluid into a reactor in a manner that makes use of one or more features not shown in FIG. 3. For example, the system may lack a jacket. As another example, the system may comprise a jacket having a design other than that shown in FIG. 3 (e.g., the jacket may only be positioned around a portion of the outlet conduit, such as only the upper portion or only the lower portion; the jacket may be a different distance or relative distance from the outlet conduit; the jacket may comprise an additional portion positioned around the reactor). FIG. 4 shows one non-limiting example of a system with a jacket design different than that shown in FIG. 3. In FIG. 4, jacket 20 is positioned around both outlet conduit 210 and a portion of reactor 110. As a third example, the system may direct the fluid into the reactor in an active manner (e.g., by an actively established pressure gradient, such as by use of a pump and/or by use of a fan).

Figure 5:
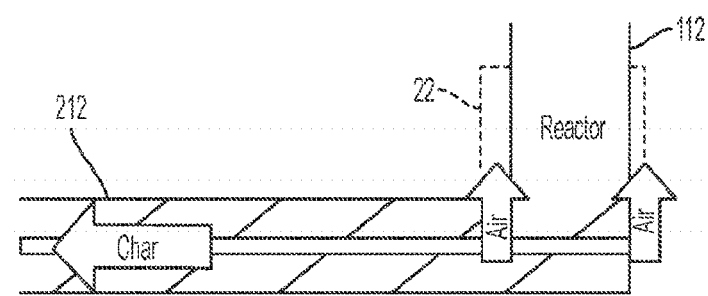

Certain systems described herein are configured to direct a fluid (e.g., a gas, a fluid comprising oxygen) into a reactor after it has flowed over a portion of the reactor. In some embodiments, the fluid flows over both an outlet conduit and the reactor. For example, the fluid may flow through a jacket positioned around the both a portion of the outlet conduit and a portion of the reactor (e.g., through a jacket as shown in FIG. 4). As another example, the fluid may flow through a jacket positioned around the reactor but not the outlet conduit. FIG. 5 shows one example of a jacket with this design. In FIG. 5, jacket 22 is positioned around reactor 112, but not around outlet conduit 212. As a third example, the system may direct the fluid over the outlet conduit and the reactor in an active manner (e.g., by use of a pump, by use of a fan). In some embodiments, the fluid flows over the reactor without flowing over the outlet conduit. In some embodiments, the system may direct fluid into the reactor that has flowed over neither the outlet conduit nor the reactor.

When a system is configured to direct a fluid (e.g., a gas, a fluid comprising oxygen) into a reactor (e.g., after flowing over an outlet conduit, after flowing over a portion of the reactor, after flowing over neither the outlet conduit nor a portion of the reactor), it may direct the fluid to a variety of suitable locations in the reactor. The fluid may enter the reactor through one or more fluid inlets positioned at these location(s). In some embodiments, the system is configured to direct the fluid into a section of the reactor configured to perform biomass decomposition. For instance, the system may be configured to direct the fluid into a section of the reactor proximate an outlet conduit, and/or a bottom portion of the reactor. The fluid may serve as a source of oxygen (and/or other reagent(s)) that may react with the biomass during biomass decomposition to produce at least partially decomposed biomass. In some embodiments, the system is configured to direct the fluid into a section of the reactor configured to allow for reaction of one or more gases. For instance, the system may be configured to direct the fluid to a section of the reactor configured to allow for reaction (e.g., oxidation) of a portion of exhaust gas produced by biomass decomposition, configured to direct the fluid to a section of the reactor proximate a hopper configured to receive biomass from an environment external to the reactor, and/or configured to direct the fluid to an upper section of the reactor. The fluid may serve as a source of oxygen (and/or other reagent(s)) that may react with the exhaust gases. The reaction may comprise reacting gases that are more toxic and/or less desirable to emit from the system to form gases that are less toxic and/or more desirable to emit from the system.

Figure 6:
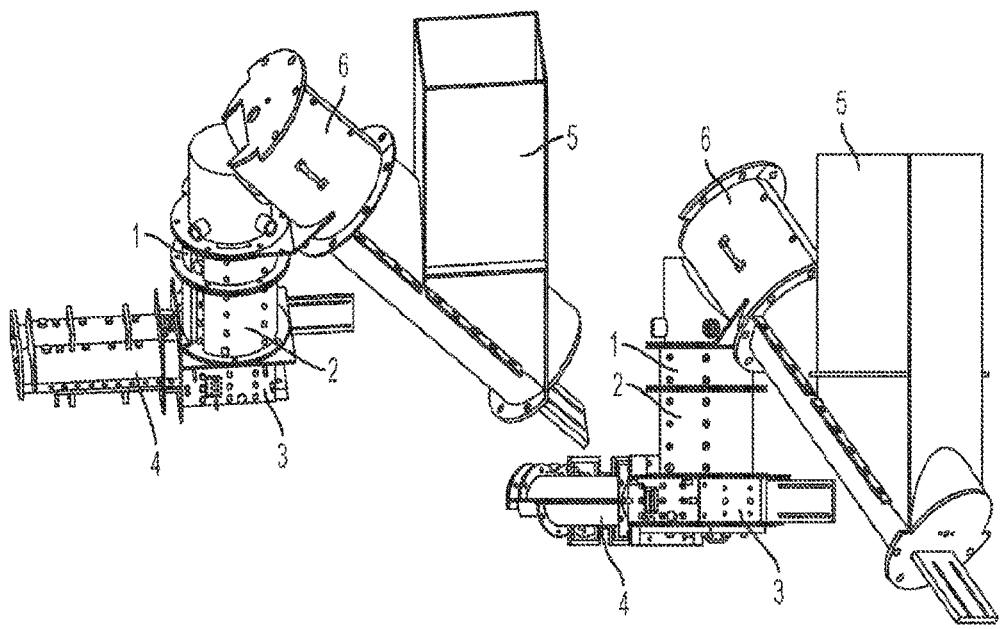
FIGS. 6-7 are schematic depictions of systems configured for biomass decomposition, according to some embodiments.
Figure 7:
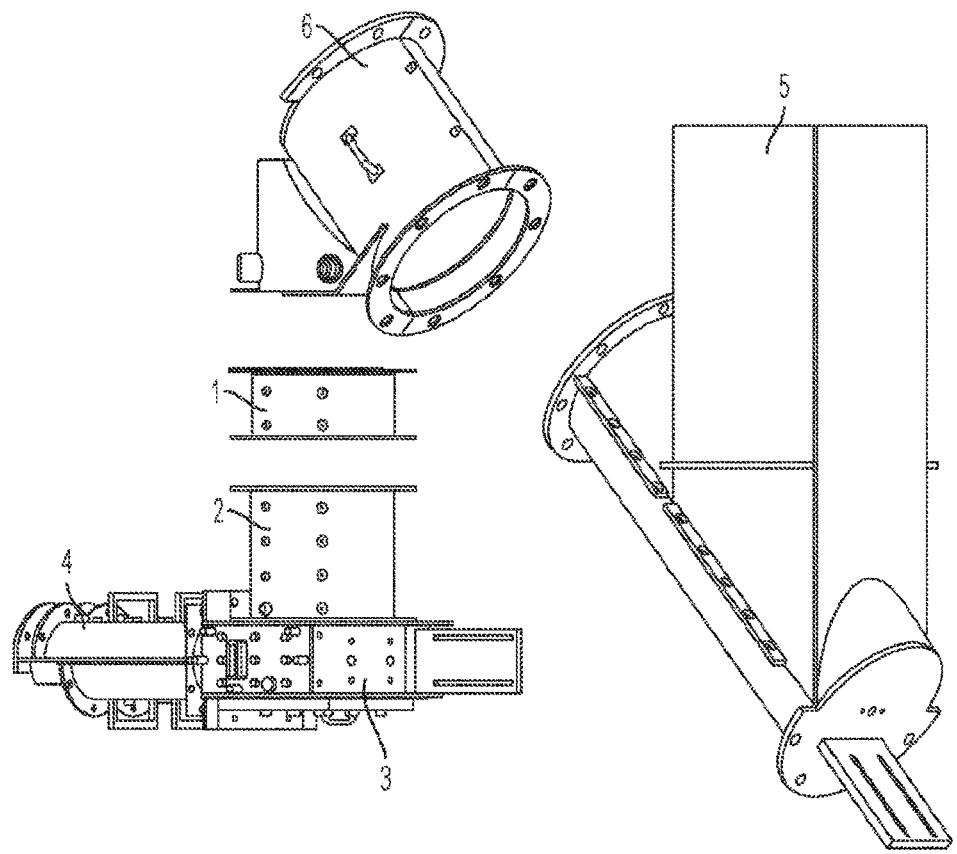

In some embodiments, a system for biomass decomposition may have a design as shown in FIG. 6 and/or as shown in FIG. 7. FIGS. 6 and 7 show a system comprising a reactor comprising a reactor assembly, a firebox assembly, and a combustor assembly; an outlet conduit comprising a lower auger assembly; a hopper; and a hopper connector configured to introduce biomass into the system. During operation, the systems shown in FIGS. 6 and 7 may receive biomass from the hopper. The biomass may flow from the hopper into the hopper connector and then into the combustor assembly. The biomass may flow down the reactor, into the combustor assembly and then into the reactor assembly. While inside the reactor, the biomass may at least partially decompose (e.g., it may undergo torrefaction). Then, the biomass may enter the lower auger assembly. The biomass may be translated out of the system by movement of the auger within the lower auger assembly.

As described above, certain embodiments relate to methods of biomass decomposition or systems configured for biomass decomposition.

Biomass may be, in accordance with certain embodiments, any carbon-containing material derived from a plant. The biomass can comprise, according to certain embodiments, both carbon and hydrogen. In certain cases, at least a portion of the biomass that is decomposed is solid biomass. For example, in some cases, at least 50 wt %, at least 75 wt %, at least 90 wt %, at least 95 wt %, or at least 99 wt % of the biomass that is fed to the system to be decomposed is solid biomass. Non-limiting examples of biomass that can be decomposed using the systems and/or methods described herein include pine shavings, hay, rice husk, sugarcane bagasse, coconut shells, straw, corn stover, and corn cobs. Other forms of biomass could also be used.

In accordance with certain embodiments, biomass decomposition may comprise any reaction in which biomass is transformed from an initial state to a final state in which the biomass has improved fuel characteristics relative to in its initial state. In some embodiments, the biomass decomposition comprises a chemical reaction, such as the breaking and/or forming of one or more covalent chemical bonds. In some embodiments, biomass decomposition may comprise evolution of one or more gases from the biomass (e.g., water vapor, gases formed by reaction of the biomass, exhaust). In some embodiments, biomass decomposition may comprise formation of a solid product. For instance, biomass decomposition may comprise formation of a primarily solid product (e.g., a product that is at least 20 wt % solid, at least 30 wt % solid, at least 50 wt % solid, at least 75 wt % solid, or at least 90 wt % solid and/or a product that is less than or equal to 95 wt % solid, less than or equal to 90 wt % solid, less than or equal to 75 wt % solid, less than or equal to 50 wt % solid, or less than or equal to 30 wt % solid). In some embodiments, biomass decomposition may comprise one or more reactions that occur in an oxidizing environment (e.g., reaction of the biomass with oxygen). In some embodiments, biomass decomposition may comprise one or more reactions that occur in an inert environment (e.g., pyrolysis of the biomass).

According to certain embodiments, a torrefaction reaction occurs as part of the biomass decomposition. As used herein, the term "torrefaction" refers to a thermal process to convert biomass into a primarily solid material that has better fuel characteristics than the original biomass. In some embodiments, the torrefaction reaction produces a reaction product comprising coal and/or one or more coal-like substances. In some embodiments, the torrefaction reaction produces a solid product that contains carbon in an amount of at least 10 wt %, at least 20 wt %, at least 30 wt %, at least 40 wt %, at least 50 wt %, at least 75 wt %, at least 90 wt %, or more. In some embodiments, the torrefaction reaction densifies the biomass. In certain embodiments, the torrefaction reaction renders the biomass suitable for subsequent combustion.

In some embodiments, the torrefaction reaction comprises heating the biomass in the presence of an oxygen-containing atmosphere. The oxygen content in the oxygen-containing atmosphere can be, in some embodiments, less than about 21 at %, less than about 20 at %, less than about 15 at %, less than about 10 at %, less than about 5 at %, less than about 2 at %, less than about 1 at %, less than about 0.5 at %, less than about 0.2 at %, or less than about 0.1 at %. The oxygen content in the oxygen-containing atmosphere can be, in some embodiments, greater than about 0 at %, greater than about 0.1 at %, greater than about 0.2 at %, greater than about 0.5 at %, greater than about 1 at %, greater than about 2 at %, greater than about 5 at %, greater than about 10 at %, greater than about 15 at %, or greater than about 20 at %. Combinations of the above-referenced ranges are also possible (e.g., greater than about 0 at % and less than about 21 at %). Other ranges are also possible. In some embodiments, the torrefaction reaction may occur in an oxygen-containing environment with an amount of oxygen substantially equivalent to the amount of oxygen in air.

Biomass decomposition may occur at any suitable temperature. Biomass decomposition may occur at a temperature of greater than or equal to 150° C., greater than or equal to 175° C., greater than or equal to 200° C., greater than or equal to 225° C., greater than or equal to 250° C., greater than or equal to 275° C., greater than or equal to 300° C., greater than or equal to 325° C., greater than or equal to 350° C., greater than or equal to 375° C., greater than or equal to 400° C., greater than or equal to 425° C., greater than or equal to 450° C., greater than or equal to 475° C., greater than or equal to 500° C., greater than or equal to 550° C., greater than or equal to 600° C., greater than or equal to 650° C., greater than or equal to 700° C., greater than or equal to 750° C., greater than or equal to 800° C., or greater than or equal to 850° C. Biomass decomposition may occur at a temperature of less than or equal to 900° C., less than or equal to 850° C., less than or equal to 800° C., less than or equal to 750° C., less than or equal to 700° C., less than or equal to 650° C., less than or equal to 600° C., less than or equal to 550° C., less than or equal to 500° C., less than or equal to 475° C., less than or equal to 450° C., less than or equal to 425° C., less than or equal to 400° C., less than or equal to 375° C., less than or equal to 350° C., less than or equal to 325° C., less than or equal to 300° C., less than or equal to 275° C., less than or equal to 250° C., less than or equal to 225° C., less than or equal to 200° C., or less than or equal to 175° C. Combinations of the above-referenced ranges are also possible (e.g., greater than or equal to 150° C. and less than or equal to 900° C., greater than or equal to 150° C. and less than or equal to 500° C., greater than or equal to 200° C. and less than or equal to 400° C., or greater than or equal to 200° C. and less than or equal to 350° C.). Other ranges are also possible.

The hottest temperature in the reactor during biomass decomposition may be any of a variety of values. The hottest temperature in the reactor during biomass decomposition may be greater than or equal to 150° C., greater than or equal to 175° C., greater than or equal to 200° C., greater than or equal to 225° C., greater than or equal to 250° C., greater than or equal to 275° C., greater than or equal to 300° C., greater than or equal to 325° C., greater than or equal to 350° C., greater than or equal to 375° C., greater than or equal to 400° C., greater than or equal to 425° C., greater than or equal to 450° C., greater than or equal to 475° C., greater than or equal to 500° C., greater than or equal to 550° C., greater than or equal to 600° C., greater than or equal to 650° C., greater than or equal to 700° C., greater than or equal to 750° C., greater than or equal to 800° C., or greater than or equal to 850° C. The hottest temperature in the reactor during biomass decomposition may be less than or equal to 900° C., less than or equal to 850° C., less than or equal to 800° C., less than or equal to 750° C., less than or equal to 700° C., less than or equal to 650° C., less than or equal to 600° C., less than or equal to 550° C., less than or equal to 500° C., less than or equal to 475° C., less than or equal to 450° C., less than or equal to 425° C., less than or equal to 400° C., less than or equal to 375° C., less than or equal to 350° C., less than or equal to 325° C., less than or equal to 300° C., less than or equal to 275° C., less than or equal to 250° C., less than or equal to 225° C., less than or equal to 200° C., or less than or equal to 175° C. Combinations of the above-referenced ranges are also possible (e.g., greater than or equal to 150° C. and less than or equal to 900° C., greater than or equal to 150° C. and less than or equal to 500° C., greater than or equal to 200° C. and less than or equal to 400° C., or greater than or equal to 200° C. and less than or equal to 350° C.). Other ranges are also possible.

In some embodiments, biomass decomposition may result in an improvement in one or more properties of the biomass. For instance, decomposition may enhance the energy density of the biomass. In some embodiments, biomass decomposition enhances the energy density of the biomass by greater than or equal to 0.1%, greater than or equal to 1%, greater than or equal to 2%, greater than or equal to 5%, greater than or equal to 10%, greater than or equal to 15%, greater than or equal to 20%, greater than or equal to 30%, or greater than or equal to 40%. In some embodiments, biomass decomposition enhances the energy density of the biomass by less than or equal to 50%, less than or equal to 40%, less than or equal to 30%, less than or equal to 20%, less than or equal to 15%, less than or equal to 10%, less than or equal to 5%, less than or equal to 2%, or less than or equal to 1%. Combinations of the above-referenced ranges are also possible (e.g., greater than or equal to 0.1% and less than or equal to 50%). Other ranges are also possible. The energy density of the biomass may be determined by using a calorimeter. It should be understood that the ranges above may refer to either or both of the volumetric energy density of the biomass and the mass energy density of the biomass. It should also be understood that a system as described herein (and/or a component thereof, such as an outlet conduit) may be configured to output biomass for which the energy density has been enhanced by a value within one or more of the ranges listed above. In some embodiments, a method may comprise outputting biomass for which the energy density has been enhanced by a value within one or more of the ranges listed above.

In some embodiments, an enhancement in the energy density of the biomass during biomass decomposition may be expressed as an index of torrefaction. As used herein, the index of torrefaction of biomass is the ratio of a higher heating value of the biomass after decomposition to a higher heating value of the biomass prior to decomposition. The higher heating value of the biomass may be determined by grinding the biomass into particles with an average largest cross-sectional diameter of less than or equal to 0.5 mm, pressing the ground particles using a ¼" diameter by 1" pelleting press (Parr Instrument 2810 series), and combusting the biomass in a calorimeter (e.g., Parr Instrument Model 6200 isoperibol). Combusting the biomass in the calorimeter may be performed by immersing the calorimeter in a known quantity of water, creating a pressurized pure oxygen environment inside the calorimeter, electrically igniting a spark, and then measuring the increase in the temperature of the known quantity of water. The energy absorbed by the water can be determined based on the known heat capacity of the water and divided by the initial mass of the biomass to yield the higher heating value of the biomass.

In some embodiments, a system as described herein (and/or a component thereof, such as an outlet conduit) may be configured to output biomass with an index of torrefaction of greater than or equal to 1.00, greater than or equal to 1.05, greater than or equal to 1.10, greater than or equal to 1.15, greater than or equal to 1.20, greater than or equal to 1.25, greater than or equal to 1.30, greater than or equal to 1.35, greater than or equal to 1.40, greater than or equal to 1.45, greater than or equal to 1.50, greater than or equal to 1.55, greater than or equal to 1.60, greater than or equal to 1.65, greater than or equal to 1.70, greater than or equal to 1.75, greater than or equal to 1.80, greater than or equal to 1.85, greater than or equal to 1.90, greater than or equal to 1.95, greater than or equal to 2.00, or higher. A system as described herein may be configured to output biomass with an index of torrefaction of less than or equal to 2.00, less than or equal to 1.50, or lower. Combinations of the above-referenced ranges are also possible (e.g., greater than or equal to 1.00 and less than or equal to 2.00, or greater than or equal to 1.05 and less than or equal to 1.50). Other ranges are also possible.

In some embodiments, biomass decomposition increases the hydrophobicity of the biomass. Biomass decomposition may increase the hydrophobicity of the biomass by decreasing the moisture content of the biomass. The moisture content of the biomass after biomass decomposition may be less than or equal to 10%, less than or equal to 5%, less than or equal to 2%, or less than or equal to 1%. The moisture content of the biomass after biomass decomposition may be greater than or equal to 0%, greater than or equal to 1%, greater than or equal to 2%, or greater than or equal to 5%. Combinations of the above-referenced ranges are also possible (e.g., greater than or equal to 0% and less than or equal to 10%). Other ranges are also possible. It should be understood that the ranges above may refer to the moisture content on one or more of wt %, vol %, and mol % bases. It should also be understood that a system as described herein (and/or a component thereof, such as an outlet conduit) may be configured to output biomass with a moisture content within one or more of the ranges listed above. In some embodiments, a method may comprise outputting biomass with a moisture content within one or more of the ranges listed above.

In some embodiments, biomass decomposition enhances the grindability of the biomass. In other words, biomass may be ground into particles with less energy input after decomposition than prior to decomposition. The ratio of the energy input required to grind the biomass after decomposition to the energy input required to grind the biomass prior to decomposition may be less than or equal to 1, less than or equal to 0.8, less than or equal to 0.5, or less than or equal to 0.2. The ratio of the energy input required to grind the biomass after decomposition to the energy input required to grind the biomass prior to decomposition may be greater than or equal to 0.1, greater than or equal to 0.2, greater than or equal to 0.5, or greater than or equal to 0.8. Combinations of the above-referenced ranges are also possible (e.g., less than or equal to 1 and greater than or equal to 0.1). Other ranges are also possible. The energy input required to grind the biomass may be determined by passing the biomass through an IKA MF 10.1 mill connected to a HOBO UX120 plug load logger and to a 2.0 mm grate preventing efflux of species with a size larger than the grate, measuring the power supplied to the mill, measuring the mass flow rate of the biomass through the mill, and dividing power supplied to the mill by the mass flow rate of the biomass through the mill. It should also be understood that a system as described herein (and/or a component thereof, such as an outlet conduit) may be configured to output biomass for which a ratio of the energy input required to grind the biomass after decomposition to the energy input required to grind the biomass prior to decomposition is within one or more of the ranges listed above. In some embodiments, a method may comprise outputting biomass for which a ratio of the energy input required to grind the biomass after decomposition to the energy input required to grind the biomass prior to decomposition is within one or more of the ranges listed above.

In some embodiments, a system as described herein (and/or a component thereof, such as an outlet conduit) is configured to output at least partially decomposed biomass at a variety of suitable temperatures. The system as described herein (and/or a component thereof, such as an outlet conduit) may be configured to output at least partially decomposed biomass at a temperature of greater than or equal to 25° C., greater than or equal to 50° C., greater than or equal to 75° C., greater than or equal to 100° C., greater than or equal to 125° C., greater than or equal to 150° C., or greater than or equal to 175° C. The system as described herein may be configured to output at least partially decomposed biomass at a temperature of less than or equal to 200° C., less than or equal to 175° C., less than or equal to 150° C., less than or equal to 125° C., less than or equal to 100° C., less than or equal to 75° C., or less than or equal to 50° C. Combinations of the above-referenced ranges are also possible (e.g., greater than or equal to 25° C. and less than or equal to 200° C., or greater than or equal to 25° C. and less than or equal to 100° C.). Other ranges are also possible. It should also be understood that certain methods comprise outputting biomass (e.g., from a system, from an outlet conduit) at a temperature within one or more of the ranges listed above.

Biomass decomposition within a system may produce exhaust comprising one or more gases as a byproduct. In some embodiments, the system is configured to output exhaust with one or more beneficial properties. For instance, the system may be configured to output exhaust with a PM-2.5 level of less than or equal to 100 micrograms per cubic meter, less than or equal to 80 micrograms per cubic meter, less than or equal to 60 micrographs per cubic meter, less than or equal to 50 micrograms per cubic meter, less than or equal to 40 micrograms per cubic meter, or less than or equal to 35 micrograms per cubic meter. The PM-2.5 level may be determined by employing a UCB particle sensor capable of detecting PM-2.5 down to 25 mg/m$^3$ to measure the PM-2.5 level of the exhaust gas over the course of one hour, and then averaging the PM-2.5 levels measured over the hour. It should also be understood that certain methods comprise outputting exhaust (e.g., from a system, from a reactor) with a PM-2.5 level within one or more of the ranges listed above.

In some embodiments, a system is configured to output exhaust with a PM-10 level that is advantageous. The system may be configured to output exhaust with a PM-10 level that is less than or equal to 150 micrograms per cubic meter. The PM-10 level may be determined by passing the exhaust through a 10-micron filter and then measuring the mass increase of the filter over time. It should also be understood that certain methods comprise outputting exhaust (e.g., from a system, from a reactor) with a PM-10 level within one or more of the ranges listed above.

In some embodiments, a system is configured to output exhaust which includes a relatively low amount of $NO_x$. The exhaust may include a relatively low about of $NO_2$. The exhaust may include $NO_2$ at a level of less than or equal to 500 ppb, less than or equal to 400 ppb, less than or equal to 300 ppb, less than or equal to 200 ppb, or less than or equal to 100 ppb. The $NO_2$ level in the exhaust may be determined using a gas analyzer to measure the $NO_2$ level in the exhaust over the course of one hour, and then averaging the $NO_2$ levels measured over the hour. It should also be understood that certain methods comprise outputting exhaust (e.g., from a system, from a reactor) which includes an amount of $NO_2$ within one or more of the ranges listed above.

In some embodiments, a system is configured to output exhaust which includes a relatively low amount of $SO_x$. The exhaust may include $SO_x$ at a level of less than or equal to 5 ppm, less than or equal to 2 ppm, less than or equal to 1 ppm, less than or equal to 0.75 ppm, or less than or equal to 0.5 ppm. The $SO_x$ level in the exhaust may be determined using a gas analyzer to measure the $SO_x$ level in the exhaust over the course of three hours, and then averaging the $NO_2$ levels measured over the three hours. It should also be understood that certain methods comprise outputting exhaust (e.g., from a system, from a reactor) which includes an amount of $SO_x$ within one or more of the ranges listed above. The ranges listed above for $SO_x$ levels may refer to the total $SO_x$ level in the exhaust (i.e., the sum of the levels of various types of $SO_x$), or may refer to the level of any individual $SO_x$ in the exhaust. Non-limiting examples of $SO_x$ include lower sulfur oxides (e.g., $S_nO$, $S_7O_2$, $S_6O_2$), SO, $SO_2$, higher sulfur oxides (e.g., $SO_3$, $SO_4$, polymeric condensates of $SO_3$ and/or $SO_4$), $S_2O$, and $S_2O_2$.

In some embodiments, a system is configured to output exhaust with a relatively low amount of carbon monoxide (CO). The exhaust may include CO at a level of less than or equal to 50 ppm, less than or equal to 45 ppm, less than or equal to 40 ppm, or less than or equal to 35 ppm. The amount of CO in the exhaust may be determined by employing a Lascar EL-USB-CO sensor to measure the CO level over the course of one hour, and then averaging the CO levels measured over the hour. It should also be understood that certain methods comprise outputting exhaust (e.g., from a system, from a reactor) which includes an amount of CO within one or more of the ranges listed above.

As described above, certain embodiments comprise methods of decomposing biomass which comprise adjusting a flow rate of a fluid into a reactor and/or systems configured to adjust a flow rate of a fluid into a reactor. The fluid may be any of the fluids described herein (e.g., a gas, a fluid comprising oxygen, air). Adjusting the flow rate of the fluid may comprise increasing the flow rate of the fluid, maintaining the flow rate of the fluid at a constant value, and/or decreasing the flow rate of the fluid. Increasing or decreasing the flow rate of the fluid may comprise increasing or decreasing the flow rate of the fluid to a set value (e.g., increasing the flow rate from an initial value to a final value), and/or may comprise increasing or decreasing the flow rate of the fluid until another adjustment is made (e.g., continually increasing the flow rate until an adjustment is made to maintain the flow rate or decrease the flow rate). The set value may be zero (e.g., decreasing the flow rate may comprise shutting off the flow rate). Maintaining the flow rate may comprise maintaining the flow rate at a set value and/or at a measured value. The flow rate may be maintained for a set period of time (e.g., for at least half an hour, for at least an hour, for at least two hours, for at least four hours and/or for less than six hours, for less than four hours, for less than two hours, or for less than an hour) or maintained indefinitely (e.g., until an adjustment is made to increase the flow rate or decrease the flow rate). One or more of the adjustments described herein may be made with respect to an absolute value of the flow rate of the fluid in certain embodiments. In certain embodiments, one or more of the adjustments described herein may be made with respect to the flow rate of the fluid with respect to the flow rate of the biomass into and/or through the reactor.

It should be understood that adjusting the flow rate of a fluid into the reactor may comprise adjusting the flow rate of the fluid into the reactor at a single section (e.g., a section configured to perform biomass decomposition, a section configured to allow for reaction of one or more exhaust gases), may comprise adjusting the flow rate of the fluid into the reactor at more than one section, and/or may comprise adjusting the total flow rate of the fluid into the reactor (e.g., the flow rate of the fluid totaled across all of the fluid inlets for the fluid).

In some embodiments, the fluid may be a fluid comprising oxygen (e.g., a gas comprising oxygen, air, a fluid comprising nitrogen and oxygen, a fluid comprising carbon dioxide and oxygen, a fluid comprising a volatile gas and oxygen). It should be understood that the fluid comprising oxygen may be a variety of suitable fluids, such as pure oxygen and/or a fluid comprising oxygen mixed with one or more other gases. Non-limiting examples of such gases include nitrogen, carbon dioxide, and volatile gases. In some embodiments, the fluid comprising oxygen may be air. The fluid comprising oxygen may be a fluid flowed into the reactor from a variety of suitable sources. For instance, the fluid may flow into the reactor from an ambient atmosphere outside the reactor, from a compressed gas cylinder, from an exhaust stream of a chemical process (e.g., a chemical process producing $CO_2$ and/or $H_2O$, a chemical process producing one or more heated gases, a chemical process occurring in the system, a chemical process occurring external to the system, a chemical process associated with the system, a chemical process not associated with the system), and/or from one or more locations configured to direct the fluid comprising oxygen into the reactor. In some embodiments, the system may be configured to direct a fluid comprising oxygen over an outlet conduit and then into the reactor.

In cases in which the fluid is a fluid comprising oxygen, increasing the flow rate of the fluid into the reactor may increase the rate at which the biomass decomposes and/or the extent to which the biomass decomposes (e.g., by increasing the rate at which the biomass undergoes oxidation) and/or decreasing the flow rate of the fluid into the reactor may decrease the rate at which the biomass decomposes and/or the extent to which the biomass decomposes (e.g., by decreasing the rate at which the biomass undergoes oxidation). Some such cases may be cases where the fluid comprising oxygen is introduced into a section of the reactor configured to perform biomass decomposition. Increasing and/or decreasing the rate at which the biomass decomposes and/or the extent to which the biomass decomposes may, in some embodiments, increase and/or decrease the temperature inside the reactor. For instance, if the biomass decomposes exothermically in the presence of the fluid (e.g., if it is oxidized by the fluid), increasing the flow rate of the fluid into the reactor may increase the reactor temperature and/or decreasing the flow rate of the fluid into the reactor may decrease the reactor temperature.

In cases in which the fluid is a fluid comprising oxygen, increasing the flow rate of the fluid into the reactor may increase the rate at which one or more exhaust gases react and/or the extent to which one or more exhaust gases react (e.g., by increasing the rate at which the exhaust gas(es) undergo oxidation and/or the extent to which the exhaust gas(es) undergo oxidation) and/or decreasing the flow rate of the fluid into the reactor may decrease the rate at which the exhaust gas(es) react and/or the extent to which the exhaust gas(es) react (e.g., by decreasing the rate at which the exhaust gas(es) undergo oxidation and/or the extent to which the exhaust gas(es) undergo oxidation). Some such cases may be cases where the fluid comprising oxygen is introduced into a section of the reactor configured to allow for reaction of one or more exhaust gases. The section may be a section that is oxygen depleted.

In some embodiments, increasing a temperature of a section of a reactor may increase the rate of one or more reactions taking place in that section and/or increase the extent to which one or more reactions taking place in that section occur. Decreasing the temperature of a section of a reactor may decrease the rate of one or more reactions taking place in that section and/or decrease the extent to which one or more reactions taking place in that section occur.

A flow rate of a fluid may be adjusted, at least in part, based upon a measurement of a characteristic of the reactor and/or a characteristic of biomass. Certain methods comprise measuring a characteristic of the reactor and/or a characteristic of the biomass. If the measurement indicates that biomass decomposition is occurring too rapidly or to an extent that is too great, the flow rate of the fluid, if it comprises oxygen, may be reduced. If the measurement indicates that biomass decomposition is occurring too slowly or to an extent that is too low, the flow rate of the fluid, if it comprises oxygen, may be increased. If the measurement indicates that biomass decomposition is occurring appropriately, the flow rate of the fluid may be maintained. In some embodiments, one or more measurements may be made prior to decomposition of any of the biomass and/or prior to an appreciable amount of the biomass. Such measurements (e.g., of a characteristic of the undecomposed biomass) may be beneficial for determining a starting point for the flow rate of the fluid (e.g., a starting point that may be adjusted, at least in part, based on further measurements).

Non-limiting examples of characteristics of the reactor include the temperature at one or more points inside the reactor (e.g., the lowest point inside the reactor, the point inside the reactor at which the fluid is introduced, the point inside the reactor at which the rate of biomass decomposition is the highest), the variation in temperature at one or more points inside the reactor over a period of time (e.g., the lowest point inside the reactor, the point inside the reactor at which the fluid is introduced, the point inside the reactor at which the rate of biomass decomposition is the highest), the spatial variation in temperature inside the reactor (e.g., axial variation, radial variation, variation from a point at which the biomass is introduced to a point at which it enters an outlet conduit, variation from the hottest point inside the reactor to the coolest point inside the reactor, flow rate of biomass into the reactor).

Non-limiting examples of characteristics of the biomass include characteristics of biomass to be at least partially decomposed in a reactor (e.g., chemical composition of the biomass prior to decomposition in the reactor, moisture content of the biomass prior to decomposition, bulk volumetric density of the biomass prior to decomposition, bulk effective density of the biomass prior to decomposition, bulk thermal conductivity of the biomass prior to decomposition, bulk bed porosity of the biomass prior to decomposition, shape and size of the particles forming the biomass prior to decomposition, characteristic resistance of the biomass to gas flow prior to decomposition, energy density of the biomass prior to decomposition), characteristics of biomass located in a reactor (e.g., chemical composition of the biomass located in the reactor), and characteristics of biomass that has undergone at least a partial decomposition process in a reactor (e.g., chemical composition of the biomass after decomposition within the reactor, energy content of the biomass after decomposition within the reactor, mass density of the biomass after decomposition within the reactor, volumetric density of the biomass after decomposition within the reactor, energy density of the biomass after decomposition within the reactor, combustion temperature of the biomass after decomposition within the reactor, grindability of the biomass after decomposition within the reactor, color of the biomass after decomposition within the reactor, rate of production of biomass by the reactor, index of torrefaction of the biomass after decomposition within the reactor, hardness of the biomass after decomposition within the reactor, moisture content of the biomass after decomposition within the reactor, shape and size of the particles forming the biomass after decomposition within the reactor, volatile matter content of the biomass after decomposition within the reactor).

Further examples of characteristics of biomass include characteristics of biomass flow through the reactor (e.g., ratio of the flow rate of decomposed biomass out of the reactor to biomass into the reactor, product of the flow rate of decomposed biomass out of the reactor and an index of torrefaction of decomposed biomass) and characteristics of the biomass include characteristics of one or more exhaust gases produced during biomass decomposition (e.g., the temperature of one or more exhaust gases; the flow rate of one or more exhaust gases (e.g., through the reactor, out of the reactor); the density of one or more exhaust gases; the velocity of one or more exhaust gases (e.g., inside the reactor, above the reactor); the pressure drop experienced by one or more exhaust gases during pipe flow through one or more portions of the system, such as the reactor and/or section(s) thereof; the transparency of one or more exhaust gases; the PM-2.5 level of one or more exhaust gases; the PM-10 level of one or more exhaust gases; and the amount(s) of one or more species in one or more exhaust gases, such as the amount(s) of $NO_x$, $SO_x$, CO, $CO_2$, $N_2$, $H_2O$, acetic acid, methanol, furfural, $CH_4$, $H_2$, formic acid, lactic acid, and/or hydroxyacetone in one or more exhaust gases). References to one or more exhaust gases should be understood to refer to one or more of exhaust gases of a single type within a mixture, mixtures of exhaust gases, and all of the exhaust as a whole. The velocity of one or more exhaust gases may be measured by use of a pressure transducer.

It should be understood that flow rate of a fluid (e.g., a fluid comprising oxygen) into a reactor is not the only parameter that may be adjusted. In some embodiments, a method may comprise adjusting, and/or a system may be configured to adjust, the rate at which the biomass is introduced into the system and/or a component thereof (e.g., into the reactor). The adjustment may be, at least in part, based upon a measurement of a characteristic of the reactor and/or a characteristic of biomass. In some embodiments, a method may comprise adjusting, and/or a system may be configured to adjust, the rate at which the biomass is removed (i.e., output) from the system and/or a component thereof (e.g., from the reactor, from the outlet conduit). The adjustment may be, at least in part, based upon a measurement of a characteristic of the reactor and/or a characteristic of biomass. The rate at which biomass is removed may be adjusted by, for instance, adjusting a speed at which the conveyor conveys biomass from an inlet of the outlet conduit to an outlet of the outlet conduit. In some embodiments, adjusting the rate at which biomass is output from the system may comprise stopping output of biomass from the system. The output of biomass from the system may be stopped if, e.g., a sensor detects that there is jamming in one or more parts of the system (e.g., the reactor, the outlet conduit). In some embodiments, the output of biomass from the system may be stopped and an alarm may sound if, e.g., a sensor detects that there is jamming in one or more parts of the system.

In certain cases, a method may comprise adjusting, and/or a system may be configured to adjust, a relative flow rate of a fluid (e.g., a fluid comprising oxygen, air, a gas) to the rate at which the biomass is introduced into the system and/or a component thereof (e.g., into the reactor), a relative flow rate of a fluid (e.g., a fluid comprising oxygen, air, a gas) to the rate at which the biomass is transported through the system and/or a component thereof (e.g., through the reactor), and/or a relative flow rate of a fluid (e.g., a fluid comprising oxygen, air, a gas) to the rate at which the biomass is removed from the system and/or a component thereof (e.g., from the reactor, from the outlet conduit). The adjustment may be, at least in part, based upon a measurement of a characteristic of the reactor and/or a characteristic of biomass.

In some embodiments, a method may comprise, and/or a system may be configured to, determine where and/or when to introduce an ignition source (e.g., a spark, a propane torch, a flame) into the reactor. In some embodiments, a method may comprise, and/or a system may be configured to, determine where and/or when to introduce an ignition source (e.g., a spark, a propane torch, a flame) into a zone above the reactor. The ignition source may be introduced at a distance above the reactor of greater than or equal to 0 m, greater than or equal to 0.25 m, greater than or equal to 0.5 m, or greater than or equal to 0.75 m. The ignition source may be introduced at a distance above the reactor of less than or equal to 1 m, less than or equal to 0.75 m, less than or equal to 0.5 m, or less than or equal to 0.25 m. Combinations of the above-referenced ranges are also possible (e.g., greater than or equal to 0 m and less than or equal to 1 m, or greater than or equal to 0 m and less than or equal to 0.5 m). Other ranges are also possible.

As described above, certain embodiments are related to systems and/or may comprise methods performed on, in, or by systems described herein. As also described above, the system may comprise various components, some of which may have fixed positions relative to each other (e.g., by being bolted together). In some embodiments, the system comprises a reactor. The reactor may be configured to at least partially decompose biomass, and/or certain methods may comprise at least partially decomposing biomass in a reactor. The reactor may be any suitable type of reactor, such as a fixed bed reactor, a moving bed reactor, a fluidized bed reactor, and/or a screw reactor.

In some embodiments, a reactor may comprise an elongated compartment having a longitudinal axis. The longitudinal axis may be arranged substantially vertically (e.g., within 30° of vertical, within 15° of vertical, within 10° of vertical, or within 5° of vertical). Without wishing to be bound by any particular theory, it is believed that reactors with this design may promote advantageous flow of fluids (e.g., fluids comprising oxygen, gases comprising oxygen, air) through the reactor. The fluid may preferentially flow upwards along the longitudinal axis, which may advantageously cause fluid to flow into the reactor at its base. In such reactors, biomass to be at least partially decomposed may be introduced at the top, become warmed by the rising fluid as it flows downwards, and then reach its maximum temperature and rate of reaction at the base of the reactor where the fluid is injected. It should also be noted that this effect may occur in reactors that lack a longitudinal axis arranged substantially vertically; for instance, it may be present in reactors in which a column of hot air is present.

In some embodiments, a reactor comprises one or more side walls separating an environment interior to the reactor from an environment exterior to the reactor. In some embodiments, it may be advantageous for the side walls to be relatively thermally insulating. In other words, it may be beneficial for the side walls to be configured to allow a relatively low amount of thermal energy to pass therethrough. Side walls with this design may maintain a relatively large amount of the thermal energy produced in the reactor therein, allowing the reactor to operate in an energy efficient manner. The reactor may be configured to dissipate energy from the environment interior to the reactor to the environment exterior to the reactor through the one or more side walls at a rate of greater than or equal to 0%, greater than or equal to 1%, greater than or equal to 2.5%, greater than or equal to 5%, greater than or equal to 7.5%, greater than or equal to 10%, greater than or equal to 20%, greater than or equal to 30%, greater than or equal to 40%, greater than or equal to 50%, greater than or equal to 60%, or greater than or equal to 70% of a biomass energy flux through the reactor. The reactor may be configured to dissipate energy from the environment interior to the reactor to the environment exterior to the reactor through the one or more side walls at a rate of less than or equal to 80%, less than or equal to 70%, less than or equal to 60%, less than or equal to 50%, less than or equal to 40%, less than or equal to 30%, less than or equal to 20%, less than or equal to 10%, less than or equal to 7.5%, less than or equal to 5%, less than or equal to 2.5%, or less than or equal to 1% of the biomass energy flux through the reactor. Combinations of the above-referenced ranges are also possible (e.g., greater than or equal to 0% and less than or equal to 80% of the biomass energy flux through the reactor, or greater than or equal to 0% and less than or equal to 10% of the biomass energy flux through the reactor). Other ranges are also possible.

When energy is dissipated through one or more side walls of a reactor, a portion of it may be absorbed by a fluid flowing over the reactor (e.g., a gas, a fluid comprising oxygen). The fluid may be a fluid that the system is configured to direct into the reactor. The percentage of the energy dissipated through the one or more side walls of the reactor and absorbed by the gas flowing over the reactor may be greater than or equal to 0%, greater than or equal to 10%, greater than or equal to 20%, greater than or equal to 30%, greater than or equal to 40%, greater than or equal to 50%, greater than or equal to 60%, greater than or equal to 70%, greater than or equal to 80%, or greater than or equal to 90%. The percentage of the energy dissipated through the one or more side walls of the reactor and absorbed by the gas flowing over the reactor may be less than or equal to 100%, less than or equal to 90%, less than or equal to 80%, less than or equal to 70%, less than or equal to 60%, less than or equal to 50%, less than or equal to 40%, less than or equal to 30%, less than or equal to 20%, or less than or equal to 10%. Combinations of the above-referenced ranges are also possible (e.g., greater than or equal to 0% and less than or equal to 100%, or greater than or equal to 50% and less than or equal to 100%). Other ranges are also possible. The percentage of the energy dissipated through one or more side walls of the reactor that is absorbed by the fluid may be determined by employing heat flow measurement sensors positioned at different locations inside and outside the reactor. The measured heat flux of the fluid and through the side walls of the reactor may be determined using these sensors, and the former may be divided by the latter to determine the percentage of the energy dissipated through one or more side walls of the reactor that is absorbed by the fluid.

As described above, in some embodiments, the reactor comprises a section configured to allow for reaction of one or more gases. Certain methods may comprise reacting one or more gases at this section. The one or more gases may include gases formed during biomass decomposition and/or gases introduced into the reactor from an environment external to the reactor (e.g., through a fluid inlet). The reaction may be an oxidation reaction in certain cases. The temperature of the section of the reactor configured to allow for reaction of one or more gases may be, during reaction of the gas(es), greater than or equal to 150° C., greater than or equal to 200° C., greater than or equal to 250° C., greater than or equal to 300° C., greater than or equal to 350° C., greater than or equal to 400° C., greater than or equal to 450° C., greater than or equal to 500° C., greater than or equal to 550° C., greater than or equal to 600° C., greater than or equal to 650° C., greater than or equal to 700° C., greater than or equal to 750° C., greater than or equal to 800° C., greater than or equal to 850° C., greater than or equal to 900° C., or greater than or equal to 950° C. The temperature of the section of the reactor configured to allow for reaction of one or more gases may be, during reaction of the gas(es), less than or equal to 1000° C., less than or equal to 950° C., less than or equal to 900° C., less than or equal to 850° C., less than or equal to 800° C., less than or equal to 750° C., less than or equal to 700° C., less than or equal to 650° C., less than or equal to 600° C., less than or equal to 550° C., less than or equal to 500° C., less than or equal to 450° C., less than or equal to 400° C., less than or equal to 350° C., less than or equal to 300° C., less than or equal to 250° C., or less than or equal to 200° C. Combinations of the above-referenced ranges are also possible (e.g., greater than or equal to 150° C. and less than or equal to 1000° C., or greater than or equal to 200° C. and less than or equal to 800° C.). Other ranges are also possible.

In some embodiments, a system comprises an outlet conduit. The outlet conduit may be fluidically connected to the reactor. The fluidic connection between the outlet conduit and the reactor may be permanent. In other words, in some embodiments, once the outlet conduit is fluidically connected to the reactor, it is not practicable and/or possible to remove the outlet conduit from fluidic connection with the reactor. For instance, it may not be possible to remove the outlet from fluidic connection with the reactor absent the use of tools or without breaking apart the system. In other embodiments, the fluidic connection between the outlet conduit and the reactor may be temporary and/or may be reversible. For example, the outlet conduit may be fluidically connected to the reactor through a valve (e.g., an airlock, an air valve, a rotary valve) that may be reversibly opened and closed. The outlet conduit may be in fluidic connection with the reactor when the valve is open, and not in fluidic connection with the reactor when the valve is closed. Valves that may be reversibly opened and closed may allow for better separation of an environment interior to the reactor from an environment exterior to the system. This enhanced separation may be desirable because it may reduce unwanted oxidation of biomass in the environment interior to the reactor by one or more species in the environment external to the system. Reduced oxidation of biomass in the environment interior to the reactor may enhance the yield and/or efficiency of the system, and/or may reduce the probability of a fire in the reactor.

In some embodiments, biomass exits the reactor into the outlet conduit, passes through the outlet conduit, and then exits the system. In some embodiments, the outlet conduit may be configured to cool any biomass therein. In certain cases, a limited amount of biomass decomposition may occur in the outlet conduit (e.g., less than 5% of the total biomass decomposition occurring in the system). In some embodiments, no biomass decomposition occurs in the outlet conduit.

In some embodiments, the outlet conduit comprises one or more side walls separating an environment interior to the outlet conduit from an environment exterior to the outlet conduit. The outlet conduit may be configured to dissipate energy from the environment interior to the outlet conduit to the environment exterior to the outlet conduit through the one or more side walls at a variety of suitable rates. The outlet conduit may be configured to dissipate energy from the environment interior to the outlet conduit to the environment exterior to the outlet conduit through the one or more side walls at a rate of greater than or equal to 0%, greater than or equal to 1%, greater than or equal to 2.5%, greater than or equal to 5%, greater than or equal to 7.5%, greater than or equal to 10%, greater than or equal to 20%, greater than or equal to 30%, greater than or equal to 40%, greater than or equal to 50%, greater than or equal to 60%, or greater than or equal to 70% of a biomass energy flux through the outlet conduit. The outlet conduit may be configured to dissipate energy from the environment interior to the outlet conduit to the environment exterior to the outlet conduit through the one or more side walls at a rate of less than or equal to 80%, less than or equal to 70%, less than or equal to 60%, less than or equal to 50%, less than or equal to 40%, less than or equal to 30%, less than or equal to 20%, less than or equal to 10%, less than or equal to 7.5%, less than or equal to 5%, less than or equal to 2.5%, or less than or equal to 1% of the biomass energy flux through the reactor. Combinations of the above-referenced ranges are also possible (e.g., greater than or equal to 0% and less than or equal to 80% of the biomass energy flux through the reactor, or greater than or equal to 0% and less than or equal to 10% of the biomass energy flux through the reactor). Other ranges are also possible.

When energy is dissipated through one or more side walls of an outlet conduit, a portion of it may be absorbed by a fluid flowing over the outlet conduit (e.g., a gas, a fluid comprising oxygen). The fluid may be a fluid that the system is configured to direct into the reactor. The percentage of the energy dissipated through the one or more side walls of the outlet conduit that is absorbed by the gas flowing over the outlet conduit may be greater than or equal to 0%, greater than or equal to 10%, greater than or equal to 20%, greater than or equal to 30%, greater than or equal to 40%, greater than or equal to 50%, greater than or equal to 60%, greater than or equal to 70%, greater than or equal to 80%, or greater than or equal to 90%. The percentage of the energy dissipated through the one or more side walls of the outlet conduit that is absorbed by the gas flowing over the outlet conduit may be less than or equal to 100%, less than or equal to 90%, less than or equal to 80%, less than or equal to 70%, less than or equal to 60%, less than or equal to 50%, less than or equal to 40%, less than or equal to 30%, less than or equal to 20%, or less than or equal to 10%. Combinations of the above-referenced ranges are also possible (e.g., greater than or equal to 0% and less than or equal to 100%, or greater than or equal to 50% and less than or equal to 100%). Other ranges are also possible. The percentage of the energy dissipated through one or more side walls of the outlet conduit that is absorbed by the fluid may be determined by employing heat flow measurement sensors positioned at different locations inside and outside the outlet conduit. The measured heat flux of the fluid and through the side walls of the outlet conduit may be determined using these sensors, and the former may be divided by the latter to determine the percentage of the energy dissipated through one or more side walls of the outlet conduit that is absorbed by the fluid.

Biomass may pass through the outlet conduit at a rate of greater than or equal to $1 \text{ kg}/(\text{m}^2 \text{*hr})$, greater than or equal to $2 \text{ kg}/(\text{m}^2 \text{*hr})$, greater than or equal to $5 \text{ kg}/(\text{m}^2 \text{*hr})$, greater than or equal to $10 \text{ kg}/(\text{m}^2 \text{*hr})$, greater than or equal to $20 \text{ kg}/(\text{m}^2 \text{*hr})$, greater than or equal to $50 \text{ kg}/(\text{m}^2 \text{*hr})$, or greater than or equal to $75 \text{ kg}/(\text{m}^2 \text{*hr})$. Biomass may pass through the outlet conduit at a rate of less than or equal to $100 \text{ kg}/(\text{m}^2 \text{*hr})$, less than or equal to $75 \text{ kg}/(\text{m}^2 \text{*hr})$, less than or equal to $50 \text{ kg}/(\text{m}^2 \text{*hr})$, less than or equal to $20 \text{ kg}/(\text{m}^2 \text{*hr})$, less than or equal to $10 \text{ kg}/(\text{m}^2 \text{*hr})$, less than or equal to $5 \text{ kg}/(\text{m}^2 \text{*hr})$, or less than or equal to $2 \text{ kg}/(\text{m}^2 \text{*hr})$. Combinations of the above-referenced ranges are also possible (e.g., greater than or equal to $1 \text{ kg}/(\text{m}^2 \text{*hr})$ and less than or equal to $100 \text{ kg}/(\text{m}^2 \text{*hr})$). Other ranges are also possible. The flux referenced above is the flux through the area of the conduit.

The system may be operated at a biomass flux rate of greater than or equal to 1 kg/(m²*s), greater than or equal to 2 kg/(m²*s), greater than or equal to 5 kg/(m²*s), greater than or equal to 10 kg/(m²*s), greater than or equal to 20 kg/(m²*s), greater than or equal to 50 kg/(m²*s), greater than or equal to 100 kg/(m²*s), greater than or equal to 200 kg/(m²*s), greater than or equal to 440 kg/(m²*s), greater than or equal to 500 kg/(m²*s), greater than or equal to 1000 kg/(m²*s), or greater than or equal to 2000 kg/(m²*s). The system may be operated at a biomass flux rate of less than or equal to 2200 kg/(m²*s), less than or equal to 2000 kg/(m²*s), less than or equal to 1000 kg/(m²*s), less than or equal to 500 kg/(m²*s), less than or equal to 440 kg/(m²*s), less than or equal to 200 kg/(m²*s), less than or equal to 100 kg/(m²*s), less than or equal to 50 kg/(m²*s), less than or equal to 20 kg/(m²*s), less than or equal to 10 kg/(m²*s), less than or equal to 5 kg/(m²*s), or less than or equal to 2 kg/(m²*s). Combinations of the above-referenced ranges are also possible (e.g., greater than or equal to 1 kg/(m²*s) and less than or equal to 2200 kg/(m²*s), or greater than or equal to 5 kg/(m²*s) and less than or equal to 440 kg/(m²*s)). Other ranges are also possible. The flux referenced above is the flux through the area of the conduit.

As described above, certain methods may comprise flowing a fluid (such as a gas) over the outlet conduit. The system may be configured to direct this fluid (e.g., gas) to the reactor after it has flowed over the outlet conduit (e.g., by comprising a jacket surrounding the outlet conduit through which the gas can flow that feeds into the reactor). The fluid such as a gas may, in some embodiments, be a fluid comprising oxygen (e.g., air; any of the fluids comprising oxygen described elsewhere herein, such as fluids comprising both oxygen and one or more other gases). The velocity of the gas passing over the outlet conduit may be greater than or equal to 0.01 m/s, greater than or equal to 0.02 m/s, greater than or equal to 0.05 m/s, greater than or equal to 0.1 m/s, greater than or equal to 0.2 m/s, or greater than or equal to 0.5 m/s. The velocity of the gas passing over the outlet conduit may be less than or equal to 1 m/s, less than or equal to 0.5 m/s, less than or equal to 0.2 m/s, less than or equal to 0.1 m/s, less than or equal to 0.05 m/s, or less than or equal to 0.02 m/s. Combinations of the above-referenced ranges are also possible (e.g., greater than or equal to 0.01 m/s and less than or equal to 1 m/s). Other ranges are also possible.

When a fluid (e.g., a gas) flows over the outlet conduit and is then directed to the reactor, it may enter the reactor at a variety of suitable temperatures. The fluid may enter the reactor at a temperature of greater than or equal to 25° C., greater than or equal to 50° C., greater than or equal to 75° C., greater than or equal to 100° C., greater than or equal to 150° C., greater than or equal to 200° C., greater than or equal to 250° C., greater than or equal to 300° C., greater than or equal to 350° C., greater than or equal to 400° C., greater than or equal to 450° C., greater than or equal to 500° C., greater than or equal to 550° C., greater than or equal to 600° C., greater than or equal to 650° C., greater than or equal to 700° C., greater than or equal to 750° C., greater than or equal to 800° C., or greater than or equal to 850° C. The fluid may enter the reactor at a temperature of less than or equal to 900° C., less than or equal to 850° C., less than or equal to 800° C., less than or equal to 750° C., less than or equal to 700° C., less than or equal to 650° C., less than or equal to 600° C., less than or equal to 550° C., less than or equal to 500° C., less than or equal to 450° C., less than or equal to 400° C., less than or equal to 350° C., less than or equal to 300° C., less than or equal to 250° C., less than or equal to 200° C., less than or equal to 150° C., less than or equal to 100° C., less than or equal to 75° C., or less than or equal to 50° C. Combinations of the above-referenced ranges are also possible (e.g., greater than or equal to 25° C. and less than or equal to 900° C., or greater than or equal to 25° C. and less than or equal to 400° C.). Other ranges are also possible.

When present, an outlet conduit may have any of a variety of suitable designs. In some embodiments, an outlet conduit may comprise an inlet and/or an outlet. The inlet may be, for example, fluidically connected to the reactor. The outlet conduit may receive biomass (e.g., biomass that is at least partially decomposed) from the reactor via the inlet. The outlet may be, for example, fluidically connected to an environment external to the outlet conduit. The outlet may be configured to discharge biomass from the outlet conduit. In some embodiments, the outlet is configured to discharge biomass into a location that is particularly advantageous (e.g., a component of the system configured to collect biomass that is at least partially decomposed).

In some embodiments, an outlet conduit may comprise a conveyor. The conveyor comprises, according to certain embodiments, at least one moving surface, the movement of which results in transportation of solid through the outlet conduit. The conveyor may be configured to convey biomass from an inlet of the outlet conduit to an outlet of the outlet conduit. Certain methods may comprise conveying biomass from an inlet of the outlet conduit to an outlet of the outlet conduit. When present, the conveyor may be any suitable type of conveyor, such as one or more augers (e.g., two or more augers configured to operate in parallel), a sloped rotary drum, and/or a moving belt. The outlet conduit may be configured such that a large portion of its axially projected cross-sectional area is occupied by the conveyor. In some embodiments, greater than or equal to 75%, greater than or equal to 80%, greater than or equal to 85%, greater than or equal to 90%, or greater than or equal to 95% of the projected cross-sectional area of the outlet conduit is occupied by the conveyor. In some embodiments, less than or equal to 100%, less than or equal to 95%, less than or equal to 90%, less than or equal to 85%, or less than or equal to 80% of the projected cross-sectional area of the outlet conduit is occupied by the conveyor. Combinations of the above-referenced ranges are also possible (e.g., greater than or equal to 75% and less than or equal to 100%). Other ranges are also possible.

Figure 8:
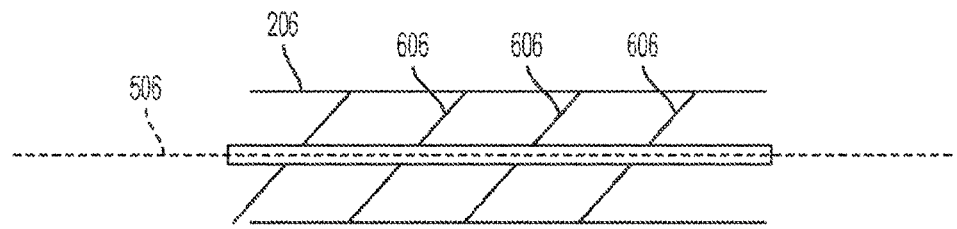
FIGS. 8-10 are schematic depictions of outlet conduits, according to some embodiments.
Figure 9:
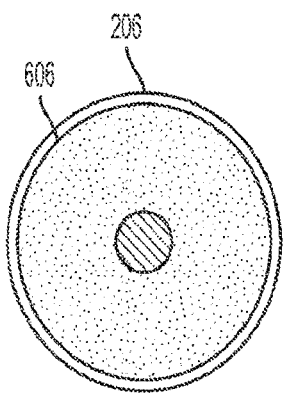

The percentage of the axially-projected cross-sectional area of the outlet conduit occupied by the conveyor may be determined by projecting the outlet conduit along a line parallel to its axis from an outlet of the outlet conduit to an inlet of the outlet conduit, calculating the amount of this projected area occupied by the conveyor, and then multiplying by 100%. FIGS. 8 and 9 further clarify what is meant by an axial projection. For instance, in FIG. 8, line 506 is parallel to the axis of outlet conduit 206. In FIG. 8, outlet conduit 206 also comprises conveyor 606 (in the form of an auger). FIG. 9 shows the axially-projected cross-sectional area for the conduit shown in FIG. 8. As can be seen in FIG. 9, for conduits comprising conveyors that wrap around the outlet conduit, such as augers, a large portion of the axial projection may be occupied by the conveyor. As shown in FIG. 9, augers or other conveyors that wrap around the axis of the outlet conduit may only be absent from the outer boundaries of the axial projection. Such conveyors, if they fit tightly within the outlet conduits, may occupy close to 100% of the axial projections of the conduits in which they are positioned.

It should be understood that a conveyor, if present, may extend fully throughout the outlet conduit or may not extend fully throughout the outlet conduit. As an example, in some embodiments the outlet conduit comprises a conveyor that does not extend to an outlet of the outlet conduit. The conveyor may extend partially through the outlet conduit, but may terminate some distance from the outlet of the outlet conduit. In other words, the outlet of the outlet conduit may, in some embodiments, comprise a section proximate its outlet which does not surround a conveyor.

Figure 10:
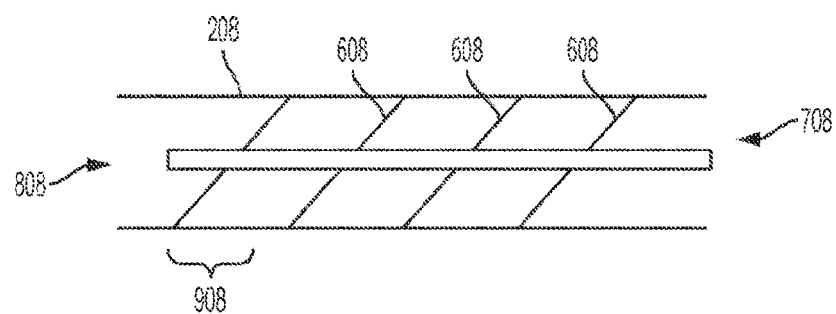

In some embodiments, an outlet conduit comprises a conveyor that occupies a relatively large fraction of its axially projected cross-sectional area proximate to an end of the conveyor proximate to an outlet of the outlet conduit. In other words, the conveyor may extend through the outlet conduit (e.g., partially, fully), and a portion of the conveyor near its terminus may occupy a relatively large fraction of the axially projected cross-sectional area of the outlet conduit. For instance, in FIG. 10, outlet conduit 208 comprises inlet 708 and outlet 808. Section 908 of the outlet conduit proximate to an end of conveyor 608 proximate outlet 808 may occupy a relatively large fraction of the axially projected cross-sectional area of the conduit. The section of the conveyor proximate the outlet conduit occupying a relatively large fraction of its axially projected cross-sectional area may extend along less than or equal to 20%, less than or equal to 15%, less than or equal to 10%, less than or equal to 5%, or less than or equal to 2% of the length of the outlet conduit. The section of the conveyor proximate the outlet conduit occupying a relatively large fraction of its axially projected cross-sectional area may extend along greater than or equal to 1%, greater than or equal to 2%, greater than or equal to 5%, greater than or equal to 10%, or greater than or equal to 15% of the length of the outlet conduit. Combinations of the above-referenced ranges are also possible (e.g., less than or equal to 20% and greater than or equal to 1%). Other ranges are also possible. The fraction of the cross-sectional area occupied by the conveyor in the above-referenced section may be any of the values described above with respect to the percentage of the axially-projected cross-section of the outlet conduit occupied by the conveyor as a whole (e.g., greater than or equal to 75%, greater than or equal to 80%, greater than or equal to 85%, greater than or equal to 90%, or greater than or equal to 95%, etc.).

In some embodiments, a system may comprise an outlet conduit with a length that is advantageous (e.g., advantageous for cooling biomass therein, advantageous for heating gases that flow over the outlet conduit). The length of the outlet conduit may be greater than or equal to 0.1 ft, greater than or equal to 0.2 ft, greater than or equal to 0.5 ft, greater than or equal to 1 ft, greater than or equal to 2 ft, or greater than or equal to 5 ft. The length of the outlet conduit may be less than or equal to 10 ft, less than or equal to 5 ft, less than or equal to 2 ft, less than or equal to 1 ft, less than or equal to 0.5 ft, or less than or equal to 2 ft. Combinations of the above-referenced ranges are also possible (e.g., greater than or equal to 0.1 ft and less than or equal to 10 ft). Other ranges are also possible.

In some embodiments, two or more components present in a system may have a relationship to each other that is advantageous. For instance, when a system comprises both a reactor and an outlet conduit, the ratio of the length of the outlet conduit to the length of the reactor may be any suitable value. In some embodiments, the ratio of the length of the outlet conduit to the length of the reactor is greater than or equal to 0.25, greater than or equal to 0.5, greater than or equal to 1, greater than or equal to 2, greater than or equal to 3, greater than or equal to 5, or greater than or equal to 10. In some embodiments, the ratio of the length of the outlet conduit to the length of the reactor is less than or equal to 20, less than or equal to 10, less than or equal to 5, less than or equal to 3, less than or equal to 2, less than or equal to 1, or less than or equal to 0.5. Combinations of the above-referenced ranges are also possible (e.g., greater than or equal to 0.25 and less than or equal to 20, or greater than or equal to 1 and less than or equal to 3). Other ranges are also possible.

Other examples of advantageous relationships between components include the relationship between the length of the outlet conduit and the velocity of the air passing over the outlet conduit, the relationship between the length of the outlet conduit and the mass flux of the biomass through the outlet conduit, and the relationship between the length of the outlet conduit and the type of material that makes up the wall of the conduit.

In some embodiments, a system may further comprise one or more additional components. For instance, in some embodiments a system may further comprise a sensor. The sensor may be any suitable type of sensor, such as an oxygen sensor, a thermocouple, a mass flow sensor (e.g., of oxygen, of air, of another gas), a gas analyzer (e.g., a gas analyzer configured to analyze the determine the content of one or more of CO, $CO_2$, $NO_x$, and $SO_x$ in the gas), a pressure transducer, a level sensor (e.g., an ultrasonic sensor, a camera, a dielectric capacitive sensor, an infrared sensor), and a sensor configured to detect biomass jamming. In some embodiments, a system may comprise a sensor configured to make a measurement as described herein. In some such embodiments, an adjustment can be made to one or more parameters of the system based, at least in part, upon such measurement. As an example, if a measurement indicates that the rate of increase of amount of one or more uncombusted gases (e.g., CO, volatile biomass, organic acids) in the reactor is proportional to the rate of increase of carbon dioxide in the reactor, an adjustment comprising igniting a species in the reactor (e.g., igniting a species in a secondary oxidation zone) may be made. As another example, if a measurement indicates that the temperature in the reactor is decreasing, an adjustment comprising introducing oxygen into the reactor (e.g., in the form of a short pulse of air) may be performed. In some embodiments, a sensor may cause an alarm to be sounded based, at least in part, upon a measurement.

In systems comprising one or more sensors, the sensor(s) may be positioned at a variety of suitable locations. In some embodiments, a system comprises one or more sensor positioned in an environment interior to the reactor. Such sensors may be useful for measuring one or more features of the environment interior to the reactor (e.g., the temperature, one or more characteristics of biomass in the environment interior to the reactor). In some embodiments, a system comprises one or more sensors positioned in an environment interior to the outlet conduit. Such sensors may be useful for measuring one or more features of the environment interior to the outlet conduit (e.g., one or more characteristics of biomass in the environment interior to the outlet conduit). Some sensors may be positioned in an environment exterior to the system, and/or in an environment exterior to one or more components of the system. For instance, a system may comprise one or more sensors positioned in an environment exterior to the reactor and/or one or more sensors positioned in an environment exterior to the outlet conduit. Such sensors may be useful for measuring one or more features of the environment external to the system and/or system component (e.g., a temperature of the environment external to the system; one or more characteristics of biomass in an environment exterior to the system, such as one or more characteristics of biomass to be input into the system, one or more characteristics of biomass to be at least partially decomposed, one or more characteristics of biomass output from the system, one or more characteristics of biomass that has been at least partially decomposed, one or more characteristics of one or more exhaust gases produced during biomass decomposition).

When a sensor is positioned exterior to the system, it may be positioned at a variety of suitable locations. In some embodiments, one or more sensors may be positioned above the reactor. The sensor may be positioned at a distance above the reactor of greater than or equal to 0 m, greater than or equal to 0.1 m, greater than or equal to 0.2 m, greater than or equal to 0.5 m, greater than or equal to 1 m, greater than or equal to 2 m, or greater than or equal to 5 m. The sensor may be positioned at a distance above the reactor of less than or equal to 10 m, less than or equal to 5 m, less than or equal to 2 m, less than or equal to 1 m, less than or equal to 0.5 m, less than or equal to 0.2 m, or less than or equal to 0.1 m. Combinations of the above-referenced ranges are also possible (e.g., greater than or equal to 0 m and less than or equal to 10 m, or greater than or equal to 0 m and less than or equal to 1 m). Other ranges are also possible.

In some embodiments, a system may further comprise a panic button. The panic button may be configured to cause the reactor to shut down when it is pressed. The panic button may cause the reactor to shut down by, e.g., stopping output of biomass from the system and/or causing an inert gas to enter the system. The inert gas may be nitrogen gas, argon gas, or any other inert gas.

In some embodiments, a system as a whole may be relatively portable. For instance, the system as a whole may weigh less than a certain amount, and/or may have a relatively small volume. In some embodiments, the system weighs less than 2 metric tons (e.g., less than 1 metric ton, or between 1-2 metric tons), weighs less than or 2 English tons (e.g., less than 1 English ton, or between 1-2 English tons) and/or has a radius of less than or equal to 2 m.

In some embodiments, one or more components of a system may be relatively portable, weigh less than a certain amount, and/or may have a relatively small volume. As an example, a system may comprise a reactor with a diameter of less than or equal to 15 inches, less than or equal to 12 inches, less than or equal to 10 inches, or less than or equal to 6 inches. As another example, a system may comprise a reactor with a volume of less than or equal to 2000 cubic inches, less than or equal to 1000 cubic inches, less than or equal to 500 cubic inches, less than or equal to 200 cubic inches, or less than or equal to 100 cubic inches.

According to one aspect, a method for decomposition of biomass within a system comprising a reactor is provided. In some embodiments, the method comprises receiving, with a controller, instructions regarding a target flow rate of a fluid comprising oxygen. In some embodiments, the instructions may be based, at least in part, upon a measurement of at least one characteristic of the system (e.g., any of the characteristics described elsewhere herein, a characteristic of the reactor, a characteristic of the biomass). In some embodiments, the method further comprises adjusting a flow rate of any oxygen-containing fluid in response to the controller receiving the instructions. The controller may be used to adjust the flow rate, in some embodiments.

Certain of the embodiments described herein can be implemented using hardware, software or a combination thereof. When implemented in software, the software code can be executed on any suitable processor (e.g., a microprocessor) or collection of processors, whether provided in a single computing device or distributed among multiple computing devices. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above. In some embodiments, a combination of programmable hardware and dedicated hardware may also be used. In this respect, it should be appreciated that one implementation of the embodiments described herein comprises at least one computer-readable storage medium (e.g., RAM, ROM, EEPROM, flash memory or other memory technology, CD-ROM, digital versatile disks (DVD) or other optical disk storage, magnetic cassettes, magnetic tape, magnetic disk storage or other magnetic storage devices, or other tangible, non-transitory computer-readable storage medium) encoded with a computer program (i.e., a plurality of executable instructions) that, when executed on one or more processors, performs the above-discussed functions of one or more embodiments. The computer-readable medium may be transportable such that the program stored thereon can be loaded onto any computing device to implement aspects of the techniques discussed herein. In addition, it should be appreciated that the reference to a computer program which, when executed, performs any of the above-discussed functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement aspects of the techniques discussed herein.

The following text describes certain systems that may be advantageous, such as a system allowing efficient and continuous or batch torrefaction of biomass under either inert or partially oxidative or reactive conditions. The system may comprise and/or consist of one or more of the following features:

(1) A biomass moving bed reactor. The moving bed reactor may comprise an outer insulation whose thickness $\Delta_1$ may optionally be determined by the method described in Section 5 in Example 1, and, optionally, with a height Hr and/or radius Rr whose values may be determined in Sections 2 and 6 in Example 1. The height of biomass in the moving bed may be determined according to method described in Section 6 (of Example 1), and the temperature of operation may be determined according to the approach described in Sections 3, 4, and 5 of Example 1.

(2) Treatment segment: The treatment segment may comprise an insulated channel of length Lt at the bottom of the moving bed comprising zero or more augers or similar means of solid conveyance to move biomass away, with the insulation thickness optionally determined by the method described in Section 5 in Example 1. The material selection of the different components are discussed in Sections 2 and 7 of Example 1.

(3) Cooling segment: The cooling segment may comprise an uninsulated channel of length Le that continues the length of the treatment segment to continue to move biomass away from the reactor, with the length optionally determined by the method described in in Section 5 in Example 1. The rate of rotation of the auger is determined, in some cases, according to the approach described in Sections 3, 4, 5, and 7 of Example 1.

(4) Solid exit: The solid exit may comprise one or more outlets to allow the cooled biomass to escape from the reactor.

(5) Primary gas inlets: The primary gas inlets may comprise one or multiple channels at the bottom of the moving bed reactor allowing either air or other gases, heated or unheated, to enter, with the option of a perforated plate (grate) with one or more holes of same or different sizes to allow for the even distribution of gases within the moving bed. Air preheating may be achieved by several means (e.g., any of the following means alone or in combination) including the recycling of the heat from the cooling segment, heat exchange between the burned exhaust and secondary air above the secondary gas inlets, etc.

(6) Preheating jacket for primary gas inlets: The preheating jacket for the primary gas inlets may comprise a jacket of thickness $\Delta_2$ that lines the outer wall of the uninsulated cooling segment and/or that leads incoming air from the atmosphere to the primary gas inlets.

(7) Secondary gas inlets: The secondary gas inlets may comprise one or multiple channels at any vertical position at or above the primary gas inlets allowing a secondary stream of air or other gases, heated or unheated, to enter and mix with the gases emerging from the bottom of the reactor.

(8) Pressure drives: The pressure drives may comprise one or more articles configured to provide a pressure difference (e.g., a means of providing a pressure difference). In some embodiments, the pressure difference may be provided either by force (push or pull) or by throttle. The pressure difference may be employed to allow a specific flow rate of gases from the primary and/or secondary inlets into the moving bed reactor. The inlet air pressure is, in certain embodiments, determined according to the approach described in Section 6 of Example 1.

(9) Ignition ports: The ignition ports may comprise one or more insertion ports at the level of or above the primary and secondary gas inlets to allow any type of ignition device to provide a short burst of energy to the prevalent gas mixture; reactor start up is achieved, in certain cases, by one of the few methods described in Section 7 of Example 1, or by lighting some starter biomass of the same or different type on fire, inserting it into the bottom of the reactor, and the piling on top of it with more raw, uncombusted biomass to smother the flame.

(10) Biomass feed and hopper: Certain embodiments are related to methods to continuously inject biomass in a controlled manner into the moving bed reactor, comprising and/or consisting of an enclosed compartment and zero or more augers configured to convey the biomass into the moving bed reactor.

(11) Heat exchanger: The heat exchanger may comprise any article configured to exchange heat (e.g., a means of heat exchange) between the gases from the reactor outlet with the biomass feed and hopper, with the secondary gas inlets, and/or with the primary gas inlets.

(12) Control system: The control system may comprise a system whose input comprises signals from one or more of temperature, pressure, and chemical composition measurement ports located anywhere in the system, and whose output comprises signals to control the rate of rotation of the motors driving the auger(s), and, optionally, also control the pressure drive and/or throttle to supply the primary and secondary gas streams. The wiring between inputs and outputs may be such that the desired torrefaction reaction conditions are maintained with minimal user intervention according to strategies described in Sections 3, 4, 5, 6, and 7 of Example 1.

(13) Motor drive: The motor drive may comprise one or more motors connected to any or all of the augers described above, either directly or via a sprocket. The motor may have a variable speed adjustable by the control system via any mechanism such as a silicon controlled rectifier drive. One embodiment of this connection is described in Section 2 of Example 1.

One embodiment of the system described above is shown and labeled in the schematic FIG. 11.

In some embodiments, a system as described herein may be configured to perform (and/or a method may comprise performing) continuous and decentralized production of bulk of a fertilizer component that also acts as a liming agent on normal or acidified soils.

In some embodiments, a system as described herein may be configured to perform (and/or a method may comprise performing) decentralized production of a substrate that can be processed into water and industrial filters through activation.

In some embodiments, a system as described herein may be configured to perform (and/or a method may comprise performing) production of inert carbon for long-term sequestration in the soil (to counter the effects of $CO_2$ emissions).

In some embodiments, a system and/or component of a system described herein (e.g., a reactor, such as a reactor in which torrefaction may occur) may be integrated with a means of conveyance (e.g., a tractor, a donkey cart, a shipping container).

In some embodiments, a system as described herein (e.g., a system configured to perform torrefaction) system can operate by intaking room-temperature air (e.g., only room temperature air). Certain systems as described herein can operate (e.g., operate solely) based on the natural buoyancy effect of a hot column of rising air. Certain systems may lack, or may not require, provisions for forced draft/fan.

Certain methods may comprise using a conveyer system to control the residence time inside the reactor.

Certain methods may comprise using one or more parameters (e.g., residence time, air flow rate) to control the rate and/or extent of biomass decomposition (e.g., torrefaction severity). The rate and/or extent of biomass decomposition may be controlled in an autothermal manner (e.g., it may require minimal or no input of energy).

Certain systems may comprise a cooling subsystem. The cooling subsystem may be positioned around the outlet conduit (e.g., an outlet conduit comprising an auger) and/or an exit channel to ensure sufficient cooling of products. The cooling subsystem may prevent and/or substantially minimize the risk of combustion. Without wishing to be bound by any particular theory, it is believed that biomass that has at least partially decomposed may be prone to catching fire if it is exposed to too much oxygen at a temperature that is too high. Methods for cooling the at least partially decomposed biomass without water, which undesirably increases its water content, may be advantageous. At least partially decomposed biomass cooled in this manner may not require further drying.

In some embodiments, a system as described herein may be a regenerative system configured to recover heat from the exiting products (e.g., gas products, solid products, at least partially decomposed biomass). Regenerative systems may have a higher thermal efficiency than non-regenerative systems.

In some embodiments, a system as described herein may be configured to be operated, or may be capable of being operated, without use of an external power source. In some embodiments, the introduction of one or more fluids (e.g., fluids comprising oxygen, gases) may be accomplished without use of an external power source. Certain systems may lack forced air, and/or may have few or no moving parts.

In some embodiments, a system as described herein may comprise a control system that minimizes user intervention. The control system may optimizing the reactor performance and stability.

Certain systems described herein may be operable in a small-scale, decentralized, and/or mobile manner. Certain systems described herein may have reduced operational complexity and/or labor requirements.

In some embodiments, a control system may comprise an Arduino kit. The control system may perform one or more of the following functions: starting the reactor, maintaining the reactor at steady state, shutting down the reactor, transitioning the reactor from one reaction state to another, and controlling for emissions.

Certain methods may comprise establishing conditions under which biomass may at least partially decompose (e.g., conditions under which biomass may undergo torrefaction). Such methods may employ one or both of the following strategies: establishing the appropriate conditions in the fastest amount of time possible and/or practical; and establishing the appropriate conditions in a manner in which the minimum amount of biomass wasted. The biomass feeding rate and/or air flow may be selected such that the appropriate strategy is carried out.

Certain methods may comprise at least partially decomposing biomass at a relatively constant rate. For instance, conditions within one or more portions of the system (e.g., the reactor) may be maintained at relatively constant values. In some embodiments, an operator and/or a control system may set a desired output characteristic (e.g. a specified heating value of torrefied fuel). Then, the control system (or the operator) may calculate the index of torrefaction and look up the amount of air input required. This calculation may be done with a preference for keeping the residence time of the biomass in the reactor to a minimum. Based on this calculation, a motor speed and/or an air flow control may be set. Once every few minutes, the control system (or the operator) may check the temperature at the bottom of the reactor. If the reaction is not stable, the control system or operator can adjust conditions accordingly in order to return the reaction to steady state conditions.

Certain methods may comprise shutting down a reactor in a system. Such methods may employ one or both of the following strategies: shutting down the reactor as quickly as possible (e.g. to enable a repair to take place); and preserving as much heat within the reactor as possible during shutdown in order to prevent waste heat dissipation.

Certain methods may comprise transitioning the reactor from one set of conditions (e.g., temperature, temperature gradient, oxygen content) to a second set of conditions (e.g., with a different temperature, temperature gradient, and/or oxygen content). In certain cases, it may be advantageous to minimize the transition time and/or to minimize the amount of biomass passing through the system during the transition.

In some embodiments, the control system will check the temperature at the secondary oxidation zone at the top of the reactor output for the presence of a flame and for the stability of the flame. Secondary air may be adjusted accordingly (e.g., it may be increased to ignite a flame and/or to increase the rate of combustion). In some embodiments, an ignition may be introduced to the system (e.g., to the reactor) if needed.

Figure 11:
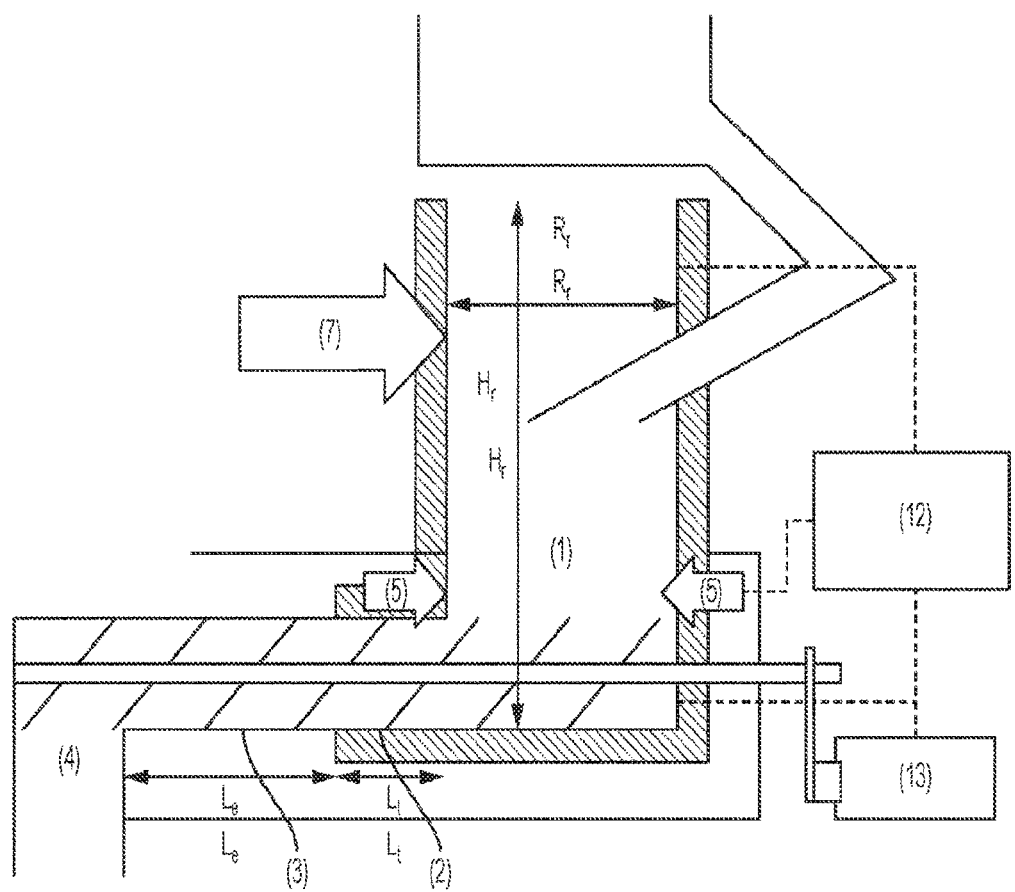
FIG. 11 is a schematic depiction of a system configured for biomass decomposition, according to some embodiments.

FIG. 11 shows mechanical drawings of certain systems as described herein.

The following examples are intended to illustrate certain embodiments of the present invention, but do not exemplify the full scope of the invention.

Example 1

To date, there has been limited usage of biomass and agricultural residues in rural areas as a form of renewable energy, possibly due to the expensive costs involved in collecting and transporting certain types of raw biomass. A decentralized biomass torrefaction system has the potential to upgrade the quality and transportability of distributed biomass residues in situ, which may create additional localized economic values and/or mitigate the environmental consequences associated with open burning of the excess biomass residues.

A biomass torrefaction system based on the concept of torrefaction in a low-oxygen environment is proposed. The proposed system may include a simplified reactor design and/or a laboratory-scale system that is also scalable. The proposed torrefaction system is built and validated with respect to different operating conditions and types of biomass. Using a quantitative definition for torrefaction severity, the various fuel user requirements in real life were related back to the fundamental reactor operations. By quantifying in detail the overall energy performance, pressure requirements, and transient timescales, the reactor system was shown to be capable of operating at scale. It was also shown that various proposed design improvements can further boost the performance of a scaled-up system. Therefore, this work builds the foundation towards the development of a low-cost, small-scale, and portable torrefaction system that can potentially be widely deployed in rural areas.

Section 1: Case for Decentralized Torrefaction

In this work, a case for decentralized biomass torrefaction as a strategy to locally densify and process the excess biomass resources is presented. Contemplated advantages include storage of biomass over a longer period of time in solid form and biomass that can be more easily consumed locally and/or transported and processed. Functional attributes beneficial for certain systems are described, as well as a simplified but scalable low-oxygen moving bed reactor design concept.

1.1 Fate of Unused Biomass Energy and its Environmental Impacts

Biomass, as loosely defined, may include organic materials produced by the photosynthetic activities of plants. These can include trees, grass, agricultural products, and their residues. The term lignocellulosic biomass gives the term more specificity, by referring to the three main constituent components of biomass: cellulose, hemicellulose, and lignin. Biomass is very diverse. Although this Example focuses only on a specific sub-type of biomass: agricultural residues (e.g., agricultural residues in India), the work done in this Example is applicable to all types of biomass throughout the world, including those that are non-agricultural in origin.

Biomass has a high potential as a mostly renewable energy resource: the plant matter can be converted into carbon dioxide and water, releasing energy in the process, whether through rapid oxidation such as combustion or gasification, or through slower biological conversion such as anaerobic digestion or aerobic composting. Biomass can be converted into other valuable uses, such as fertilizer, animal mulch, and even structural materials.

As summarized in Table 1, most of the world's agricultural residues can be broken down into four families: cereals (e.g. barley, corn, millet), legumes (e.g. beans, chickpeas, groundnut), oil crops (e.g. linseed, sesame, sunflower), and sugar crop (e.g. sugar beet, sugarcane, potatoes).

TABLE 1

Worldwide biomass potential as an energy resource in 2001.

| Crop family | Worldwide crop production | Worldwide crop residue |
| --- | --- | --- |
| Cereals | 2.1 billion tons/year | 2.8 billion tons/year |
| Legumes | 305 million tons/year | 305 million tons/year |
| Oil crops | 79 million tons/year | 108 million tons/year |
| Sugar crop | 677 million tons/year | 170 million tons/year |

Although the use of biomass energy is highly context-dependent, some generalizations are possible. Most types of agricultural biomass residues do not present themselves in a form that cannot be easily manipulated. For example, due to the high moisture content, and low mass and energy density in its native state, biomass is often very costly to transport and process without some preprocessing step, such as baling or pelleting, that improves the density and other transportation-related characteristics 1.2 Biomass Torrefaction and its Functional Effects Biomass torrefaction can include pretreatment processes in which lignocellulosic biomass is subject to an elevated temperature of typically between 200-320° C. for a timescale of minutes to hours. Under such conditions, the biomass may undergo chemical changes in the form of devolatilization, whereby the low-energy molecules such as water, carbon dioxide, carbon monoxide, and organic acids leave the biomass in the form of volatile gases rich in hydrogen and oxygen. Because these low-energy molecules may carry mass away to a greater extent than they carry away energy, what remains in the torrefied solid may become more energy dense and/or more carbon-rich. This may results in a visual change of color in the appearance of the biomass.

Torrefied biomass may be more hydrophobic, which means that it may be resistant to moisture attack and/or may not degrade over time. Therefore, certain torrefied biomass can be stored as a stable fuel for a much longer period of time.

In addition, there are other features of biomass torrefaction such as decreased energy requirement for grinding the torrefied biomass into smaller pieces. These features may confer advantages to the subsequent solid fuel processing, because many solid fuel boilers—especially of fluidized bed design—require that the incoming fuel feedstock by pulverized.

Finally, the volatile gases released by the biomass feedstock may contain energy and/or be capable of being combusted. Therefore, this heat can, in theory, be harnessed to supply the heat source to the torrefaction reactor itself, in some cases without requiring external energy. This autothermal nature of biomass torrefaction under certain conditions may be beneficial for scalable torrefaction processes.

1.3 Overview of Torrefaction Reactor Designs
1.1.1 Rotary Drum

Figure 12:
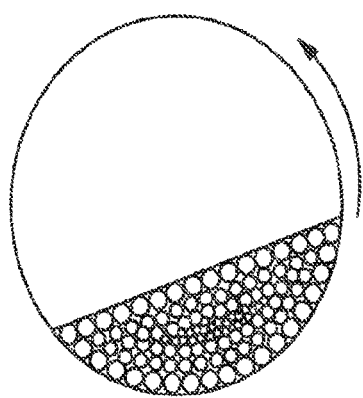
FIG. 12 is a schematic depiction of a rotary drum reactor, according to some embodiments.

Certain rotary drum reactors include a slightly downward inclining cylinder that rotates. Biomass may enter into the higher end of the cylinder, and as the cylinder rotates, the biomass may tumble (FIG. 12). Due to this tumbling motion, biomass particles may alternate in their contact with the hotter reactor wall and the gas inside the reactor, which may result in relatively good mixing and/or homogeneous heating.

1.1.2 Screw Conveyor

Certain screw conveyors may include a horizontally or vertically oriented reactor, with one or more screw augers that rotate in order to continuously convey biomass through the system. The hot gases may be provided to the outside of the reactor and/or within the hollow shaft of a screw. In certain screw conveyors, the heat is indirectly transferred to the biomass. The heat transfer may be somewhat better than the rotary drum, as in addition to the heated outer wall, the screw itself can also be heated, thereby providing a larger surface area for more effective heat exchange. Like the rotary drum, screw conveyors may perform better when not completely filled. Therefore, for a given biomass processing capacity, it may be beneficial for the reactor volume to be significantly larger.

1.1.3 Microwave

Certain microwave reactors use radiation energy to heat up the biomass, which may allow it to reach torrefaction conditions.

1.2 Need for a Small-Scale, Decentralized Torrefaction Reactor Design

In Section 2, torrefaction in a low-oxygen environment is considered. A scalable laboratory-scale moving bed reactor design is also described. In Section 3, the operation and performance metrics of this reactor under various torrefaction reaction conditions and types of input biomass feedstock are validated. In Section 4, the performance maps obtained in Section 3 are employed to devise a simplified and design-oriented approach to selecting torrefaction reactor conditions based on the index of torrefaction, and to show ways to operate the reactor in order to satisfy different end user requirements for energy density, fixed carbon content, stove temperature, grindability, and even combustion emissions profile. In Section 5, various energy loss mechanisms are considered, and a science-based approach to improve the design of a scaled-up torrefaction reactor through selection of insulation, air pre-heating, and secondary oxidation of uncombusted volatiles in the reactor exhaust stream is presented. In Section 6, the factors influencing what it takes to inject a specified flow rate of air into the reactor in order maintain a low-oxygen environment are considered by characterizing the hydrodynamic characteristics of the biomass moving bed, and using a combination of the natural stack effect and, in some cases, forced air. Finally, in Section 6.1, the factors related to starting the reactor from a cold state, stopping the reactor, and transiting the reactor from one operating condition to another are considered. Therefore, the collection of studies in this Example provide a quantitative basis for scaling up a low-cost, portable, and small-scale torrefaction reactor unit suitable for decentralized torrefaction in rural areas.

Section 2 A Low-Oxygen Torrefaction Reactor Design

Certain torrefaction reactors described herein are simplified, reduced in complexity, and/or reduced in cost. Some such torrefaction reactors can be feasibly deployed in a rural setting. In this section, the concept of a low-oxygen torrefaction environment is explored, and methods of taking advantage of this concept to simplify the reactor design via a moving bed reactor are described. A coarse-grained model description of the moving bed based on length scales and heat transfer approximations is developed, and it is demonstrated that heat transfer through the gaseous phase may be a primary heat transfer mechanism in the moving bed. Then, a fine-grained model description of the biomass moving bed is presented in order to validate the proposed design and to derive base case operating conditions. It is demonstrated that the moving bed reactor designed using reasonable length scales and operating conditions can indeed satisfy the requirements of torrefaction. Finally, the insight above is employed to derive and describe a more detailed design that will be implemented and validated subsequently.

2.1 Torrefaction in a Low-Oxygen Environment

Low-oxygen torrefaction appears to be an attractive option because it can simplify the reactor design in a few ways. With the injection of a limited amount of oxygen directly into the biomass reactor, some (if not all) of the volatile gases released from the biomass torrefaction process can be combusted in situ. The combustion may release heat directly to the biomass bed, which may then sustain the torrefaction reaction. Torrefaction reactors with this design may not require an external combustor to burn the volatile gases separately. In some cases, the volatile gases can be directly generated and burned in the torrefaction zone without needing to be first co-mingled and diluted by the steam generated from the drying process. This may obviate the need to perform a volatile gas cleaning/scrubbing step. Ignition typically occurs when the volatiles released by the biomass start oxidizing. The ignition temperatures of these types of biomass lie within the realm of torrefaction temperature. This means that if the biomass can be brought to the torrefaction condition, then the presence of oxygen can cause the volatiles to spontaneously ignite. The heat released from this oxidation can then heat the incoming biomass to the torrefaction condition, which may result in a self-sustaining, autothermal process. The other data point to note is that the ignition temperature of charcoal is higher, at 350° C. The fact that charcoal only ignites at a higher temperature suggests that the kinetics of the undesirable char oxidation reaction proceeds more slowly compared to the kinetics of the volatile oxidation reaction. Therefore, it is believed that keeping the temperature below 350° C. will prevent excessive char oxidation.

2.2 Proposed Reactor Design Concept

Figure 13:
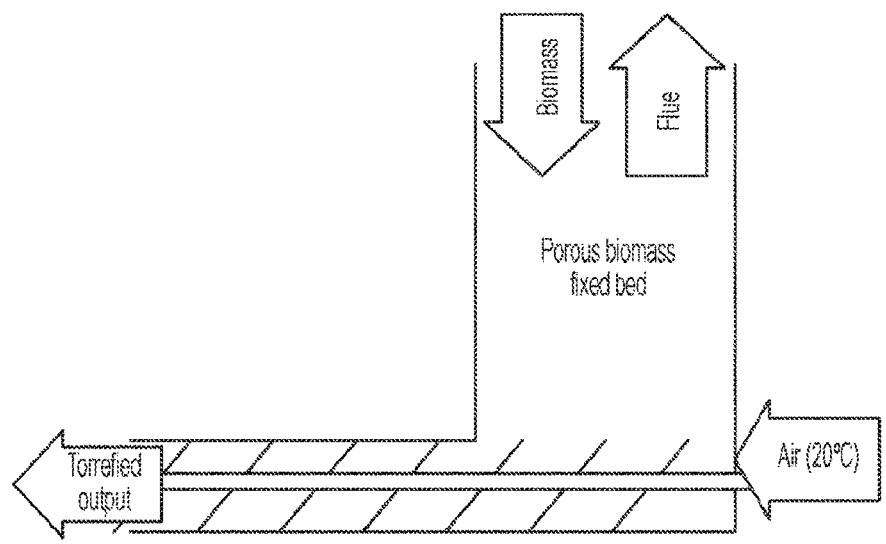
FIG. 13 is a schematic depiction of a system configured for biomass decomposition, according to some embodiments.

A schematic of a proposed torrefaction reactor design is shown in FIG. 13. In this design, biomass may be continuously fed from the top into a porous biomass moving bed. At the bottom, a turning auger may continuously remove the biomass from the moving bed, and/or allow the incoming biomass column to migrate downwards by gravity. Air (at room temperature) may be introduced near the bottom of the reactor, which may result in a low-oxygen environment that may support torrefaction at the bottom of the moving bed. A mixture comprising reacting air, volatiles, and/or flue gas may travel upwards through the moving bed in a counter-flow manner. While traveling upward, it may cool and/or be exhausted from the top of the reactor. While the biomass is traveling downwards, it may be heated. The biomass may reach torrefaction temperature at the bottom of the moving bed. To the side of the moving bed, there may be an extension with a length of the auger conveying biomass away from the moving bed. This length may serve one or more functions. First, as the biomass at the bottom of the moving bed is hot, it may be beneficial for it be cooled before emerging from the reactor; if it is not cooled sufficiently, it may spontaneously combust. The auger extension may cool the hot, torrefied biomass. Therefore, this section is also referred to as the "char-cooling segment". Second, the auger flights and the inner diameter of the char-cooling segment may form quite a tight fit, such that it prevents the injected air, volatiles, and/or post-combustion flue gas mixture from escaping sideways with the cooling char. The auger flights and inner diameter of the char-cooling segment may fit together such that much of the injected air, volatiles, and/or post-combustion flue gas may be directed upwards through the moving bed. In order for this to happen, it may be beneficial if the pressure drop for the gas across the char-cooling segment higher than that for the gas across the moving bed. It may be beneficial for the char-cooling segment to be at least longer than the height of the moving bed.

2.3 Coarse-Grained Model 2.3.1 Modeling Description

Figure 14:
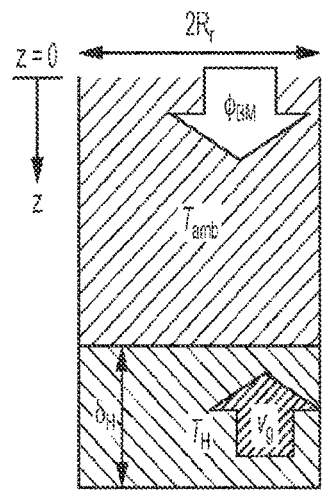
FIG. 14 is a schematic depiction of a moving bed reactor, according to some embodiments.

FIG. 14 shows a very simplified lump-sum model description of the moving bed reactor considering axial heat transfer, but ignoring any radial variations. The side walls of the reactor are assumed to be surrounded by perfect insulation. The torrefaction is treated as having two zones: a lower "hot zone" where torrefaction takes place, homogeneously at an elevated temperature $T_H$, as well as an upper "cold zone" at ambient temperature $T_{amb}$. It is assumed that $T_H$ is achieved and sustained in an oxidative environment via the mechanism described in Section 2.2. The solid biomass, of mass flow rate $\dot{m}_{BM}$, flows downwards the reactor of radius $R_r$, with an axial mass flux of $\Phi_{BM} = \dot{m}_{BM}/\pi R_r^2$ [kg s$^{-1}$ m$^{-2}$]. On the other hand, gases flow upwards with a superficial velocity $v_g$. Here, the following equation is satisfied:

$$v_{BM} \sim \frac{\delta_H}{\tau_{res}}.$$

If it is assumed that the biomass moving bed has an effective axial thermal conductivity coefficient of $k_r$, and thermochemistry is ignored, then the steady-state governing axial (z) heat equation can be written as:

$$\frac{d}{dz}(\Phi_{BM} c_{p,s} T) = \frac{d}{dz}\left(k_r \frac{dT}{dz}\right).$$

By doing a dimensional analysis, $\delta_H$ can be related to various biomass and reactor operating parameters as:

$$\delta_H \sim \frac{k_r}{c_{p,BM} \Phi_{BM}}.$$

In this model, it is assumed that the moving bed itself includes of two inhomogeneous phases: a solid phase (biomass) and a gas phase (a mixture of air, volatile gases, and post-combustion flue gases). The two phases are assumed to conduct heat differently in the axial direction, and the two phases are assumed to be capable of exchanging heat with each other.

Solid bulk thermal conductivity. The actual heat transfer coefficient $k_{rs}$ in the solid phase may be affected by one or more of: (i) heat conduction within a single biomass particle, (ii) biomass particle-to-particle contact conduction, (iii) particle-to-particle radiation via the porous void, and/or other parameters. An empirical correlations given by Hobbs (1992) was employed for this model.

Gas bulk thermal conductivity. Similar to the solid effective bulk thermal conductivity $k_{r,s}$, the gas effective bulk thermal conductivity $k_{r,g}$ describes the homogeneous heat transfer within the gaseous phase inside the biomass moving bed, via a combination of one or more of conduction, convection, and radiation. Once again, the gasifier correlations from Hobbs (1992) were employed.

Solid-gas heat transfer. In the biomass moving bed, it is believed that the solid and the surrounding gas can exist at different temperatures ($T_s$ and $T_g$, respectively), and that there may be heat transfer between the two phases of the form $Q_{sg}=h_{sg}A_{sg}(T_s-T_g)$, where $h_{sg}$ is the solid-gas heat transfer coefficient with the units of W m$^{-2}$ K$^{-1}$, and $A_{sg}$ is the total area of exposure between the solid and the gas phases. The amended correlation proposed by Gupta and Thodos (1963) was employed:

$$h_{sg} = \frac{2.06 c_{p,g} \rho_g v_g}{\varepsilon}(Re)^{-0.575}(Pr)^{-2/3},$$

where $c_{p,g}$, $\rho_g$, and $v_g$ are the specific heat capacity, mass density, and superficial axial velocity of the gas phase, respectively. In the equation above, Re and Pr are the Reynolds and Prandtl numbers associated with the superficial flow of the gaseous phase, respectively. Knowing $h_{sg}$, the volumetric heat flow rate $q_{sg}$ (in units of W m$^{-3}$) from the solid to the gas phase is given as follows:

$$q_{sg} = \frac{6(1-\varepsilon)\gamma}{d_p} h_{sg}(T_s - T_g),$$

where $\gamma$ is an adjustable factor proposed by Hobbs et al. (1992). This factor may account for other factors—such as chemical reactivity within the bed—in order to better fit the experimental data. $\gamma$ is assumed to be equal to 0.2.

2.3.2 Analysis of Heat Transfer Pathways

Figure 15:
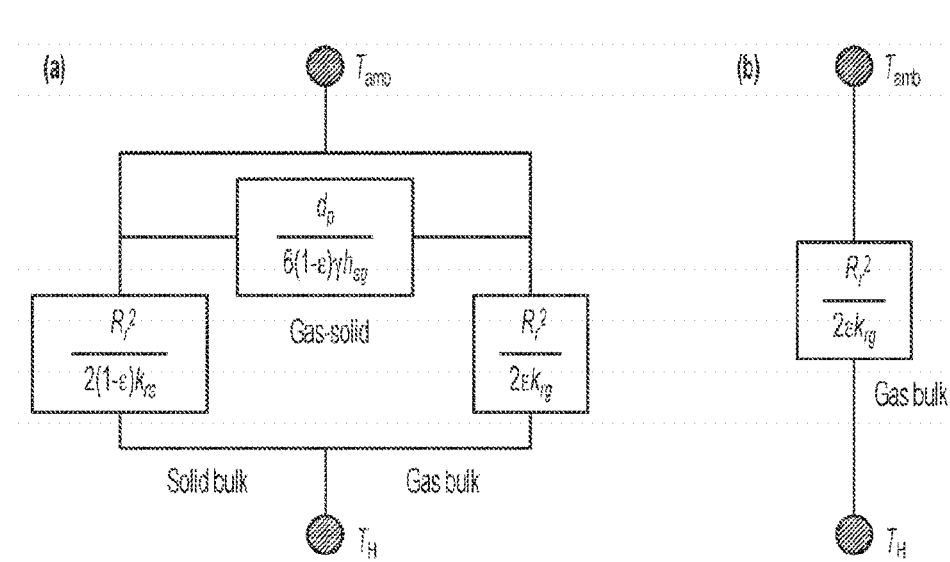
FIG. 15 is a schematic depiction of a heat flow circuit through a reactor, according to some embodiments.

Heat transfer may be understood by analogous electrical circuit analysis. Table 2 shows the typical ranges of values of the different heat transfer resistivities. It is noted that the gas-to-solid heat transfer resistivity is very small compared to all the other terms. In fact, the resistivity against heat flow between the solid and gas phases is so small that it can be approximated as roughly zero. This analysis implies that the solid and the gas phases assume very similar temperature throughout the moving bed and that heat can exchange freely between the two phases. The ratio of the solid bulk heat transfer resistivity to the gas bulk heat transfer resistivity was found to be less than 0.1 in many cases, when the characteristic particle diameter $d_p$ is larger than ~1 cm. When this condition is satisfied, it implies that most of the heat flow within the bulk of the reactor occurs through the gas phase, with very little going into the solid phase. based on these conclusions, the electrical circuit diagram can be simplified further by assuming that the solid bulk heat transfer path is an "open circuit" with infinite resistivity. With these simplifications in mind, the heat flow circuit simplifies to that in FIG. 15. In this case, the bulk thermal conductivity coefficient $k_r$ is equivalent to the effective gas bulk heat transfer coefficient $k_{rg}$, which typically has a value of 1-10 W m$^{-1}$ K$^{-1}$ in the regime of interest.

TABLE 2

Typical ranges of values of the different heat transfer resistivities across the biomass moving bed.

| Type of resistivity | Typical value range |
| --- | --- |
| Solid bulk heat transfer | 1-100 m$^3$ K W$^{-1}$ |
| Gas bulk heat transfer | 0.01-10 m$^3$ K W$^{-1}$ |
| Gas-to-solid heat transfer | 0.05-0.08 m$^3$ K W$^{-1}$ |

2.3.3 Implications for Reactor Sizing

For a reactor rated to process about 5 tons/day of biomass that has a diameter no larger than 2.5 m, the above analysis implies that the solid mass flux through the system is in the range of 0.01 kg m$^{-2}$ s$^{-1}$, or a downward axial velocity of around 2 cm min$^{-1}$. This yields a hot zone thickness $\delta_H$ on the order of 20 cm, and a solid residence time $\tau_{res}$ on the order of 10 min. This also means that for a laboratory-scale reactor design whose diameter does not exceed 10 cm, which represents a factor of 1/625 from the full-scale reactor, with a typical biomass processing capacity of around 1 kg h$^{-1}$.

2.4 Fine-Grained Model

In the prior section, coarse-grained scaling arguments were used to conduct an initial sizing of the moving bed biomass torrefaction reactor concept, and to verify that it meets the torrefaction requirements. In this section, building on this scaling argument, a fine-grained steady-state axial model of the moving bed is proposed. The main design parameters to this fine-grained model are: solid mass flux $\Phi_{BM}$ (which takes into account the reactor radius), and the reactor height $H_r$. The target treatment temperature and solid residence time are treated in this study as two output parameters, which depend on the reactor sizing input parameters.

The main input parameters to model include: solid mass flux (on a dry basis) $\Phi_{BM}$, height of the reactor $H_r$, bulk solid density of the moving bed $\rho_s$, bulk void fraction in the moving bed $\varepsilon$, incoming biomass moisture content expressed as a mass fraction of the dry biomass $Y_{MT}$, and the characteristic biomass particle size $d_p$. It has been assumed, in the base case, that $Y_{MT}=0.11$, $\varepsilon=0.6$, and $\rho_s=30$ kg m$^{-3}$.

2.4.1 Kinetics and Thermochemistry Submodel

Figure 16:
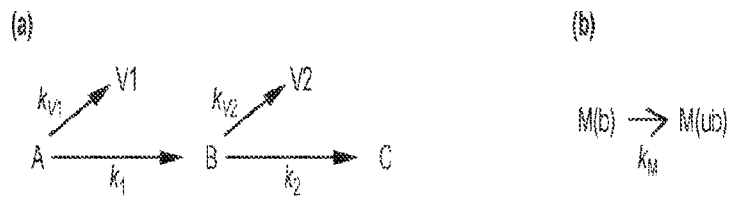
FIG. 16 is a schematic depiction of a kinetic model of heat flow through a reactor, according to some embodiments.

In order to describe the solid devolatilization process, the kinetic model proposed by Bates and Ghoniem (2012), developed for the case of willow (FIG. 16A) is employed. In this model, the solid-phase devolatilization following a two-step process. First, the raw biomass (A) can either decompose into volatile gas (V1) or become solid intermediate (B). Then, the solid intermediate (B) becomes either volatile gas (V2) or char (C). Each of these reactions are assumed to be first-order Arrhenius in nature. In addition, for the drying of biomass, a simplified model proposed by Peters and Bruch (2003) is employed, where water bound to the biomass (M(b)) in the solid phase becomes unbound (M(ub)) in the gas phase as a first-order Arrhenius-type process (FIG. 16B). This gives the following rate equations:

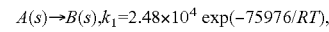

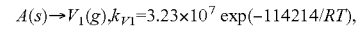

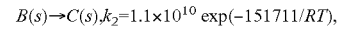

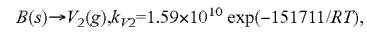

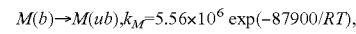

In a subsequent paper, Bates and Ghoniem (2013) derived the enthalpy $H_i$ associated with each ith reactant or product at temperature T. Therefore, the overall volumetric enthalpy change due to the chemical reaction is given as $\Sigma_i r_i H_i$, where $r_i$ is the volumetric creation rate of the ith species [kg m$^{-3}$ s$^{-1}$].

2.4.2 Governing Equations

The 13 steady-state equations are correspondingly listed as follows:

Seven mass conservation equations of the solid and gas phases in the moving bed (for each of the 4 solid species and 3 gas species):

$$\frac{d\Phi_i}{dz} = r_i,$$

where $\Phi_i$ is the mass flux through the reactor cross-section of the ith species, and $r_i$ is the volumetric creation rate [kg s$^{-1}$ m$^{-3}$] of the ith species and is calculated in the coupled chemical kinetics/thermochemistry submodel. Note that it is assumed that diffusion of the gas species is negligible compared to convection. It is understood that the mass flux of the dry solid through the reactor is $\Phi_s = \Phi_A + \Phi_B + \Phi_C$, while the mass flux of the gas, $\Phi_g = \Phi_{V1} + \Phi_{V2} + \Phi_{M(ub)}$.

Five mass balance equations for the jth elemental analysis component (carbon, hydrogen, oxygen, nitrogen, and ash) in the solid phase:

$$\frac{d}{dz}(\Phi_s Y_j) = \sum_i r_i Y_{ij},$$

where $Y_j$ is the mass fraction of the jth elemental component, and $Y_{ij}$ is the mass fraction of the jth elemental component in the ith species.

One energy balance equation:

$$\sum_i \frac{d}{dz}(\Phi_i c_{p,i} T) = \frac{d}{dz}\left(k_r \frac{dT}{dz}\right) - \sum_i r_i H_i$$

where the first term on the right-hand side describes the effective heat conduction through the moving bed in the axial direction, and the second term describes the heat of reaction (computed in the chemical kinetics/thermochemistry submodel). The summation terms are summed over all 7 solid and gas species in the biomass fixed bed.

The initial and boundary conditions are set as follows:

$$\Phi_A(z = 0) = \Phi_{BM}$$

$$\Phi_{M(b)}(z = 0) = \frac{Y_{MT} \Phi_{BM}}{1 - Y_{MT}}$$

$$\Phi_i(z = 0) = 0, \ i \notin \{A, M(b)\}$$

$$Y_j(z = 0) = Ult(j)$$

$$T(z = 0) = T_{amb}$$

$$T(z = H_r) = T_H,$$

where Ult(j) is the elemental mass fraction of the jth element through the elemental (ultimate) analysis of the original raw biomass.

2.4.3 Implementation and Validation

The mathematical model was implemented in MATLAB using a standard stiff solver (ode15s) with the shooting method. The obtained results were compared with a limiting case of bone-dry, non-reactive case where an analytical solution can be derived. The model was found to match the analytical solution for various input parameters in this case.

2.4.4 Results

Figure 17:
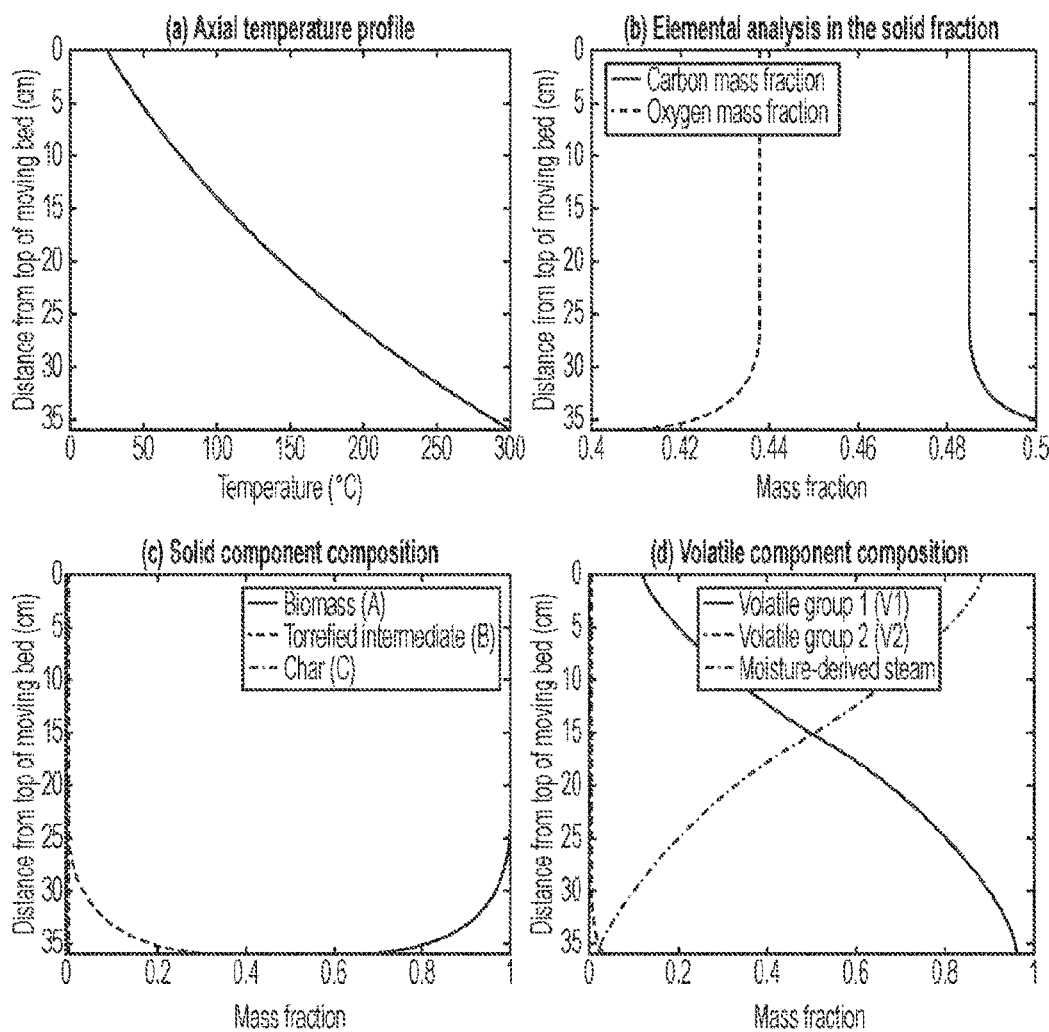
FIG. 17 includes several charts showing different features of a reactor, according to some embodiments.

For the simulation, the operating conditions identified in the previous section were used, where the dry biomass flux $\Phi_{BM}$=0.0024 kg s$^{-1}$ m$^{-2}$ and reactor height H$_r$=36 cm. FIG. 17A plots the axial temperature profile within the biomass moving bed, starting with a position of z=0 from the top of the reactor. The temperature increases quite smoothly, reaching a solid exit temperature of 300° C. In FIG. 17B, the solid biomass phase is shown to undergo a decrease in oxygen and increase in carbon. This change is also corroborated in FIG. 17C, where the mass fractions of torrefied (B) and char (C) components increase while that of the raw biomass (A) component decreases. Finally, in FIG. 17D, a change in the composition of the locally released volatile phase is seen: in the upper part of the biomass moving bed, the volatiles being released are rich in moisture, signifying the drying process. Lower down in the reactor, the non-moisture volatile groups (V1 and V2) become dominant as torrefaction takes place.

One note is that for the large part of the reactor studied in this Section, there is not much change in the biomass solid phase except for drying. It is only in the bottommost 10 cm that significant changes in the composition are seen for the reactor studied in this Section. It is believed that for most parts of the moving bed, the temperature is rising but is always below 200° C. It is believed that the onset of torrefaction typically occurs above 200° C., which is around 25 cm from the top of the reactor. Having the drying occur higher up in the reactor in a zone slightly separate from the devolatilization process may be advantageous because the combustible volatile gases released in the oxidation zone may be less diluted by the inert steam released from drying. This zonal separation may help improve the performance of the reactor.

The model described herein predicts that most of the devolatilization occurs within the bottommost 10 cm of the reactor, and that there are advantages in the zonal separation between drying and devolatilization.

2.5 Detailed Reactor Design

The reactor described in this Section includes several features, including:

The ability to have a temperature profile taken.

The ability to operate switch to the inert (N$_2$) conditions from the oxidative condition on demand.

Gas-sampling ports built into the side of the reactor, in addition to the exhaust exit at the top.

Figure 18:
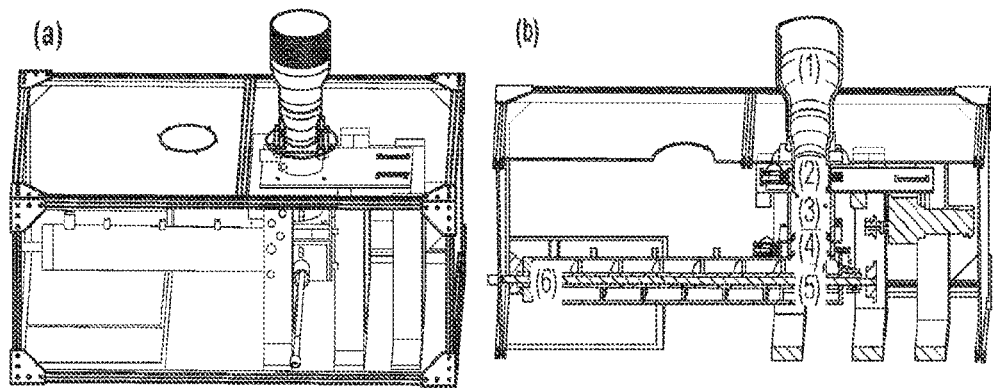
FIGS. 18-23 are schematic depictions of reactors and components of reactors, according to some embodiments.

An overview of the reactor assembly described in this Section is shown in FIG. 18. The reactor system described in this Section comprises several components, labeled numerically in FIG. 18B. In this reactor, biomass enters into the biomass feed region (1), where the exhaust gas from the torrefaction reaction also escapes. Then, the biomass moves downwards in the moving bed that is contiguous in components (2) through (5). There are two gas sampling ports, one upper (2) and one lower (4), from which the gas from the reactor can be sampled or vented. Then the biomass enters the oxidative "hot zone" (5) where a limited amount of air is injected and where low-oxygen torrefaction occurs. Finally, the torrefied biomass is conveyed away from this hot zone via a char-cooling segment (6).

2.5.1 Biomass Feed Component

Figure 19:
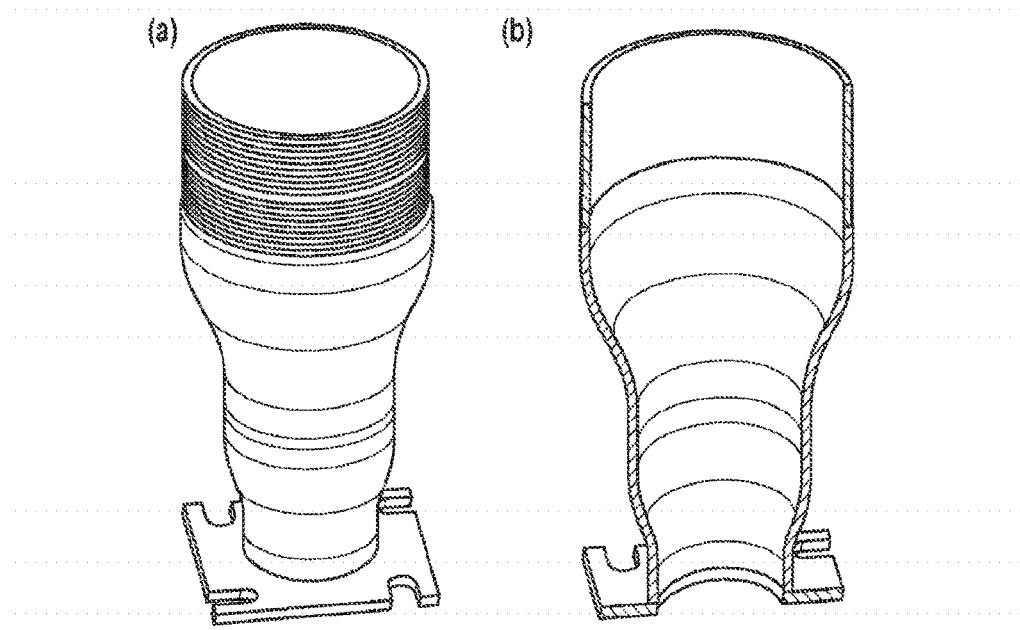

The biomass feed for the reactor described in this Section includes an outlet that is 6 inches (15.24 cm) in diameter to make manual feeding of biomass easy. In the case of escaping exhaust gas, the widening opening may allow the gas to slow down in vertical velocity, so that it does not overwhelm the exhaust system and spill into the rest of the lab. Then the inner diameter gradually reduces to 3 inches (7.62 cm) (FIG. 19). This reduction was done by welding various existing NPT components together: a standard 6-NPT steel pipe nipple (McMaster-Carr 44615K138), a standard butt-weld 304 stainless steel straight 6-by-4 NPT reducer (McMaster-Carr 45605K786), and a standard butt-weld 304 stainless steel straight 4-by-3 NPT reducer (McMaster-Carr 45605K783). The feed was then welded to a 304 stainless steel flange component that has been cut on a waterjet. This flange enables the different components in the assembly to be bolted together.

2.5.2 Upper Gas Sampling Port Component

Figure 20:
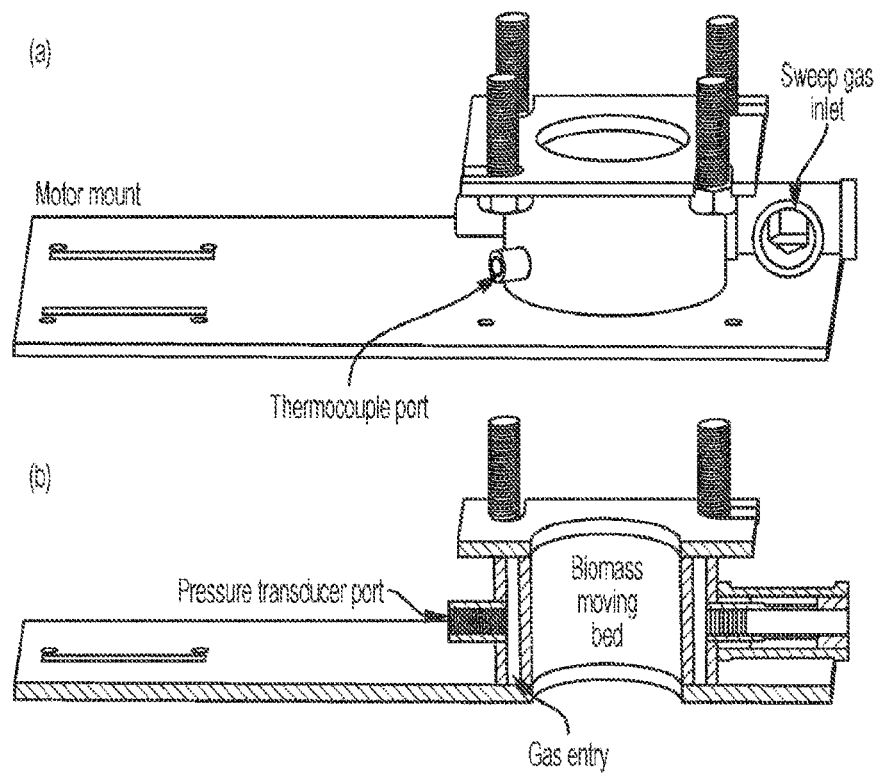

In the reactor described in this Section, immediately beneath the biomass feed component lies the upper gas sampling port component (FIG. 20). Here, the biomass travels downwards along the inner moving bed, which comprises a 2.5-inch (6.35-cm) segment of a standard 304 stainless steel, 3-NPT welded pipe (McMaster-Carr 1947K79). Then, concentrically surrounding the 3-NPT pipe is a larger standard 304 stainless steel, 4-NPT welded pipe of the same segment length (McMaster-Carr 7750K199). Between the 3-NPT and 4-NPT pipe is a jacket that opens to the biomass moving bed at the bottom via a series of small slits. The jacket also communicates to the exterior via a welded standard ¾-NPT tee (McMaster-Carr 44605K155), and serves as the gas sampling port. The third end of the tee serves as an inlet for sweep gas, which may be employed to dilute the reactor gas with inert nitrogen, and/or to combust this gas by mixing it with air. Also welded to the exterior side of the 4-NPT pipe segment are a few female couplings of ⅛-NPT and ¼-NPT sizes (McMaster-Carr 46685K261 and 46685K262 respectively). These ports may allow insertion of thermocouples (via a male compression tube to NPT fittings) and/or pressure transducers (via barbed hose to NPT fittings). The ports may be sealed with NPT caps when they are not in use. In some cases, they do not openly communicate with the exterior. Finally, the top of the upper gas sampling port component is welded to a flange connection that is identical to the one at the bottom of the biomass feed component so that the two components can be bolted to each other (with some compressible gasket material in-between). The bottom of the upper gas sampling port component, on the other hand, is welded to a large rectangular ¼-inch-thick 304 stainless steel sheet that is also cut on a waterjet. This sheet (a) serves as the lower flange to connect to the component below, and (b) as labeled in FIG. 20, provides for a place to mount the motor that drives the auger at the bottom of the reactor assembly.

2.5.3 Moving Bed Component

Figure 21:
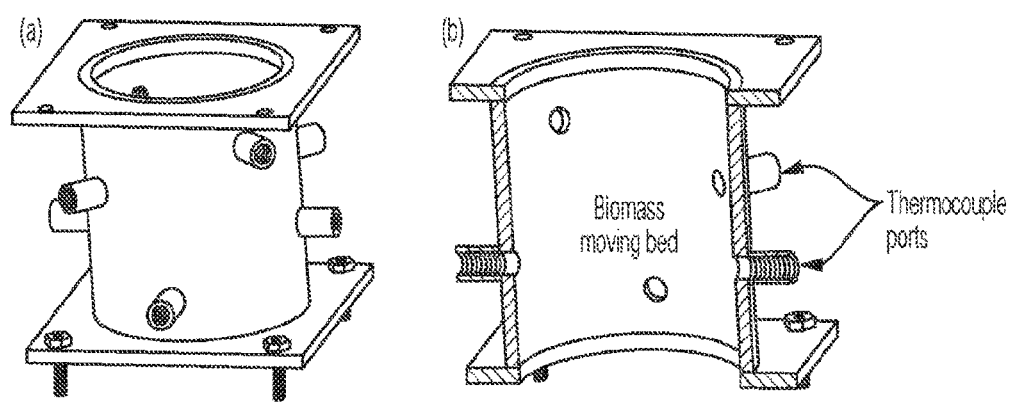

For the reactor described in this Section, immediately beneath the upper gas sampling port component is the moving bed reactor component (FIG. 21). The inner side of this component is made from a 5-inch-long (12.7 cm) segment of the same 304 stainless steel, 3-NPT welded pipe (McMaster-Carr 1947K79). Therefore, in this design, the inner biomass moving bed is contiguous with that in the upper gas sampling port component above, as well as with that in the lower gas sampling port component below. Eight female couplings of ⅛-NPT size (McMaster-Carr 46685K261) are welded to the exterior of the 3-NPT pipe to serve as thermocouple ports. Both the top and the bottom of this component is welded to a stainless steel flange that has been cut using a waterjet, in order to provide tight connection with the components above and below.

2.5.4 Lower Gas Sampling Port Component

Figure 22:
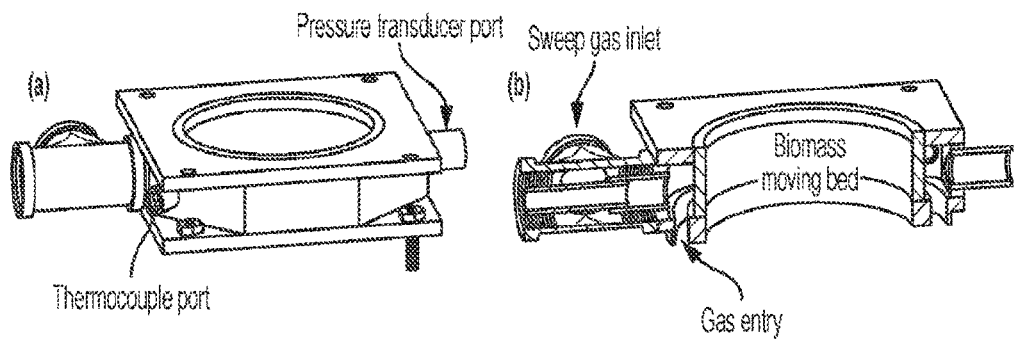

The lower gas sampling port component may include an inner 3-NPT pipe that makes up the biomass moving bed, as well as a concentric surrounding 4-NPT pipe that forms the outer wall of the gas jacket (FIG. 22). In this design, the gas jacket communicates to the biomass moving bed via several thin slits at the bottom, and a ¾-NPT tee communicates the gas jacket to the outside, with the same sweep gas inlet feature included, as previously described for the upper gas sampling port. This component, like the upper gas sampling port component, also has welded female NPT couplings that provide places for the pressure transducer and thermocouples to enter.

2.5.5 Oxidative Zone Component

Figure 23:
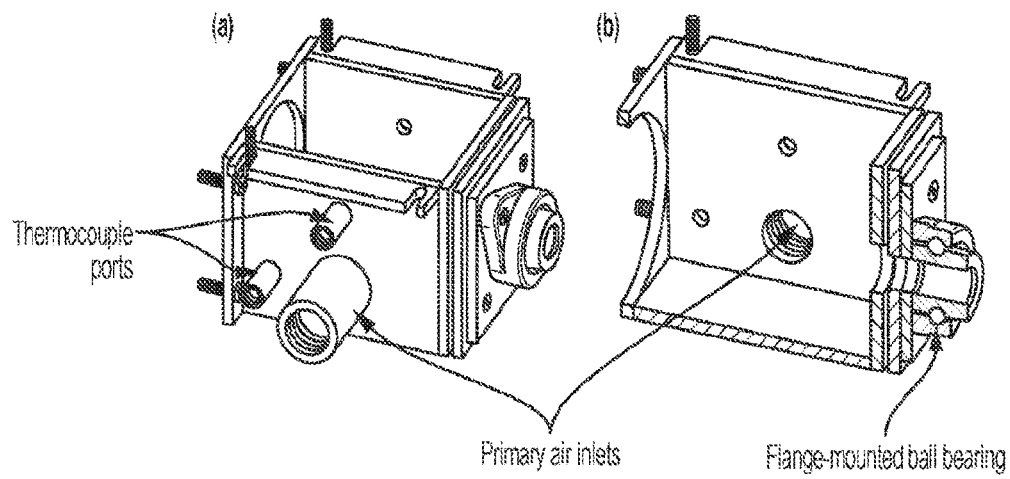

For the reactor described in this Section, beneath the lower gas sampling port component lies the rectangular box that houses the auger and constitutes the oxidative hot zone (FIG. 23). As the biomass travels through the inside of the lower gas sampling port and falls into this oxidative hot zone, it may have been heated sufficiently hot such that torrefaction reaction can take place. There may be two primary air inlets, located opposite from each other, in the form of a pair of welded standard 1-NPT female couplings (McMaster-Carr 4513K650), where air (with or without preheating) from a compressed source can be connected via a compression tube to NPT fitting. There may be four thermocouple ports at different locations, which may comprise welded standard ⅛-NPT female couplings (McMaster-Carr 4513K261). The left side of the oxidative zone may open to the char-cooling segment, and/or the right side of this component may comprise a wall with an opening for the shaft of the auger to go through, an O-ring to provide an airtight seal, and/or a flange-mounted ball bearing (McMaster-Carr 6665K33) that helps position the auger shaft axially and allows it to rotate. The left, right, and/or upper faces of the component may have bolt holes to secure these components to their adjacent neighbors. Finally, the incoming air may be injected at the same level as the auger flights, whose shape may help disperse the air throughout the biomass moving bed. For safety measure, there may be an option to switch the air stream with an inert stream.

2.5.6 Char-Cooling Segment

Figure 24:
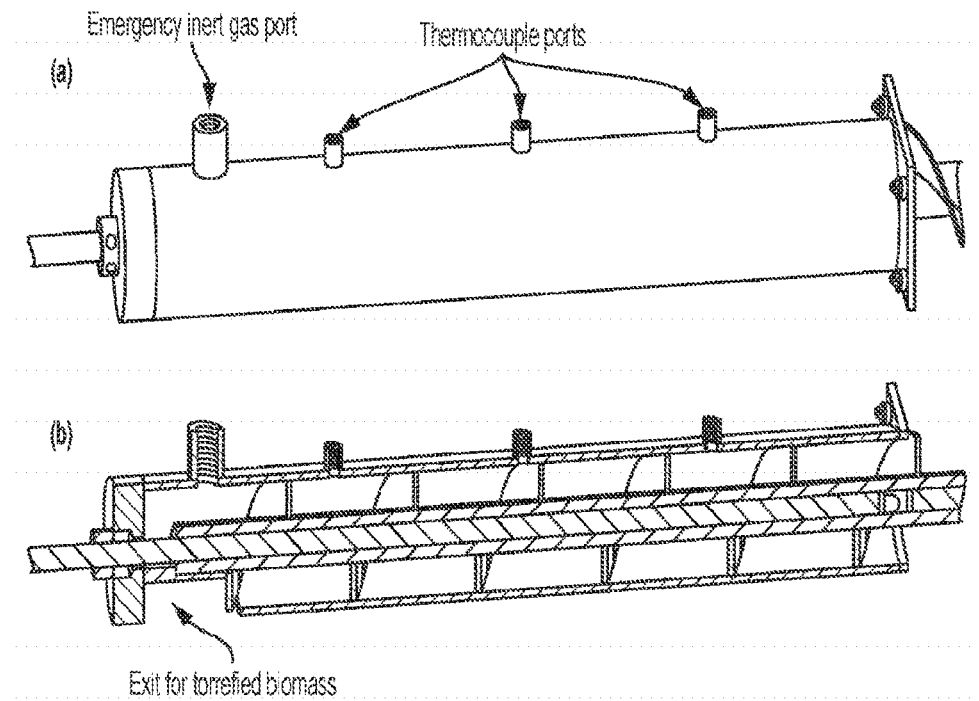
FIG. 24 shows schematic depictions of outlet conduits, according to some embodiments.

After the biomass passes through the oxidative zone, it may be carried by the auger into the char-cooling segment (FIG. 24). As described previously, this segment may cool hot torrefied biomass, such as when it emerges from the reactor, it does not risk spontaneously catching fire. The auger may be housed within a 2-foot-long (61 cm) piece of standard 4-NPT steel pipe (McMaster-Carr 7750K199). The right-hand auger flights may have a diameter of 4 inches (10.16 cm), and/or the auger component may be supplied by Tanaka Power Equipment. At the left end of the char-cooling segment, there may be a square opening, cut into the NPT pipe 3 inches by 3 inches (7.62 cm). The square opening may allow the cooled torrefied product to exit the reactor assembly. The char-cooling segment may be capped at the left end, and/or a clamping two-piece shaft collar (McMaster-Carr 6436K16) may maintain the axial position of the auger in conjunction with the flange-mounted ball bearing described earlier on the right-side wall of the oxidative zone.

2.5.7 Motor Drive

Figure 25:
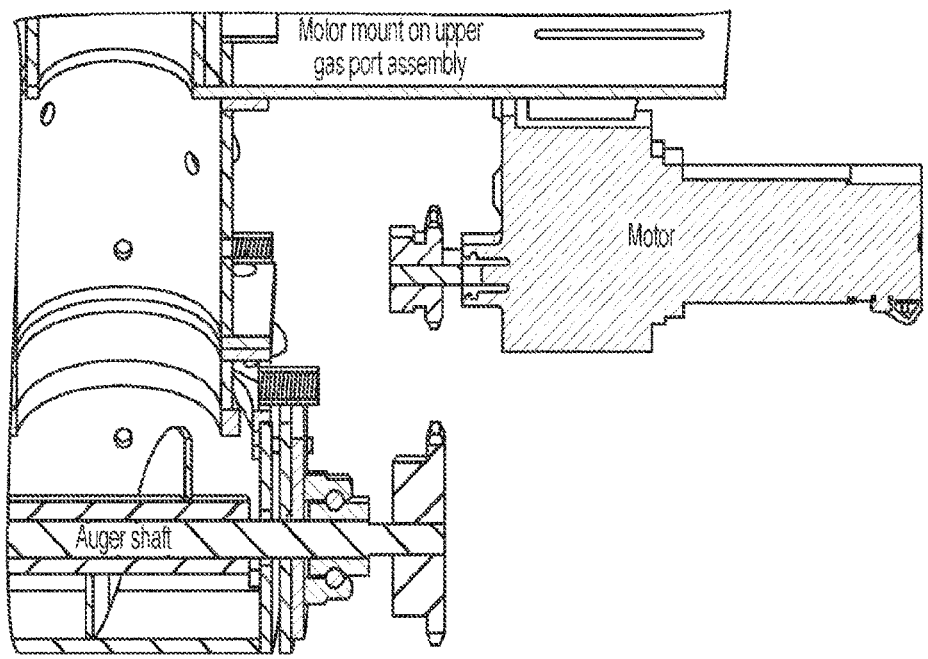
FIG. 25 is a schematic depiction of a motor, a reactor, and an outlet conduit, according to some embodiments.

A motor, such as a Bison 336 Series 37 Watt permanent magnet 90V/130V DV motor, may be mounted below the motor mount on the lower face of the upper gas port component (FIG. 25). The motor may have a ⅝-inch pitch, 10-teeth, ⅝-inch bore motor sprocket (McMaster-Carr 6280K871), which may be connected via the #50 chain to a ⅝-inch pitch, 20-teeth, ⅝-inch bore sprocket that is connected via a square key to the auger shaft (McMaster-Carr 6280K808). The DC motor speed may be adjustable via an Iron Horse silicon controlled rectifier 180 VDC drive. Another way the DC motor speed may be adjustable is via a Minarik Drives XP-02-115AC-Q whose output can be varied by an input signal.

Section 3 Validation of a Scalable Biomass Torrefaction Reactor and Its Performance Metrics In this Section, a lab-scale torrefaction test reactor is employed to torrefy three types of biomass: pine shavings, hay, and rice husks. The reactor performance may depend on the type of feedstock. For each feedstock studied in this Section, there existed a set of operating conditions where the reactor was able to sustain a stable and continuous torrefaction reaction of different degrees of severity for several hours. For each operating condition, several parameters were characterized, including the product yield, energy yield, and energy densification. In general, torrefaction under a low-oxygen environment resulted in an over-torrefaction and reduced solid mass and energy yield under a given torrefaction temperature and residence time. Mass closure and elemental analysis were employed to calculate the elemental composition in the volatile mixture. It was found that the reactor operated almost always on the air-rich side with respect to the available combustible volatiles. These performance metrics can be used to predict the necessary torrefaction reactor conditions at scale.

3.1 Need for a Scalable Torrefaction Test Reactor

In this Section, operation of a laboratory-scale torrefaction test reactor is studied under various conditions for biomass types with diverse characteristics (pine shavings, hay, and rice husks), and its performance is quantified (product yield, energy yield, energy densification ratio, chemical composition, and the nature of in-situ volatile oxidation) under different operating conditions.

3.2 Experimental Set-Up and Design

The test reactor described in this Section is able to control two independent variables: solid-phase residence time, and the reactor temperature.

3.2.1 Control of Solid Residence Time

Figure 26:
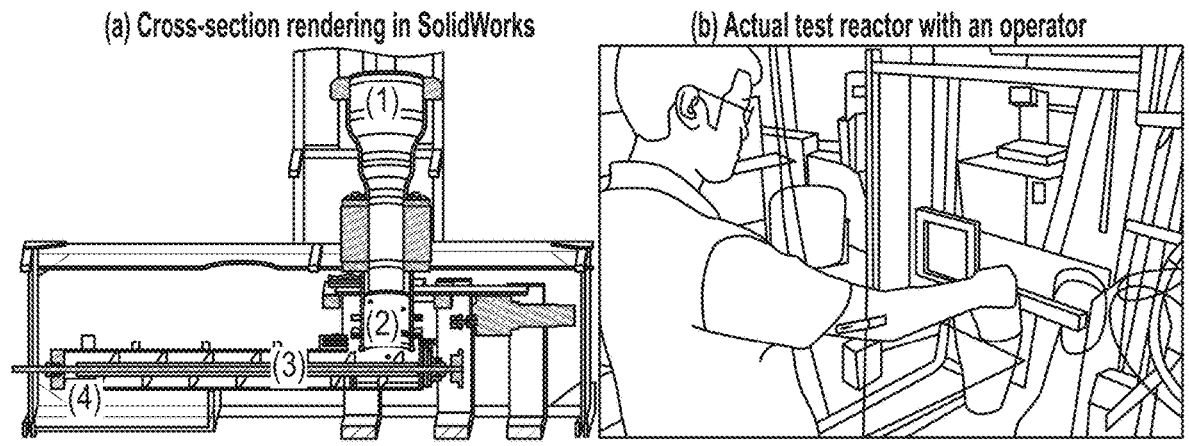
FIG. 26 shows a schematic depiction of a system configured for biomass decomposition and an operator operating a system configured for biomass decomposition, according to some embodiments.

A lab-scale, continuous-flow biomass torrefaction reactor design for a feedstock capacity of about 1 kg/h and a cross-sectional diameter of 4 inches, as described previously in Section 2.5, was implemented and tested in this Section. This test reactor utilizes a fixed-bed reactor concept (labeled in FIG. 26A; FIG. 26B shows an operator operating the test reactor), with a screw auger at the bottom to continuously remove torrefied biomass. The screw auger was sized to be 2 feet in length, which allows sufficient time for the heated, torrefied biomass to cool off before it exits from the reactor outlet. The screw auger is connected to a motor drive with an adjustable turning rate. The speed at which the screw auger turns, and therefore, the solid-phase residence time inside the reactor for the torrefaction reaction, can be controlled.

In order to calculate the solid residence time, the density $\rho_{BM}$ and input mass flow rate $\dot{m}_{BM}$ of biomass were measured for each type of biomass and auger turning speed. Then given the radius $R_r$ and height $H_r$ of the fixed-bed reactor, the effective residence time $\tau_{res}$ of biomass is given by:

$$\tau_{res} = \frac{\rho_{BM} \pi R_r^2 H_r}{\dot{m}_{BM}}.$$

For the specific lab-scale reactor dimensions (diameter=4 inches, depth of torrefaction zone ~10 cm), in Table 3, ranges of possible input feeding rates for our lab-scale reactor given the normal ranges of torrefaction residence times are provided.

TABLE 3

Typical ranges of possible input feeding rates in the lab-scale reactor for different solid residence times. The possible ranges of feeding rates may depend on the type of biomass.

| Residence time | 5 min | 20 min | 40 min |
|---|---|---|---|
| Pine shavings/hay | 0.58 kg/h | 0.15 kg/h | 0.073 kg/h |
| Rice husk | 2.0 kg/h | 0.51 kg/h | 0.26 kg/h |

For the lab-scale reactor with a fixed torrefaction residence time, the biomass feeding rate is generally on the order of 0.1-2 kg/h. Torrefaction reactors capable of processing about 500 kg/h of biomass and/or that are scaled up from the lab-scale design by a factor of 250-5,000 are also contemplated.

3.2.2 Control of Torrefaction Severity

Figure 27:
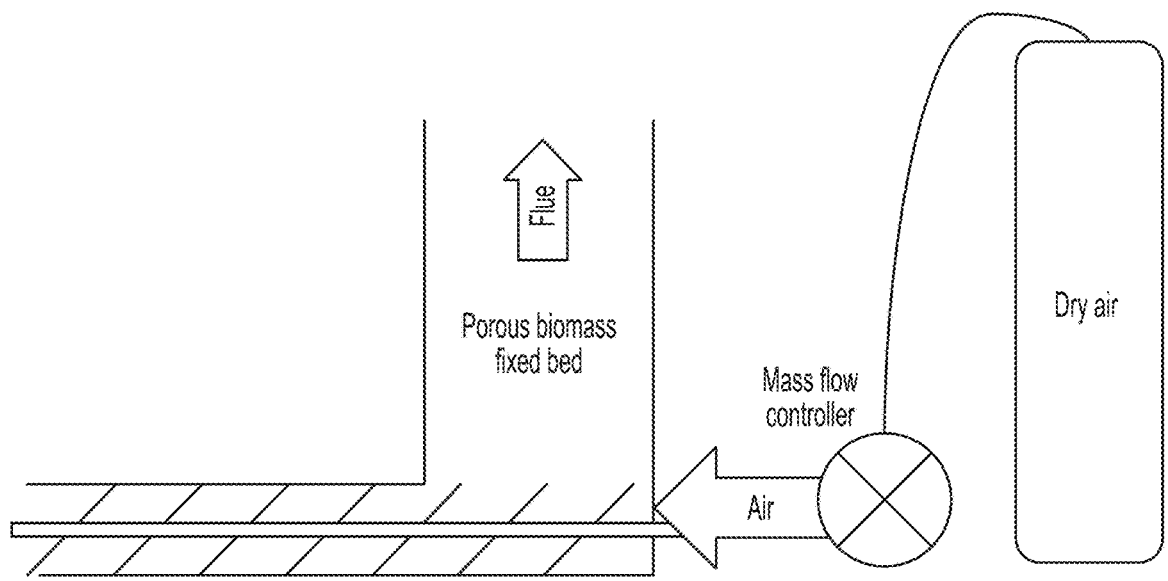
FIG. 27 is a schematic depiction of a system configured for biomass decomposition, according to some embodiments.

At a given solid residence time (i.e., feeding rate), the torrefaction severity may be controlled by introducing air in different proportions to the solid feeding rate. As shown in FIG. 27, two air flow inlets may be present near the base of the fixed bed reactor. These inlets are connected to a compressed air cylinder (Airgas AI D300). A mass flow controller (Omega Engineering FMA-5528A) was used to adjust the input air flow rate, with an adjustable flow rate range between 0.1 to 50.0 standard L/min.

Because different types of biomass under different reaction conditions may have different bulk densities and/or different volumetric flow rates, a dimensionless quantity called the normalized air/fuel ratio, or a is employed to understand the experimental results presented herein. This quantity represents the proportion of air mass flow rate to biomass mass flow rate, and is defined via the following steps:

(1) For a specific type of biomass, determine its elemental analysis of the form $CH_xO_y$ as well as moisture mass fraction $Y_M$ and ash content $Y_{ash}$.

(2) Assuming stoichiometric oxidation of this type of biomass, then the fully balanced chemical equation will be:

$$CH_xO_y + (1 + 0.25x - 0.5y)(O_2 + 3.76N_2) \rightarrow CO_2 + 0.5y\, H_2O + 3.76 \times (1 + 0.25y - 0.5z)N_2.$$

(3) Therefore, based on the chemical equation above, at stoichiometry, and with the molecular weights of carbon, hydrogen, and oxygen atoms are given by $MW_C$, $MW_H$, and $MW_O$, respectively, then the mass flow rate $\dot{m}_{ox,stoic}$ [kg/s] of air that is required to fully oxidize $\dot{m}_{BM}$ [kg/s] of biomass (as received, on a wet basis) is given by:

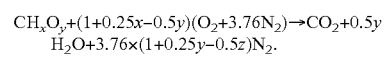

$$(AF)_{stoic} \equiv \frac{\dot{m}_{ox,stoic}}{\dot{m}_{BM}} = \frac{(2 + x/2 - y)(MW_O + 3.76 MW_N)}{(1 + Y_M + Y_{ash})(MW_C + MW_H x + MW_O y)},$$

where $(AF)_{stoic}$ is the stoichiometric ratio (mass) of air to biomass to enable complete oxidation.

(4) The normalized air/fuel ratio σ is defined as the actual mass flow rate of air $\dot{m}_{ac}$ output from the air inlets to the stoichiometric mass flow rate of air, $\dot{m}_{ox}$, as determined previously, to enable complete biomass combustion:

$$\sigma = \dot{m}_{ac}/\dot{m}_{ox}.$$

Therefore, if there is stoichiometric oxidation of biomass, it is expected that σ=1 in certain cases. In the regime of low-oxygen biomass torrefaction, it is expected that σ<1 in certain cases. For the different types of biomass, general values of a range between 0.2 to 0.5. Higher values may correspond to increasing torrefaction severity.

The elemental compositions of certain types of raw biomass (pine shavings, hay, and rice husks) were obtained experimentally by using a CHON analyzer available at Professor Sanjay Mahajani's group at Indian Institute of Technology-Bombay. The moisture and ash contents for the raw biomass were obtained experimentally using a thermogravimetric analyzer (TA Instruments Q50). These values are listed in Table 4. Based on the elemental analysis data in Table 4, mass ratios of air to biomass for stoichiometric combustion were derived, which are listed in Table 5.

TABLE 4

Elemental compositions of three types of raw biomass by mass fraction, as determined experimentally.

| Biomass type | Carbon | Hydrogen | Oxygen |
| --- | --- | --- | --- |
| Pine shavings | 49.6% | 5.7% | 44.8% |
| Hay | 43.7% | 4.4% | 51.3% |
| Rice husks | 37.6% | 3.9% | 58.3% |

TABLE 5

The approximated chemical formula, moisture content, ash content, and stoichiometric air/ratio of different types of biomass.

| Biomass type | Formula | Moisture content | Ash content | Stoichiometric air/fuel ratio |
| --- | --- | --- | --- | --- |
| Pine shavings | $C_{4.13}H_{5.61}O_{2.80}$ | 6.3% | 1.6% | 5.26 |
| Hay | $C_{3.65}H_{4.32}O_{3.21}$ | 4.4% | 5.1% | 3.94 |
| Rice husks | $C_{3.14}H_{3.86}O_{3.64}$ | 7.2% | 17.0% | 2.53 |

3.3 Readout Protocols

In order to measure the performance of the reactor unit, several quantities were monitored during reactor operation: solid mass flow, solid proximate analysis, and solid ultimate (elemental) analysis.

3.3.1 Solid Mass Flow

The input solid mass flow rate [kg s$^{-1}$] is measured by weighing a bucket of the raw biomass every 5-10 minutes as an operator manually feeds a certain amount of biomass into the reactor manually. The output solid mass flow rate is measured by weighing a bucket placed at the reactor outlet to continuously collect the torrefied biomass that falls out, again once every 5-10 minutes or so. Dividing the mass change by the time elapsed gives an estimated solid mass flow.

3.3.2 Proximate Analysis

Proximate analysis, as described in ASTM D-3175, measures the mass fractions of moisture, fixed carbon, volatile matter, and ash components in a given biomass sample. In particular, the volatile matter component is the portion of combustible biomass that departs the solid fraction under non-oxidative thermochemical conditions (defined by ASTM as heating the biomass sample to 950° C. within 30 minutes and maintaining the sample at that temperature for 7 minutes under inert conditions such as nitrogen). The remaining part of the solid may include fixed carbon and/or ash. In order to distinguish the two, the residues are subject to an oxidative environment (air) at an elevated temperature of 600-750° C. During this process, the fixed carbon may become oxidized into gaseous carbon dioxide and/or steam. The solids remaining may include ash.

A thermogravimetry analyzer (TA Instruments Q50) including an EGA furnace and a mass balance were employed to keep track of the mass loss in the torrefied sample when the sample was heated to different temperatures. The thermogravimetry analyzer can be used to understand the fixed carbon, volatile matter, and ash components of the system. This procedure, known as proximate analysis, was performed as per ASTM-D3175 standards.

3.3.3 Ultimate Analysis

Elemental analysis—also known as ultimate analysis—breaks down the biomass or torrefied biomass sample into the mass fractions of its elemental components: mostly carbon, hydrogen, oxygen, and nitrogen (CHON), as per ASTM-D5373-16 protocol. By keeping track of the number of different atoms coming in and going out of the reactor, the reaction chemistry and the chemical composition of the outgoing volatile gases can be inferred. The elemental analysis was carried out using a CHON analyzer (Thermo Finnigan Flash EA 1112) at Professor Sanjay Mahajani's group in Indian Institute of Technology-Bombay.

3.3.4 Higher Heating Value

The higher heating value (HHV) [J kg$^{-1}$] of a fuel sample is defined as the energy that can be harvested if a certain amount of the fuel sample is combusted and then the post-combustion flue gas is cooled down to the standard condition (including the latent heat of condensation of water vapor and other vapors). In order to measure the higher heating values of the raw biomass and torrefied biomass samples, the prospective samples were ground to small particles of sizes inferior to 0.5 mm. Then, these particles were compressed into pellets using a manual ¼"-diameter-by-1" pelleting press (Parr Instrument 2810 series) and analyzed using a calorimeter (Parr Instrument Model 6200 isoperibol).

3.4 Validation of Stable Operating Conditions

Figure 28:
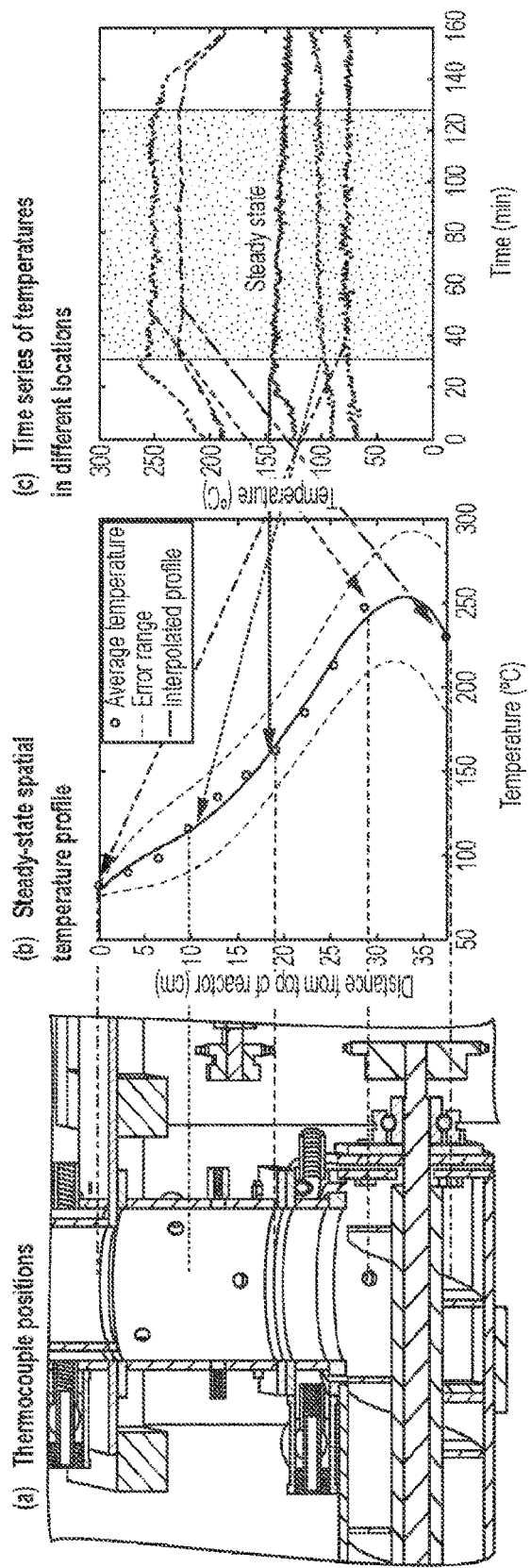
FIG. 28 shows a schematic depiction of a system configured for biomass decomposition and two charts showing the temperature at various locations in the system, according to some embodiments.

In order to monitor the reactor operation, 10 thermocouple points were inserted, in approximately 1 inch spacing, axially throughout the length of the reactor (FIG. 28A). As a sample proof of steady-state operation, air was flowed into the reactor at the normalized air/fuel ratio of σ=0.18, and the screw auger turning rate was adjusted such as the solid residence time $\tau_{res}$=11 min. Then some initial pine shavings were ignited at the bottom of the reactor, and fed pine shavings were continuously fed into the reactor such that the level of pine shavings at the top was maintained. After some initial start-up period, where the entire reactor assembly and the fixed bed were heated up, a steady-state condition was reached at each axial location (FIG. 28C), and it was demonstrated that the steady-state condition could be sustained for at least 100 minutes before turning the reactor off by quenching the torrefaction reaction with inert nitrogen in place of air. The mean steady-state temperature readouts at different axial locations were compiled into an axial temperature profile of the reactor (FIG. 28B).

The fixed bed temperature increases axially towards the bottom of the reactor, and reaches a maximum near the middle of the screw auger area, where the air inlets are also located. This temperature profile further suggests that the biomass fixed bed in this specific design can be broken down into the following zones:

(1) Drying zone: For the first 5 cm from the top of the reactor, the temperature of the fixed bed is less than 100° C., and drying occurs.

(2) Heating zone: From about 5 cm to 25 cm from the top of the reactor, the temperature of the fixed bed is between 100-200° C. At this point, the input biomass is practically dry, but no torrefaction reaction has taken place yet.

(3) Torrefaction zone: In the bottommost 15 cm of the reactor, the temperature of the fixed bed stays above 200° C. but below 300° C., temperatures at which torrefaction occurs under a low-oxygen environment.

This zonal separation of drying and torrefaction is consistent with the temperature profile predicted earlier by the coarse-grained analysis in Section 2.4.4. This separation may be advantageous, as it may automatically separate the combustible volatile gases from the non-combustible steam. Separation of the combustible volatile gases from the non-combustible stream may promote higher combustion efficiency and/or flammability.

Figure 29:
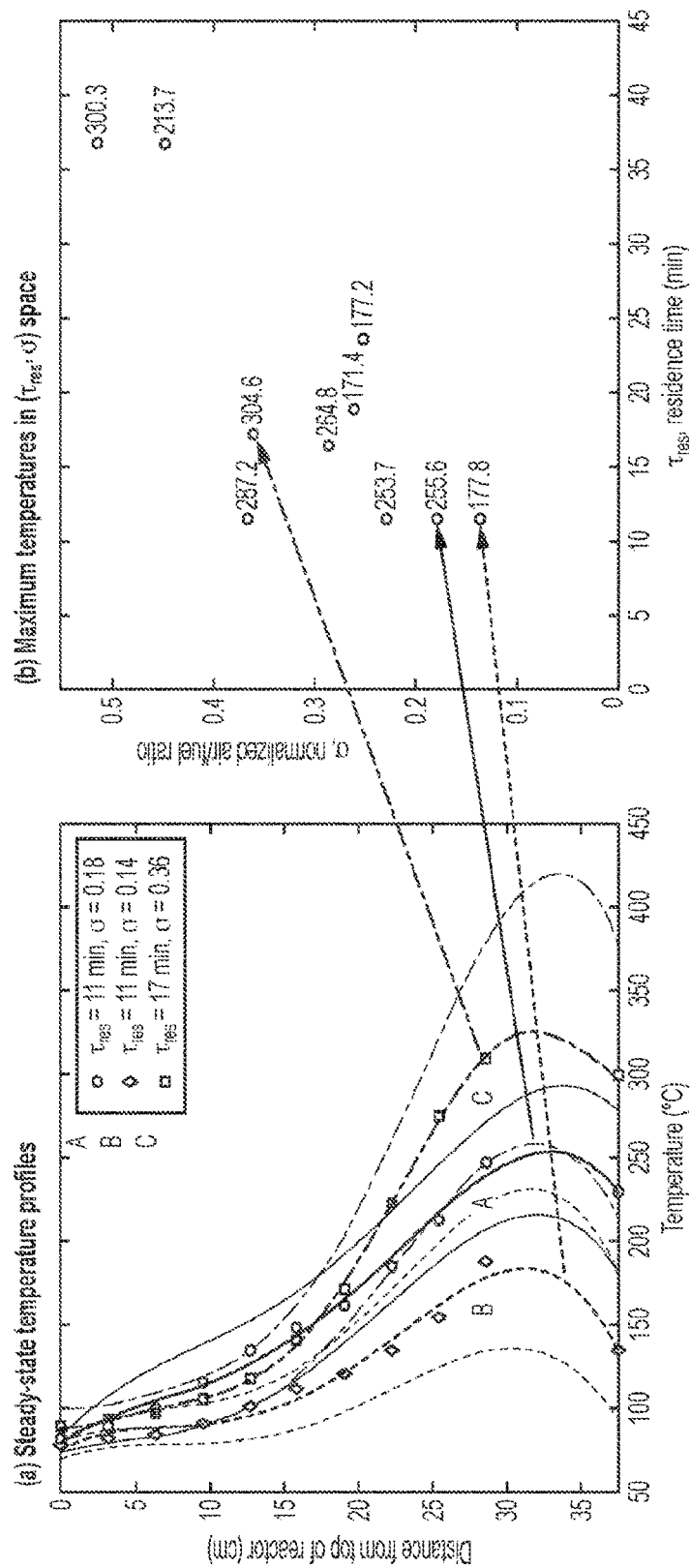
FIG. 29 shows two charts showing the temperature at various locations in the system, according to some embodiments.

The reactor was operated under two additional conditions ($\tau_{res}$=11 min, $\sigma$=0.18), and ($\tau_{res}$=17 min, $\sigma$=0.36). FIG. 29A shows that of these conditions has resulted in stable steady-state temperature profiles. As the torrefaction severity is increased by introducing more air, a higher maximum temperature may be achieved.

The data shown in FIG. 29B is replotted in FIG. 30A. Each colored point in the plot represents a real experimental point, while the color gradient from 180° C. to 300° C. represents a linear interpolation of the maximum steady-state reactor temperatures under other possible ($\tau_{res}$, $\sigma$) combinations based on the real experiments. FIGS. 30B and 30C show similar plots for hay and rice husk, respectively.

Different types of biomass may have different regimes of operation. Rice husks, for example, may have high density of the biomass. For rice husks, for each given value of normalized air/fuel ratio σ and for each given residence time, torrefaction may occur at relatively high volumetric flows of air. In some such cases, the maximum safe air flow rate for indoor experimentation may be reached at relatively low values of a. This may explain why the polygon delineating rice husks in FIG. 30C is compressed in the vertical direction, and/or why the range of a tested is from 0.3 to 0.4. Hay may be difficult to light and to sustain a reaction for; it may flame out unpredictably. Possibly for these reasons, sustained reactions were achieved at comparatively higher air flows at about σ=0.5-0.8.

Figure 30:
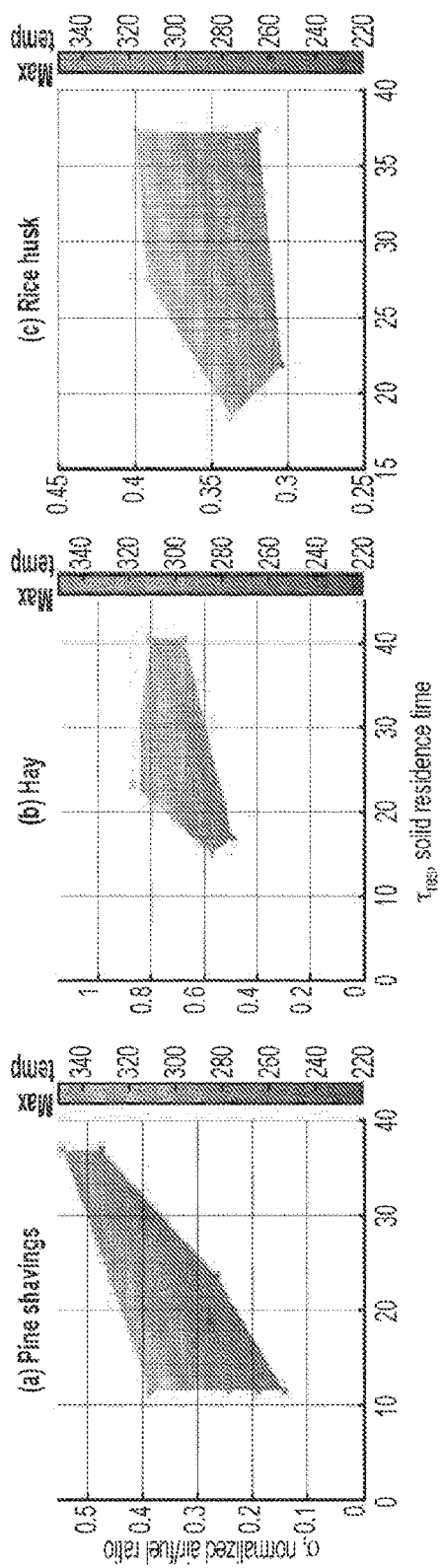
FIG. 30 shows maximum temperature as a function of solid residence time and normalized air to fuel ratio for certain types of biomass, according to some embodiments.

In FIG. 30, the interpolated temperatures are bounded in polygons. The left and right edges in this Figure are limited by the maximum and minimum possible solid feeding rates for the lab-scale screw auger set-up. The upper edge of the polygons in this Figure were limited by the amount of suction that the indoor exhaust hood can provide: a higher a beyond the polygon typically generates too much exhaust to be safely removed from the indoor laboratory. Finally, the bottom edge may be limited by the autothermal boundary: experiments at a lower a values were sometimes unable to stably sustain a torrefaction reaction. Some of these reactions resulted in reactor flame-out after initial ignition, without ever reaching a non-room-temperature steady-state temperature profile. As the operating conditions approach this autothermal boundary, the torrefaction reactor in this Section becomes less stable.

Near the autothermal boundary, the reactor described in this Section tends to "flame out" frequently. It may need an external spike to return to the steady-state condition. As the autothermal boundary is approached, the variation in the temperature profile (denoted by the error bar) also increases, which may suggest a less stable reactor prone to flaming out.

3.5 Reactor Performance Analysis 3.5.1 Energy Densification

Torrefying biomass may increase its energy density. Torrefied biomass may have a higher HHV value than raw (untorrefied) biomass.

Figure 31:
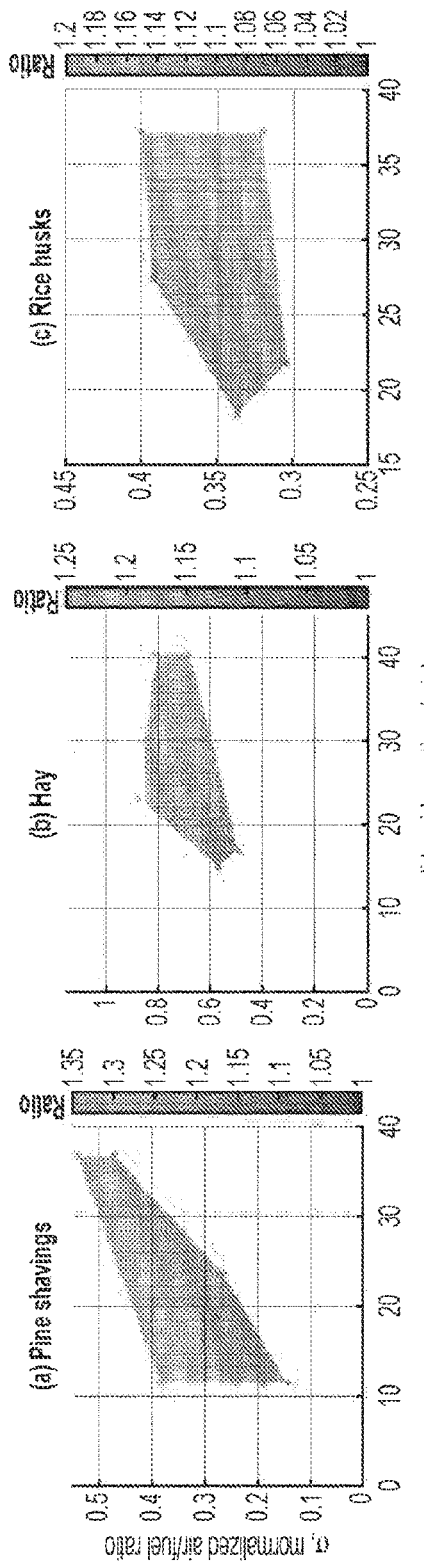
FIG. 31 shows the energy densification ratio as a function of solid residence time and normalized air to fuel ratio for certain types of biomass, according to some embodiments.

FIG. 31 illustrates the energy densification ratio—defined as the ratio of higher-heating value (HHV) of torrefied biomass to the HHV of raw biomass (dry basis)—for a wider range of reactor operating conditions for all three types of biomass, plotted in the $\tau_{res}$–$\sigma$ phase space. The index of torrefaction increases with increasing solid residence time and/or increasing normalized air/fuel ratio (corresponding to more severe torrefaction conditions). This energy densification ratio is equivalent to a parameter called the index of torrefaction, discussed later in this Example.

3.5.2 Solid Mass Yield

Figure 32:
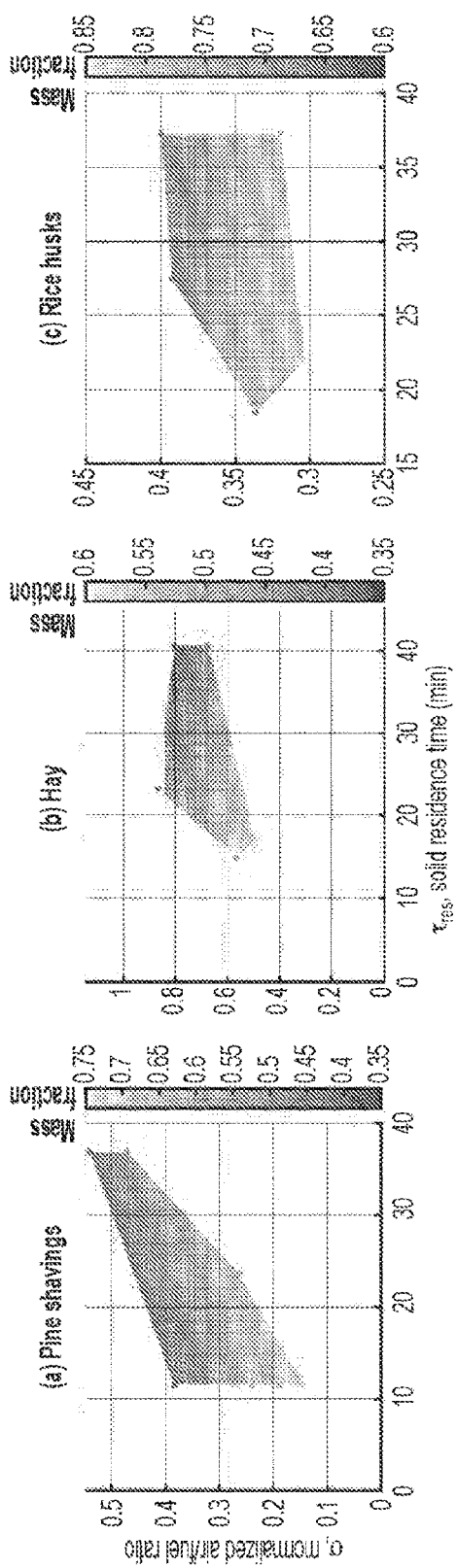
FIG. 32 shows the solid mass yield as a function of solid residence time and normalized air to fuel ratio for certain types of biomass, according to some embodiments.

FIG. 32 illustrates the solid mass yield (the ratio of the mass flow rate of torrefied output to the mass flow rate of the input biomass feedstock) interpolated for different operating conditions for the three types of biomass utilized in this study. In general, the solid mass yield decreases with increasing torrefaction severity, from about 75% near the autothermal boundary to less than 25% under very severe torrefaction conditions. It is believed that a larger part of the original biomass is converted into volatile gases at a higher torrefaction temperature (possibly due to faster solid devolatilization kinetics).

There may be a trade-off between the index of torrefaction and the solid product mass yield as the torrefaction severity and/or solid residence time are increased: while a higher index of torrefaction signals that the original biomass has become much more energy dense (per mass unit of output), it also signals enhanced loss of product mass.

3.5.3 Solid Energy Yield

The solid energy yield is defined as the fraction of the energy contained in the original raw biomass that is still retained in the solid phase after the torrefaction treatment. Solid product energy yield can be calculated as the product between the solid product mass yield and the index of torrefaction:

Solid product energy yield=Solid product mass yield×Index of torrefaction.

Figure 33:
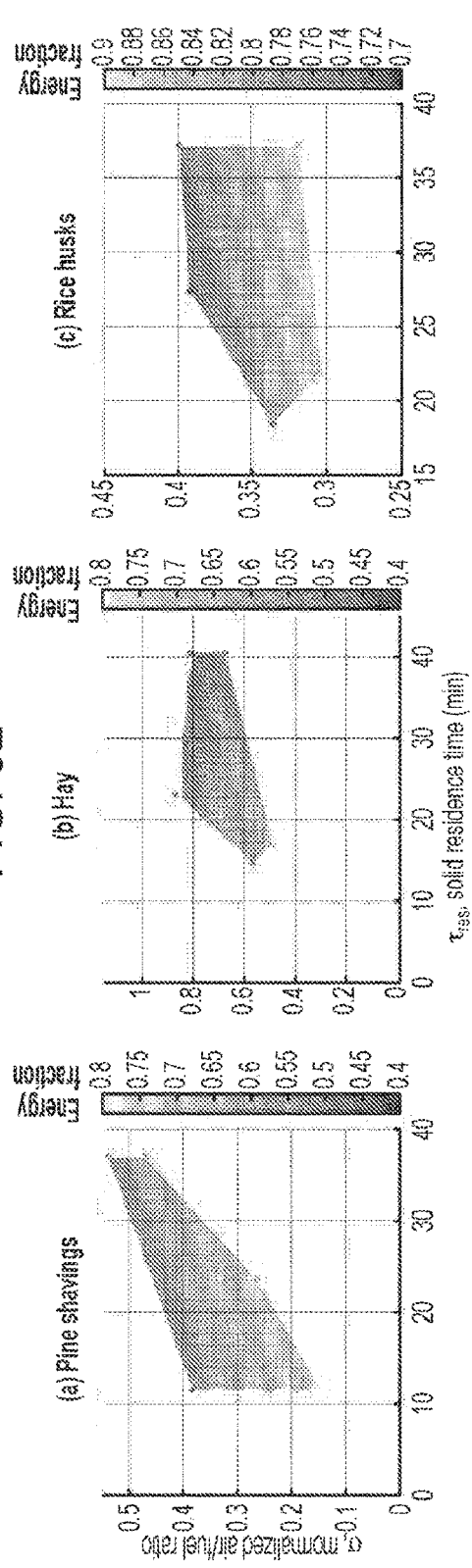
FIG. 33 shows the solid energy yield as a function of solid residence time and normalized air to fuel ratio for certain types of biomass, according to some embodiments.

FIG. 33 shows the result of this calculation for different reactor operating conditions for the three different types of biomass. As torrefaction severity increases, the reduction in the solid product mass yield outweighs any increase in the energy densification (index of torrefaction), such that there is a net reduction in the solid product energy yield. For pine shavings and hay, this energy yield ranges from about 80% near the autothermal boundary to less than 50% under severe torrefaction conditions. In the case of rice husk, over a much narrower range of normalized air/fuel ratio, the overall solid product energy yield decreases from about 80% to 70%.

3.5.4 Solid Proximate Analysis

Figure 34:
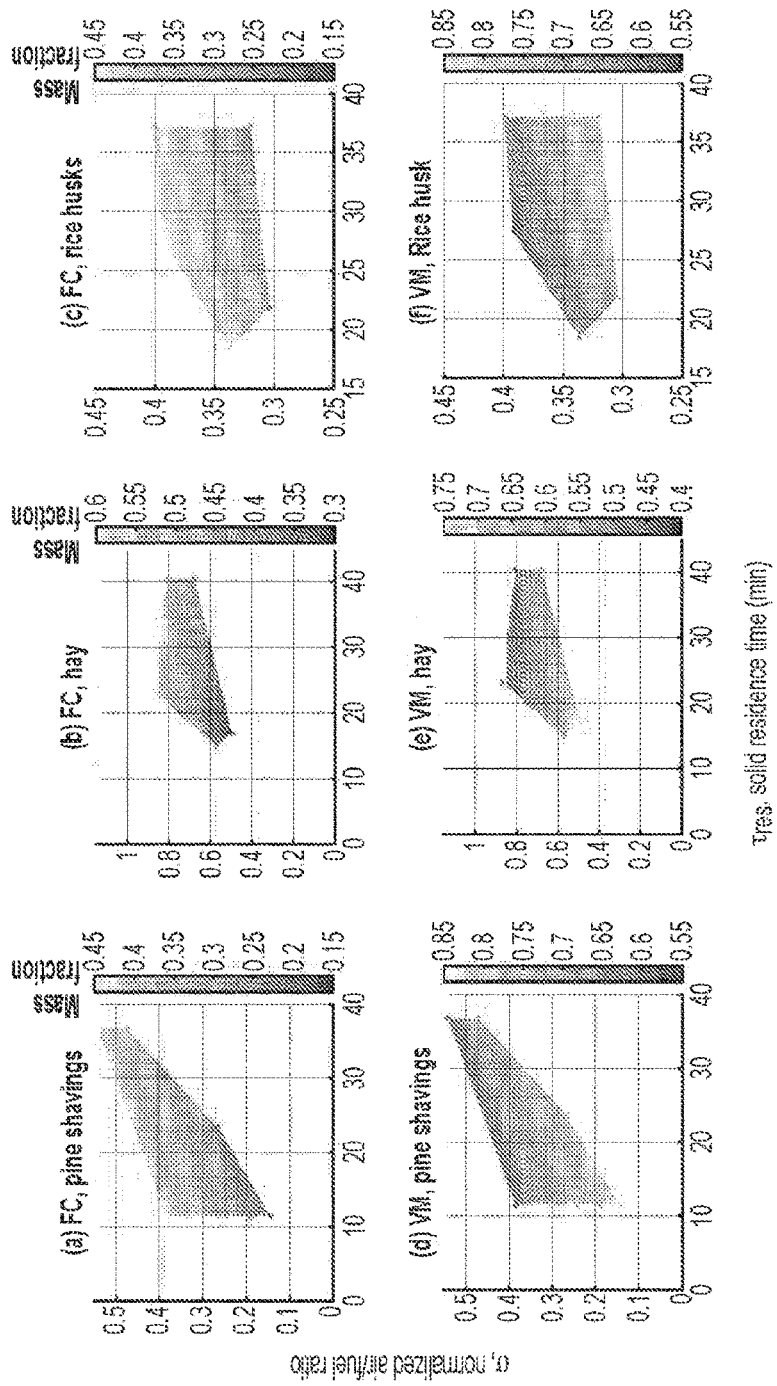
FIG. 34 shows the results of proximate analysis performed on certain types of biomass as a function of solid residence time and normalized air to fuel ratio, according to some embodiments.

FIG. 34, which shows the results from the proximate analysis on the different torrefied outputs, indicates that as the torrefaction severity increases (increasing normalized air/fuel ratio), the mass fraction of fixed carbon in the remaining torrefied biomass increases, while that of volatile matter decreases. It is believed that torrefaction drives out the volatile matter from the raw biomass, causing the formation of a product that contains less volatiles and more fixed carbon.

3.5.5 Solid Elemental Analysis

Figure 35:
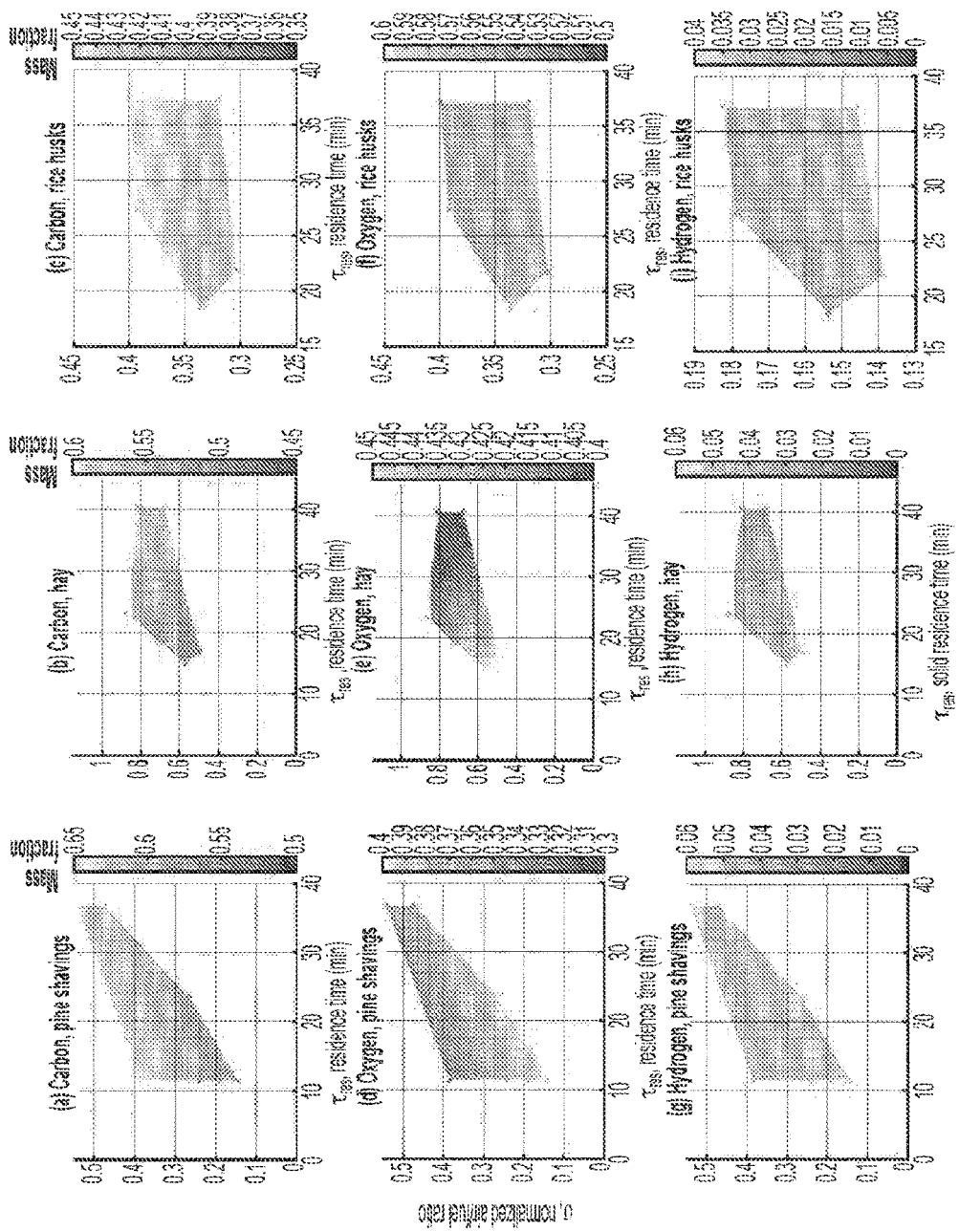
FIG. 35 shows the results of solid element analysis performed on certain types of biomass as a function of solid residence time and normalized air to fuel ratio, according to some embodiments.

As can be seen in FIG. 35, for the torrefied output from all types of biomass, the elemental carbon mass fraction increases with increasing torrefaction severity. On the other hand, both elemental oxygen and hydrogen decrease as torrefaction becomes more severe. Torrefaction may drive out the low-energy molecules (rich in hydrogen and oxygen) and/or preserve the carbon in the torrefied biomass.

3.5.6 Volatile Elemental Analysis

For a given torrefaction experiment, consider the initial input biomass with mass flow rate of $\dot{m}_{BM}$, a moisture content of $Y_M$, and ash content of $Y_{ash}$, with ash and moisture contents determined using the method of proximate analysis as described in Section 3.3.2, and with both of whose values are reported on a dry, ash-free basis. Then the flow rate of incoming biomass on a dry, ash-free (DAF) basis is given by $\dot{m}_{BM}/(1+Y_M+Y_{ash})$. It is assumed that while the moisture component in the input biomass can devolatilize, the ash component is always inert and will stay within the solid torrefied output. The elemental composition (also on a dry, ash-free basis) of the raw input biomass ($Y_C$, $Y_H$, and $Y_O$) may be considered in terms of carbon, hydrogen, and oxygen atoms respectively. Under these assumptions, that the total mass flow rate of carbon atoms $\dot{m}_{C,BM}$ going into the reactor is given by $$\dot{m}_{C,BM} = \frac{\dot{m}_{BM} Y_C}{1 + Y_M + Y_{ash}}.$$

The total mass flow rate of hydrogen atoms $\dot{m}_{H,BM}$ going into the reactor (does not include the hydrogen in the biomass moisture) is given by $$\dot{m}_{H,BM} = \frac{\dot{m}_{BM} Y_H}{1 + Y_M + Y_{ash}}.$$

Finally, the total mass flow rate of oxygen atoms $\dot{m}_{O,BM}$ going into the reactor is given by $$\dot{m}_{O,BM} = \frac{\dot{m}_{BM} Y_O}{1 + Y_M + Y_{ash}},$$

once again not accounting for the oxygen contained in the biomass moisture.

With the mass flow rate of the output torrefied biomass measured as $\dot{m}_{char}$, the outgoing flow rate $\dot{m}_{i,char}$ of the ith element of carbon, hydrogen, and oxygen atoms in the torrefied output product is:

$$\dot{m}_{i,char} = \frac{Y_i}{1 + Y^*_{ash}} \dot{m}_{char},$$

where $Y_i$ is the ith component (carbon, hydrogen, oxygen) in the ultimate (elemental) analysis of the torrefied output, and $Y^*_{ash}$ is the newly measured ash content in the torrefied output.

The torrefied biomass may include a volatile component, in this model equivalent to the total volatile mixture (excluding moisture from the biomass drying process) that is emitted from the biomass as it travels through the reactor due to torrefaction. It is believed that this volatile mixture is instantaneously mixed with incoming air and oxidized, and so would be extremely difficult to measure. Based on the mass closure on the individual elements (carbon, hydrogen, oxygen, and nitrogen) from prior results from the solid-phase ultimate (elemental) analysis, the lump-sum mass flow rates of the carbon, hydrogen, and oxygen atoms in the volatile species ($\dot{m}_{C,vol}$, $\dot{m}_{H,vol}$, and $\dot{m}_{O,vol}$) may be written as:

$$\dot{m}_{C,vol} = \dot{m}_{C,BM} - \dot{m}_{C,char},$$

$$\dot{m}_{H,vol} = \dot{m}_{H,BM} - \dot{m}_{H,char},$$

$$\dot{m}_{O,vol} = \dot{m}_{O,BM} - \dot{m}_{O,char}.$$

This implies that the elemental composition of the volatile species, in the lump-sum molar form $CH_xO_y$, can be computed as follows:

$$x = \frac{\dot{m}_{H,vol}}{\dot{m}_{C,vol}} \frac{MW_C}{MW_H},$$

$$y = \frac{\dot{m}_{O,vol}}{\dot{m}_{C,vol}} \frac{MW_C}{MW_O}.$$

Figure 36:
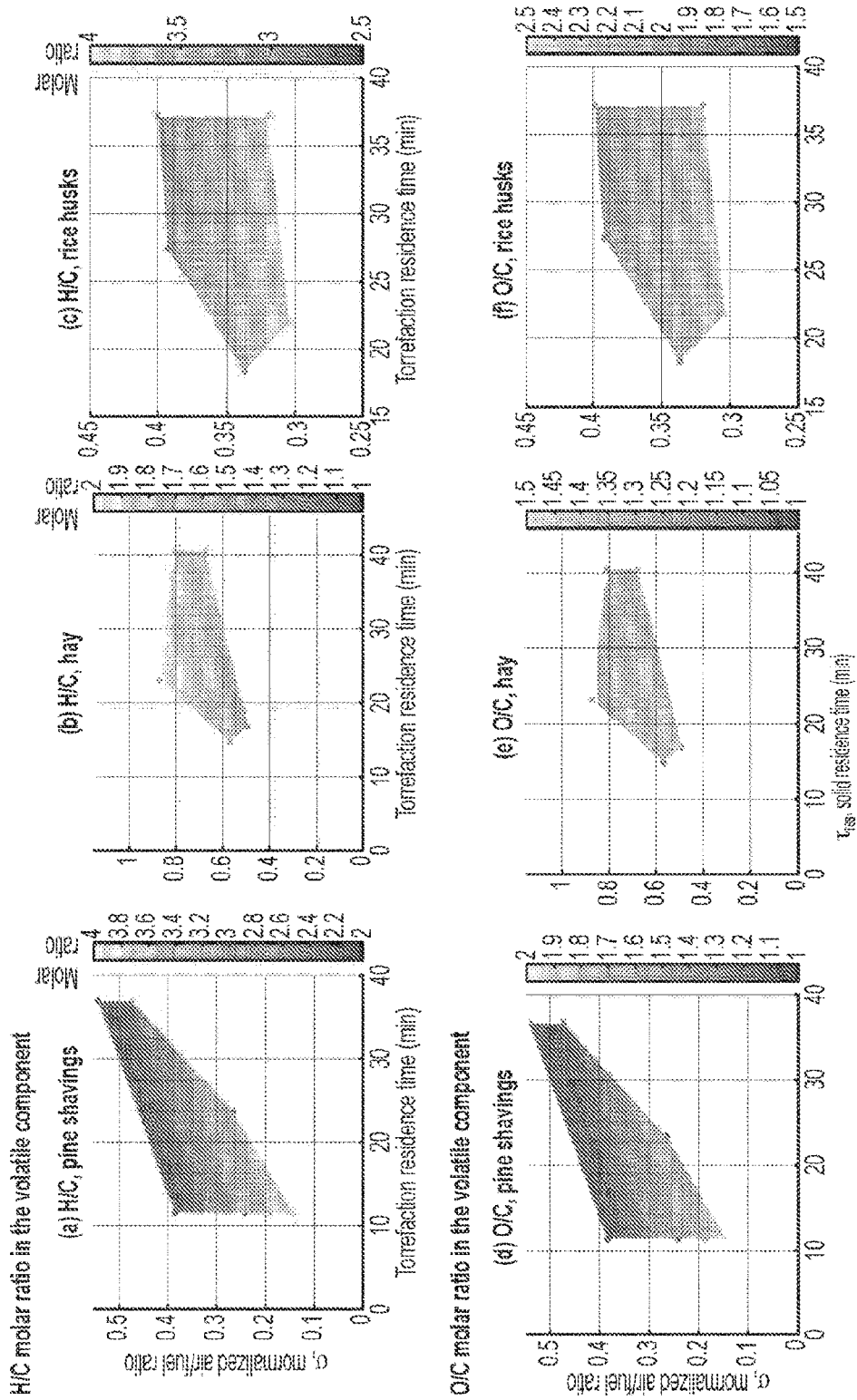
FIG. 36 shows ratios of various elements in exhaust produced during biomass decomposition as a function of solid residence time and normalized air to fuel ratio for certain types of biomass, according to some embodiments.

In other words, x denotes the molar ratio of hydrogen atoms to carbon atoms in the unknown component of the reactor exhaust, and y denotes the molar ratio of oxygen atoms to carbon atoms. Judging from FIG. 36, it can be seen that different types of biomass exhibit different chemistries. While for pine shavings and rice husks, increasing torrefaction severity leads to an increased H/C molar ratio, the opposite appears to be true for hay. On the other hand, all three types of biomass uniformly exhibit increasing molar O/C ratio with decreasing torrefaction severity, suggesting that under mild torrefaction, the volatile mixture is likely more "oxidized" and, therefore, lower in calorific value. Furthermore, there is a large range of H/C and O/C ratios for the different types of biomass. For example, while for pine shavings, the O/C molar ratio is in the range of 1-2, in the case of rice husks, this range is between 1 and 1.5, suggesting that for pine shavings, the volatile component comes more "oxidized", and therefore potentially, has lower calorific value when further oxidized.

With the exception of hay, the H/C and O/C ratios exhibit the same trend (decreasing value) as a function of increasing torrefaction severity, signifying volatile molecules at an increasingly higher energy state.

3.5.7 Nature of Primary Oxidation

By considering the volatile species of the general form $CH_xO_y$ as determined in the previous Section, the chemical equation for idealized complete oxidation can be balanced as:

$$CH_xO_y + (1 + 0.25x - 0.5y)O_2 \rightarrow CO_2 + 0.5x\ H_2O.$$

This means for each kilogram of volatile of the form $CH_xO_y$, the mass [kg] of oxygen needed to fully oxidize the volatile $\dot{m}_{O,stoic}$ is given by:

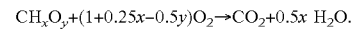

$$\dot{m}_{O,stoic} \equiv \frac{MW_O}{MW_{CH_xO_y}} \left( \frac{\dot{m}_{BM}}{1 + Y_M} - \dot{m}_{char} \right)(2 + 0.5x - y).$$

At the same time, in reality, there may be a constant supply of primary air coming into the reactor, which contributes to a mass flow rate of oxygen atoms $\dot{m}_{O,air}$ as follows:

$$\dot{m}_{O,air} = \frac{MW_{O_2}}{4.76 MW_{air}}(AF)_{stoic}\sigma \dot{m}_{BM},$$

where $(AF)_{stoic}$ is defined as the mass ratio of the amount of air to the amount of biomass (as received) to enable stoichiometric oxidation, as discussed previously in Section 3.2.2. Putting this together, an ersatz air-to-volatile equivalence ratio $\sigma_{AV}$ can be defined as $$\sigma_{AV} = \dot{m}_{O,air}/\dot{m}_{O,stoic}.$$

Figure 37:
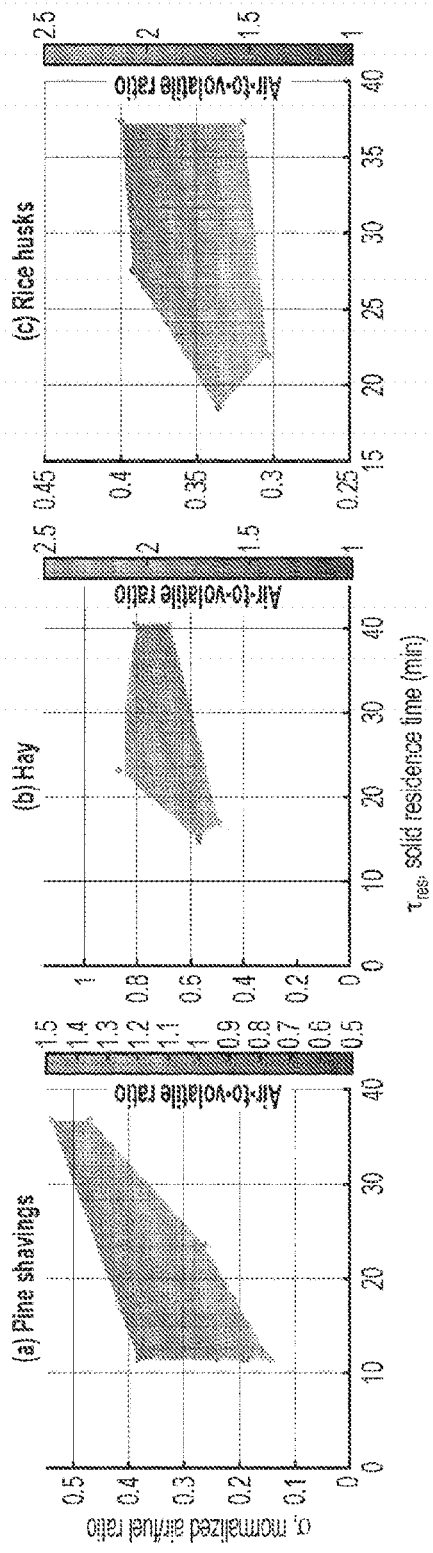
FIG. 37 shows ratios of air to exhaust produced during biomass decomposition as a function of solid residence time and normalized air to fuel ratio for certain types of biomass, according to some embodiments.

As shown in FIG. 37, the torrefaction reactor may operate in the air-rich side ($\sigma_{AV} > 1$) with respect to the oxidizable volatile mixture. It may not do so for very severe torrefaction, such as where the devolatilization process may be so vigorous that the volatile flow rate overwhelms the air supply, resulting in incomplete combustion. For many reaction conditions, there is an excess of air in the reactor exhaust as well.

3.5.8 Composition of Reactor Exhaust

By mass closure, the total mass flow rate of the exhaust gas from the reactor $\dot{m}_{exh}$ can be defined as $$\dot{m}_{exh} = (1 + (AF)_{stoic}\sigma)\dot{m}_{BM} - \dot{m}_{char}.$$

Figure 38:
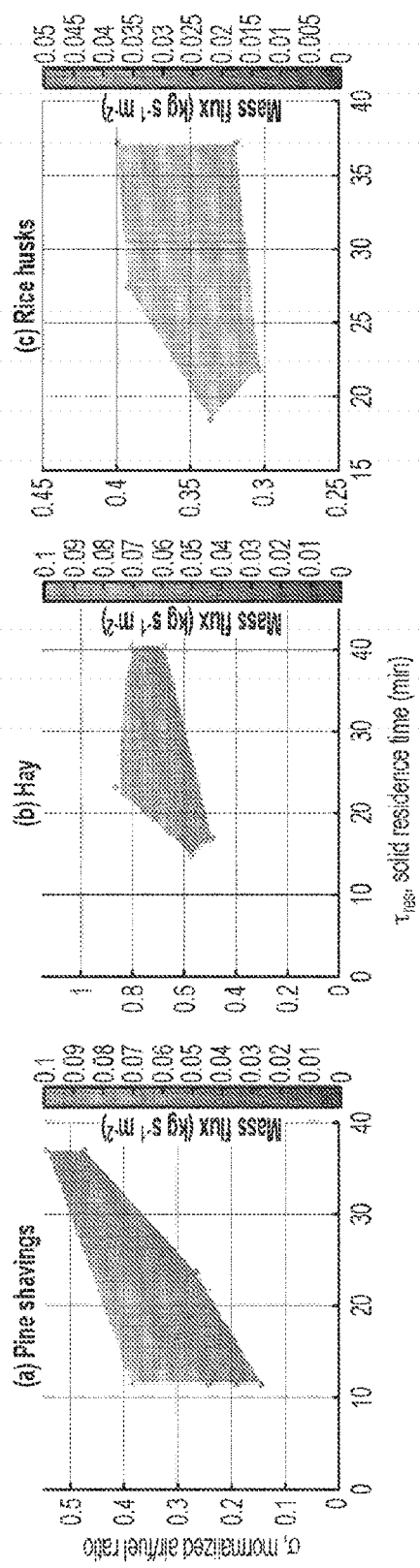
FIG. 38 shows mass flux as a function of solid residence time and normalized air to fuel ratio for certain types of biomass, according to some embodiments.

Dividing this quantity by the cross-sectional area of the reactor gives a scalable quantity that relates to the mass flux of the reactor exhaust. This quantity is plotted in FIG. 38, which shows that the reactor exhaust mass flux increases with increasing torrefaction severity (more outgassing as well as primary air influx) as well as a shorter residence time (higher solid flux through the reactor, and therefore a higher matching gas flux as well).

This exhaust may include known and/or unknown species. The known species, if present may include: (a) the nitrogen gas—assumed to be unreactive—that is introduced with primary air into the reactor and accompanies the reactor exhaust still as nitrogen gas, and/or (b) steam that is derived from drying of biomass (not associated with any additional steam contribution from the torrefaction reaction). The unknown species may include: (a) any unreacted or partially reacted torrefaction volatile gas mixture, (b) post-combustion products such as $CO_2$ and $H_2O$ in unknown proportion, and/or (c) any unreacted oxygen.

$$\dot{m}_{N,air} = \frac{3.76 MW_{N_2}}{4.76 MW_{air}}(AF)_{stoic}\sigma \dot{m}_{BM},$$

$$Y_{N_2} = \dot{m}_{N,air}/\dot{m}_{exh}.$$

$$Y_{moisture} = \frac{Y_M}{1 + Y_M + Y_{ash}}\frac{\dot{m}_{BM}}{\dot{m}_{exh}}.$$

3.6 General Approach for Rapid Reactor Validation and Scaling

The design and scaling methodology proposed in this Section is not limited only to biomass torrefaction in a fixed-bed design, but may have wider applicability to other reactor designs not explored in this Section. This approach may be applicable to other processes involving heterogeneous and complex processes or factors, such as biomass pyrolysis and gasification.

Section 4 A Design-Oriented Index of Torrefaction

Biomass torrefaction may transform input biomass feedstock through a thermochemical treatment into an improved fuel in terms of energy density, fixed carbon content, and/or grindability. Design conditions for torrefaction reactors may depend on the type of biomass feedstock. The index of torrefaction may have a monotonic relationship with the higher heating value of the direct output of torrefaction. However, once such output has been briquetted into solid fuel and tested for cooking purposes, the useful fuel energy density and power output may have a much more complex relationship with the index of torrefaction.

4.1 Definition of the Index of Torrefaction

The index of torrefaction $I_{torr}$ is defined herein as the ratio of the higher-heating value of the output torrefied fuel to the higher-heating value of raw biomass:

$$I_{torr} \equiv \frac{HHV_{torrefied}}{HHV_{raw}}.$$

From the formula above, it can be seen that any form of energy densification means that $I_{torr} > 1$.

It should be remarked that the different types of biomass, when subject to the same torrefaction condition, may exhibit different degrees of energy densification, and hence, different values of index of torrefaction. It should be further remarked that the index of torrefaction that we defined above is actually equivalent to the energy densification ratio.

4.2 A Motivating Design Case Study Using the Index of Torrefaction

The solid fuel energy content is often determined by the higher heating value (HHV) of the torrefied fuel. In this case, the HHV of the torrefied fuel is equivalent to the index of torrefaction multiplied by the HHV of the raw biomass.

Figure 39:
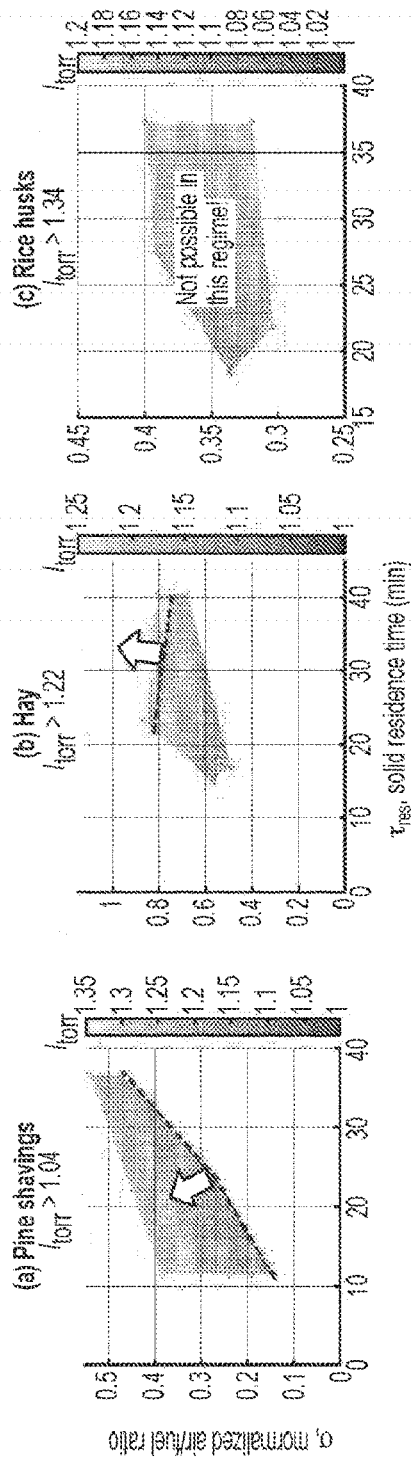
FIG. 39 shows the index of torrefaction as a function of solid residence time and normalized air to fuel ratio for certain types of biomass, according to some embodiments.

To achieve fuel with a higher heating value of at least 21.25 MJ/kg, pine shavings may be torrefied at $I_{torr} \geq 1.04$. As shown in FIG. 39A, which replicates the color heat map of the energy densification ratio determined above, all reactor operating conditions above the autothermal boundary can satisfy this HHV requirement. On the other hand, for hay, an output HHV of 21.25 MJ/kg may be achieved for $I_{torr} \geq 1.22$. According to FIG. 39B, this may involve running the torrefaction reactor under very severe torrefaction conditions (in the upper-right quadrant). Finally, for rice husk, the corresponding index of torrefaction is $I_{torr} \geq 1.34$. This means that within the mapped torrefaction regime of interest in FIG. 39C, it may not be possible to satisfy this requirement, as the maximum energy densification ratio (i.e., index of torrefaction) is around 1.15 only.

It is believed that rice husk, due to its high ash content, has a low HHV value (below 16 MJ/kg) in its raw form to start with. As it is torrefied, the relative ash mass fraction increases, which further dilutes the energy density of the usable fuel. With the amount of ash inherent in rice husk, it is just very difficult to torrefy it severely enough to achieve 21.25 MJ/kg in energy density.

4.3 Various Functional Mappings to the Index of Torrefaction 4.3.1 Proximate Analysis Conducting proximate analysis and measuring its readouts—namely fixed carbon, volatile matter, moisture, and ash—have been described previously in Section 3.3.2. For some industrial users of solid fuel—such as those in the pig iron industry—it may be beneficial to maintain a minimum fixed carbon content within the solid fuel, due to the high temperature requirements.

Figure 40:
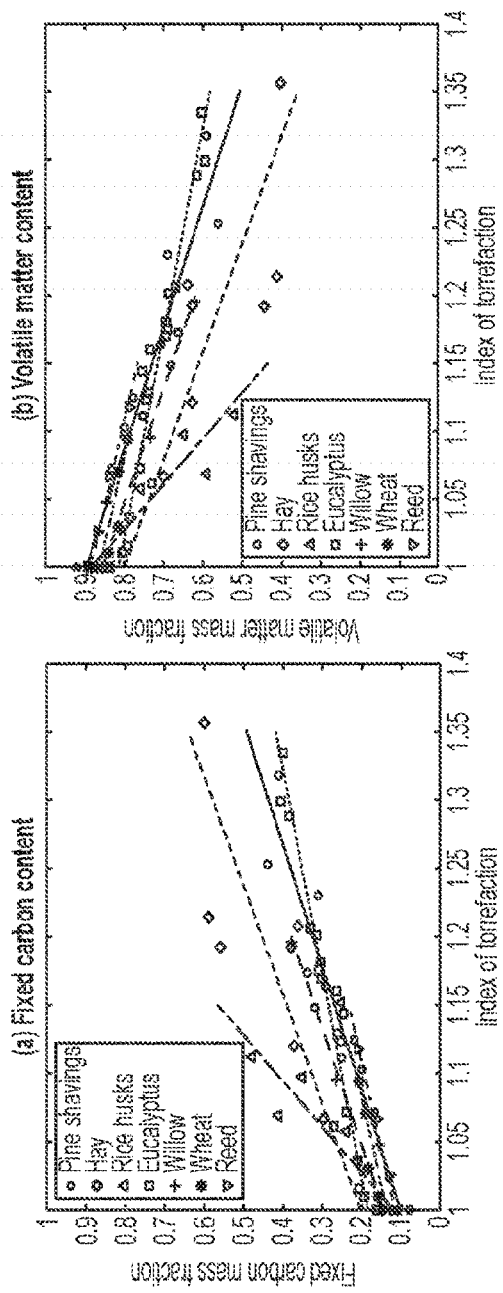
FIG. 40 shows charts showing fixed carbon mass fraction as a function of index of torrefaction and volatile mass fraction as a function of index of torrefaction for certain types of biomass, according to some embodiments.

FIG. 40 shows the experimentally determined correlations between the index of torrefaction and fixed carbon content (a) and volatile matter (b) for pine shavings (blue), hay (red), and rice husk (black), which were experimentally determined using the protocol described previously in Section 3.3.2. As can be observed, a one-to-one mapping generally exists. As shown in FIG. 40, for eucalyptus wood (cyan) and for willow (magenta), wheat (green), and canary grass (yellow), a similar monotonic relationship is observed. For a variety of different biomass types, it is possible to establish a functional mapping between the fixed carbon content and the index of torrefaction.

4.3.2 Elemental (Ultimate) Analysis

Elemental (ultimate) analysis, as defined previous in Section 3.3.3, may be useful in cases where the torrefied solid is being buried underground as inert biochar. The carbon elemental composition, for example, may give a quantitative estimate of the amount of $CO_2$ equivalent being sequestered by the biochar. If there is a carbon sequestration target, for example, a functional mapping of the carbon mass fraction to the index of torrefaction will directly inform the reactor operating conditions.

Figure 41:
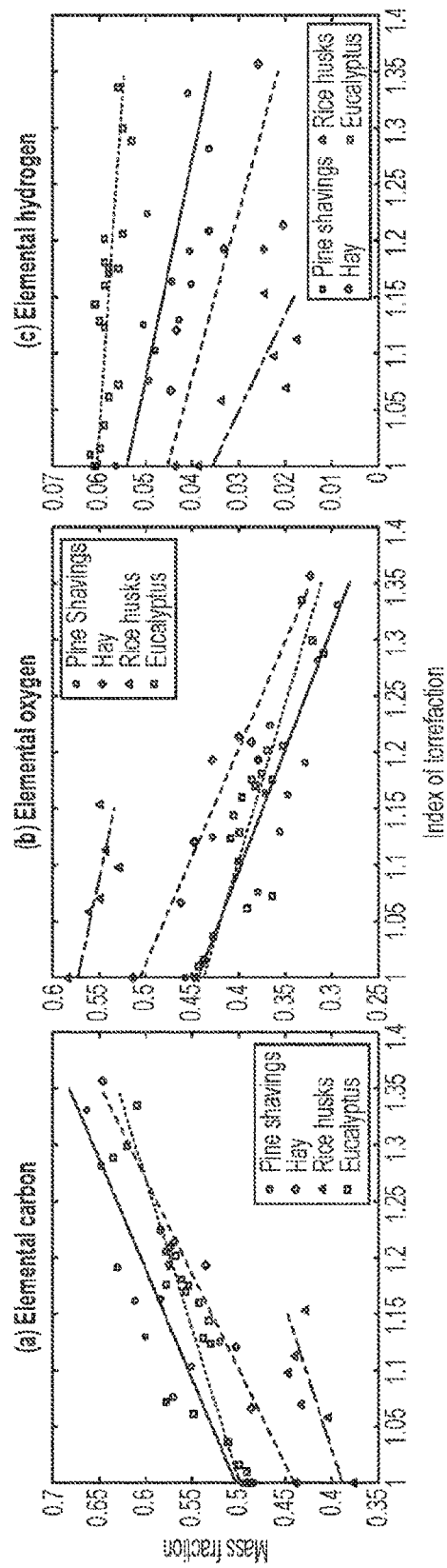
FIG. 41 shows charts showing the mass fractions of elemental carbon, elemental oxygen, and elemental hydrogen as a function of index of torrefaction for certain types of biomass, according to some embodiments.

The torrefied samples described above were analyzed using the elemental analysis. Furthermore, elemental analysis data for eucalyptus wood torrefaction was also obtained. The results are plotted in FIG. 41.

4.3.3 Fuel Grindability

Torrefaction may improve the grindability of solid fuel—that is, the ease with which the solid fuel can be pulverized. For many boiler and co-generation applications, including for fluidized bed reactors, it is beneficial for the solid fuel be pulverized and entrained before it is utilized.

"Grindability" may be quantified in two ways. In the first type of measurement, a certain known amount of grinding energy is delivered to the biomass or torrefied fuel in a batch process, and the resultant particle distribution characterized. In the second type of measurement, a continuous grinder is implemented that measures the grinding power delivered as a given flow rate of biomass or torrefied fuel passes through the grinder. In this Section, both grinding measurement methods were employed. Both grinding methods show that grindability is affected by the index of torrefaction in the sample case of torrefied rice husks as well as pine shavings. The quantification below uses the second method.

Grinding experiments were performed on six biomass or torrefied biomass samples. These included a lightly torrefied condition ($I_{torr}$=1.11 for pine shavings and for rice husks), a heavily torrefied condition ($I_{torr}$=1.16 for pine shavings and $I_{torr}$=1.15 for rice husks), and a negative control, which is raw biomass as received ($I_{torr}$=1.00).

Grindability measurements were performed with the aid of an IKA MF 10.1 mill that was connected to a HOBO UX120 plug load logger. A 2.0 mm grate was placed at the bottom of the mill, such that only particles that have been ground to a size inferior to the grate opening could pass through and be collected. By measuring the power output supplied to the grinder, as well as the mass flow rate of the biomass or torrefied biomass sample through the grinder, the specific grinding energy can be determined. As used herein, the specific grinding energy is the unit energy required to comminute a solid fuel sample into particles inferior to a certain target size. At a given measured flow rate of biomass input feeding, the power consumption during the grinding process was measured. Dividing the power consumption by the feeding mass rate gives the specific grinding energy [J kg$^{-1}$].

In order to obtain the specific grinding energy, the grinding power requirement curve is integrated over time it takes to process 500 grams of the sample, in order to obtain some energy quantity [J]. Dividing by 500 grams, a measure for the specific grinding energy is obtained.

Figure 42:
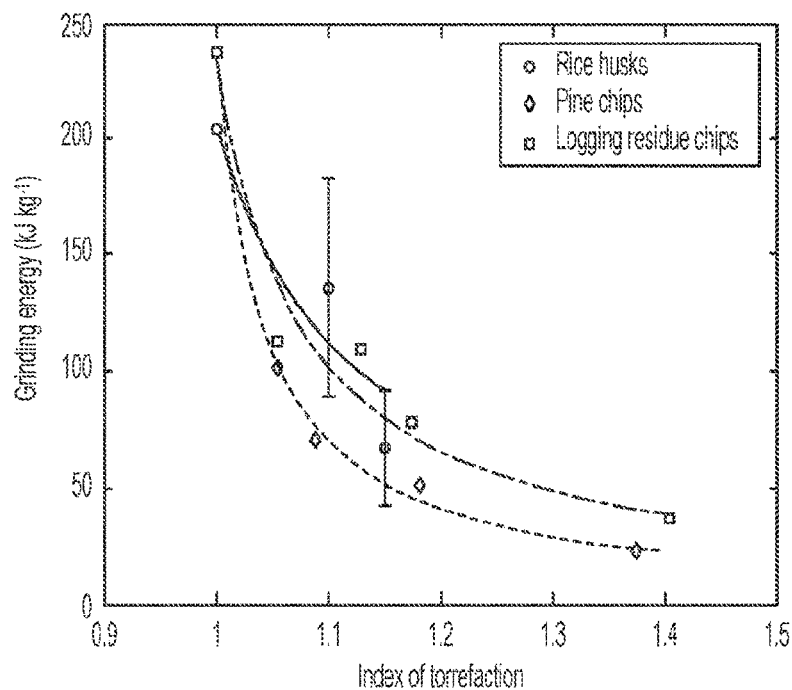
FIG. 42 shows the grinding energy as a function of index of torrefaction for certain types of biomass, according to some embodiments.

FIG. 42 shows that for rice husks (circles)), the specific grinding energy decreases as the torrefaction becomes more severe. Data from pine chips and logging residual chips is also plotted in FIG. 42. In general, it is found that the specific grinding energy (SGE) decreases as the biomass is increasingly torrefied, and that the SGE and the index of torrefaction ($I_{torr}$) can be fitted to a rational function of the form:

$$SGE = \frac{a}{1 - bI_{torr}},$$

where a and b are fit parameters. These parameters were determined via cftool fitting in MATLAB, and are given in Table 6.

TABLE 6

Best fit of the specific grinding energy as a function of the index of torrefaction to a rational function of the form $a/(1 - bI_{torr})$.

| Biomass type | Best fit value for a | Best fit value for b |
|---|---|---|
| Rice husks | 24.73* | 0.8808* |
| Pine chips | 9.96 ± 1.95 | 0.958 ± 0.0093 |
| Logging residue chips | 18.54 ± 12.49 | 0.9198 ± 0.0641 |

* Number of data points for rice husks was too small (3) to determine a reliable confidence interval for the fitting parameters.

Figure 43:
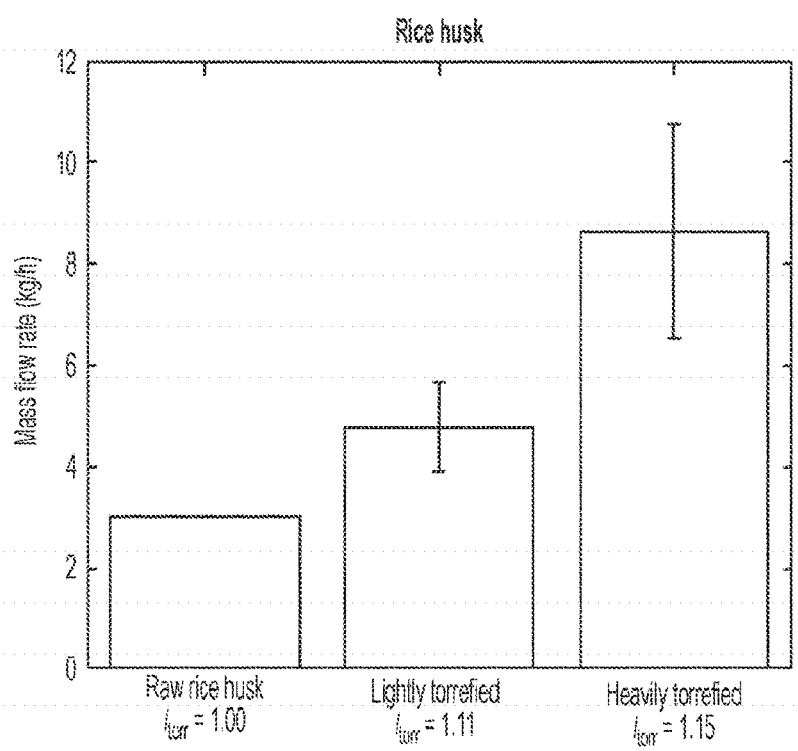
FIG. 43 shows the mass flow rate of raw rice husk at different indices of torrefaction, according to some embodiments.

The maximum solid output flow rate in a continuous grinding set-up may depend on the index of torrefaction. The rate at which comminuted solids emerge from the grinder may be limited by how quickly the mill can reduce the incoming solid feed. As FIG. 43 demonstrates, as the index of torrefaction increases, the maximum output mass flow rate may increase. Torrefaction may increase the processing capacity of the grinder, which may reduce the operating costs for comminuting torrefied biomass feedstock.

4.3.4 Selected Cooking Characteristics

Figure 44:
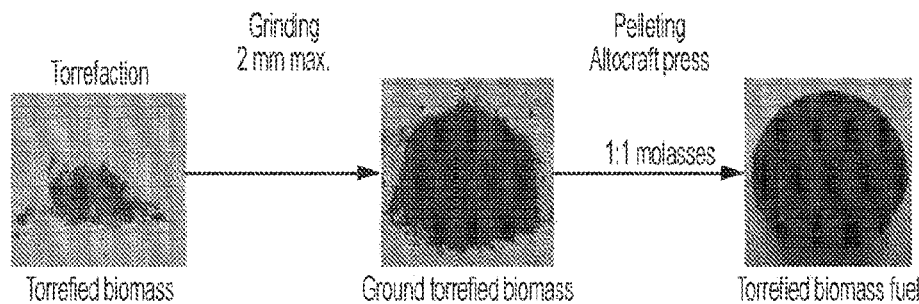
FIG. 44 shows photographs of decomposed biomass, according to some embodiments.

Torrefaction may be employed to upgrade biomass into solid cooking fuel. Torrefaction may make raw biomass more charcoal-like when used for cooking. To test the suitability of torrefied biomass for use of fuel, torrefied biomass is first comminuted, using the same grinding set-up as described in the previous section, into small powder inferior to 2 mm (see FIG. 44).

Then, after the torrefied biomass has been pulverized, it is bound to form usable solid fuel. Suitable types of "binders" may include paper pulp, wheat flour mixture, molasses, sawdust, cow dung, acid-denatured biomass, and/or natural innate binders in the raw biomass itself. In this Section, molasses was employed as the binder. Molasses is easily accessible and does not require extensive processing or pre-treatment. The binder to biomass ratio was gradually increased until briquettes that are stable and do not easily crumble into small pieces were formed. The binder-to-fuel powder ratio employed here was 1:1 by mass. No water was added in the process.

Four sample fuel briquettes were manufactured using the technique described above, including raw rice husk briquettes ($I_{torr}$=1.00, as a negative control), lightly torrefied rice husk briquettes ($I_{torr}$=1.11), and heavily torrefied rice husk briquettes ($I_{torr}$=1.15). As can be seen visually, as the index of torrefaction increases, the color of the briquettes may turn from darker brown into black. Commercial-grade charcoal was purchased, pulverized, and then reconstituted the fuel briquettes using the same technique above to form a control. A charcoal-burning stove—called a jiko—that is commonly used for domestic cooking in Kenya was employed.

During each experiment, about 400 grams of the solid fuel briquettes of a given type was loaded into the stove. A fire lighter was placed at the center of the briquettes to start the fire. A metal pot containing 3 liters of water at room temperature was placed onto the lit stove. The experimental set-up included a mass balance on which the stove, the fuel, and a pot of water are placed. The mass balance logs the weight loss of the cooking experiment in real time. The stove was covered with minimal evaporation taking place, to reduce sources of mass loss other than fuel mass loss. A thermocouple was placed inside the pot of water, as well as inside the cook stove, in order to log the temperature in real time.

Figure 45:
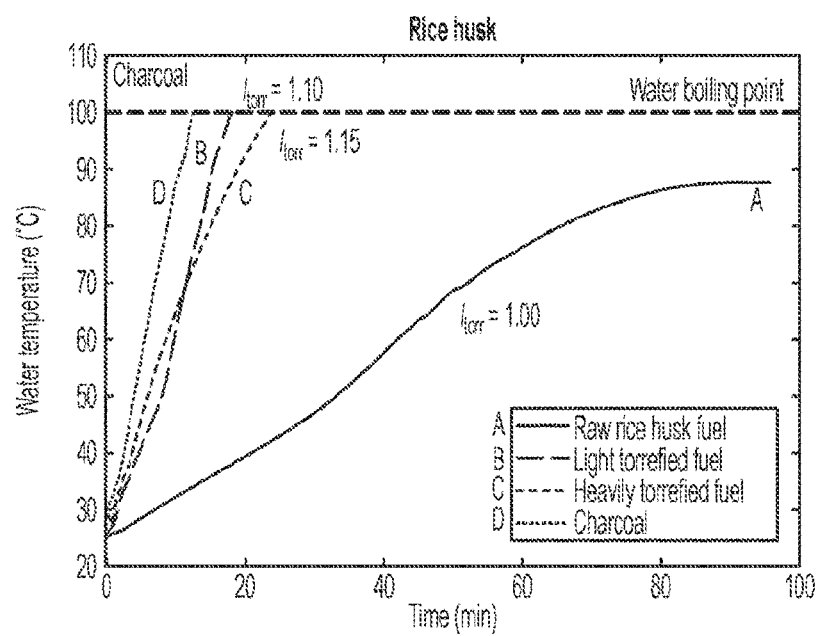
FIG. 45 shows the temperature of water as a function of time while heated by certain types of biomass, according to some embodiments.

FIG. 45 summarizes the time trace of the water temperature in the pot using different types of biomass/torrefied fuel briquettes. Fuel briquettes made from raw rice husks (blue curve) did not bring the pot of water to a boil after 90 minutes. In contrast, rice husks subject to either mild torrefaction ($I_{torr}$=1.11, black dashed curve) or heavy torrefaction ($I_{torr}$=1.15, red curve) successfully brought water to a boil in of less than 20 minutes. These torrefied rice husks behaved comparably to charcoal briquettes (purple curve). Hence, torrefaction may upgrade the characteristics of the cooking fuel and/or render it useful for cooking.

A quantity called the useful power output $P_u$ is defined as the heat flow from combusting the fuel briquettes that contributes to the heating of the water (e.g., instead of heating up the stove, or being lost to the surrounding environment). The useful power output quantifies how rapidly things can be cooked with a given fuel type:

$$P_u \equiv \frac{m_{water} c_{water}(T_{end} - T_{start})}{t_{end} - t_{start}},$$

where the subscript "start" denotes the water temperature and time at the starting point of the cooking experiment, and "end" denotes the water temperature and time at the end point of the cooking experiment, respectively. The useful power outputs for the different fuel types are plotted in FIG. 46A, and a discussion of the results will follow.

Even if two separate cooking experiments are giving the same useful power output, the solid fuel briquettes may be being consumed at different rates. The fuel consumption rate may depend a variety of factors, such as the combustion temperature and/or the underlying chemistry of the fuel after torrefaction of different degrees of severity. The useful energy density, defined below, quantifies how much fuel (in mass) is needed to perform a certain useful purpose (in units of energy):

$$\rho_E \equiv \frac{m_{water} c_{water}(T_{end} - T_{start})}{m_{fuel,end} - m_{fuel,start}}.$$

Figure 46:
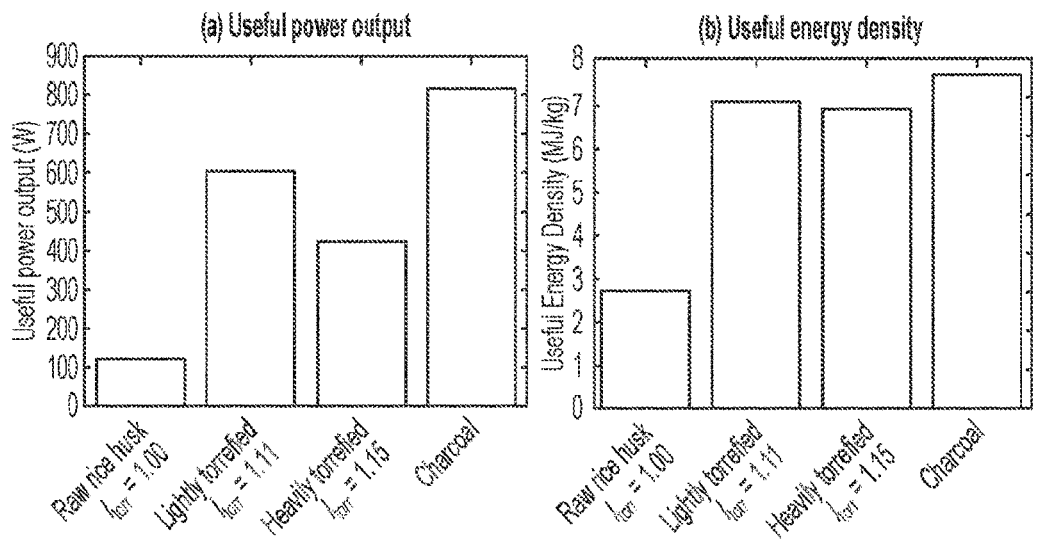
FIG. 46 shows the useful power output and useful energy density of certain types of biomass, according to some embodiments.

FIG. 46A plots the useful power outputs and FIG. 46B plots the useful energy densities of the different fuel types. In FIG. 46A, the useful power output first increases (to 600 watts) and then decreases (to 400 W) as the index of torrefaction is increased. One potential explanation is as follows. Rice husks may have high ash content (about 15-20% in raw rice husks). As rice husks are torrefied, the ash content may increase. A proximate analysis performed on the torrefied rice husks shows that the ash content may increase from 22% by mass in the lightly torrefied regime to about 37% by mass in the heavily torrefied regime. Phenomenologically, when attempting to boil water with the heavily torrefied rice husk briquettes, the briquettes quickly became coated in ash, and the red glow of the combustion that was evident on the fuel surface was attenuated significantly. This observation, if true, could then also explain the trend observed in FIG. 46B, where after an initial increase in the useful energy density from 3 MJ/kg to 7 MJ/kg upon light torrefaction, this useful energy density did not increase any further upon increasing the torrefaction severity: as the rate of heat release from heavily torrefied fuel became slower in time, the stove needed to expend more energy due to the losses through the side jacket. Therefore, while judging from the index of torrefaction, it could be expected that the heavily torrefied rice husks would have a higher HHV value compared to lightly torrefied rice husks, when these samples were briquetted and combusted, the advantage of the higher HHV value may have been counteracted by the limited heat release due to the high ash build-up.

Therefore, increasing torrefaction severity may increase the HHV of the output product without increasing the useful energy density and power output of the briquetted fuel.

Figure 47:
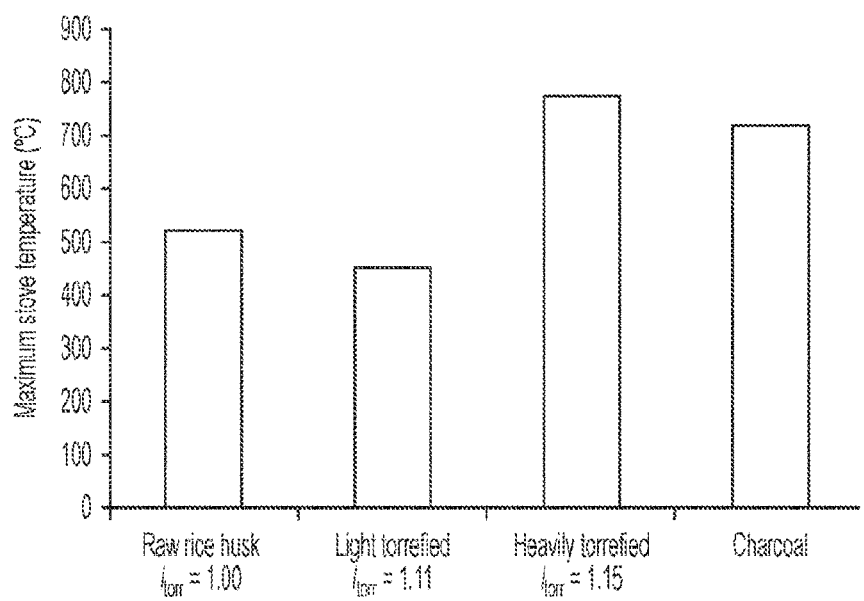
FIG. 47 shows the maximum stove temperature achievable by certain types of biomass, according to some embodiments.

FIG. 47 shows the maximum stove temperatures reached during the different cooking experiments. In the case of raw and lightly torrefied rice husk briquettes, the stove temperature remains relatively cold (around 500° C.). Heavily torrefied rice husk briquettes increased the stove temperature to around 700° C. In some cases, lightly torrefied fuel briquettes may be inappropriate for certain specific cooking purposes (e.g., baking) in which higher temperatures are preferred.

Figure 48:
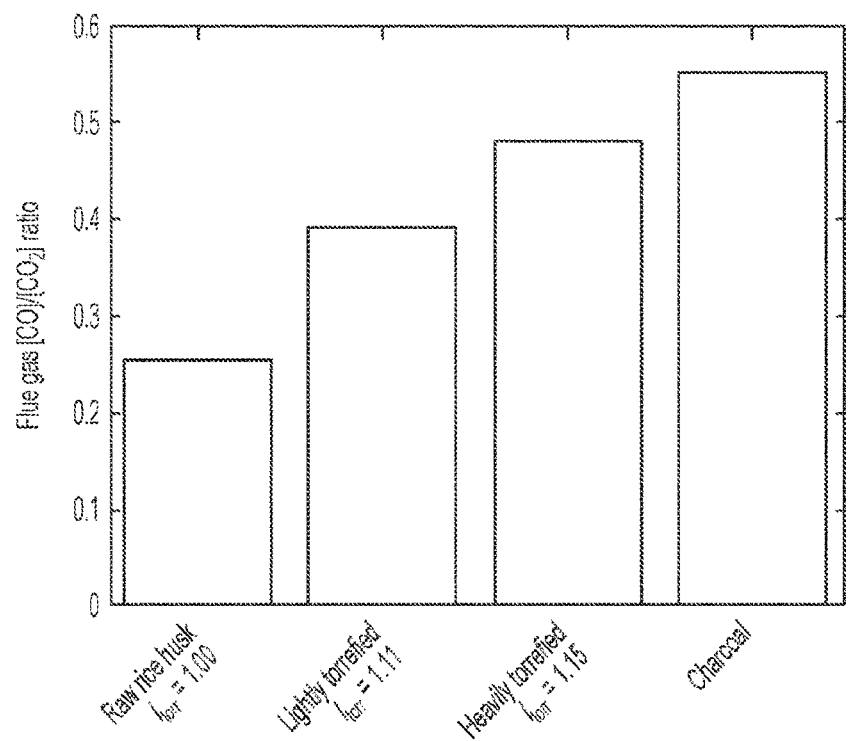
FIG. 48 shows the $CO/CO_2$ ratio of flue gas produced upon combustion of certain types of biomass, according to some embodiments.

To evaluate the emission characteristics, a carbon monoxide logger (Bacharach) and a carbon dioxide logger (COZIR-WR) were installed in the exhaust hood above the cook stove experiment. The different stoves burn at different rates, and so the ratio of carbon monoxide to carbon dioxide levels were employed a relative quantification of the emission level due to incomplete combustion within the cook stove. FIG. 48 plots these ratios for the differently torrefied rice husk solid fuel briquettes.

As can be observed, the completeness of combustion may be reduced as the torrefaction severity increases, and the torrefied fuel briquettes may increasingly become charcoal-like in their emission profiles (increasing relative carbon monoxide levels).

4.4 General Approach for Rapid Reactor Validation and Scaling

The index of torrefaction may correlate with various "secondary characteristics"—such as fixed carbon content, elemental analysis, grindability, and/or cooking characteristics.

The higher heating value of the torrefied biomass may increase monotonically with the index of torrefaction. However, when such fuels are briquetted and combusted in a cook stove set-up, there may not be an increase in the useful energy density or useful power output. Some secondary characteristics may be dependent on the method of briquetting, the cook stove design, and/or the method of cooking.

Section 5 Analysis and Mitigation of Energy Loss Mechanisms in a Torrefaction Reactor This Section quantifies certain different mechanisms of energy losses throughout the lab reactor system, and proposes concrete steps towards an improved design for scaling up. The first loss is the thermal dissipation through the side wall. By balancing the insulation material cost and the ongoing energy loss, a formula that describes the optimal insulation thickness for different reactor operating conditions and scales is presented. The second loss is the thermal dissipation through the char-cooling segment. By modeling an air-preheating channel to recycle the dissipated heat from the char-cooling segment, it is found that it may be beneficial for the air channel to be narrow, and/or for the length of the char-cooling segment to be short. It may be beneficial for the air channel to be sufficiently long to allow the torrefied biomass to emerge at a reasonable temperature. Finally, the third loss mechanism is in the exhaust stream. In some cases, much of the energy loss is carried by the chemical enthalpy availability in the escaping unburned volatiles in the exhaust stream, rather in the sensible heat of the exhaust stream. By designing a secondary oxidation zone, it may be possible to harness some of this combustible and/or to minimize pollution from the reactor. For the work performed in this Section, it was found that the chemical availability in the exhaust stream was the largest factor contributing to energy loss.

5.1 Need for an Energy-Based Method for Reactor Improvement

Figure 49:
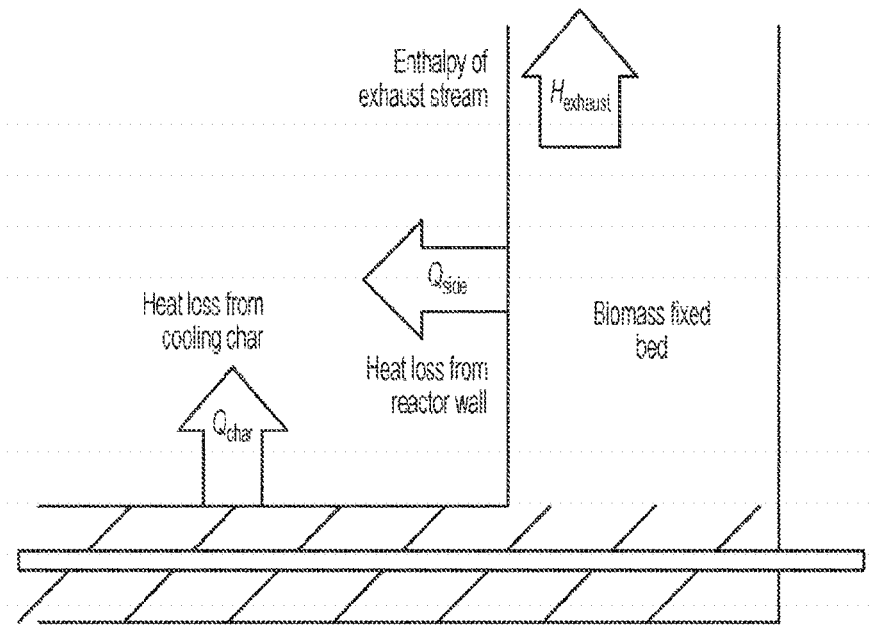
FIG. 49 is a schematic depiction of a system configured for biomass decomposition, according to some embodiments.

This Section quantifies the total biomass that flows through the reactor under different solid residence time and normalized air/fuel ratio conditions. Then various losses as a fraction of this total quantity are characterized. These mechanisms include: (1) thermal dissipation from the reactor side walls, (2) thermal dissipation from the char-cooling segment, and (3) potential energy loss due to unburned volatiles mixed in the reactor exhaust stream. These mechanisms are illustrated in FIG. 49.

5.2 Total Biomass Energy Fluxes from the Reactor System

By changing the residence time of the reactor and even the type of biomass (which affects the bulk bed density), it is possible to alter the mass flow rate of biomass through the system and/or the total energy flow rate through the system. These changes may affect the absolute magnitudes of the various losses. Given a reactor of cross-sectional area $\pi_{R_r}^2$, the total biomass energy flux from the system, $\varphi_{BM}$, is defined as follows:

$$\varphi_{BM} \equiv \frac{\dot{m}_{char} HHV_{char}}{\pi R_r^2}.$$

Figure 50:
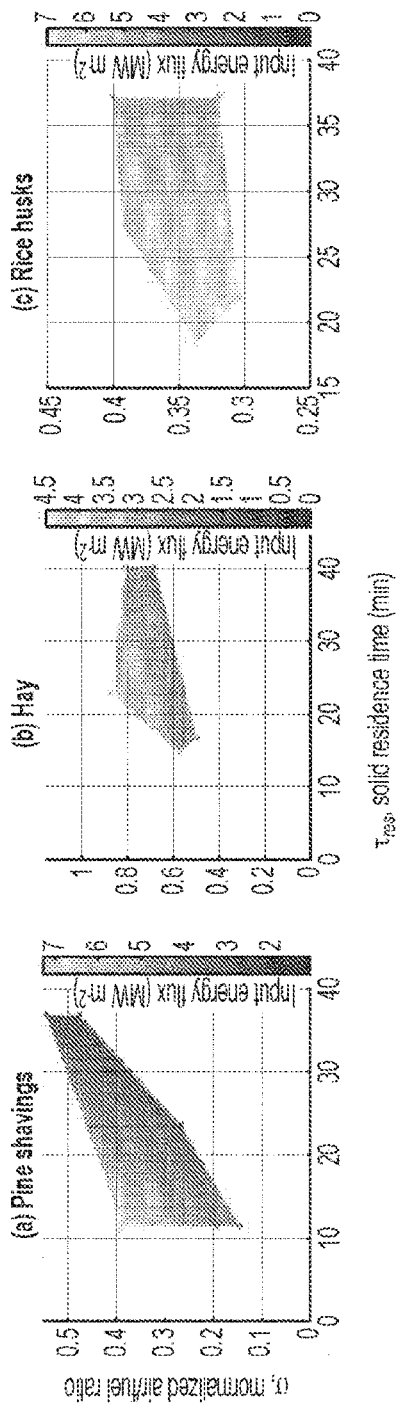
FIG. 50 shows the biomass energy flux as a function of normalized air to fuel ratio and solid residence time for certain types of biomass, according to some embodiments.

This quantity is related to the biomass energy that flows through the reactor, normalized by the reactor cross-sectional area. A larger reactor processing more biomass operating at the same reaction condition is predicted to still have the same energy flux. FIG. 50 plots this total biomass energy flux under different reactor operating conditions for three types of biomass: pine shavings (a), hay (b), and rice husk (c). The overall magnitudes of the energy fluxes are about 0.2-0.7 MW m$^{-2}$. This means that for a reactor diameter of 4 inches (10.2 cm), the reactor processes about 2-6 kW's worth of incoming biomass.

It is observed that there is a dependency of the total energy flux on the solid residence time: the shorter the solid residence time is, the higher the solid mass flow rate is through the reactor. A higher solid mass flow rate through the reactor may correlate with a higher the total energy flux. In some cases, there may be a dependency on the normalized air/fuel ratio. It is believed that more severe torrefaction condition may result in a higher volumetric reduction (and/or greater downward axial velocity) in the biomass fixed bed. The higher volumetric reduction may result in a higher effective solid mass flow rate.

5.3 Characterizing and Mitigation of Losses from Reactor Side Walls

The fixed bed reactor studied in this Section is surrounded by insulation in order to minimize heat loss from the hot central core.

5.3.1 Measurement Methodology

A series of thermocouples, spaced about 1.25 inches (3.2 cm) apart, were installed axially on the outer side wall of the reactor (outside the insulation layer). Four thermocouples, spaced also about 1.25 inches (3.2 cm) apart, were also installed axially on the inner wall of the reactor at the biomass fixed bed interface. Temperature profiles were taken at the inner wall and the outer wall of the reactor.

Figure 51:
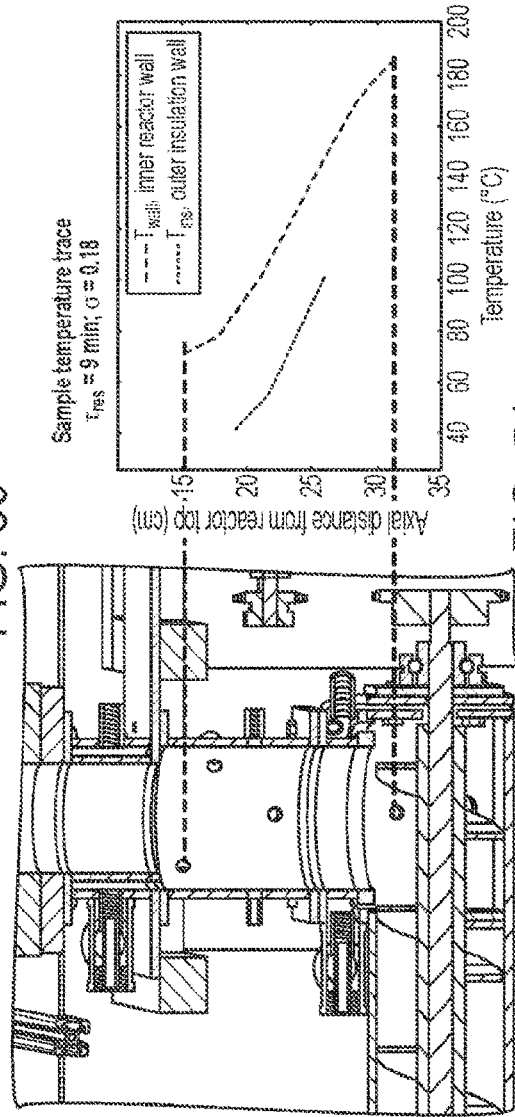
FIG. 51 shows a schematic depiction of a reactor and the temperature at various points therein, according to some embodiments.

In FIG. 51, having obtained the steady-state temperature profiles both at the inner reactor wall $T_{wall}(z)$ (blue dashed line) as well as at the outer insulation surface of the wall $T_{ins}(z)$ (red solid line), it is observed that the inner reactor wall at steady state is maintained at a consistently higher temperature compared to the outer reactor wall. This may signify a net heat flow from the inside of the reactor to the outside. A heat loss model is constructed to quantify this flow (FIG. 52).

Figure 52:
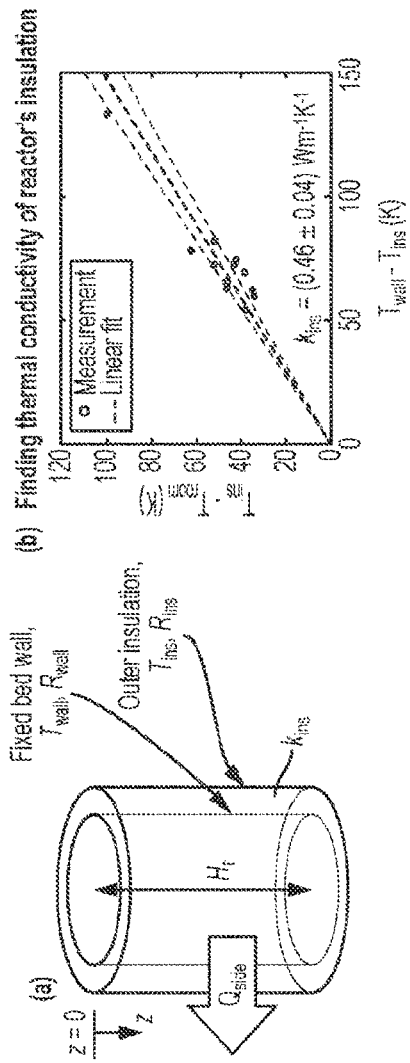
FIG. 52 shows a schematic depiction of a reactor and its thermal conductivity, according to some embodiments.

As FIG. 52 indicates, the reactor was approximated as a cylinder with a radius at the inner wall of $R_{wall}$ and the radius at the outer insulation surface of $R_{ins}$. The height of the reactor cylinder is $H_r$. Therefore, the thickness of the stainless steel wall plus the insulation layer is $R_{ins} - R_{wall}$, and this layer is assumed to have a uniform effective thermal conductivity of $k_{ins}$ [W m$^{-1}$ K$^{-1}$].

With these assumptions in place, the radial heat flow $dQ_{side}$ [J s$^{-1}$] through a small axial slice dz of the reactor is given by:

$$dQ_{side}(z) = \frac{2\pi k_{ins} dz}{\ln(R_{ins}/R_{wall})}(T_{wall} - T_{ins}) = 2\pi h_{air} R_{ins} dz (T_{ins} - T_{amb}),$$

where $h_{air} \approx 10$ W m$^{-2}$ K$^{-1}$ is the convective heat transfer coefficient of ambient (still) air at the outer insulation surface, and where $T_{amb}$ is the temperature of the ambient air. Based on the equation above, $k_{ins}$ can be inferred by linear-fitting the following relationship (FIG. 52B):

$$(T_{wall} - T_{ins}) = \frac{h_{air} R_{ins} \ln(R_{ins}/R_{wall})}{k_{ins}}(T_{ins} - T_{amb}).$$

From the composite steady-state data points involving multiple experiments, it is estimated that $k_{ins} \approx (0.46 \pm 0.04)$ W m$^{-1}$ K$^{-1}$ for the case of the laboratory-scale reactor. Then, the differential heat losses over the side wall can be integrated over the entire axial length of the reactor to obtain:

$$Q_{side} = \int_0^{H_r} dQ_{side}(z) dz = \frac{2\pi k_{ins}}{\ln(R_{ins}/R_{wall})} \int_0^{H_r} (T_{wall}(z) - T_{ins}(z)) dz.$$

In this case, the temperature profiles $T_{wall}(z)$ and $T_{ins}(z)$ were interpolated and extrapolated beyond the axial points sampled by the thermocouples.

5.3.2 Results and Discussion

Figure 53:
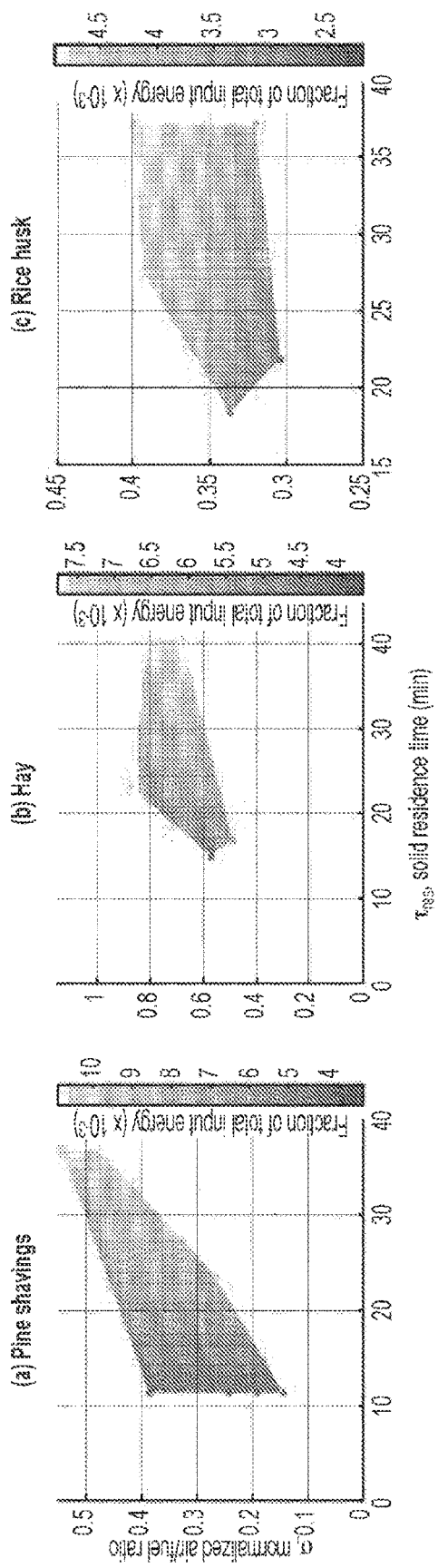
FIG. 53 shows thermal dissipation through reactor side walls as a function of normalized air to fuel ratio and solid residence time for certain types of biomass, according to some embodiments.

As shown in FIG. 53, about 1% of the total biomass energy is lost due to thermal dissipation from the reactor side wall. For all three types of biomass, this loss is most significant for long solid residence time. It is believed that a hot reactor at a given temperature dissipates the same power as thermal loss, but increasing the solid residence time may reduce the total biomass energy flow through the reactor. Therefore, minimizing the solid residence time may maximize the mass flow rate of solid fuel that can be processed through a reactor of a given size.

5.3.3 Scaling the Side Wall Thermal Loss

Figure 54:
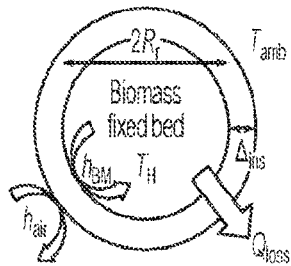
FIG. 54 shows a schematic depiction of thermal dissipation through reactor side walls and associated equations, according to some embodiments.

Because the laboratory-scale reactor is small, it has a high surface area-to-volume ratio and therefore tends to dissipate heat significantly through its surfaces. Larger reactors are modeled herein as a cylinder of height $H_r$ and radius $R_r$ that operates uniformly at some elevated temperature $T_H$ compared to the ambient temperature $T_{amb}$ (FIG. 54).

As the reactor is scaled, as long as the biomass mass flux $\Phi_{BM}$ through the reactor remains constant, then the reactor radius $R_r$ will scale as $\sqrt{\dot{m}_{BM}/\Phi_{BM}}$. The relative heat loss $R_{loss}$ with respect to the total biomass energy flow through the reactor is given by $\varepsilon_{loss} = Q_{loss}/(\dot{m}_{BM}HHV_{BM})$. Then assuming that the heat transfer characteristics ($h_{BM}$, $k_{ins}$, $h_{air}$), the biomass characteristics ($HHV_{BM}$), and the thickness $\Delta_{ins}$ of the reactor wall and insulating material does not change as the reactor scales up in the feeding rate, in the limit that $\Delta_{ins} \ll R_r$, $$\frac{\varepsilon_{loss}^*}{\varepsilon_{loss}} = \sqrt{\frac{\dot{m}_{BM}}{\dot{m}_{BM}^*}},$$

where the asterisk superscripts denote a new loss and mass flow rate in a scaled-up reactor. Therefore, as the reactor scales, its relative heat loss from the side wall decreases as $1/\sqrt{\dot{m}_{BM}}$. For the laboratory-scale reactor, 0.4% and 0.3% side wall heat loss was observed in the mild and severe torrefaction cases, respectively. Table 7 predicts the same side wall heat losses as the reactor scales up. As the reactor radius increases, it is believed that the thermal dissipation from the side wall becomes a smaller contributor to the total losses.

TABLE 7

Predicted relative magnitude thermal dissipation from the reactor side wall as the reactor is scaled up.

| Biomass feed rate | Reactor radius | $E_{side}$, mild torrefaction | $E_{side}$, severe torrefaction |
|---|---|---|---|
| ~1 kg/h | 5.1 cm | 0.4% | 0.3% |
| ~20 kg/h | 22.9 cm | 0.09% | 0.07% |
| ~200 kg/h | 73.2 cm | 0.03% | 0.02% |

5.4 Characterizing and Mitigating Losses from the Char-Cooling Segment

The fixed bed reactor described in this Section is surrounded by insulation in order to minimize heat loss from the hot central core.

5.4.1 Measurement Methodology

After the torrefied biomass emerges from the fixed bed, it is carried in the screw auger through a 2-foot-long (61 cm) char-cooling segment. This cooling segment may prevent hot torrefied product from seeing significant air prematurely, which could cause spontaneous combustion. The cooling segment may lower the temperature of the torrefied product, and has no insulation beyond a stainless steel outer surface.

Figure 55:
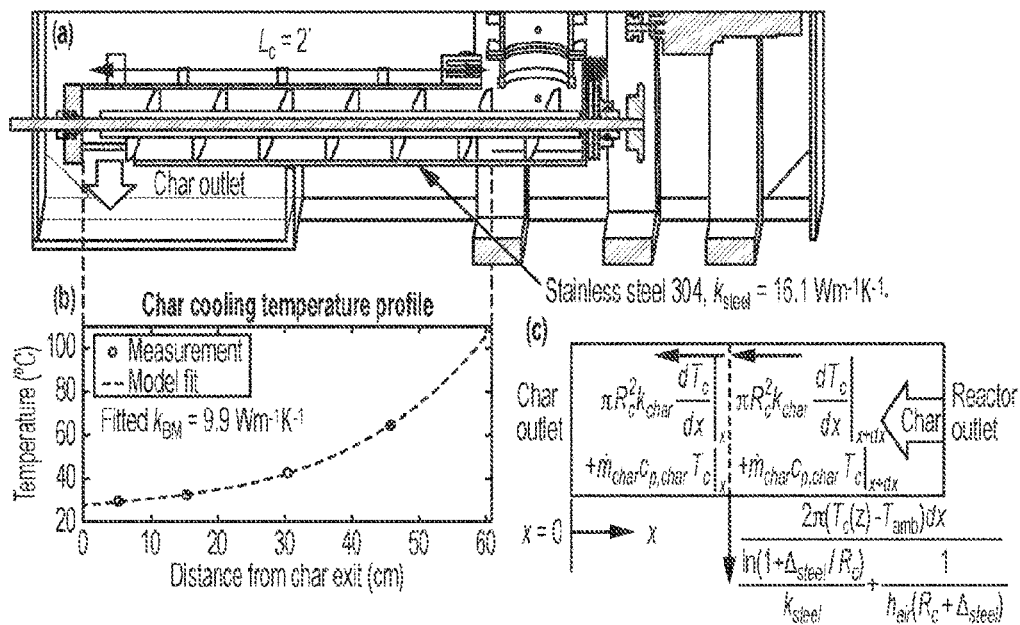
FIG. 55 shows a schematic depiction of an outlet conduit and a schematic depiction of thermal dissipation through side walls of the outlet conduit, according to some embodiments.

Thermocouples were installed lengthwise, spaced about 15 cm apart, axially throughout the char-cooling segment (FIG. 55A) located at the inner wall at the interface with the cooling biomass. This design allows for temperature read-outs at four points (FIG. 55B), to which an extrapolated model is fitted (blue dashed line). In FIG. 55C, a simplified heat transfer model is shown. It is assumed that there is no radial inhomogeneity, and that the axial heat transfer occurs, as shown in the two horizontal blue arrows, via (a) axial conduction (the $\pi R_c^2 k_{char} dT_c/dx$ term) through a combination of the torrefied char, gases, and the outer stainless steel lining (with a bulk effective thermal conductivity $k_{char}$ to be determined by fitting, which is assumed to the first order to be temperature-independent), and (b) axial convection by the slow-moving torrefied char (the $\dot{m}_{char} c_{p,char} T_c$ term). At the same time, throughout the length of the char-cooling segment, heat is continuously being lost via the surface to the outside, as represented by the $2\pi R_c k_{steel}(T_c - T_{amb}) dx$ term and shown by the downward-pointing blue arrow in FIG. 55C. Putting all these energy balance terms together, yields the following model to describe the axial temperature profile:

$$k_{char}\frac{d^2 T_c}{dx^2} + c_{p,char}\rho_{char}v_{char}\frac{dT_c}{dx} = \frac{2}{R_c^2 \Omega}(T_C - T_{amb}), \quad \text{Eq. 1}$$

where the thermal resistance term $\Omega$ is defined as:

$$\Omega \equiv \frac{\ln(1 + \Delta_{steel}/R_c)}{k_{steel}} + \frac{1}{h_{air}(R_c + \Delta_{steel})}.$$

Here, $\Delta_{steel} = 0.64$ cm is the thickness of the type 304 stainless steel we used to build the char-cooling segment, and $k_{steel} = 16.2$ W m$^{-1}$ K$^{-1}$ is the thermal conductivity of the same steel. The heat capacity ($c_{p,char}$) and/or bulk density ($\rho_{char}$) of the torrefied char may be a function of temperature, and therefore may exhibit spatial dependence as the torrefied char cools axially in the segment. Here, $\rho_{char}$ is evaluated by weighing the product. $c_{p,char}$ is approximated by Merrick's correlation (1983):

$$c_{p,char} = \frac{R}{\langle MW \rangle_{char}}\left(e^{\frac{380}{T}}\left(\frac{e^{\frac{380}{T}} - 1}{380/T}\right)^{-2} + 2e^{\frac{1800}{T}}\left(\frac{e^{\frac{1800}{T}} - 1}{1800/T}\right)^{-2}\right),$$

where the effective molecular weight $\langle MW \rangle_{char}$ of the torrefied char is defined as:

$$\langle MW \rangle_{char} \equiv \left(\sum_{i \in \{C,H,O,N,S\}} \frac{Y_{i(DAF)}}{MW_i}\right)^{-1}.$$

Eq. 1 is a second-order differential equation of the type $aT_c'' + bT_c' + c(T_c - T_{amb}) = 0$ that can be solved analytically, with the general solution:

$$T_c(x) = r_1 e^{r_1 x} + r_2 e^{r_2 x} + T_{amb}, \quad r_1, r_2 = \frac{-b \pm \sqrt{b^2 - 4ac}}{2a}.$$

For each operating condition, this model was utilized to fit $T_c(x)$ to the thermocouple readouts using the cftool fitting function in MATLAB. After obtaining the interpolated and extrapolated profile $T_c(x)$, we the total heat flow from the char-cooling segment is given by:

$$Q_{char} = \frac{2\pi}{\Omega} \int_0^{L_C} (T_c(x) - T_{amb}) dx.$$

5.4.2 Results and Discussion

Figure 56:
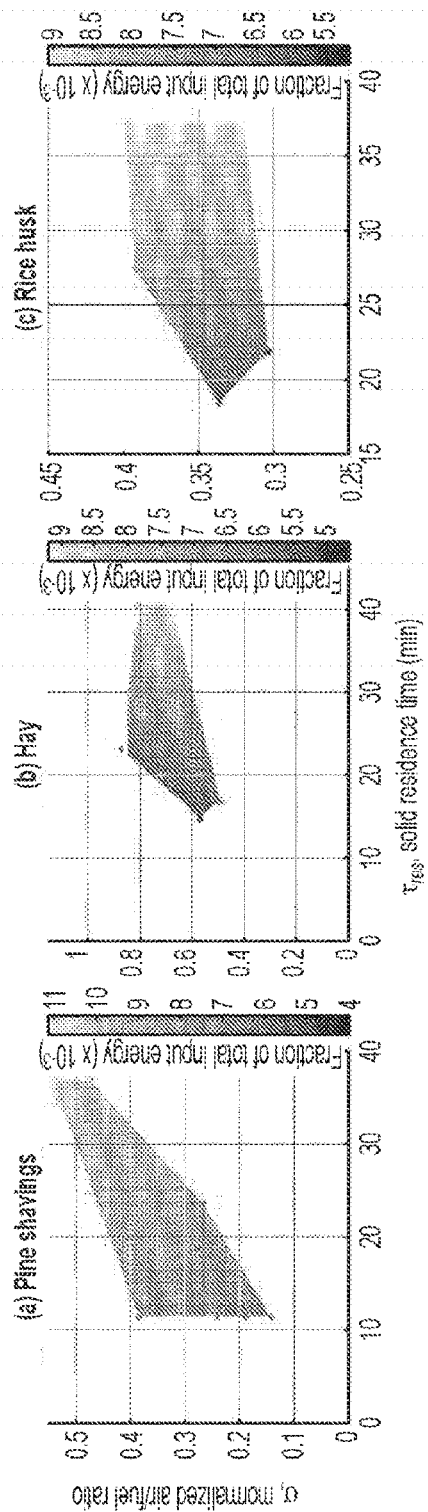
FIG. 56 shows thermal dissipation through outlet conduit side walls as a function of normalized air to fuel ratio and solid residence time for certain types of biomass, according to some embodiments.

The thermal dissipation from the char-cooling segment in FIG. 56 under different reactor operating conditions for different biomass types. It is observed that the relative magnitude of the dissipation from the char-cooling segment is relatively minor (around 1% of the total biomass energy flow through the reactor). The dissipation depends on the solid residence time.

5.4.3 Proposed Air-Preheating Mechanism and Validation Strategy

It may be desirable to lose heat quickly in the char-cooling segment. In some circumstances, this heat is not necessarily irrevocably "lost" to the environment: a scaled-up reactor design may utilize this dissipated heat to pre-heat the incoming air that will ultimately enter into the reactor. This pre-heating may stabilize the torrefaction reaction and/or reduce product inhomogeneity.

Figure 57:
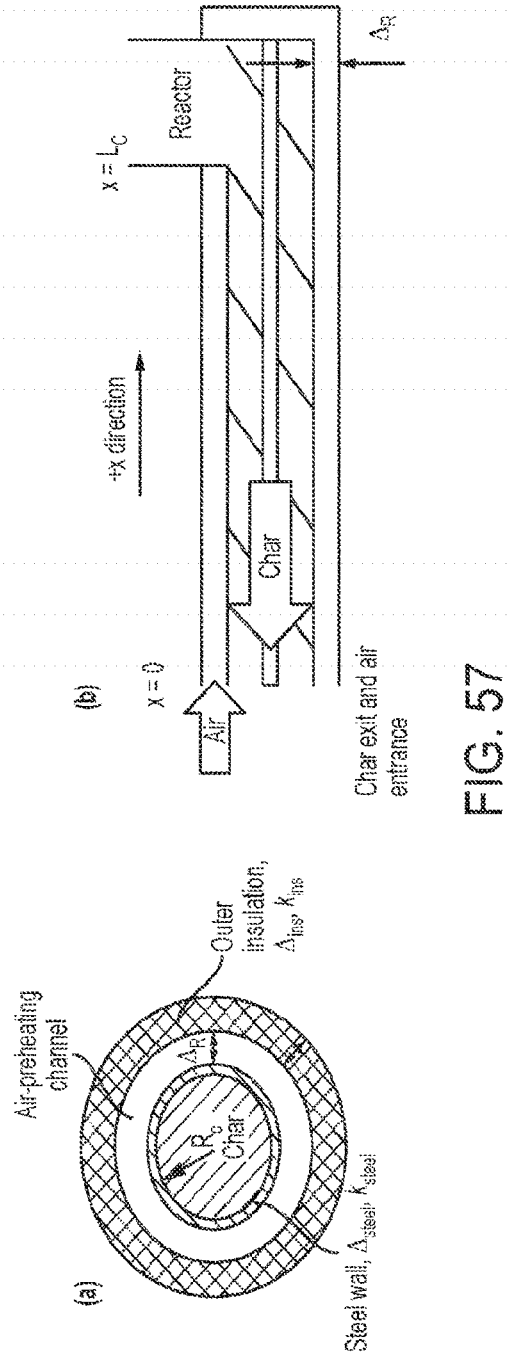
FIG. 57 shows a schematic depiction of an outlet conduit configured to heat a fluid flowing thereover, according to some embodiments.

FIG. 57 illustrates the general modeling approach by viewing the char-cooling segment and air-preheating channel in a transverse (axial) cross section (a) as well as in a longitudinal cross section (b).

Regarding the transverse cross section view first (FIG. 57A), it can be seen that the central core includes of the cooling char of radius $R_c$, which is then surrounded by steel of thickness $\Delta_{steel}$ and thermal conductivity $k_{steel}$ (shown in light gray), followed by the air-preheating channel of width $\Delta_R$ (shown in white). Finally, outside of the air-preheating channel there is an outer insulation of thickness $\Delta_{ins}$ and thermal conductivity $k_{ins}$ (shown in dark gray). Then from the longitudinal cross section view (FIG. 57B), an axial distance variable x can be defined, where x=0 represents the solid (torrefied product) outlet at temperature $T_c(z=0)$ as well as the pre-heated air inlet at temperature $T_p(z=0)$, and where $x=L_C$ indicates the beginning of the char-cooling segment, where the temperature $T_c(z=L_c)$ of the torrefied biomass is maximum and the temperature $T_p(z=L_C)$ of the pre-heated air is also maximum. The torrefied biomass is conveyed by the auger axially from right to left (decreasing x), while the pre-heated air travels from left to right (increasing x).

The temperature profile in the solid (cooling torrefied biomass) phase and the gaseous (pre-heating air) phase is considered and radial temperature profiles are ignored. It is assumed that at a given z position, the entire solid phase is at a homogeneous temperature, and the entire incoming air is also at a different homogeneous temperature. Based on these assumptions, Eq. 1 can be modified as follows:

$$k_{char} \frac{d^2 T_c}{dx^2} + c_{p,char} \rho_{char} v_{char} \frac{dT_c}{dx} = \frac{2}{R_c^2 \Omega} (T_c - T_p),$$

where the radial thermal resistance term $\Omega$ is defined, assuming that $R_C \ll L_C$, as:

$$\Omega \equiv \frac{\ln(1 + \Delta_{steel}/R_c)}{k_{steel}} + \frac{1}{h_{air}(v_{air})(R_c + \Delta_{steel})}.$$

Here, on the end of the torrefaction reactor ($x=L_C$), the temperature of the torrefied solid is given by $$T_c(x=L_C) = T_{torr,out},\qquad \text{Eq. 2}$$

while on the end of the solid outlet (x=0), the boundary condition is governed by the thermal conductivity across the air-facing stainless steel cap (SS 304, thickness of $\Delta_{cap}$=2.5 cm, of thermal conductivity coefficient $k_{cap}$) from the cooling char to the outside air at an ambient room temperature of $T_{amb}$:

$$-k_{cap} \frac{dT_c}{dx}\bigg|_{x=0} = \frac{T_c(z=0) - T_{amb}}{\frac{1}{h_{air}} + \frac{\Delta_{cap}}{k_{cap}}}.$$

Thus there is a second-order differential equation with two boundary conditions.

The convective thermal coefficient of the pre-heating air $h_{air}$ is written as a function of the air velocity $v_{air}$, which is in turn related to the design parameter $\Delta_R$ (width of the air-preheating channel) as well as the torrefaction reactor operating conditions as follows:

$$v_{air} = (AF)_{stoic} H_r \frac{\rho_{BM}}{\rho_{air}} \left( \frac{R_r^2}{2(R_c + \Delta_{steel})\Delta_R + \Delta_R^2} \right) \frac{\sigma}{\tau_{res}},$$

where $H_r$ is the height of the torrefaction reactor region. The convective heat transfer coefficient of air is assumed to follow the following scaling law (ETB, 2017):

$$h_{air}(v_{air}) \approx 10.45 - v_{air} + 10\sqrt{v_{air}}. \qquad \text{Eq. 3}$$

It is believed that the air flows into the reactor at a much faster timescale compared to that of the solid being transported in the char-cooling segment, and so it is assumed that the axial convection of air dominates over axial conduction (supported by that the Biot number is around 500 in the design regime of interest here). Hence the pre-heated air is approximated in a plug-flow fashion, reducing the steady-state heat transfer equation in the gas phase into a first-order differential equation:

$$\frac{dT_p}{dz} = \frac{2\pi(R_c + \Delta_{steel})}{\dot{m}_{air} c_{air} \Theta_{char \to air}} (T_c - T_p) - \frac{2\pi(R_c + \Delta_{steel} + \Delta_R + \Delta_{ins})}{\dot{m}_{air} c_{air} \Theta_{air \to amb}} (T_p - T_{amb}),$$

where the thermal resistance term $\Theta_{char \to air}$ describes the heat transfer between the cooling char at location z and the pre-heating air across the steel wall:

$$\Theta_{char \to air} \equiv \frac{\ln(1 + \Delta_{steel}/R_c)}{k_{steel}} + \frac{1}{h_{air}(R_c + \Delta_{steel})},$$

and where the thermal resistance term $\Theta_{air \to amb}$ describes the heat transfer between the pre-heating air at location z and the outside ambient air (room temperature) across the outer insulation:

$$\theta_{air \to amb} \equiv \frac{1}{h_{air}(R_c + \Delta_{steel} + \Delta_R)} +$$

$$\frac{\ln\left(\frac{R_c + \Delta_{steel} + \Delta_R + \Delta_{ins}}{R_c + \Delta_{steel} + \Delta_R}\right)}{k_{ins}} + \frac{1}{h_{amb}(R_c + \Delta_{steel} + \Delta_R + \Delta_{ins})}.$$

Furthermore, the mass flow rate of air ($\dot{m}_{air}$) as noted in the differential equation above can also be re-expressed in terms of the key reactor operating parameters:

$$\dot{m}_{air} = \rho_{BM} \pi R_r^2 H_r (AF)_{stoic} \sigma / \tau_{res}.$$

The initial condition is $$T_p(Z=0) = T_{amb}.$$

Therefore, in summary, there are two coupled differential equations: a second-order equation describing the cooling solid phase, and a first-order equation describing the heating gaseous phase. The solution was implemented in MATLAB using the method of lines.

5.4.4 Air-Preheating Validation Results

FIG. 58 shows some temperature profiles of the air (blue, panels b and d) and torrefied biomass (red, panels a and c) phases under different design conditions. Panels a-b indicate the different results when the width of the air pre-heating channel is varied. Panels c-d indicate the different results when the length of the char-cooling segment is varied. Panel (b) shows that as the channel width decreases from 5 cm to 1 cm, the final pre-heating temperature of air also increases from about 80° C. to about 90° C. It is believed that at a given air mass flow rate, a narrower channel causes the air to flow through at a higher velocity. The convective heat transfer coefficient $h_{air}$ of air, as described in Eq. 3, may also increase. The pre-heated air may equilibrate to a higher temperature. The temperature profile in the torrefied output may not have a significant change.

In Panel (c), it is observed that as the char-cooling length is increased, the temperature of the torrefied biomass at outlet (z=0) decreases. It is believed that a longer char-cooling segment may allow the torrefied biomass more time to cool down. In Panel (d), varying the char-cooling segment length has no effect on the final air-preheating temperature. It is believed that there is there is a rapid rise of the air temperature near z=0 (air inlet); air may be pre-heated within a short length (in the initial 5-10%) of the char-cooling segment. For the remaining part of the char cooling segment, it is believed that there is a gentle temperature rise.

The length of the char-cooling segment may be designed to drop the temperature of the cooling torrefied biomass down sufficiently such that it is not dangerous to handle (e.g., causing a spontaneous combustion) as it emerges out of the char-cooling segment. It may be beneficial to reduce the width of the air channel (to provide for a greater extent of pre-heating) and/or to reduce the length of the char-cooling segment (to minimize the size of the reactor, and/or the "fin effect" for increased thermal dissipation over a large surface area).

FIG. 59 shows the exit temperature of cooled torrefied biomass (Panel a) as well as the final temperature of the pre-heated air (Panel b) under different design configurations. The final torrefied biomass temperature at exit may depend on the char-cooling segment length. The final air-preheating temperature may depend on the air channel width only. The relationship between the two parameters may be "uncoupled".

Figure 60:
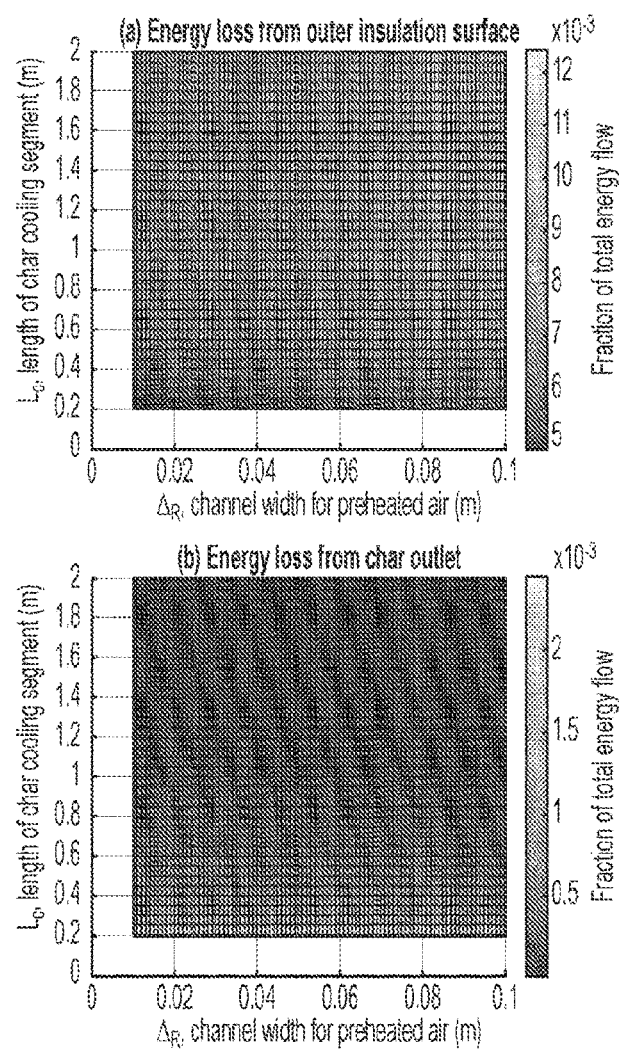
FIGS. 60-61 show charts showing various types of energy losses associated with various outlet conduits, according to some embodiments.

FIG. 60 summarizes these two types of losses. Panel (b) quantifies the energy loss from the char outlet as a fraction of the total solid energy passing through the torrefaction system. This value may be proportional to the temperature of the exiting char, and/or may increase as the char-cooling segment length decreases. Panel (a) quantifies the fraction of energy loss from the outer insulation surface. Energy loss may increase as the length of the char-cooling segment increases, possibly due to the "fin effect", as explained below. The boundary condition of Eq. 2 imposes a fixed solid-phase temperature at the torrefaction reactor outlet (assuming that the solid residence time and the normalized air/fuel ratio can be adjusted to achieve this temperature). As the total char-cooling length (and therefore surface area) increases, the total thermal dissipation from the entire length may also increase. In order to maintain the boundary condition, it may be necessary for the torrefaction reactor to work harder to compensate for this additional heat loss. Increasing the char-cooling segment length may be analogous to adding a cooling fin to the torrefaction system: it may aid the cooling and/or safe exit of torrefied biomass, and/or it may impose an energy penalty on the overall system. Energy loss may increase as the air-preheating channel width increases Table 8 shows a relevant sensitivity analysis.

TABLE 8

Sensitivity analysis of various values as the air channel width is doubled.

| Variable | Nominal value for $\Delta_R$ = 1 cm | % change as $\Delta_R$ is doubled |
|---|---|---|
| Air velocity ($V_{air}$) | 7.3 cm s$^{-1}$ | −52% |
| Air convective heat transfer coefficient ($h_{air}$) | 13.1 W m$^{-1}$ K$^{-1}$ | −10% |
| Char-to-air thermal resistance ($\Theta_{char \to air}$) | 0.71 m K W$^{-1}$ | +11% |
| Air-to-ambient thermal resistance ($\Theta_{air \to amb}$) | 2.5 m K W$^{-1}$ | −4% |
| Outer surface area | 0.55 m$^2$ | +7% |

In Table 8, the air channel width doubling causes the air velocity to almost halve. This results in a 10% decline in the convective heat transfer coefficient. It may become more difficult both for heat to get from the cooling char to the pre-heated air, and/or increase the char-to-air thermal resistance. The air-to-ambient thermal resistance may decrease, and/or it may be easier for heat to be lost from the pre-heated air to the ambient surrounding. Increasing the air channel width may increase the outer radius and/or surface area of the insulation, which may make it easier for heat to escape. There may be an increase in the energy loss as we the air channel width is increased. Making the char-cooling segment greater than or equal to 2 m while and the air channel width 0.1 m can result in a loss of 30% of the overall total solid energy through the exterior surface of the char-cooling segment.

Figure 61:
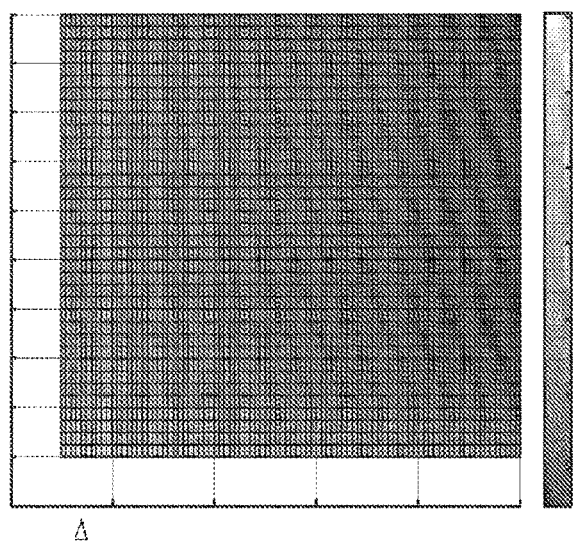

The summation of Panels (a) and (b) in FIG. 60 provide the total energy loss through both the exterior insulation as well as the char outlet. Comparing this quantity with the original energy lost in the char-cooling segment without air-preheating, the fraction of energy saved from the original loss can be computed. This quantity is plotted in FIG. 61. There may be energy saving (from 68-82% of the original energy loss without pre-heating) due to implementing air pre-heating. This savings may be enhanced when the air channel width is small, and/or the char-cooling segment length is short. It may also be desirable for the cooling char to emerge from the reactor in a manner that is safe to handle. From FIG. 59 above, for the laboratory-scale reactor, it can be seen that for torrefied biomass to emerge at a temperature of no more than 50° C., then the minimum viable char-cooling length will be around 0.5 m. This length, combined with an air channel width of 1 cm, gives a 75% saving in energy loss compared to the default design case without air pre-heating in place.

5.5 Characterizing and Mitigation Losses and Emissions from the Exhaust

Finally, the energy losses from the escaping exhaust gases ($CO_2$, $H_2O$, other post-combustion products, as well as unburned volatiles) are considered. These losses may come in the form of (a) sensible enthalpy loss (residual heat from the reactor being carried away by the exhaust gases at a higher-than-room temperature, and/or (b) chemical enthalpy loss (unreacted escaped volatile gases that have a positive higher heating value).

5.5.1 Measuring the Sensible Enthalpy Loss

Figure 62:
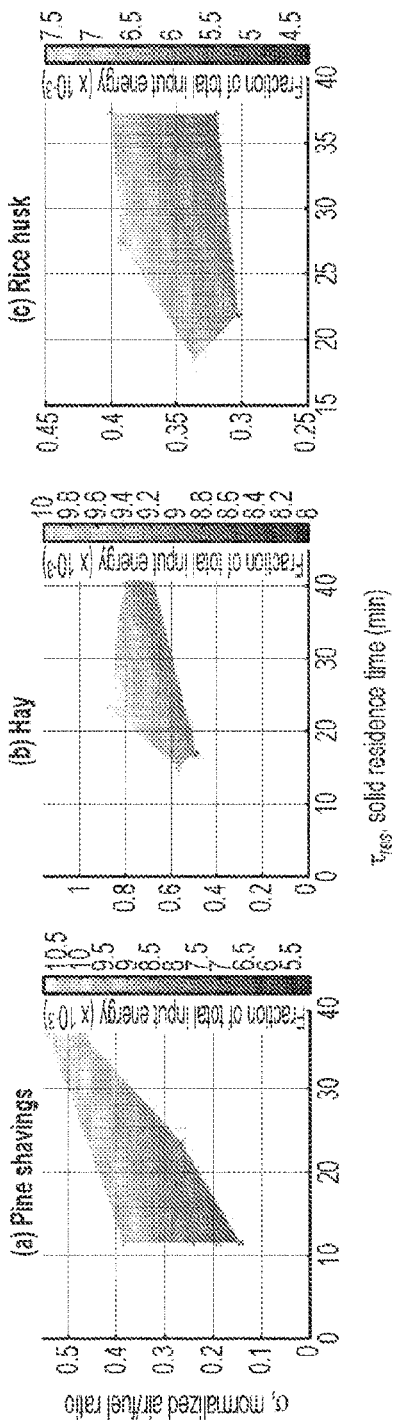
FIG. 62 shows charts showing energy losses associated with exhaust for certain types of biomass, according to some embodiments.

A thermocouple was placed at the exit of the reactor assembly and monitored the exit temperature of the exhaust stream under different reactor operating conditions. FIG. 62 plots the calculated energy losses due to the sensible heat from the exhaust stream. The temperature of the exhaust stream increases as the torrefaction becomes more severe, and thus the overall sensible energy loss also increases. However, this energy loss generally occupies a very small fraction of the total solid energy flow through the reactor system, typically no more than 1%.

5.5.2 Measuring the Chemical Enthalpy Availability

Figure 63:
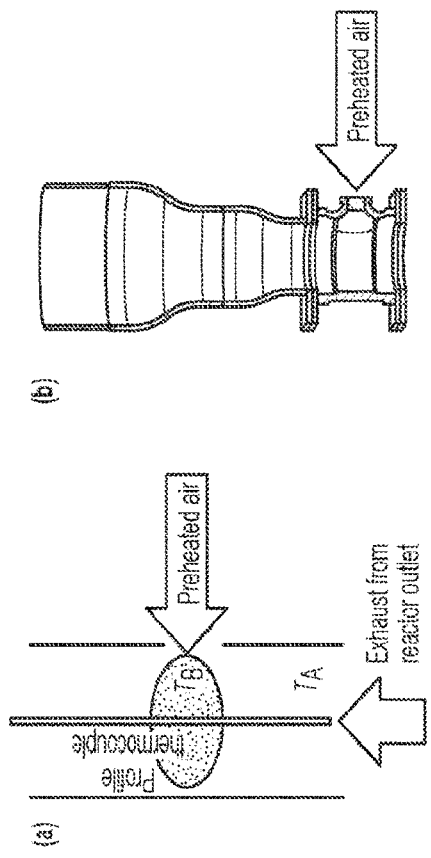
FIG. 63 shows schematic depictions of a reactor, according to some embodiments.

As illustrated in FIG. 63, on top of the reactor outlet, it may be beneficial to build an additional column with a profile thermocouple to monitor the temperature at different axial positions. First, as the warm exhaust gas mixture exits from the reactor at temperature $T_A$. Then, there is a port where a certain amount of preheated air is injected into the column at a specified flow rate. The amount of preheating is adjusted until there is flammability of the exhaust mixture, and the air flow rate is adjusted until a maximum reaction zone temperature $T_B$ is achieved. From the flame temperature, the chemical enthalpy of the unburned volatile gas mixture can be estimated.

Figure 64:
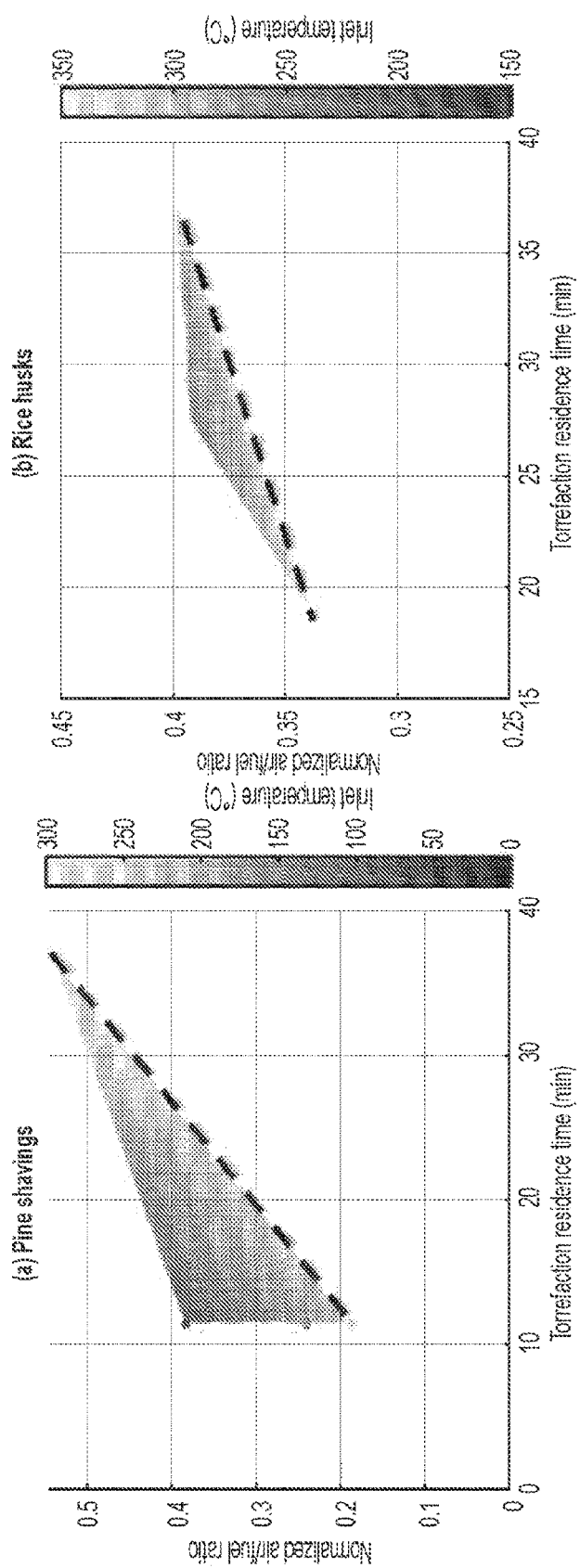
FIG. 64 shows temperatures suitable for oxidizing certain portions of the exhaust generated during biomass decomposition for certain types of biomass, according to some embodiments.

For each type of biomass and reactor condition, the power output of the inline heater element for the secondary air was adjusted, and the minimum viable pre-heating temperature where such a flame can be sustained was noted. In the case of pine shavings, in the severe torrefaction regime, no pre-heating was needed. As the torrefaction reaction became less severe, the required air pre-heating temperature was increased. In some cases, the pre-heating was so intensive (above 300° C.) such that it could not be feasibly achieved using any natural heat exchange mechanism in the torrefaction setup without external energy input. This boundary of feasibility is delineated by the dashed black line in FIG. 64. In the case of rice husks (Panel b), it was generally more difficult than pine shavings to sustain a stable flame: in all conditions in Panel b, a significant amount of pre-heating (at least 200° C.) was required.

Figure 65:
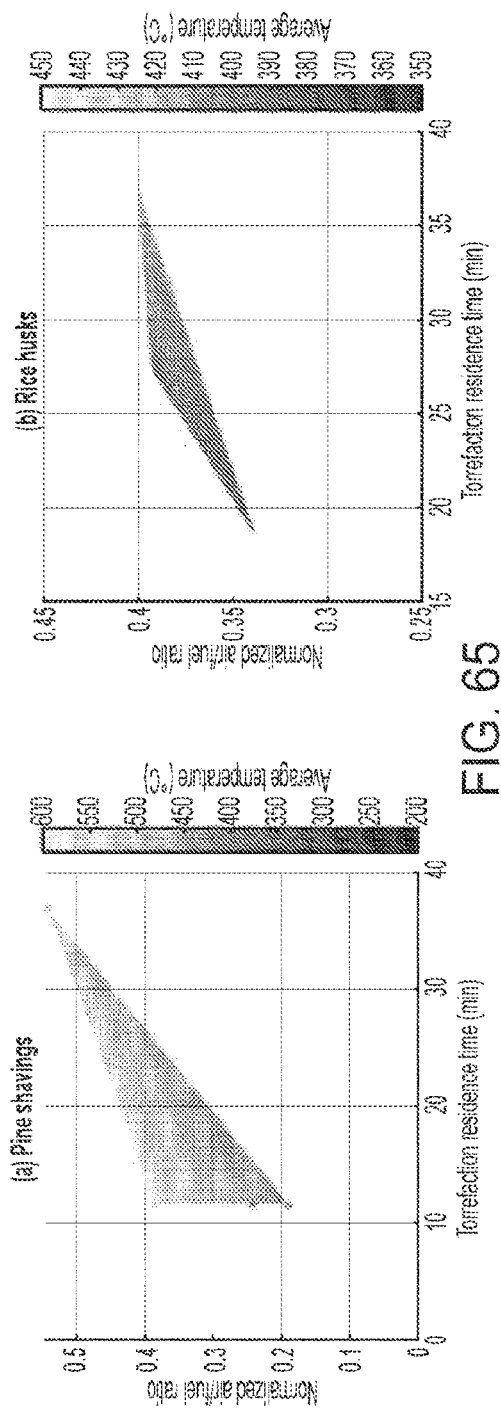
FIG. 65 shows temperatures in a section of a reactor configured to allow for reaction of exhaust gas for certain types of biomass, according to some embodiments.

FIG. 65 shows the flame temperature for different reaction conditions and biomass types. For pine shavings (Panel a), an oxidation at around 600° C. was achievable under the severe torrefaction conditions. As the torrefaction severity reduces, the flame temperature also decreases to around 450° C. whilst the air pre-heating temperature increases. This may signal decreasing chemical enthalpy availability as torrefaction severity decreases. For rice husks (Panel b), the flame temperature is around 400-450° C.

Now, knowing (a) the temperature and mass flow rate of the unburned exhaust stream emerging from the reactor, (b) the pre-heating temperature and mass flow rate of secondary air stream, and (c) the temperature in the secondary oxidation zone, the chemical enthalpy availability $\dot{H}_{chem}$ from the original (native) exhaust stream that can be harnessed by the method of secondary oxidation can be estimated as follows:

$$\dot{m}_{exh}c_{p,exh}(T_{exh}-T_0)+\dot{m}_{air2}c_{p,air}(T_{air2}-T_0)+ \\ \dot{H}_{chem} -(\dot{m}_{air2}+\dot{m}_{exh})c_{p,flue}(T_{flame}-T_0)- \\ \dot{m}_{H2O}\Delta H_{vap}-Q_{loss}=0,$$

where the first term with the subscript "exh" refers to the incoming enthalpy carried by the unburned exhaust emerging from the reactor unit, the second term with the subscript "air2" refers to the incoming pre-heated air, the fifth term refers to the heat of condensation of steam, and the sixth term $Q_{loss}$ refers to the energy loss through the side wall of the secondary oxidation zone, which may be a function of the difference between the oxidation temperature and the ambient air temperature. The third term $\dot{H}_{chem}$ [W] may reflect the difference in chemical availability between the incoming mixture (exhaust and some portion of unreacted volatiles) and the outgoing mixture (exhaust and a much smaller portion of unreacted volatiles), or in other words, the chemical availability that can be harnessed in the secondary oxidation mechanism for useful purpose such as pre-drying biomass.

The mass flow rates of the unburned exhaust, secondary air, and flue gas are all provided from actual measurement and mass balance. In the fifth term, the mass flow rate of steam is obtained from the ultimate (elemental) analysis of the raw biomass and the torrefied biomass, which is used to deduce the elemental composition of the volatile gases and exhaust mixture, of the form $CH_xO_y$. Chemical balance yields the following equation:

$$CH_xO_y+(1+0.25x-0.5y)O_2+3.76\times(1+0.25x-0.5y) \\ N_2 \rightarrow CO_2+0.5x\ H_2O+3.76\times(1+0.25x-0.5y)N_2.$$

This gives an estimate of the final composition of the flue gas, from which the amount of steam in the mixture that would release the enthalpy of condensation in the fifth term can be deduced.

The sixth term, which describes the energy loss from the side wall of the secondary oxidation zone, can be formulated in the same manner as done previously for the case of thermal dissipation through an insulated surface:

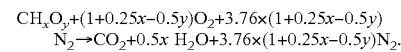

$$Q_{loss} = \frac{2\pi H_{ox}(T_{flame}-T_{amb})}{\frac{1}{h_{flue}R_{ox}}+\frac{\ln(1+\Delta_{steel}/R_{ox})}{k_{steel}}+\frac{\ln(R_{out,ox}/(R_{ox}+\Delta_{steel}))}{k_{ins}}+\frac{1}{h_{flue}R_{out,ox}}},$$

where $H_{ox}$ and $R_{ox}$ are respectively the height and radius of the secondary oxidation zone, and $R_{out,ox}=R_{ox}+\Delta_{steel}+\Delta_{ins}$ is the radius of the outer insulated surface surrounding the secondary oxidation zone.

Figure 66:
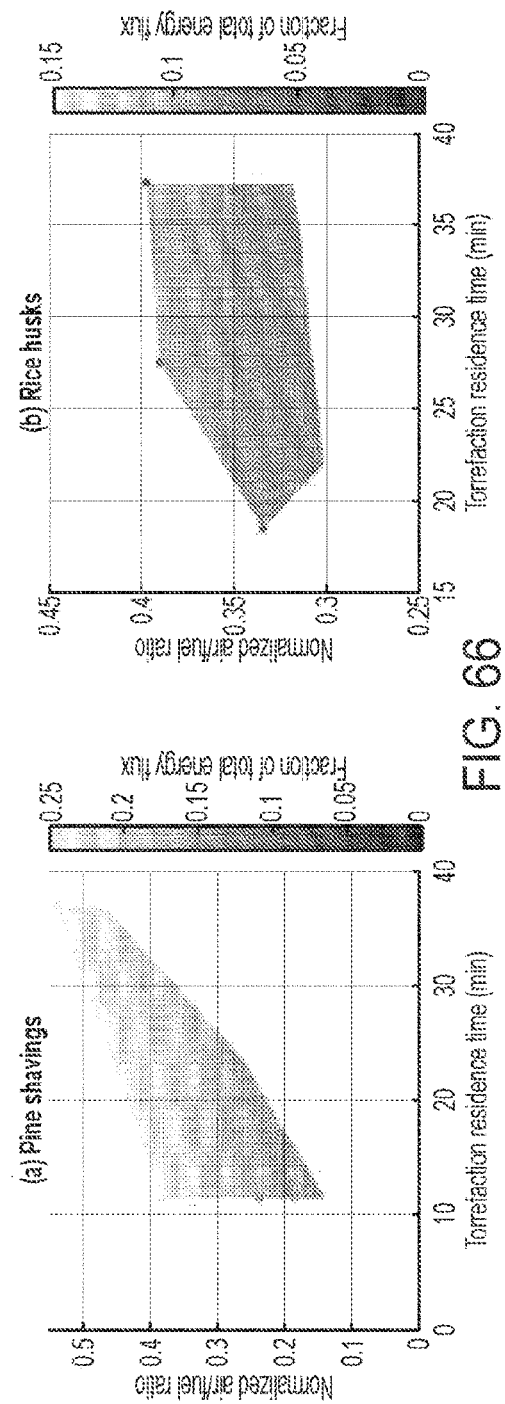
FIG. 66 shows chemical enthalpy that may be harvested by reaction of exhaust produced during biomass decomposition for various types of biomass, according to some embodiments.

FIG. 66 plots this chemical availability term $\dot{H}_{chem}$ as a fraction of the total solid energy flow through the torrefaction reactor under different reaction conditions and biomass types. In regions of flammability delineated in FIG. 66, this value was experimentally determined. Outside of this region of flammability, this value was deduced through linear interpolation in MATLAB.

In general, the total chemical enthalpy availability that can be harnessed by the secondary oxidation mechanism may represent a significant portion of all the losses characterized so far. This chemical availability may be in the range of 10-25% of the total solid energy flow, and/or may increase as the torrefaction severity increases. Rice husks show a lower chemical availability (~10-15%) and a gentler trend of increase compared to the case of pine shavings.

5.5.3 Emission Profiles and Completeness of Secondary Combustion

In the discussion above, it is assumed that the secondary oxidation mechanism reacts any unburned fractions in the exhaust stream virtually to completion. In order to evaluate the completeness of this secondary combustion process, and to characterize the changes in the emission profiles of the post-combustion flue gas, two quantities are tracked: carbon monoxide level, and particulate-2.5 μm (PM-2.5) level. To monitor the carbon monoxide level, a commercial CO datalogger (Lascar EL-USB-CO) was installed inside the exhaust duct approximately 0.5 m above the reactor outlet. Likewise, for monitoring the PM-2.5 level, a UCB particle sensor capable of detecting PM-2.5 down to 25 mg m$^{-3}$ was installed at the same position. A pressure transducer (Omega Engineering PX278-30D5V) was tapped into the exhaust duct to constantly monitor the total gas flow rate. These sensors allow for computation of the dilution ratio employed to back out the actual emission levels emerging from the reactor outlet. The emission levels in the post-combustion flue gas (after secondary oxidation) are compared against those in the reactor's native state (without secondary oxidation).

Figure 67:
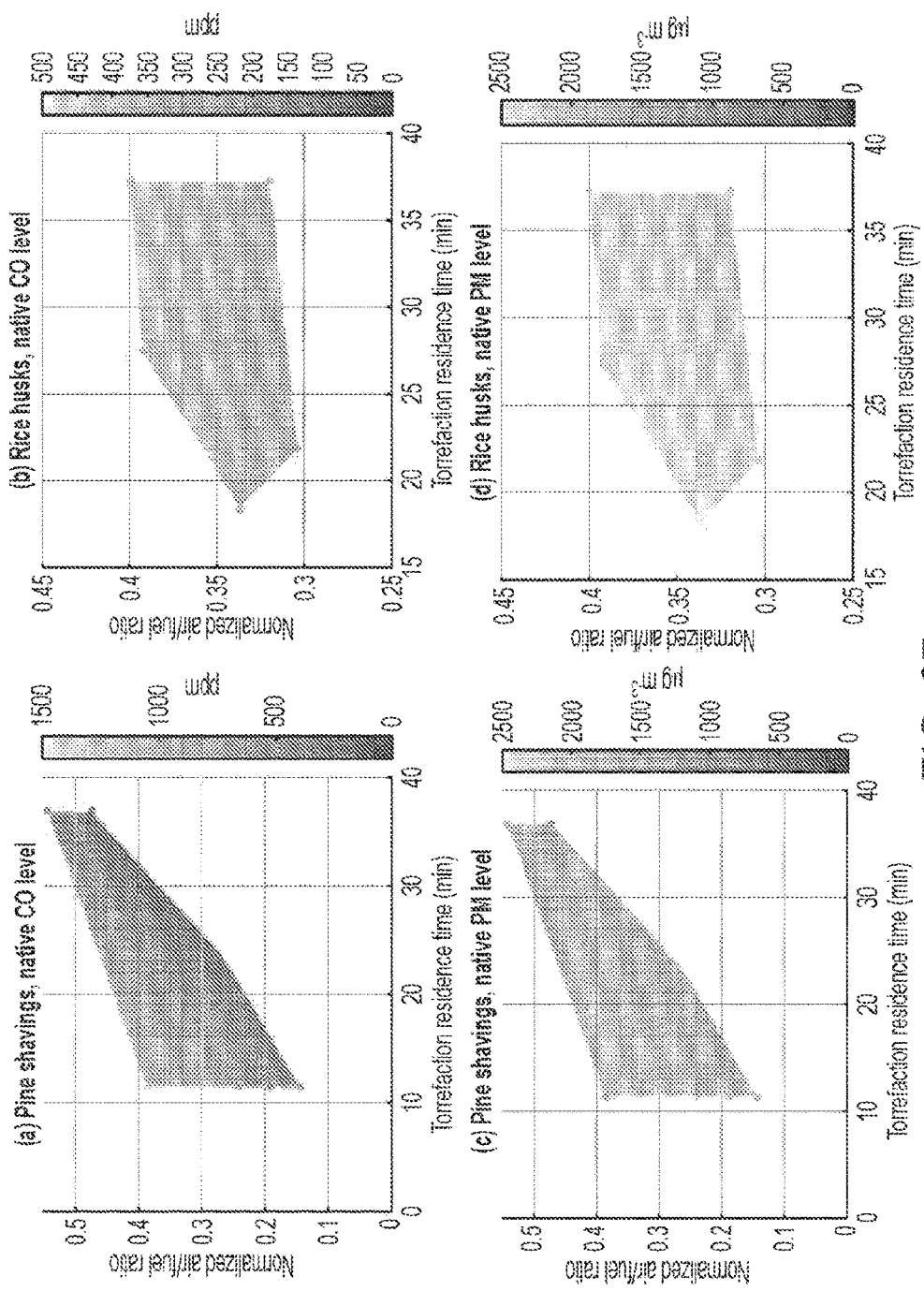
FIG. 67 shows carbon monoxide emission during biomass decomposition for various types of biomass, according to some embodiments.

FIG. 67, shows the measured values of the native (without secondary oxidation) emission profiles of carbon monoxide and particulates emerging from the reactor under different reaction conditions. In this Figure, the emission levels increase as the torrefaction reaction becomes more severe, possibly because more energy may be contained in the unburned volatiles in the exhaust stream under this regime. For carbon monoxide (Panels a and b), under severe torrefaction conditions, the CO level is about tripled than under the moderate conditions. For particulates, in the case of pine shavings, the level is almost doubled. However, for rice husks, the increase is more gentle, from about 1,800-2,500 μg m$^{-3}$. These differing trends may reflect the intrinsic chemical differences and combustion characteristics of bulk pine shavings and rice husks.

Figure 68:
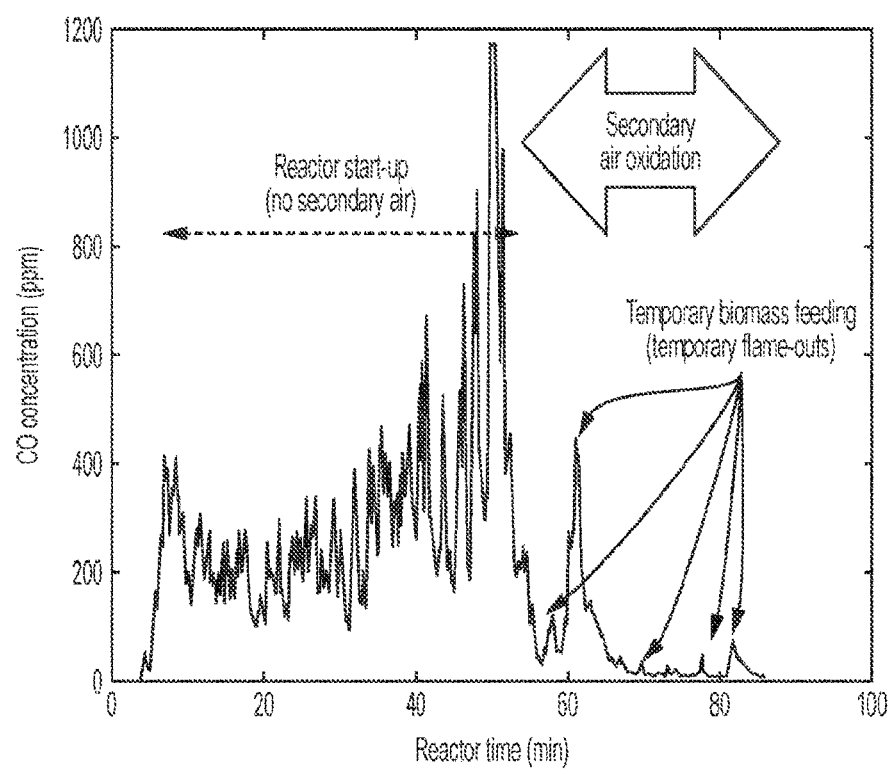
FIG. 68 shows carbon monoxide emission as a function of time during biomass decomposition, according to some embodiments.

FIG. 68 shows a sample trace of the measured CO level under a representative torrefaction reactor operation (pine shavings, $\tau_{res}$=12 min, σ=0.37). In the first part of the time trace (t<60 min), the reactor was warming up to a steady-state level, and no secondary oxidation was implemented. Then, the CO level was consistently high, and increased to above 1000 ppm as the reactor approached the steady-state condition. After the start of the secondary oxidation mechanism, there was a drop of CO levels generally to less than 100 ppm. Even during this period, they were a few spikes in the CO level. These spikes correspond to the temporary flame-outs in the secondary oxidation flame as raw biomass was fed into the reactor through the secondary oxidation zone. During later analysis, these spikes were removed from consideration by including the stabilized CO levels 30 seconds after a stable secondary oxidation flame was observed. FIG. 68 shows a reduction in the CO emission after the onset of secondary oxidation.

The ratio of the mean emission level (CO and particulates) with secondary oxidation to the mean emission level (CO and particulates) in the reactor's native state without secondary oxidation was computed while accounting for the differences in the air dilution factor in the exhaust hood.

Figure 69:
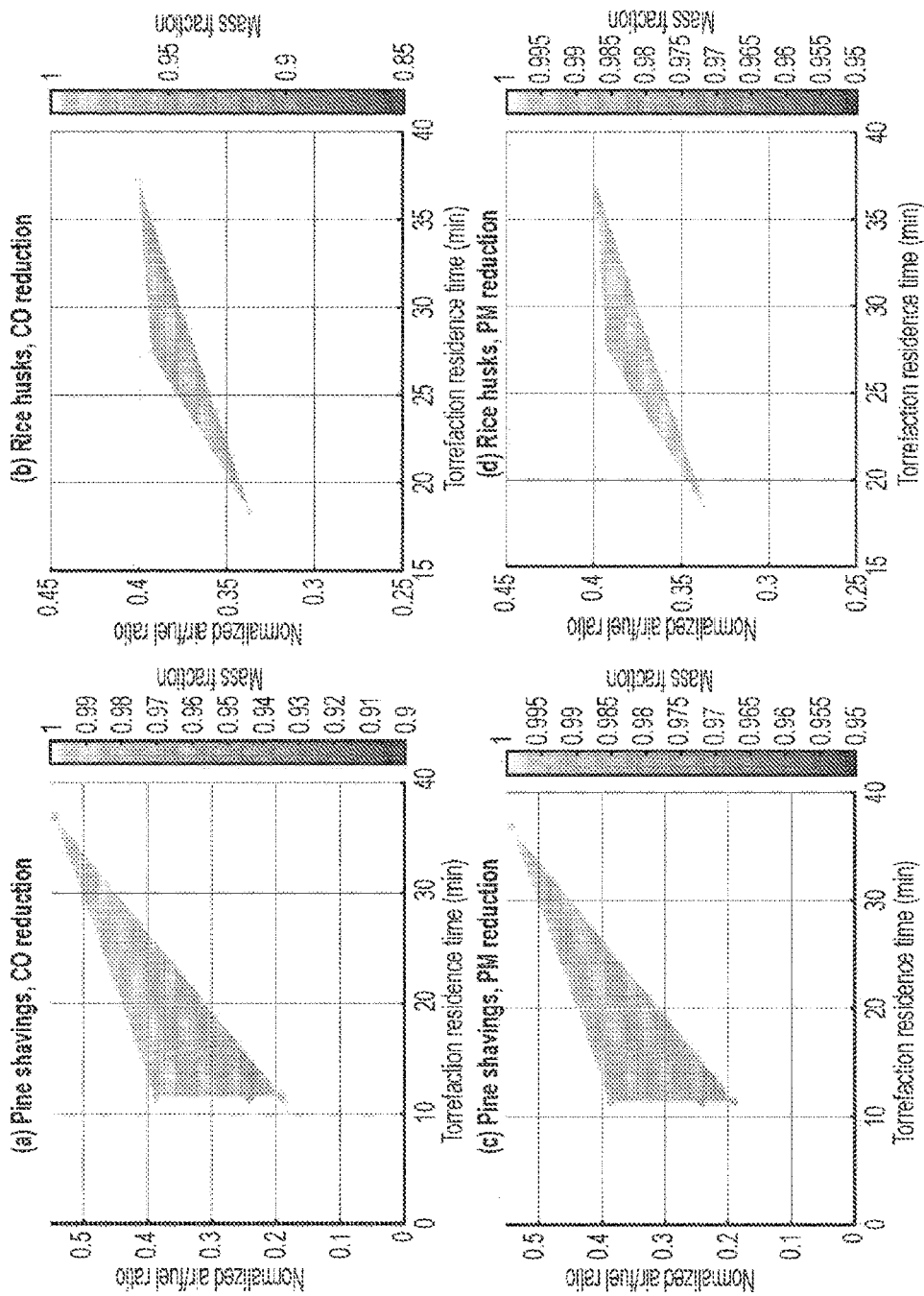
FIG. 69 shows charts showing the percent reduction in carbon monoxide emission and percent reduction in particulate emission when exhaust gas is oxidized during decomposition of various types of biomass, according to some embodiments.

FIG. 69 shows the percentage reduction in the emissions (CO and particulates) from the native reactor operation without secondary oxidation. These figures can also be used, on the first-order approximation, as proxy for quantifying the completeness of combustion in the secondary oxidation mechanism (and/or the percentage of chemical availability that can be harnessed by the secondary oxidation). There may be a reduction of 95-98% in carbon monoxide emission and/or of 97-99% in the particulate emission with the onset of secondary oxidation. As the torrefaction becomes less severe, the emission reduction (and/or the completeness of reduction) may become reduced. It is believed that during lower oxidation temperature under the mild torrefaction regime, oxidation kinetics proceed at a slower rate. It is also believed that within a certain gas residence time, the combustion will be less complete under such conditions.

5.5.4 Discussion on Energy Losses in the Exhaust Stream

It may be possible to capture between 10-25% of the total solid energy flow from the uncombusted volatiles. Secondary oxidation may reduce the emission (in terms of carbon monoxide and particulates) by above 95%.

Figure 70:
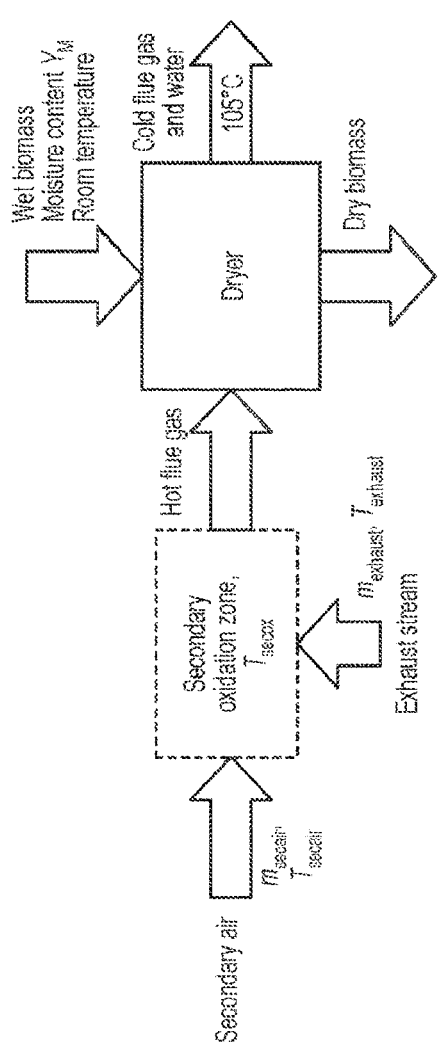
FIG. 70 is a schematic depiction of various inputs and outputs to systems configured for biomass decomposition, according to some embodiments.

It is possible for excess heat can be redirected for other purposes such as pre-drying the incoming biomass. Pre-drying the biomass before it enters into the reactor may reduce the amount of dilution of the combustible fraction in the exhaust stream and/or improve the secondary oxidation zone stability and completeness of combustion. To demonstrate how this could work with pre-drying the biomass, a simplified process model for pre-drying biomass before it enters into the reactor was constructed, as shown in FIG. 70. For each reactor operation condition, a certain flow rate, temperature of the exhaust, and temperature of secondary air are obtained.

Figure 71:
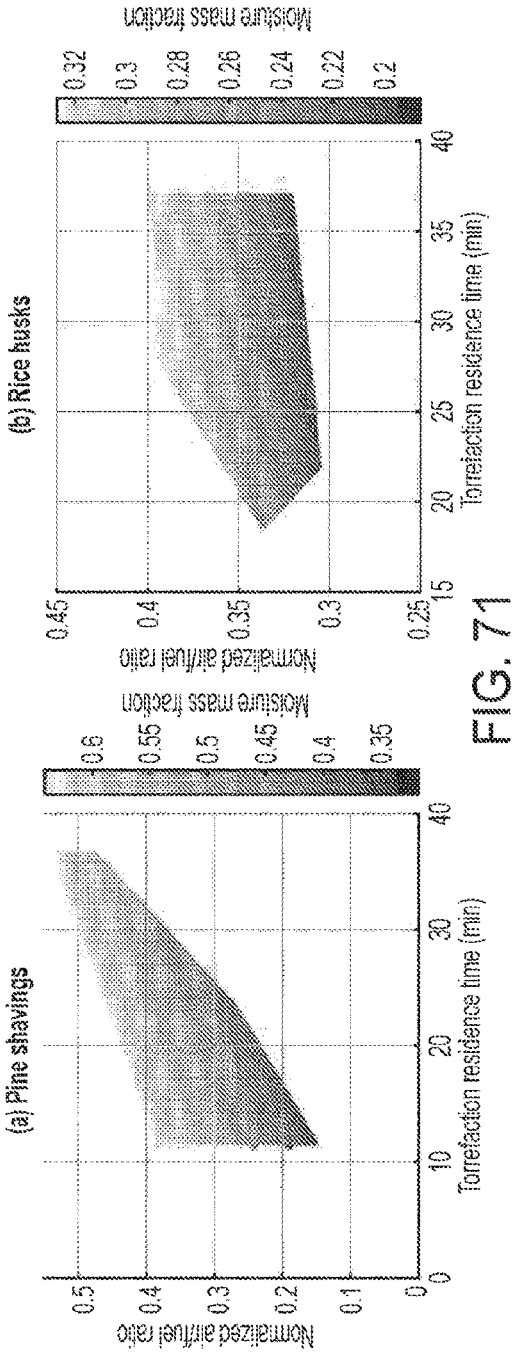
FIG. 71 shows biomass levels of moisture at which suitable biomass decomposition may occur as a function of normalized air to fuel ratio and torrefaction residence time for certain types of biomass, according to some embodiments.

An overall system energy balance calculation was implemented in MATLAB, the results from which are displayed in FIG. 71. By harnessing the sensible heat from the flue gas emerging from the secondary oxidation zone, it may be possible to pre-dry incoming biomass with a moisture content of up to 60% for pine shavings, and up to 32% for rice husks. As torrefaction severity is increased, the system may be capable of supporting pre-drying of feedstock with increased moisture content. It is possible that part of the reactor condition selection may depend on the original moisture content of the native biomass.

Section 6 Bulk Hydrodynamic Characteristics in a Biomass Moving Bed and their Effects on Scaling Table 9 lists the deduced bulk permeability values of packed biomass beds including several different types of biomass.

TABLE 9

Deduced bulk permeability values of packed biomass bed consisting of different types of biomass.

| Biomass type | Measured permeability |
| --- | --- |
| Pine shavings | (1.5 ± 0.2) x 10$^{-7}$ m$^2$ |
| Hay | (1.0 ± 0.1) x 10$^{-7}$ m$^2$ |
| Rice husk | (8.6 ± 0.2) x 10$^{-9}$ m$^2$ |
| Sawdust | (2.4 ± 0.3) x 10$^{-10}$ m$^2$ |

Loose biomass such as pine shavings and hay typically have a higher measured permeability (around 10$^{-6}$ m$^2$) compared to dense biomass such as sawdust (10$^{-10}$ m$^2$), which is akin to that of typical sand.

6.1 Scaling Pressure Requirements in Torrefaction Reactor

In a scaled-up version of the reactor, air may be drawn into the reactor through a fan ($\Delta P_{forced}$), and/or by the natural stack effect ($\Delta P_{stack}$) due to a hot rising column of air inside the reactor. In this Section, it is assumed that the reactor does not a secondary air oxidation mechanism.

It may be beneficial for the pressure that is supplied to push/pull the air upwards through the reactor ($\Delta P_{forced} + \Delta P_{stack}$) to be enough to counteract against the pressure loss through the porous medium ($\Delta P_{loss,bed}$) and major and minor losses through the rest of the non-biomass-filled stack ($\Delta P_{loss,stack}$):

$$\Delta P_{loss,bed} + \Delta P_{loss,stack} = \Delta P_{forced} + \Delta P_{stack}.$$

It is assumed that the bulk moving bed permeability is approximately constant as a function of temperature. It is also assumed that any variations in the permeability occur within the same order of magnitude in the temperature range of interest. The differential porous pressure drop $d(\Delta P_{loss,bed})$ across a thin axial slice of the reactor dz may be estimated via Darcy's law:

$$d(\Delta P_{loss,bed}) = -d(\Delta P_{porous}) = \frac{\mu(T)Q(T)}{\kappa \pi R_r^2} dz = \frac{\mu(T)Q_0}{\kappa \pi R_r^2} \frac{T}{T_0} dz,$$

where the volumetric flow rate Q(T) of the gas at temperature T to that ($Q_0$) at the reference temperature $T_0$ can be determined by applying the ideal gas law:

$$Q(T) = \left(\frac{T}{T_0}\right) Q_0.$$

The Sutherland equation is used to model the temperature dependence of the viscosity term µ, $$\mu(T) = \frac{kT^n}{T+C}$$

where the constants k, C, and n are given in the literature such as Bonilla et al. (1951). For the calculation below, $k = 1.458 \times 10^{-6}$ kg m$^{-1}$ s$^{-1}$ K$^{-1/2}$, C=110.4 K, and n=1.5.

Integrating both sides, and rewriting the air flow rate in terms of the desired solid (biomass) flux and the normalized air/fuel ratio, and hence, in terms of the solid residence time, the following equation is obtained:

$$\Delta P_{loss,bed} = \frac{\dot{Q}_{air,0}}{\kappa \pi R_r^2 T_0} \int_0^{H_r} T(z)\mu(T(z))dz = \frac{H_r(AF)_{stoic}}{T_0} \left(\frac{\rho_{BM}}{\rho_{air}}\right) \frac{\sigma}{\tau_{res}} \int_0^{H_r} T(z)\mu(T(z))dz,$$

where $(AF)_{stoic}$ is the mass ratio of air to biomass at stoichiometric combustion of the latter. As the normalized air/fuel ratio increases, more air may go through the reactor system. As the solid residence time is reduced, the air flow rate may increase in order to keep up with the increase in the overall biomass flow rate. As more air is driven through the biomass moving bed, the pressure loss is increased. It is assumed that the biomass moving bed height $H_r = 1$ m. The viscosity of the volatile and exhaust gas mixture is using the kinetic mechanism and transport model proposed by Anca-Couce et al. (2014) for different types of biomass under the torrefaction regime. The viscosities may depend more strongly on temperature than gas composition.

Figure 72:
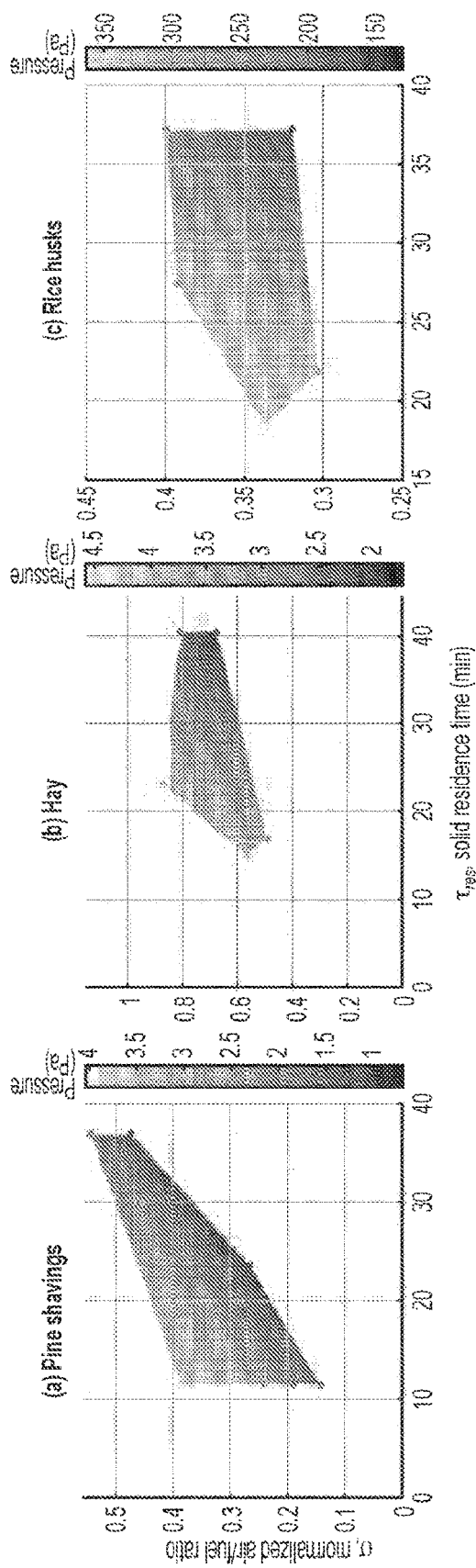
FIG. 72 shows projected pressure loss across a moving bed reactor as a function of normalized air to fuel ratio and solid residence time, according to some embodiments.

FIG. 72 shows the projected pressure loss incurred across the biomass moving bed under different torrefaction reaction conditions for (a) pine shavings, (b) hay, and (c) rice husks. The pressure loss may be modulated by the bulk bed permeability: it is around 1-5 Pa for loose biomass such as pine shavings and hay, and around 100-300 Pa for dense biomass such as rice husks. Then, for each given type of biomass, it is observed that the pressure loss increases as the normalized air/fuel ratio increases (increasing torrefaction severity) and as the solid residence time decreases. It is believed that the pressure loss is related to the amount of gas flow through the biomass moving bed. As the torrefaction severity increases, there may be more air inflow for a given biomass flow rate. Furthermore, as the solid residence time decreases, the biomass may flow through the reactor at a higher rate, and therefore, the normalized air/fuel ratio may be maintained by increasing the flow rate of air through the moving bed.

$\Delta P_{loss,stack}$ describes the major and minor losses that occur in the non-biomass-filled portion of the stack. Assuming that the chimney height $H_c$ is greater than the biomass bed height $H_r$, and assuming a laminar flow regime:

$$\Delta P_{loss,stack} = \left(\frac{f(H_c - H_r)}{4R_r} + \frac{1}{2}\right) \rho v_{exhaust}^2 = \frac{16\mu v_{exhaust}}{R_r} + \frac{\rho v_{exhaust}^2}{2},$$

where the friction factor f=64/Re is approximated by applying Poiseuille's law. Here, the first term on the right-hand side is the major loss in the chimney length, while the second term is the exit loss at the top of the chimney. The velocity of the exhaust mixture can be rewritten as a combination of the reactor design parameters as well as the performance factor (e.g., solid mass yield, $Y_M$):

$$v_{exhaust} = \frac{(\sigma(AF)_{stoic} + 1 - Y_M)H_r}{\tau_{res}} \frac{\rho_{BM}}{\rho_{exhaust}} \left(\frac{R_r}{R_c}\right)^2.$$

Figure 73:
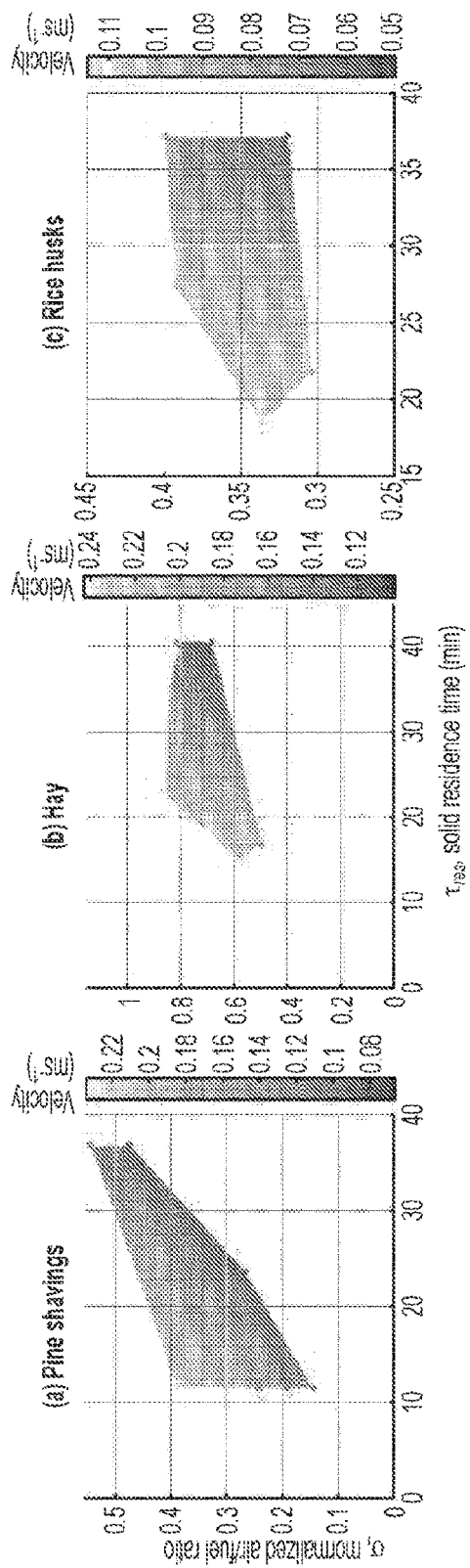
FIG. 73 shows estimated exhaust stream velocity as a function of normalized air to fuel ratio and solid residence time, according to some embodiments.
Figure 74:
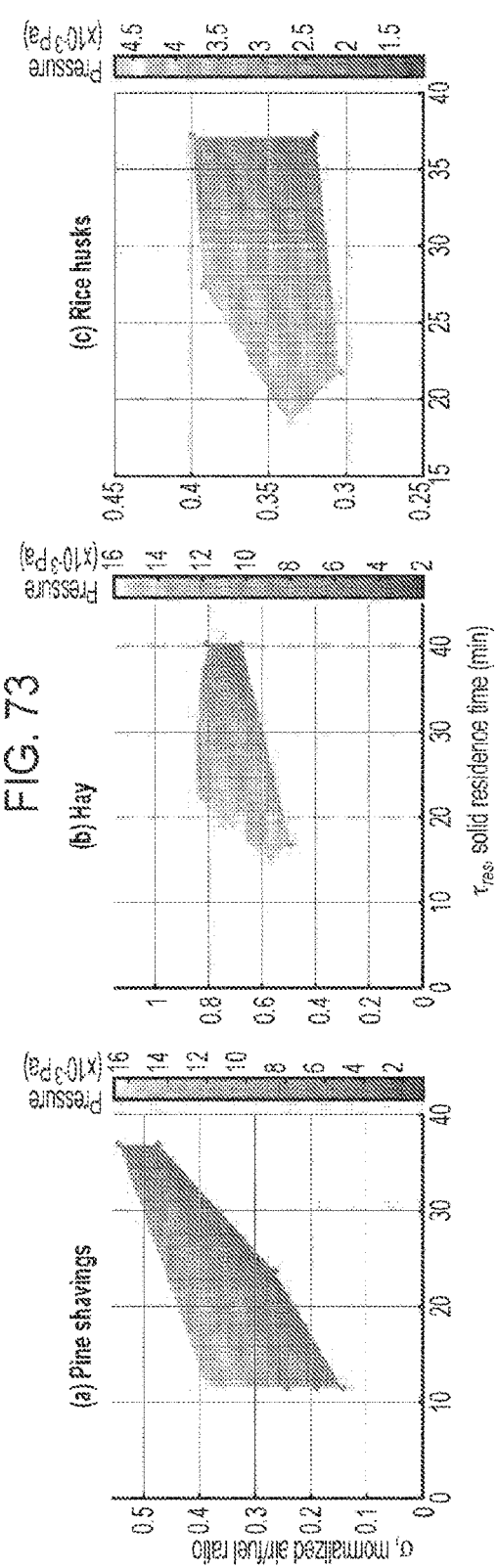
FIG. 74 shows estimated pressure loss in a chimney as a function of normalized air to fuel ratio and solid residence time, according to some embodiments.

The exhaust velocities under different reaction conditions for different types of biomass are plotted in FIG. 73. For each type of biomass, the velocities are between 0.03 to 0.22 m s$^{-1}$. The velocity tends to increase as the solid residence time decreases and as the normalized air/fuel ratio increases, possibly due to increased flow. $\Delta P_{loss,stack}$ can be calculated under different reaction conditions from the measured velocities, as shown in FIG. 74. The observed pressure losses in the chimney segment and the exit pressure losses increase as a function of reducing solid residence time and increasing normalized air/fuel ratio. The general range of values is between 0.002 to 0.017 Pa.

$\Delta P_{stack}$ can be derived from first principles and then expressed in terms of the reactor design parameters. The inside of the reactor is assumed to be at an elevated temperature $T_H$ with a lower gas density of $\rho_H$, and the ambient air is assumed to be at a colder temperature $T_H$ with a higher gas density of $\rho_C$. The net stack effect may arise due to the hot column of air (dictated by the overall height of the hot air column $H_r + H_c$) at a lighter density:

$$\Delta P_{stack} = (\rho_C - \rho_H)gH_c = \frac{p_{atm}}{R}\left(\frac{MW_C}{T_C} - \frac{MW_H}{T_H}\right)g(H_r + H_c),$$

where R is the gas constant, and $MW_C$ and $MW_H$ are the mean molecular weights [kg mol$^{-1}$] of the cold and hot gases, respectively. In this case, the cold gas is ambient air. The molecular weight of the hot gas (reactor exhaust) can be calculated by knowing the (a) mass flow rate of the gas, (b) volumetric flow rate of the gas, and (c) temperature profile of the gas. The following approximation is employed: $MW_H \approx MW_C = 0.029$ kg mol$^{-1}$ (Klote, 1991; Chu, 2017).

Figure 75:
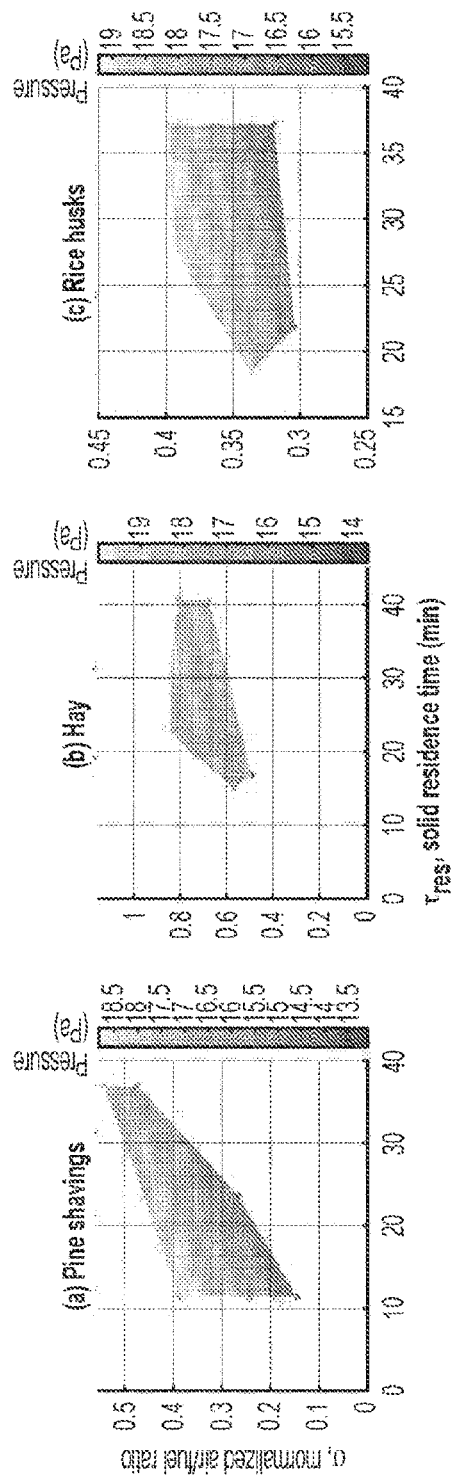
FIG. 75 shows estimated natural stack effect magnitude as a function of normalized air to fuel ratio and solid residence time, according to some embodiments.

In FIG. 75, the estimated natural stack effect is plotted in terms of the pressure drive [Pa]. The general range of values is between 13 to 22 Pa for each type of biomass. It is believed that the natural stack effect has less to do with the physical properties of biomass, and rather with the elevated temperature inside the reactor. As the normalized air/fuel ratio increases, the reactor temperature may also increase, which may lead to a larger natural stack effect, as observed.

The values in FIG. 72 (pressure losses across the moving bed) are compared to those in FIG. 75 (magnitudes of the natural stack effect neglecting the major and minor losses in the chimney stack). Table 10 summarizes the typical ranges of estimated values. These values differ for different types of biomass. The bulk permeability of the moving bed may affect the estimate and/or may affect the pressure loss in the moving bed. For pine shavings and hay, the natural stack effect provides sufficient drive. For rice husks, which have a bulk permeability that is 2 orders of magnitude lower, the pressure loss across a moving bed constituted of rice husks is two orders of magnitude higher. The natural stack effect may be insufficient to provide sufficient flow to overcome this resistance to flow. For rice husks and certain other types of biomass with smaller particle sizes and bulk permeability constants, it may be beneficial to employ an external forced air mechanism to provide some of the pressure drive for flow through the moving bed.

TABLE 10

Pressure calculations for various types of biomass

| Biomass type | Pressure loss in moving bed | Pressure drive due to stack effect |
| --- | --- | --- |
| Pine shavings | 1-4 Pa | 13-19 Pa |
| Hay | 1-5 Pa | 14-20 Pa |
| Rice husks | 130-360 Pa | 15-20 Pa |

6.2 Discussion

From estimated the pressure losses across the moving bed, it was determined that for loose biomass such as pine shavings and hay, the stack effect may be able to provide sufficient flow of air to the reactor. On the other hand, in the case of dense biomass such as rice husks, an external pressure drive may be beneficial.

It is believed that pressure losses may be reduced by making the bed shorter. It is also believed that the natural stack effect can be increased by increasing the height of the chimney. Implementing secondary air oxidation in the reactor assembly may cause secondary combustion to occur at a higher temperature, which may provide a further boost to the natural stack effect in the upper section of the reactor. It is believed that the stack effect only scales linearly with increasing chimney height.

Section 7 Characterization of Transition Timescales in Scaling Biomass Reactor Operations The thermal mass of the reactor may affect the reactor's temporal response to changes. In some cases, a method in which biomass is continually fed into the reactor may be less efficient than other methods.

7.1 Transient Response of the Reactor System

In certain cases, reactors may be brought to a steady state from a cold state. If start up is slow, the output product may not be subject to the steady state reaction condition for a period of time.

7.2 Analysis of Reactor Thermal Mass

The test reactor has an inner radius $R_r=2$ inches (5.1 cm) and is made from of ¼-inch-thick (0.64 cm) stainless steel 304. Then outside of the stainless steel wall, the reactor is surrounded by a formable ceramic insulation sheet that is about 1 inch (2.5 cm) thick. It is assumed that the reactor is completely filled with biomass (pine shavings, which has a bulk moving bed density of 30 kg m$^{-3}$). Table 11 illustrates calculation of the heat capacity (thermal mass) [J K$^{-1}$] from these data. The volumes of the three components in the laboratory-scale reactor are comparable (on the order of 10-100 cm$^3$), but the density of the stainless steel is almost two orders of magnitude higher than either the biomass or the insulation material. Even though, stainless steel has a lower specific heat capacity compared to the other two materials, ultimately, it contributes to about 84% of the system's thermal inertia at the laboratory scale.

TABLE 11

Calculation of the various components of the thermal mass comprising the laboratory-scale reactor assembly.

| Components | Biomass (pine shavings) | Metal (stainless steel 304) | Insulation (AlSi ceramic) |
| --- | --- | --- | --- |
| Volume | 49 cm$^3$ | 13 cm$^3$ | 68 cm$^3$ |
| Density | 30 kg/m$^3$ | 8,050 kg/m$^3$ | 96 kg/m$^3$ |
| Mass | 0.15 kg | 11 kg | 0.65 kg |
| Specific heat capacity | 1,300 J K$^{-1}$ kg$^{-1}$ | 452 J K$^{-1}$ kg$^{-1}$ | 1,130 J K$^{-1}$ kg$^{-1}$ |
| Heat capacity | 190 J K$^{-1}$ | 4,800 J K$^{-1}$ | 740 J K$^{-1}$ |

Table 12 shows the relative contributions of each of the three components for three different dimensions of the reactor. As the reactor scales up, the amount of biomass that resides within the reactor volume at a given time is proportional to R. It is assumed that both metal and insulation have thicknesses $\Delta_i$ that are small compared to the overall reactor dimension $R_r$ (thin cylindrical shell approximation where $\Delta_i \ll R_r$), and so it is assumed that their masses scale linearly with the reactor radius as $\sim 2\pi R_r \Delta_i$. As the reactor scales up, the relative contribution of biomass to the overall thermal mass goes up to 43% while that of metal and insulation decreases. At a scale of 200 kg h$^{-1}$, the metal wall contributes to more than half of the system's overall thermal inertia. A high thermal inertia may cause longer lags in starting up, cooling down, and/or making general adjustments to the reactor.

TABLE 12

Relative contributions of the different components to the total thermal inertia of the reactor, as a function of the reactor scale.

| Reactor dimension | Mass flow rate | Biomass contribution | Metal contribution | Insulation contribution |
| --- | --- | --- | --- | --- |
| 10 cm (dia) × 60 cm (L) | 0.5 kg h$^{-1}$ | 3% | 84% | 13% |
| 50 cm (dia) × 90 cm (L) | 13 kg h$^{-1}$ | 16% | 75% | 9% |
| 2 m (dia) × 120 cm (L) | 200 kg h$^{-1}$ | 43% | 51% | 6% |

The thermal mass is a product of the following material characteristics: density, volume, and specific heat capacity. As used herein, a "lightweight design scenario" is a scenario in which the wall has a thickness of one-sixteenth of an inch. This scenario cuts down the relative contribution of metal to the overall thermal inertia by a factor of four. Table 13 shows the updated relative contributions from the different materials to the total thermal mass in this lightweight design scenario.

TABLE 13

Relative contributions of the different components to the total thermal inertia of the reactor, as a function of the reactor scale, in the lightweight design scenario.

| Reactor dimension | Mass flow rate | Biomass contribution | Metal contribution | Insulation contribution |
|---|---|---|---|---|
| 10 cm (dia) × 60 cm (L) | 0.5 kg h$^{-1}$ | 10% | 56% | 34% |
| 50 cm (dia) × 90 cm (L) | 13 kg h$^{-1}$ | 36% | 42% | 21% |
| 2 m (dia) × 120 cm (L) | 200 kg h$^{-1}$ | 70% | 20% | 10% |

7.3 Starting a Reactor from Cold State

If, during the start-up transition phase, biomass is continuously flowed through the system under a small normalized air/fuel ratio $\sigma<1$—as during the steady-state torrefaction process—then some of the biomass may not be completely torrefied. Bringing the normalized air/fuel ratio to stoichiometric combustion ($\sigma\sim1$) may completely combust biomass that may be otherwise unusable (which may provide energy suitable for starting the reactor up) and/or may maximize the flame temperature (which may heat up the reactor thermal mass more aggressively).

Figure 76:
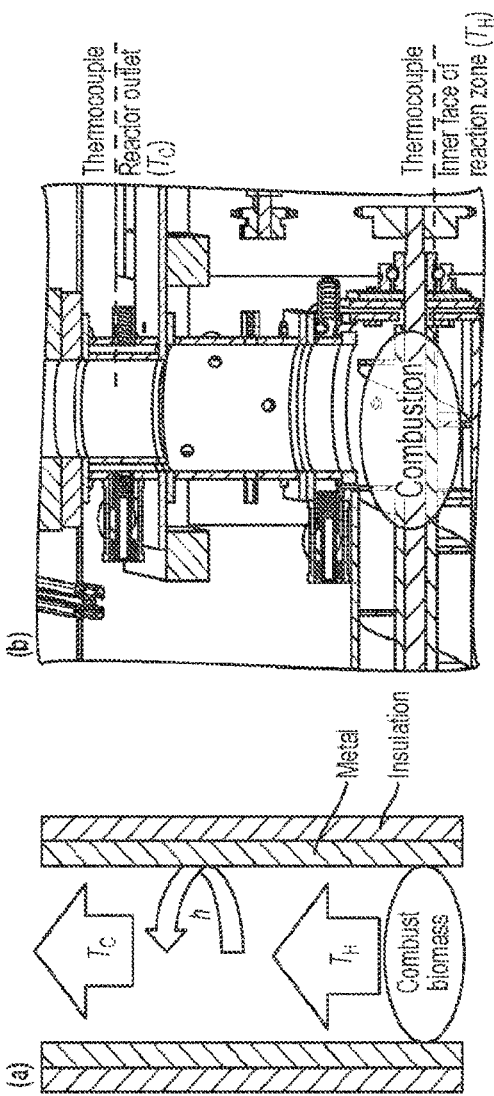
FIG. 76 shows a schematic depiction of a reactor and a schematic depiction of a system configured for biomass decomposition, according to some embodiments.

The heat transfer model shown in FIG. 76A was employed. Here, it is assumed that the reactor wall is hottest at the bottom and is at a temperature $T_H$ there. It is estimated that there is some bulk convective transfer coefficient h between the reactor wall and the upflowing post-combustion flue gas, such that when the flue gas escapes from the reactor, it has been cooled to a temperature $T_C$. FIG. 76B shows the corresponding experimental setup. The start-up procedure was tested under two different biomass mass fluxes (which may have different power outputs for heating up the reactor): 4 g s$^{-1}$ m$^2$, and 6 g s$^{-1}$ m$^2$. Once the biomass flux was specified, the air flow rate was adjusted to provide an approximately stoichiometric combustion ($\sigma\sim1$).

Figure 77:
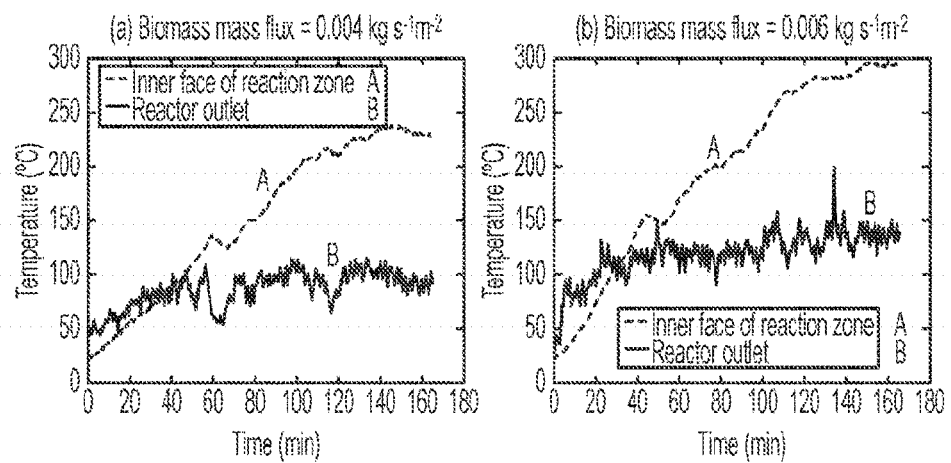
FIG. 77 shows temperature traces inside a reactor and at the reactor outlet, according to some embodiments.

FIG. 77 shows the temperature traces (in time, where t=0 represents starting from the cold state) for the lower biomass flux (4 g s$^{-1}$ m$^{-2}$, FIG. 77A) and for the higher biomass flux (6 g s$^{-1}$ m$^{-2}$, FIG. 77B). In both plots, the red line traces the inner surface temperature of the reaction zone (proxy for $T_H$), and the blue line traces the temperature at the reactor outlet (proxy for $T_C$). In both cases, the reactor heats up on the order of 2 hours, though depending on the biomass flux (power output), the final steady-state temperature is different: it is around 225° C. for a biomass flux of 4 g s$^{-1}$ m$^2$, and about 290° C. for a biomass flux of 6 g s$^{-1}$ m$^{-2}$.

Figure 78:
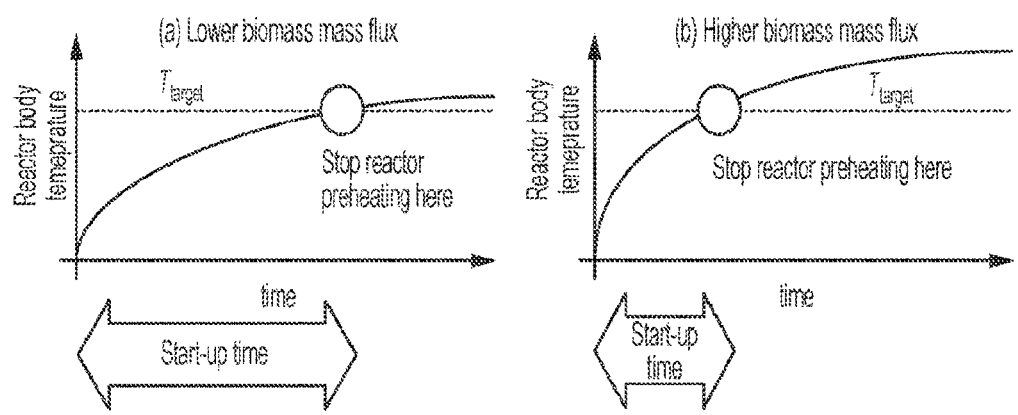
FIG. 78 shows reactor temperature as a function of time when a reactor is operated under various conditions, according to some embodiments.

As FIG. 78 illustrates, there are several options for biomass mass flux, including: (a) a biomass mass flux where the final steady-state temperature is just barely above $T_{target}$, and (b) a higher mass flux with a final steady-state temperature above $T_{target}$ which transitions to the continuous steady-state reactor operation when the reactor temperature reaches the vicinity of the target temperature. The total start-up time required is shorter for scenario b. The total amount of biomass consumed/wasted for starting the reactor up is lesser for scenario a.

It is assumed that heat transfer from the post-combustion flue gas to the reactor can be approximated as a lump sum. This may be true when the Biot number of the reactor assembly is much less than 0.1. This condition may be satisfied when the inner metal wall lining provides rapid heat conduction. In some cases, heating the metal from the post-combustion flue gas is the rate-limiting step in starting up the reactor. The equation below describes that the energy balance of the post-combustion flue gas:

$$\varepsilon_{comb}\dot{m}_{BM}HHV_{BM} = 2\pi R_r L_r h(T_H - T_{metal}) + \dot{m}_{flue}c_{p,flue}(T_C - T_{air}). \quad \text{Eq. 4}$$

Here, the left-hand side represents the heat of biomass combustion (adjusted by a lump-sum efficiency factor $\varepsilon_{comb}<1$); the first term on the right-hand side represents the heat transferred from the post-combustion flue gas to the metal body through the convective heat transfer coefficient h, and this process cools the upflowing flue gas from the original $T_H$ at the reactor core to $T_C$ at the reactor outlet; and finally, the second term on the right-hand side represents the sensible heat loss from the warm flue gas at the reactor exit.

Next, the energy balance of the metal can be written as:

$$m_{metal}c_{metal}\frac{dT_{metal}}{dt} = 2\pi R_r L_r h(T_H - T_{metal}) - \frac{2\pi L_r}{\Omega}(T_{metal} - T_{air}),$$

where the initial condition is $T_{Metal}(t=0)=T_{air}$ in the cold state. Here, the first term on the right-hand side represents the heat transfer from the post-combustion flue gas to the metal body, and the second term on the right-hand side represents the heat loss from the metal body through the insulation material to the ambient air, and this loss is governed by the thermal transfer resistance factor $\Omega$, defined as:

$$\Omega \equiv \frac{\ln(1 + \Delta_{metal}/R_r)}{k_{metal}} + \frac{\ln(1 + \Delta_{ins}/(R_r + \Delta_{metal}))}{k_{ins}} + \frac{1}{h(R_r + \Delta_{metal} + \Delta_{ins})}.$$

Based on FIG. 77, it is believed that the temperature at the reactor outlet—while fluctuating widely throughout—assumes its steady-state temperature at a faster rate than the reactor core (red lines). Therefore, in Eq. 4 above, it can be assumed that $T_C$ is independent of time, and can be represented by some time-independent average value $<T_C>$.

Combining the two equations above, and rearranging the terms yields:

$$\frac{dT_{metal}}{dt} = \frac{\dot{m}_{BM}}{m_{metal}c_{p,metal}}(\varepsilon_{comb}HHV_{BM} - \sigma AF_{stoic}(\langle T_C \rangle - T_{air})) - \frac{2\pi L_r}{m_{metal}c_{p,metal}\Omega}(T_{metal} - T_{air}). \quad \text{Eq. 5}$$

If it is assumed that the heat capacity of the metal does not vary greatly with temperature and that $<T_C>$ can be approximated as a time-independent constant, then the first term on the right-hand side is approximately a constant term (time-independent), while the second term on the right-hand side has a time-dependent $T_{metal}$ term. This equation can be simplified into the linear equation $Y=A-X/\tau_s$, where $$Y \equiv \frac{dT_{metal}}{dt},$$

$$X \equiv T_{metal} - T_{air}, \text{ and}$$

$$\tau_s \equiv \frac{m_{metal} c_{p,metal} \Omega}{2\pi L_r}.$$

Here, the time constant $\tau_s$ represents the response time of the reactor in starting up based on biomass combustion. Table 14 gives the fitting parameters for the two different biomass mass fluxes measured previously.

TABLE 14

Fitted parameters to calculate the reactor start-up response time.

| Biomass mass flux | Fitted value for A | Fitted value for $\tau_s$ |
|---|---|---|
| 4 g s$^{-1}$ m$^{-2}$ | 2.10 ± 0.11 [K s$^{-1}$] | 147 ± 1 [min] |
| 6 g s$^{-1}$ m$^{-2}$ | 3.15 ± 0.12 [K s$^{-1}$] | 114 ± 1 [min] |

The representative time constant is around 2 hours, which is consistent with the earlier observations in FIG. 77. The fitted constants may change as the biomass mass flux changes. It is believed that different temperatures and combustion conditions can affect various factors in Eq. 5.

Eq. 5 includes various reactor's geometrical factors $R_r$ and $L_r$. The new reactor start-up response timescale $\tau_s^*$, given new dimensions $L_r^*$ and $R_r^*$ of the scaled-up reactor, can be approximated as:

$$\frac{\tau_s^*}{\tau_s} = \frac{L_r^*}{L_r} \frac{\Omega}{\Omega^*}, \quad \text{Eq. 6}$$

assuming all other factors (such as choice of insulation material) are held constant. The new reactor start-up response timescale in the lightweight design scenario (where the metal thickness, $\Delta_{metal}$, is 1/16 inches (16 mm)) can be estimated as shown in Table 15.

TABLE 15

Predicted reactor start-up timescales under various reactor dimensions and metal thicknesses (shaded versus non-shaded).

| Metal thickness | BM mass flux | Reactor dimensions (diameter × height) | | |
|---|---|---|---|---|
| | | 10 cm × 60 cm | 50 cm × 90 cm | 2 m × 1.2 m |
| 64 mm (traditional) | 4 g s$^{-1}$ m$^{-2}$ | 147 min | 179 min | 188 min |
| | 6 g s$^{-1}$ m$^{-2}$ | 114 min | 139 min | 146 min |
| 16 mm (lightweight) | 4 g s$^{-1}$ m$^{-2}$ | 52 min | 68 min | 62 min |
| | 6 g s$^{-1}$ m$^{-2}$ | 40 min | 52 min | 48 min |

As the reactor is reduced in weight (e.g., by using less metal), the reactor's start-up response time may be reduced by a factor of 2-3. As a reactor with a metal thickness of ¼-inches is scaled up, the reactor's response time increases. As the biomass flow rate is increased by a factor of 400 (with a 80" reactor diameter), for both biomass fluxes, the reactor's start-up response timescale increases by a factor of 1.3. In the case of the lightweight design scenario, as the reactor scales up, the response timescale initially increases and then decreases at the largest scale (80" compared to 20" in reactor diameter).

In the limit that $R_r$ becomes very large in comparison with $\Delta_{metal}$ and $\Delta_{ins}$, the response timescale can be approximated as $$\tau_s = \frac{\pi L_r ((R_r + \Delta_{metal})^2 - R_r^2) c_{p,metal} \Omega}{2\pi L_r} \rightarrow \frac{c_{p,metal} \Delta_{ins}}{k_{ins}} \Delta_{metal}(1 + \Delta_{metal}).$$

The dependency on $\Delta_{metal}$ may explain the improvement in the reactor's response time in the lightweight design scenario. The lack of dependence on the reactor's dimensions may explain why the response timescale changes little as the reactor scales up: the timescale may asymptotically approach a constant value that depends on the insulation and the metal thickness.

To reach $T_{target}=225°$ C. with a biomass mass flux of $\Phi_{BM}=4$ g s$^{-1}$ m$^{-2}$, from FIG. 77A, the red curve (curve A) takes about $\tau_t=130$ minutes to cross the 225° C. line. For the laboratory-scale reactor with a radius $R_r=2$ inches, the total amount of biomass consumed is $m_{BM}=\pi R_r^2 \Phi_{BM} \tau_t=252$ g. On the other hand, for the biomass mass flux of $\Phi_{BM}=6$ g s$^{-1}$ m$^{-2}$, the red curve (curve A) takes only about $\tau_t=95$ minutes. In this case, the total amount of biomass consumed is 295 kg. In this case, if a higher biomass mass flux is input, there is a 30% decrease in the overall start-up time, but only a 17% increase in the total amount of biomass consumed/wasted for starting the reactor up. Which mass flux to select may depend on the operation needs: when processing a massive amount of biomass for a long time period, time saved during the start-up phase may justify the extra consumption of biomass. When processing a small batch of biomass, and/or for expensive biomass, it may be desirable to have a slower start-up time that also consumes a smaller quantity biomass.

As the reactor scales, biomass may be processed at a higher flow rate. The specific residence time $\tau_r$ is defined as:

$$\tau_r \equiv \frac{\pi R_r^2 \Phi_{BM} \tau_t}{\dot{m}_{BM}},$$

where $\dot{m}_{BM}$ is the steady-state biomass mass flow rate of the reactor. This quantity has the unit of time. This quantity normalizes the total biomass consumed/wasted during the start-up period by the nominal steady-state biomass mass flow rate. This quantity may reflect the time's worth of the amount of biomass consumed/wasted during the start-up period. As an example, for the calculations done above for the base case of the laboratory-scale reactor ($\dot{m}_{BM} \sim 0.5$ kg h$^{-1}$). For the case of the lower biomass mass flux, $\tau_r=252$ g/(500 g h$^{-1}$)~30 min. For the case of the higher biomass mass flux, $\tau_r \sim 35$ min. Therefore, in terms of the amount of biomass consumed/wasted to warm up the reactor, it represents, respectively, 30 and 35 minutes' worth of continuous reactor processing.

TABLE 16

The amount of biomass consumed/wasted to warm up the reactor-expressed in terms of the specific residence time-for different reactor scales for the target temperature of $T_{target} = 225°$ C. for pine shavings.

| Metal thickness | BM mass flux | Reactor dimensions (diameter x height) | | |
|---|---|---|---|---|
| | | 10 cm x 60 cm | 50 cm x 90 cm | 2 m x 1.2 m |
| 64 mm (traditional) | 4 g s$^{-1}$ m$^{-2}$ | 30 min | 35 min | 37 min |
| | 6 g s$^{-1}$ m$^{-2}$ | 35 min | 42 min | 48 min |
| 16 mm (lightweight) | 4 g s$^{-1}$ m$^{-2}$ | 11 min | 13 min | 13 min |
| | 6 g s$^{-1}$ m$^{-2}$ | 12 min | 16 min | 15 min |

Table 16 shows the specific residence time remains relatively constant as the reactor is scaled up.

It generally takes about 2 hours to start up the reactors described in this Example for the standard reactor design, and about 1 hour for the lightweight reactor design (with 1/16″ or 16 mm steel). The amount of biomass consumed may be about 40 and 20 minutes' worth of the steady-state operating time for the two respective scenarios above. These numbers remain relatively constant as the reactor scales up. There may be a trade-off between warming the reactor up with a higher biomass mass flux (reducing the start-up time) and with a lower mass flux (reducing the amount of biomass wasted for starting up).

7.4 Two Methods for Shutting Down the Reactor

Different response times may be appropriate for different reactor shut down scenarios. For example, in the case of a reactor malfunction, and it may be desirable to repair the reactor quickly and safely without affecting the production. In such cases, it may be beneficial to be able to cool down the reactor quickly. In the case of finishing the torrefaction reaction at one farm and immediately moving to a different farm, it may be beneficial for the reactor should stay warm for as long as possible, so that when the unit is moved to the new farm, minimal extra energy is expended to warm up the reactor assembly again.

7.4.1 Keeping the Reactor Warm

To keep the reactor warm, it may be beneficial to fill the reactor core with biomass. When filled, the hot metal wall may have reduced exposure to the outside ambient air. Capping the top of the reactor may reduce the updraft stack effect (FIG. 79A).

Figure 79:
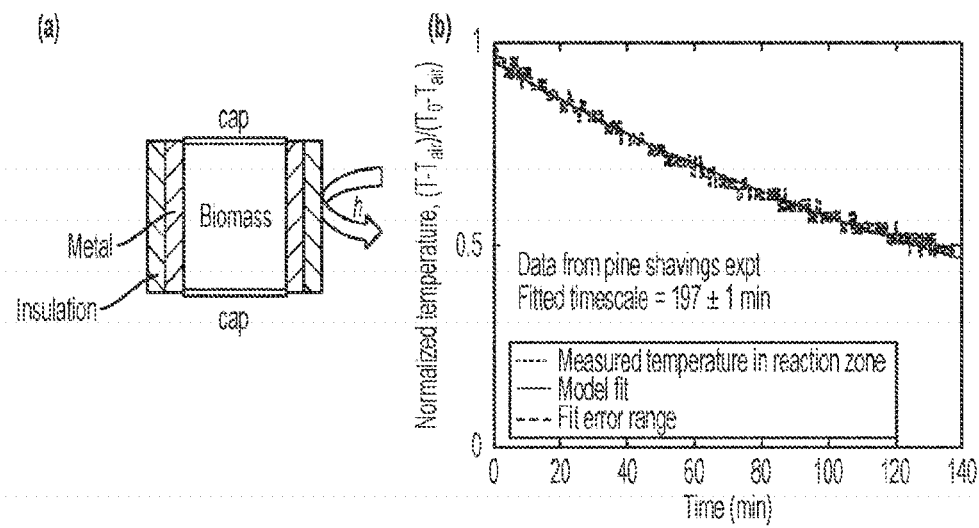
FIGS. 79-80 show schematics of reactors and charts showing normalized reactor temperature as a function of time, according to some embodiments.

FIG. 79B shows a sample experimental temperature trace of the temperature from a thermocouple probe located at the center of the biomass bed at the lower part of the reactor, for a sample pine shavings experiment. Here, the heat loss is relatively slow, and after more than 2 hours, the inner reactor still retains about 50% of the original heat. Assuming that the reactor can be modeled as a simplified lump sum block with a total mass $m_r$, and specific heat capacity $c_{p,r}$, the overall heat loss equation is as follows:

$$m_r c_{p,r} \frac{dT}{dt} = -\left(\frac{2\pi L_r}{\Omega_{ds}} + \frac{2\pi R_r^2}{\Omega_{cap}}\right)(T - T_{air}). \quad \text{Eq. 7}$$

Here, $\Omega_{cap}$ represents the bulk heat transfer resistance offered in the axial direction by the reactor caps. The $\Omega_{dr}$ term in the denominator on the right-hand side depicts the radial heat loss through the biomass bulk, the metal and the insulation layers:

$$\Omega_{ds} \equiv \frac{\ln\left(\frac{R_r}{R_{in}}\right)}{k_{BM}} + \frac{\ln\left(1 + \frac{\Delta_{metal}}{R_r}\right)}{k_{metal}} + \frac{\ln\left(1 + \frac{\Delta_{ins}}{R_r + \Delta_{metal}}\right)}{k_{ins}} + \frac{1}{h(R_r + \Delta_{metal} + \Delta_{ins})}.$$

From Eq. 7, the heat loss timescale $\tau_{ds}$ in this case can be defined as:

$$\tau_{ds} \equiv \frac{m_r c_{p,r}}{\frac{2\pi L_r}{\Omega_{ds}} + \frac{2\pi R_r^2}{\Omega_{cap}}},$$

and Eq. 7 can be solved analytically as a decaying exponential, assuming that the different terms in the equation are temperature-independent. When this exponential is fitted to the experimental data in FIG. 79B, an approximate timescale of 197±1 min is obtained.

Table 17 shows computations for a scaled-up reactor.

TABLE 17

Reactor cooling timescale at different reactor scales and metal thicknesses, in the scenario of keeping the inner core of the reactor warm as long as possible.

| Metal thickness | Reactor dimensions (diameter x height) | | |
|---|---|---|---|
| | 10 cm x 60 cm | 50 cm x 90 cm | 2 m x 1.2 m |
| 1/4 inches (64 mm) | 3.3 hours | 6.0 hours | 8.4 hours |
| 1/16 inches (16 mm) | 1.2 hours | 2.0 hours | 2.8 hours |

Table 17 shows that as the reactor scales up by factor of 400 (in terms of the biomass mass flow capacity), the cooling timescale also increases by a factor of 2.3 to 2.5. At scale, the reactor design made from thicker metal has a cooling timescale that is 3 times greater than the lightweight design, due to the thermal inertia in the metal. If the transit time is shorter than 3 hours, then even in the lightweight reactor design at scale, there is sufficient thermal mass to keep the reactor reasonably warm over that time period. However, if the transit time will be longer than 3 hours, then an intermediate metal thickness between the two investigated in this study may be beneficial.

7.4.2 Cooling the Reactor Quickly

When fast cooling of the reactor is desirable, it may be beneficial to remove the biomass from the inner reactor, and/or to keep the inner metal exposed to the cooling air. When these steps are taken, it may be possible to cool the reactor body both on the inside and the outside (through the outer insulation).

Figure 80:
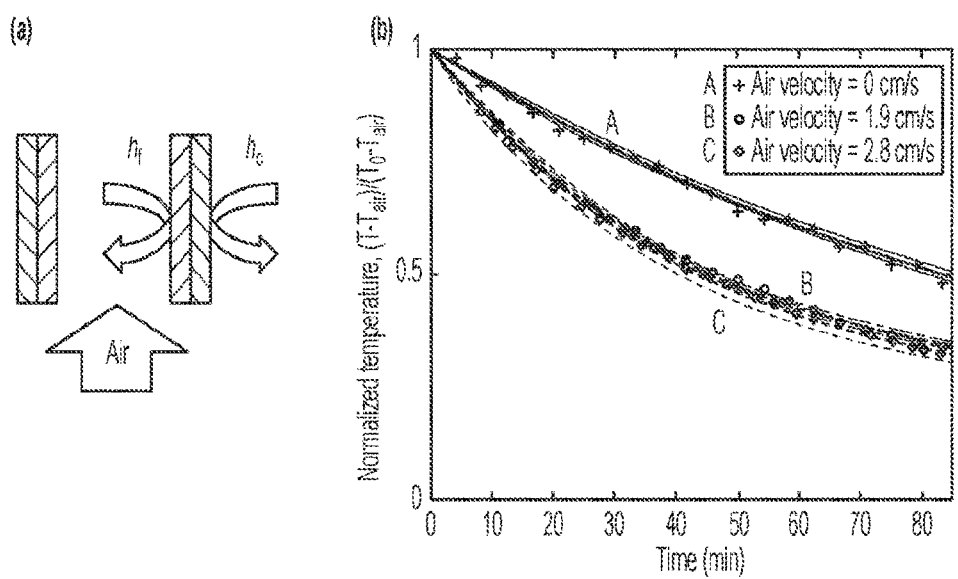

FIG. 80A shows the conceptual illustration of this cooling strategy, and FIG. 80B shows the experimental cooling data. While on the outside, the air is assumed to be relatively still (with convective heat transfer coefficient $h_s$). Inside the reactor, depending on the amount of stack effect and the applied pressure drive, forced cooling can be employed to various extents (given by a convective heat transfer coefficient $h_f$). Here, in this experiment, we let air flow through the reactor at three velocities: 0 cm/s (black), 1.9 cm/s (blue), and 2.8 cm/s (red). The discrete points are real experimental data, while the dashed lines are the exponential curve fits (strategy to be described next) and their error bars.

A heat loss model is built based on FIG. 80A by assuming that the reactor body (metal and insulation layers) can be approximated as a simplified lump sum with total mass $m_r$ and specific heat capacity $c_{p,r}$. The resultant heat loss equation is:

$$m_r c_{p,r} \frac{dT}{dt} = -2\pi L_r \left( h_f R_r + \frac{1}{\Omega_{dr}} \right)(T - T_{air}). \quad \text{Eq. 8}$$

Here, the $h_f$ term on the right-hand side represents heat loss due to forced convection inside the reactor, and the $\Omega_{dr}$ term on the right-hand side represents heat loss through the reactor's outer insulation:

$$\Omega_{dr} \equiv \frac{\ln\left(1 + \frac{\Delta_{metal}}{R_r}\right)}{k_{metal}} + \frac{\ln\left(1 + \frac{\Delta_{ins}}{R_r + \Delta_{metal}}\right)}{k_{ins}} + \frac{1}{h(R_r + \Delta_{metal} + \Delta_{ins})}.$$

When it is assumed that the temperature T is the only time-dependent term in Eq. 8, the rapid cooling reactor response time $\tau_{dr}$ is defined as:

$$\tau_{dr} \equiv \frac{m_r c_{p,r}}{2\pi L_r \left( h_f R_r + \frac{1}{\Omega_{dr}} \right)}. \quad \text{Eq. 9}$$

By fitting the various experimental data in FIG. 80B with decaying exponentials and then extracting the time constant, the following time constants were obtained: at an air velocity of 0 cm/s, $\tau_{dr}$=(124.1±0.6) min; at 1.9 cm/s, $\tau_{dr}$=(78.1±3.7) min; and at 2.8 cm/s, $\tau_{dr}$=(76.7±9.2) min. For this model, forced convection results in faster cooling timescales.

It is assumed that the forced convective heat transfer coefficient, $h_f$, is a linear function of the air velocity:

$$h_f(v_{air}) \approx h_f^0 + \left( \frac{dh_f}{dv_{air}} \right) v_{air}.$$

Then, the rapid cooling timescale equation (Eq. 9) is:

$$\left( \frac{1}{\tau_{dr}} \right) = \frac{2\pi L_r R_r}{m_r c_{p,r}} \left( \frac{dh_f}{dv_{air}} \right) v_{air} + \frac{2\pi L_r}{m_r c_{p,r}} \left( h_f^0 R_r + \frac{1}{\Omega_{dr}} \right).$$

Figure 81:
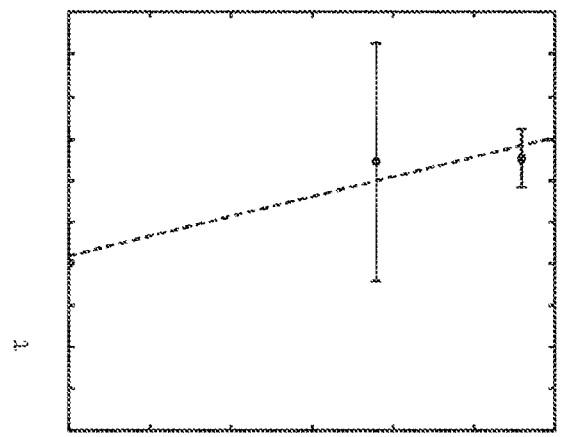
FIG. 81 shows a linear fit for a time constant as a function of air velocity inside a reactor, according to some embodiments.

This equation is of the linear form Y=a X+b, where Y=1/$\tau_{dr}$, and X=$v_{air}$. FIG. 81 shows this linear fitting for the three experimental data points we carried out for pine shavings.

Table 18 shows calculations for scaled-up reactors.

TABLE 18

The reactor's rapid cooling timescale, for different reactor scales for pine shavings under different forced air flow velocities inside the reactor.

| Metal thickness | Air velocity | Reactor dimensions (diameter × height) | | |
|---|---|---|---|---|
| | | 10 cm × 60 cm | 10 cm × 60 cm | 10 cm × 60 cm |
| 1/4 inches or 16 mm (traditional) | 0 cm s$^{-1}$ | 124 min | 115 min | 114 min |
| | 1.9 cm s$^{-1}$ | 78 min | 73 min | 72 min |
| | 2.8 cm s$^{-1}$ | 77 min | 71 min | 70 min |
| 1/16 inches or 16 mm (lightweight) | 0 cm s$^{-1}$ | 41 min | 38 min | 38 min |
| | 1.9 cm s$^{-1}$ | 26 min | 24 min | 24 min |
| | 2.8 cm s$^{-1}$ | 25 min | 24 min | 23 min |

Table 18 shows that as the forced cooling air velocity inside the reactor is increased from 0 to 1.9 cm/s, there is a reduction in rapid cooling time by almost 40%. An additional velocity increase to 2.8 cm/s results in a further reduction that is more limited. Furthermore, as the reactor scales up, the rapid cooling timescale decreases. When the metal thickness is reduced to 1/16 inches (16 mm), the rapid cooling timescale decreases by a factor of about 3.

Another strategy for enhancing the rapid cooling of the reactor is to design the outer insulation to be removable. In the case of warming up the reactor as quickly as possible and/or preserving heat within the reactor as long as possible, thermal insulation on the exterior of the reactor may be beneficial. Removing this external insulation jacket may reduce the $\Omega_{dr}$ term, which may decrease the rapid cooling time even further.

7.4.3 Perspectives in Cooling the Reactor

TABLE 19

A summary of the two cooling modes explored in this Section.

| | Slow cooling mode | Fast cooling mode |
|---|---|---|
| Purpose | Retain heat as long as possible | Lose heat as quickly as possible |
| Use case | Reactor is being moved from one farm to the next for ongoing conversion. | Reactor breaks down and needs quick and safe service. |
| Strategy | Fill interior with biomass; cap top and bottom to eliminates tack effect. | Empty biomass, drive forced cooling air through the reactor interior. |
| Scaling performance | 2-3 times improvement in storage time as reactor scales by 400 times | Weak reduction in rapid cooling time as reactor scales by 400 times |
| Reducing metal use | Adversely affects performance | Improves performance |

For the current reactor design, heating and cooling processes happen in the timescale of an hour to hours. For slower cooling, enhanced thermal mass and insulation may be preferable. For faster cooling, thermally agility may be beneficial. When it is desirable for a reactor to be capable of both faster and slower cooling, removable outer insulation jackets may be beneficial. Table 19 summarizes these two different cooling modes.

7.5 Transitioning Between Two Reaction Conditions

Figure 82:
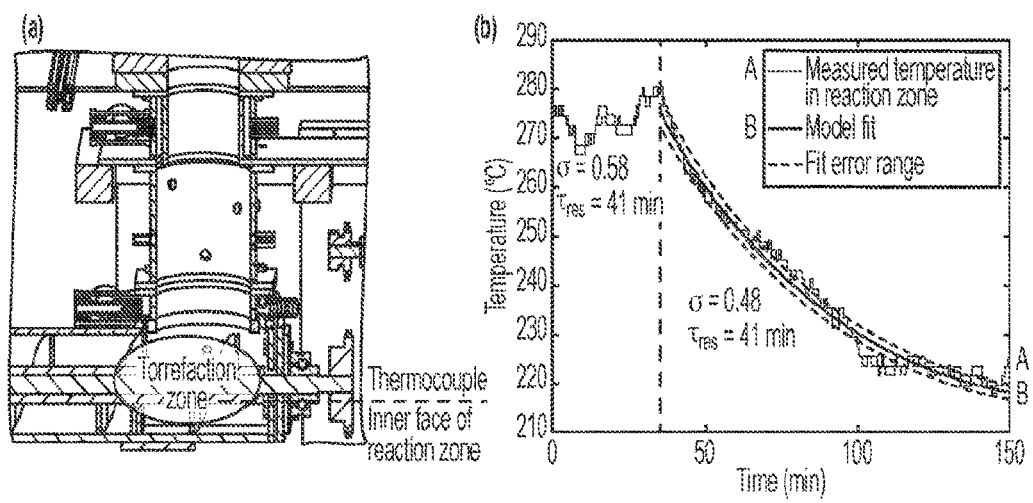
FIG. 82 shows a schematic depiction of a system configured for biomass decomposition and a chart showing reactor temperature as a function of time, according to some embodiments.

FIG. 82A shows the placement of the thermocouple probe within the reactor to take the temperature measurement, and FIG. 82B shows the result of this temperature profile as a time series. At t=40 min, the pine shavings reactor, which has been previously operating at a normalized air/fuel ratio of σ=0.58, transitions to a new ratio of σ=0.48. During the transition time, the reactor is still being continuously fed as in the original steady state. The reactor core temperature gradually decreases from about 280 to 210° C. in a period of about 2.5 hours.

For the laboratory-scale reactor, a faster transition timescale could be achieved if biomass was removed from the reactor and then the interior of the reactor was cooled via forced convection. When the reactor approached the desired final temperature, the reactor could be refilled with biomass. According to Table 18 above, this transition could be achieved in less than 78 minutes.

When transitioning the reactor from a lower to a higher temperature (e.g., for more severe torrefaction), it may be beneficial remove biomass from the reactor, and then feed a certain predetermined flow of biomass mass and air into the reactor to ensure complete combustion. Flowing biomass and air in at a higher rate may increase the speed at which the transition is accomplished. Table 15 shows that the transition can be accomplished at a time of equal to or less time than 2.5 hours.

The transition timescale may change with the specific biomass mass flux (residence time) at each operating condition.

7.6 Discussion

In some circumstances, high-density metal in the reactor may provide an appreciable fraction of its inertial mass. For rapid warming up and cooling, thermal agility may be a desired property of the reactor. Thermal agility may be achieved by reducing the amount of metal employed in the design of the reactor (such as by reducing the wall thickness). In cases where it is desirable to retain the heat within the reactor for as long as possible (such as when moving the reactor from one farm to the next), the reactor may be capped and filled with biomass. Thermal agility can be further improved by designing a removable exterior insulation jacket in the case of the need for rapid cooling.

In some cases, it may be beneficial to use a rapid start-up or rapid cooling procedure when making adjustments to reactor conditions.

Example 2

This Example describes the design of a torrefaction reactor, its fabrication, and its utility for performing torrefaction on certain biomass feedstocks. A new, simplified biomass torrefaction reactor concept that operates under oxygen-lean conditions is proposed as a potential way to downscale torrefaction reactors for small- and medium-scale applications. To verify the feasibility of the concept, a multi-scale analysis was conducted to understand the design considerations, underlying chemistry, intra-particle effects, and overall reactor-scale heat transfer. Heat transfer within the reactor and the appropriate reactor height may be influenced by gas-phase advection. Finally, by implementing a laboratory-scale reactor and operating it under diverse conditions, it is found that certain designs can be appropriate for torrefaction.

1. Introduction

Some biomass residues, in their raw form, may not be useful and/or may be undesirable: they can be wet, loose, and/or bulky. This may make them difficult and/or expensive to collect, transport, process, and/or utilize in energy applications. Furthermore, some biomass types, such as agricultural wastes, may be seasonal. Some seasonal biomass types may be challenging to store for long-term consumption during the off-seasons. Biomass torrefaction, which is a thermochemical process that improves the characteristics of biomass, may address such challenges. For example, torrefied biomass can be mostly hydrophobic, which may make it resistant to moisture attack and/or extend its shelf life. Torrefied biomass may, in some cases, have improved energy density, which may effectively lower its transportation cost.

While there is a wide distribution in the sizes, the typical farm size in South Asia is around $1.3 \times 10^4$ m$^2$ (1.3 hectares). While the yield of agricultural residues per hectare is highly dependent upon various factors, a representative value of 0.225 kg m$^{-2}$ on harvest is employed. Thus, a representative farm in rural India may have about 3,000 kg of post-agricultural residues to be processed, and these farms are spread geographically amongst a large rural region. It may be beneficial for a portable, low-cost, low-maintenance torrefaction reactor that can move from farm to farm on a daily basis to have a biomass processing capacity of on the order of $10^3$ kg day$^{-1}$.

Near-inert conditions inside biomass reactors may undesirably increase the capital cost and operational complexity in some small- to medium-scale torrefaction applications. If this inert requirement can be relaxed, then both the capital and operational costs associated with the reactor operation may be reduced.

This Example is related to designing a biomass torrefaction reactor suitable for small- to medium-scale operations in rural, decentralized regions, and assessing its functionality. In this Example the concept and analysis of an oxygen-lean torrefaction reactor are described. A laboratory-scale prototype was built and tested to demonstrate that certain systems described herein may be suitable for biomass torrefaction.

2. Basis and Derivation of an Oxygen-Lean Torrefaction Reactor Concept

Figure 83:
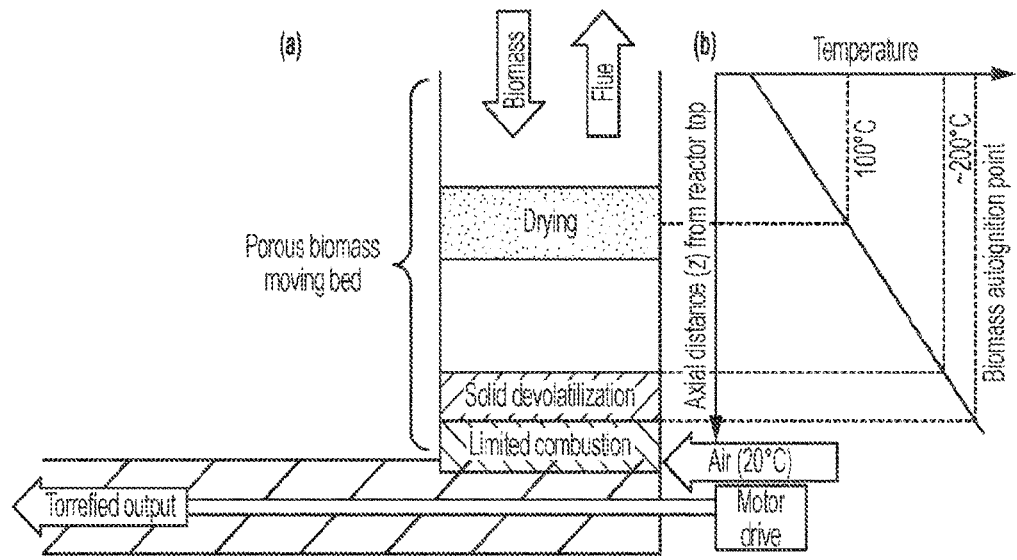
FIG. 83 shows a schematic depiction of a reactor and temperatures at various points therein, according to some embodiments.

A schematic of a moving bed, counterflow continuous reactor design is shown in FIG. 83.

In this design, raw biomass may be continuously fed from the top into a moving bed. At the bottom, a turning auger may continuously remove torrefied biomass from the moving bed, allowing the incoming biomass column to migrate downwards by gravity. Air (at room temperature) may be introduced near the bottom of the reactor, which may result in a low-oxygen environment that supports torrefaction at the bottom of the moving bed. As the reacting air, volatiles, and flue gas mixture travels upwards through the moving bed in a counter-flow manner, it may cool and/or may be exhausted from the top of the reactor. While the biomass is traveling downwards, it may be heated (e.g., by the mixture traveling upwards through the moving bed) until it reaches torrefaction temperature at the bottom of the moving bed. In some embodiments, to the side of the moving bed, there is an extension with a length of the auger conveying biomass away from the moving bed. This length may serve one or more functions. First, as the biomass at the bottom of the moving bed may be hot, it may be beneficial to cool the biomass before it emerges from the reactor (if the biomass is too hot, it may undergo spontaneous combustion). Therefore, the auger extension may be configured to cool hot, torrefied biomass. Therefore, this section is also referred to as the "char-cooling segment" or the "outlet conduit". Secondly, the auger flights and the inner diameter of the char-cooling segment may form quite a tight seal, such as a seal sufficiently tight to prevent an appreciable amount (e.g., most) of the injected air, volatiles, and/or post-combustion flue gas mixture from escaping sideways with the cooling char. The auger may instead direct much (e.g., almost all) of one or more of these species upwards through the moving bed. In some embodiments, this may be achieved when the pressure drop for the gas across the char-cooling segment is higher than that for the gas across the moving bed. In some embodiments, the char-cooling segment is at least longer than the height of the moving bed.

3. Multiscale Analysis of the Reactor Concept

At a molecular scale, chemical kinetics of solid devolatilization may influence the temperature and/or timescale at which torrefaction reactions occur. At the particle scale, thermal thickness in the biomass particles may affect the homogeneity of the output. Finally, at the reactor scale, heat transfer mechanisms may affect the temperature and/or timescales requirements that are achievable in experimental setups.

3.1 Micro-Scale Kinetics and Thermochemistry

In order to describe the solid devolatilization process, an existing kinetic model proposed by Bates and Ghoniem (2012), developed for the case of willow, was employed. In this model, the solid-phase devolatilization was modeled following a two-step lump-sum process. It should be understood that, in some embodiments, further processes may be present during solid-phase devolatilization, the two processes described below may occur at least partially (or completely) simultaneously, and/or one of the two processes may be absent or may proceed differently than described herein.

First, in this Example, it was assumed that the raw biomass (A) can either decompose into volatile gas (V1) or become solid intermediate (B). Then, in this Example, it was assumed that the solid intermediate (B) becomes either volatile gas (V2) or char (C). Each of these reactions are assumed to be first-order Arrhenius in nature in this Example, although they may proceed by different mechanisms in certain embodiments. In addition, for the drying of biomass, this Example utilized a simplified model proposed by Peters and Bruch (2003), in which water bound to the biomass (M(b)) in the solid phase becomes unbound (M(ub)) in the gas phase as a first-order Arrhenius-type process. It should be understood that other methods of water unbinding from the biomass are also contemplated.

These assumptions yield the following rate equations:

$A(s) \rightarrow B(s), k_1 = 2.48 \times 10^4 \exp(-75976/RT)$, $A(s) \rightarrow V_1(g), k_{V1} = 3.23 \times 10^7 \exp(-114214/RT)$, $B(s) \rightarrow C(s), k_2 = 1.1 \times 10^{10} \exp(-151711/RT)$, $B(s) \rightarrow V_2(g), k_{V2} = 1.59 \times 10^{10} \exp(-151711/RT)$, $M(b) \rightarrow M(ub), k_M = 5.56 \times 10^6 \exp(-87900/RT)$, For the 200-300° C. range, which is typical for torrefaction, in some cases, the characteristic timescale $\tau_{res}$ for solid devolatilization ranges from 10 minutes to 10 days. Moreover, drying is comparatively fast, ranging from 10 seconds to 10 minutes. Therefore, the solid residence time inside the reactor may be strongly influenced by the solid devolatilization kinetics in these conditions. A reactor dimension on the order of one or several meters may be appropriate when the biomass solid devolatilization is carried out at the higher temperatures (above 250° C.). At a lower temperature, the torrefaction reaction may proceed very slowly, and/or the required solid residence time may belong; in such cases, an appropriate required reactor dimension may be larger (e.g., prohibitively large). In some cases, a higher-temperature, shorter-residence-time treatment is preferred over a lower-temperature, longer-residence-time one. Continuing the analysis above, with a characteristic reactor dimension of 1 m, and a maximum residence time of $10^4$ s, the computed characteristic velocity of the biomass through the reactor is $v_s \sim 10^4$ m s$^{-1}$, or in other words, the computed characteristic mass flux of the biomass through the reactor is $\Phi_s \sim \rho_{BM} v_s \sim 0.01$ kg m$^{-2}$ s$^{-1}$.

One caveat is that the model above was proposed by fitting experimental data in an idealized reactor set-up in inert conditions. The chemical kinetics could be very different in the oxygen-lean torrefaction regime.

3.2 Particle-Scale Effects

Depending on the thermal thickness of the biomass particles, the timescale for heat to penetrate into the biomass particle could also be significant, possibly leading to thermal gradient over the particle and inhomogeneous torrefaction. Three diverse types of commonly available biomass were selected to analyze and experimentally test: pine shavings, hay, and rice husks. As shown in Table 20, these types of biomass generally have equivalent spherical diameters of less than 1 mm. The particle-scale effects in the torrefaction regime have been considered earlier by Bates and Ghoniem (2014). This study showed that, in some cases, such as when the particle thickness is less than ~10 mm, the overall heating timescale is slow compared to intraparticle effects. If processing of larger biomass particles is desired, then either such particles may be first reduced in size, or the reactor configuration (which, as will be explained below, affects the heat transfer timescale) may be adjusted accordingly.

TABLE 20

Characteristic dimensions of sample biomass particles.

| Biomass type | Major axis | Minor axis | Thickness | $d_p$ |
|---|---|---|---|---|
| Pine shavings | 11.1 mm | 6.4 mm | 0.2 mm | 3.0 mm |
| Hay | 22.9 mm | 4.4 mm | 0.3 mm | 9.4 mm |
| Rice husks | 7.6 mm | 1.8 mm | 1.8 mm | 2.9 mm |

3.3 Reactor-Scale Heat Transfer Description 3.3.1 Mechanisms of Heat Transfer

How can the heat transfer characteristics within the biomass moving bed be described?

It is noted that the moving bed itself may comprise at least one or two inhomogeneous phases: a solid phase (biomass) and/or a gas phase (a mixture of air, volatile gases, and/or post-combustion flue gases). When present, the two phases may transfer heat differently in the axial direction, and the two phases may, in some cases, exchange heat with each other.

Solid-phase conduction and radiation. The actual heat transfer coefficient $k_s$ in the solid phase may depend on one or more of (i) heat conduction within a single biomass particle, (ii) biomass particle-to-particle contact conduction, (iii) particle-to-particle radiation via the porous void, and so forth. The following scaling law may be applicable in one or more thermochemical regimes of interest: $k_s \sim 1$ W m$^{-1}$ K$^{-1}$. Thus, the characteristic heat transfer timescale due to solid-phase conduction and radiation can be approximated as $\rho_s c_{ps} L_r^2 / k_s \sim 10^5$ s, where $L_r \sim 1$ m is the axial length of the reactor, $\rho_s \sim 100$ kg m$^{-3}$ the bulk solid density in the moving bed, and $c_{ps} \sim 1,000$ J kg$^{-1}$ K$^{-1}$ the specific heat capacity of the solid phase.

Gas-phase conduction, natural convection, and radiation. Similar to the solid effective bulk thermal conductivity $k_s$, the combined effects of conduction, convection, and radiation in the gas phase can be described by an effective bulk thermal conductivity $k_g$ inside the biomass moving bed, with the empirical correlations given in Hobbs et al. (1992). The following scaling law may be applicable in one or more thermochemical regimes of interest: $k_g \sim 0.01$ W m$^{-1}$ K$^{-1}$. The characteristic heat transfer timescale due to gas-phase conduction, convection, and radiation can be approximated as $\rho_g c_{pg} L_r^2/k_g \sim 10^5$ s, where $\rho_g \sim 1$ kg m$^{-3}$ the gas density in the moving bed, and $c_{pg} \sim 1,000$ J kg$^{-1}$ K$^{-1}$ the specific heat capacity of the solid phase.

Axial advection: Either or both of solid and gas phases may be continuously moving axially (in counterflow) inside the reactor, and each of which may carry enthalpies with them. For the solid phase, it may be beneficial (e.g., with respect to its residence time and/or its downward velocity in the reactor) for its superficial flow velocity $v_s$ to be on the order of $10^4$ m s$^{-1}$. Therefore, it may be beneficial for the characteristic advective timescale within the reactor (of dimension 1 m) to be on the order of $10^4$ s. It is noted that the stoichiometric air-biomass ratio for complete combustion of biomass may be in the range of 2-10. From this, it is estimated that, in the oxygen-lean combustion regime, an appropriate amount of air flux to supply into the reactor may be on the same order as the amount of biomass flux:

$\Phi_{air} \sim \Phi_{BM} \sim 0.01$ kg m$^{-1}$ s$^{-1}$.

Therefore, the gas-phase characteristic advective timescale may be on the order of $L_r \rho_g / \Phi_{air} \sim 100$ s, and its characteristic velocity, $v_g$, may follow be $\sim \Phi_{air}/\rho_g \sim 0.01$ m s$^{-1}$. In some embodiments, its characteristic velocity may be about 100 times faster than the solid-phase movement.

Solid-gas heat transfer. In the biomass moving bed, it is possible for the solid and the surrounding gas to exist at different temperatures ($T_s$ and $T_g$, respectively); in some cases, there may be heat transfer between the two phases. When present, this heat transfer may be governed by the lump-sum heat transfer coefficient $h_{sg}$. According to prior studies (Gupta et al., 1963; Di Blasi, 2004; Radulovic et al., 1995), for biomass moving bed, $h_{sg} \sim 10$ W m$^{-2}$ K$^{-1}$. In some embodiments, the timescale of the solid-gas heat transfer can be approximated by $\rho_s c_{p,s} d_p / h_{sg} \sim 100$ s.

Heat losses: Both the solid and gas phases can interact with the insulated reactor wall and transfer heat through the wall to the ambient (with a lower temperature $T_{amb}$). The heat transfer from the moving bed (gas and solid phases) to the reactor side wall may cause heat loss. The heat loss may, in certain embodiments, be characterized by one or more heat transfer coefficients defined in (Di Blasi, 2000; Froment and Bischoff, 1979; DeWasch and Froment, 1971), such as the gas-to-wall heat transfer coefficient $h_{gw} \sim 1$ W m$^{-2}$ K$^{-1}$, and/or the solid-to-wall heat transfer coefficient $h_{sw} \sim 0.01$ W m$^{-2}$ K$^{-1}$. In some embodiments, the timescale of gas-to-wall heat transfer may be equivalent to $\rho_g c_{pg} R_r / h_{gw}$ which depends on the reactor diameter. For some small laboratory-scale equipment, $R_r \sim 0.1$ m; the gas-to-wall timescale may be on the order of 100 s. For some larger reactors, such as some reactors suitable for commercial deployment at $R_r \sim 1$ m, the timescale is lengthened to 1,000 s. On the other hand, for the solid-to-wall heat transfer, the timescale, expressed by the term $\rho_s c_{ps} R_r / h_{sw}$, may be $10^7$ s at $R_r \sim 0.1$ m, and $10^8$ s at $R_r \sim 1$ m.

3.3.2 Analysis of Heat Transfer Timescales

Several questions may be considered: Which is the rate-limiting step in the heat transfer process? Which steps of heat transfer occur so rapidly that they can be approximated as almost instantaneous? Table 21 summarizes the different heat transfer timescales calculated in the previous section.

TABLE 21

Characteristic timescales of the various heat-transfer mechanisms, with a lab-scale reactor $R_r = 0.05$ m.

| Heat transfer mechanism | Characteristic timescale |
|---|---|
| Solid-phase bulk effective conduction | $\dfrac{\rho_s c_{ps} L_r^2}{k_s} \sim 10^5$ s |
| Gas-phase bulk effective conduction | $\dfrac{\rho_g c_{p,g} L_r^2}{k_{rg}} \sim 10^5$ s |
| Gas-phase advection | $\dfrac{L_r}{v_g} \sim 10^2$ s |
| Solid-phase advection | $\dfrac{L_r}{v_s} \sim 10^4$ s |
| Gas-to-wall heat loss | $\dfrac{\rho_g c_{p,g} R_r}{2 h_{gw}} \sim 10^2 - 10^3$ s |
| Solid-to-wall heat loss | $\dfrac{\rho_s c_{p,s} R_r}{2 h_{sw}} \sim 10^7 - 10^8$ s |
| Solid-gas exchange | $\dfrac{\rho_s c_{p,s} d_p}{h_{sg}} \sim 10^2$ s |

In the regime of certain torrefaction reactor dimensions (height ~40 cm), heat transfer through advection (both solid and gas phases) may occur much more rapidly than bulk effective conduction in the respective phases. In some such cases, axially, heat transfer may be carried out primarily by the gas-phase advective pathway. In some such cases, gas advection occurs on a timescale 10 times faster than solid advection; when this occurs, the solid phase may migrate downward so slowly that, in the timescale of the upward gas migration, the solid phase may be treated as pseudo-static. However, as the heat exchange between the solid and gas phases may also occur quickly, it is possible that, as the heat is carried up axially in the gas phase, the surrounding solid may be rapidly heated up without advecting too much of this heat back down towards the bottom of the reactor. It is possible that this effect is due to the high rate of thermal exchange between the solid and gas phases, $T_g \approx T_s$. Finally, at the laboratory scale ($R_r \sim 0.1$ m), the rate of heat loss from the reactor in the gas phase may be comparatively fast with respect to the residence time (advection timescale). In some such cases, heat losses to the reactor wall may be significant. For larger reactors, we expect the magnitude of the heat loss rate may be reduced inversely to the reactor diameter.

Below, a preliminary experimental reactor is sized, designed, and operated at about $\Phi_{BM} \sim \Phi_{air} \sim 0.01$ kg m$^{-2}$ s$^{-1}$. This reactor can support biomass torrefaction.

4. Experimental Set-Up and Design

In this section, the design and fabrication of an experimental apparatus is described.

The reactor described herein is configured to control both the solid-phase residence time and the reactor temperature, which itself depends on how much air is injected relative to how much biomass passes through the reactor.

4.1 Control of Solid Residence Time

Figure 84:
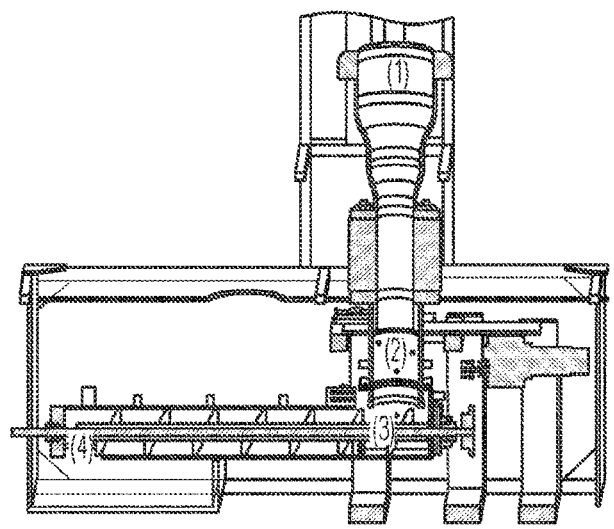
FIGS. 84-85 show schematic depictions of systems configured for biomass decomposition, according to some embodiments.

A lab-scale, continuous-flow biomass torrefaction reactor design for a feedstock capacity of about 1 kg/h and a cross-sectional diameter of 10.2 cm, was fabricated and tested. This test reactor utilizes a moving-bed reactor concept (labeled in FIG. 84), with an auger at the bottom configured to continuously remove torrefied biomass. The auger was sized to be 2 feet in length, which allowed sufficient time for the hot, torrefied biomass to cool off before exiting the reactor outlet. The auger is connected to a motor drive with an adjustable speed, allowing for control of the solid-phase residence time inside the reactor for the torrefaction reaction.

In order to calculate the solid residence time, the density $\rho_{BM}$ and input mass flow rate $\dot{m}_{BM}$ of biomass were measured for each type of biomass and auger rotational speed. Given the radius $R_r$ and height $H_r$ of the fixed-bed reactor, the effective residence time $\tau_{res}$ of biomass is obtained from:

$$\tau_{res} = \frac{\rho_{BM} \pi R_r^2 H_r}{\dot{m}_{BM}}.$$

Based on the reactor dimensions (diameter=10.2 cm, depth of torrefaction zone ~10 cm), in Table 22, the typical range of possible input feed rates corresponding to the normal ranges of torrefaction residence times are provided.

TABLE 22

Typical ranges of possible input feeding rates in the lab-scale reactor for different solid residence times. The possible ranges of feeding rates may depend on the type of biomass.

| Residence time | 5 min | 20 min | 40 min |
|---|---|---|---|
| Pine shavings / hay | 0.58 kg/h | 0.15 kg/h | 0.073 kg/h |
| Rice husk | 2.0 kg/h | 0.51 kg/h | 0.26 kg/h |

It can be seen that, for the lab-scale reactor described in this Example, by fixing the torrefaction residence time, a biomass feeding rate on the order of 0.1-2 kg/h may be achieved. This is sufficient for lab-scale tests for biomass samples in small quantities. In some instances, such as for commercial torrefaction reactors capable of processing about 500 kg/h of biomass, it may be advantageous to increase the biomass feeding rate (e.g., by a factor of 250-5,000). This may be achieved by, for example, increasing the reactor diameter of a factor of 16-71.

4.2 Control of Torrefaction Severity

Figure 85:
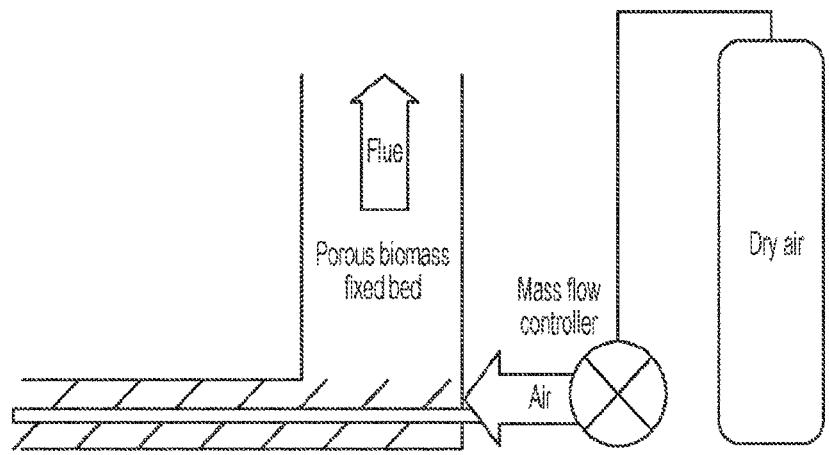

For a given solid residence time (i.e., feed rate and reactor volume), introducing air in different proportions to the solid federate may affect torrefaction severity. As shown in FIG. 85, in order to achieve this, two air flow inlets were introduced near the base of the fixed bed reactor. These inlets were connected to a compressed air cylinder (Airgas AI D300). A mass flow controller (Omega Engineering FMA-5528A) was used to adjust the input air flow rate, with an adjustable flow rate range between 0.1 to 50.0 standard L/min. The mass flow rate of air may be divided by the mass flow rate of the incoming biomass to obtain a dimensionless air-biomass ratio (ABR).

5. Demonstration of Stable Operating Conditions

Below, continuous and stable operation of a torrefaction reactor is shown.

Figure 86:
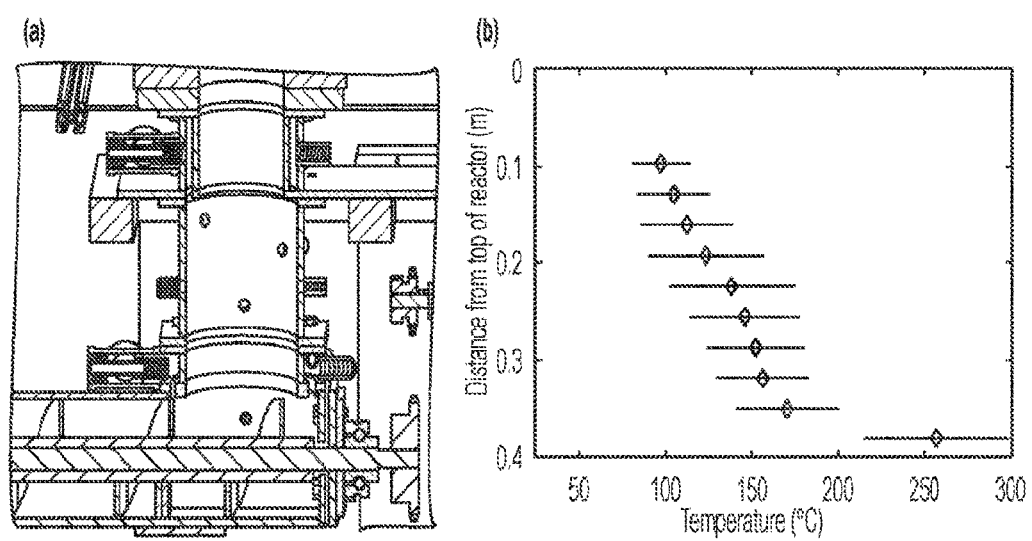
FIG. 86 shows a schematic depiction of a system configured for biomass decomposition and a chart showing the temperature at various points therein, according to some embodiments.
Figure 87:
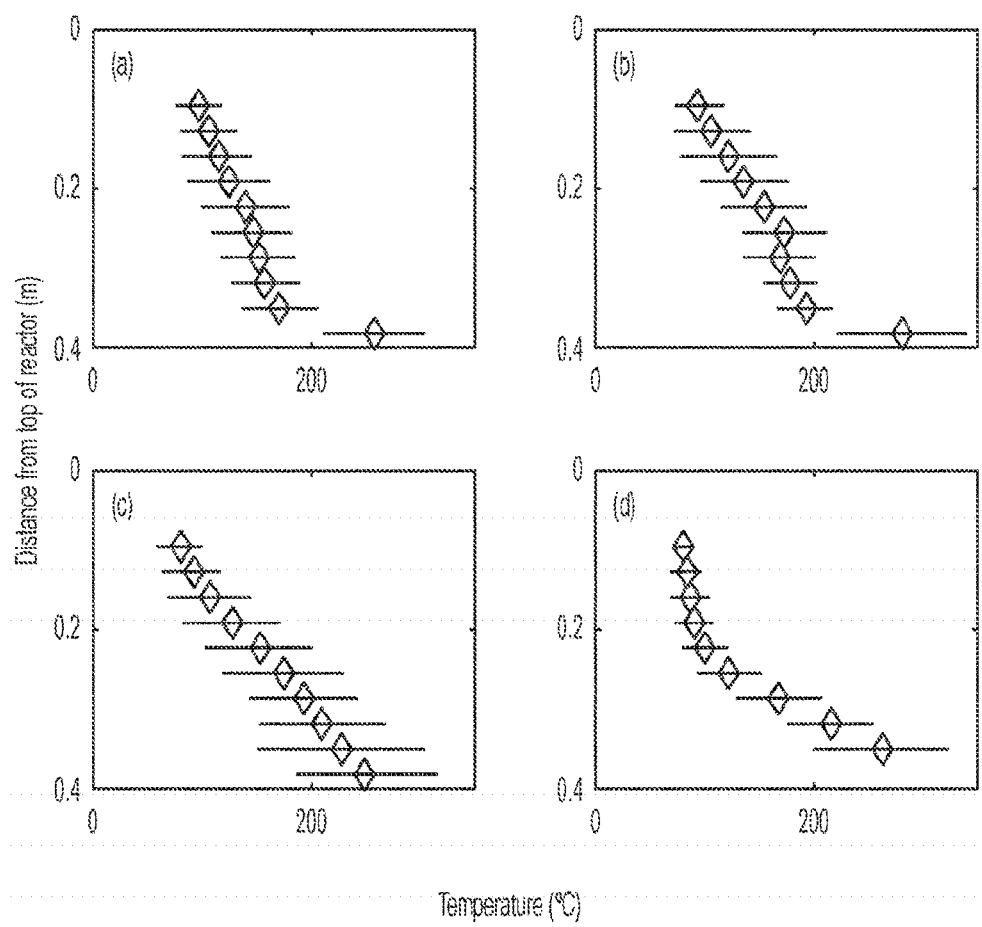
FIG. 87 shows the temperature at various points inside a reactor, according to some embodiments.

In order to monitor the reactor operation, 10 thermocouples, in approximately 2.5-cm spacing, axially throughout the length of the reactor (FIG. 86A). As a sample proof of steady-state operation, air was flowed into the reactor at the normalized air-biomass ratio of ABR=1.0, and the screw auger turning rate was adjusted such as the solid residence time $\tau_{res}$=ii min. Then, some initial pine shavings at the bottom of the reactor were ignited. After ignition, pine shavings were continuously into the reactor from the top such that the level of pine shavings at the top was maintained constant. After an initial start-up period, where the entire reactor assembly and the fixed bed were heated up, a steady-state condition was reached at each axial location. The steady-state condition could be sustained for at least 100 minutes before turning the reactor off by quenching the torrefaction reaction with inert nitrogen in place of air. The mean steady-state temperature readouts at different axial locations were compiled into an axial temperature profile of the reactor (FIG. 86B). It is noted that the fixed bed temperature increases axially towards the bottom of the reactor, and reaches a maximum near where the air inlets are located. The maximum temperature measured, reaching above 200° C., is within the torrefaction regime.

After demonstrating a stable reactor steady state for one particular reactor operating condition for pine shavings, further questions arise, such as: is it possible to show steady states for a wide range of reactor conditions? The reactor was operated under additional conditions, by first changing the air-biomass ratio ($\tau_{res}$=11 min, ABR=2.0), then changing the residence time also ($\tau_{res}$=37 min, ABR=2.4), and finally changing the biomass type from pine shavings to rice husks.

FIGS. 87A-D show that each of these conditions also result in stable steady-state temperature profiles. Notably, in (b), compared to (a) as the torrefaction severity is increased by introducing more air a higher maximum temperature is observed. In (c), compared to (a), a gentler increase in the temperature profile throughout a broader region of the reactor is observed, possibly because, as the solid residence time is increased while the reactor dimension is maintained, the downward solid flux is reduced. In this scenario, the upward countercurrent gas flux may carry the heat from the bottom of the reactor further up. In (d) compared to (a), a sharper increase in the temperature profile is observed as the biomass is switched from pine shavings to rice husks. This may be because rice husks have a higher bulk bed density, which may mean a reduced effective axial effective thermal conductivity.

To further demonstrate that the reactor outputs comprise torrefied biomass (e.g., are not exclusively made up of burned ash), proximate analysis (TA Instruments Q50 TGA using the ASTM D-3175 standard), ultimate (elemental) analysis (Thermo Finnigan Flash EA 1112 CHON Analyzer using the ASTM-D5373-16 standard), and bomb calorimetry (Parr Instrument Model 6200 isoperibol) are performed on the output from the reactor. These results are detailed in Table 23.

TABLE 23

Proximate analysis, ultimate (elemental) analysis, and higher heating value measured on the solid fuel outputs from the different experiments.

| Parameter | Experiment (a) | Experiment (b) | Experiment (c) | Experiment (d) |
|---|---|---|---|---|
| Biomass type | Pine shavings | Pine shavings | Pine shavings | Rice husks |
| Bulk density | 30 kg m$^{-3}$ | 30 kg m$^{-3}$ | 30 kg m$^{-3}$ | 100 kg m$^{-3}$ |
| Residence time | 11 min | 11 min | 37 min | 27 min |
| ABR | 1.0 | 2.0 | 2.4 | 1.0 |
| Output HHV | 25.1 MJ kg$^{-1}$ | 27.3 MJ kg$^{-1}$ | 23.8 MJ kg$^{-1}$ | 17.6 MJ kg$^{-1}$ |
| Fixed carbon | 31% | 41% | 32% | 48% |

TABLE 23-continued

Proximate analysis, ultimate (elemental) analysis,
and higher heating value measured on the solid fuel
outputs from the different experiments.

| Parameter | Experiment (a) | Experiment (b) | Experiment (c) | Experiment (d) |
|---|---|---|---|---|
| Elemental C | 58% | 66% | 61% | 44% |
| Elemental H | 5% | 4% | 5% | 2% |
| Elemental O | 37% | 30% | 35% | 54% |

In interpreting the various results given in Table 23, the proximate analysis, ultimate analysis, and bomb calorimetry measurements were also obtained for raw pine shavings and raw rice husks. First, in terms of the higher heating value (HHV), that of raw pine shavings may be around 20.5±1.0 MJ $kg^{-1}$; that of rice husks may be around 15.8±1.0 MJ $kg^{-1}$. Therefore, it is possible for torrefaction to raise the HHV values of the raw biomass by different amounts. Second, in terms of the fixed carbon, that of raw pine shavings may be 8%±1%; that of rice husks may be 12%±2%. In comparison, elevated fixed carbon readouts are observed in all the outputs from the different experiments described in this Example, consistent with biomass torrefaction. Finally, it is noted that for the raw pine shavings used herein, the elemental composition is such that (C, H, O)= (49.6%, 5.7%, 44.8%), and for raw rice husks used herein, (C, H, O)=(37.6%, 3.9%, 58.3%). By comparing these baseline values with those obtained in the experimental outputs, it can be observed that the reactor conditions cause the raw biomass to gain carbon and lose oxygen. These chemical changes may be consistent with biomass torrefaction.

6. Conclusion and Discussions 6.1 Conclusion

In this Example, a proposal for the design and development of a small- to medium-scale torrefaction reactor for decentralized deployment in rural areas was presented. A countercurrent moving bed reactor configured to perform oxygen-lean torrefaction was developed. A multi-scale analysis was performed and a laboratory-scale reactor set-up was fabricated. It was shown that the temperature profiles, output solid higher-heating value, proximate analysis, and elemental analysis values are generally consistent with certain biomass torrefaction conditions. The reactor was shown to be appropriate for biomass torrefaction.

Example 3

This Example describes a method for modeling a reactor which is configured to allow torrefaction therein. The behavior of the reactor predicted by the model is compared to data generated experimentally from a reactor with similar characteristics to those modeled. In the present Example, a mathematical description of the reactor is developed. This mathematical description may produce reasonable fit to experimental data. It is demonstrated that at the small test-reactor scale, heat loss mechanism through the side wall may affect biomass torrefaction. Furthermore, by interrogating the scaling behaviors of the reactor, it is shown that as the reactor is scaled up, at the same operating condition, the mass yield of the torrefied biomass may improve by 10-20%.

1. Introduction

As shown in FIG. 83, a reactor may comprise a moving bed, in which the input raw biomass migrates downwards by gravity and/or is continuously removed by an auger at the bottom, and/or in which air, which may be injected at the bottom of the moving bed at room temperature, may undergo a reaction (e.g., a limited reaction) with the biomass phase before migrating upwards in a countercurrent manner, which may heat the biomass up in the moving bed.

In this Example, a mathematical model description of the reactor is presented and fit it to experimental data. This Example also discusses some relevant scaling strategies.

2. Problem Formulation

To begin, a one-dimensional model of the reactor in the axial direction (z) is formulated. While there may be radial temperature gradients in addition to axial temperature gradients, in this Example, the axial temperature profile is treated. As defined in FIG. 88, the top of the reactor has position z=0, while the bottom of the reactor, $z=L_r$. The inner radius of the moving bed reactor is denoted by $R_r$. The surrounding reactor wall, comprising stainless steel 304, has a thickness $R_m-R_r$. Furthermore, surrounding the reactor wall, a ceramic-based insulation has a thickness $R_w-R_m$. Transient behaviors of the reactor are ignored and its steady-state status is analyzed. The model includes the following processes:

1. Mass flux profile of the solid species;
2. Mass flux profile of bound moisture;
3. Overall elemental composition of the solid species;
4. Temperature profile of the solid phase;
5. Temperature profile of the gas phase; and
6. Temperature profile of the reactor wall.

Figure 88:
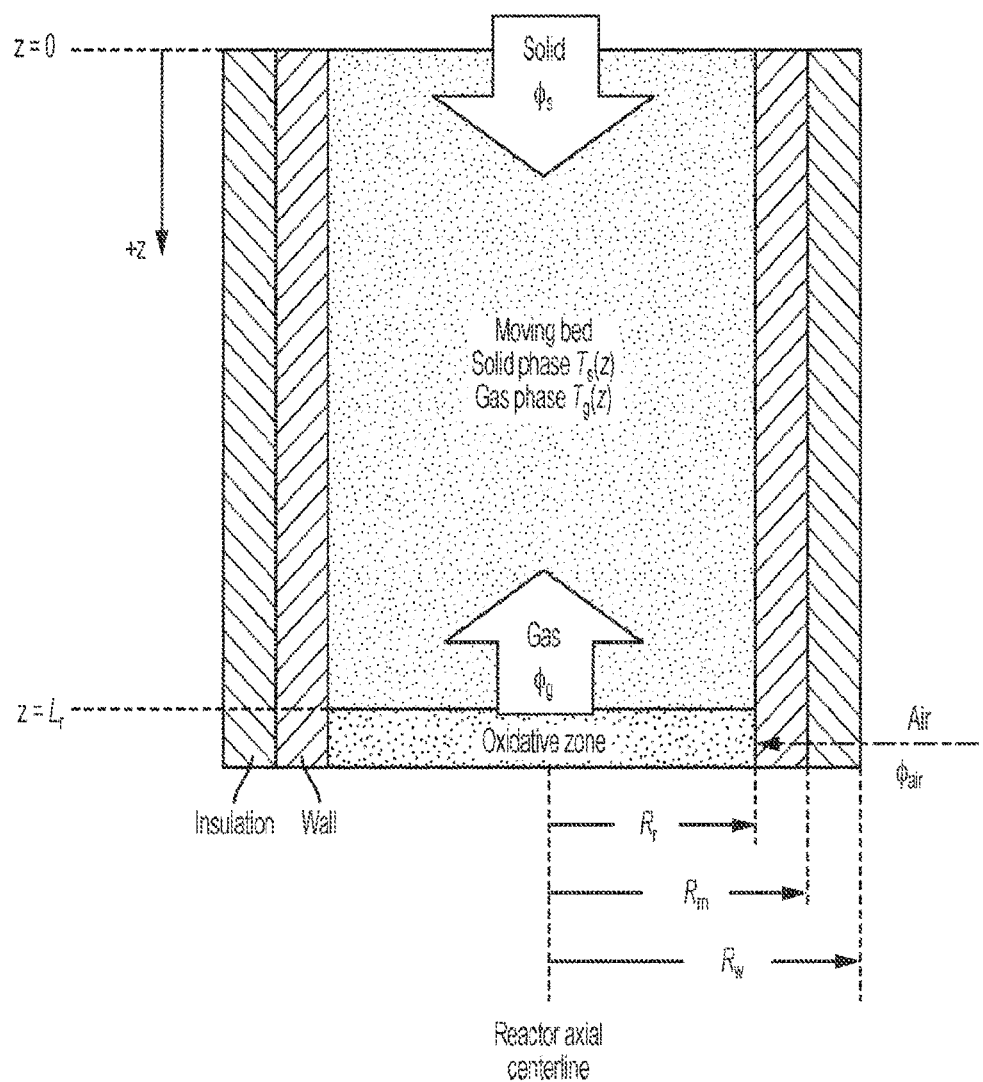
FIG. 88 shows a schematic depiction of a reactor, according to some embodiments.

The model presented in this Example carries out a detailed account of the temperature profile of the reactor wall. As will be shown later, the metallic reactor wall studied herein has a much higher axial thermal conductivity compared to either the gas and solid phase within the reactor, and this itself could play a non-trivial role in redistributing the heat axially within the reactor. Secondly, in the modeling approach described in this Example, evolution of the gas/volatile species is described in a lump-sum treatment. As shown in FIG. 88, except for the very thin "oxidative zone" at the very bottom of the reactor, it is assumed that throughout the rest of the moving bed, there is little or no gas-phase reaction, and the only chemistry that occurs relates to solid-phase devolatilization. This assumption may be inaccurate.

Finally, it is assumed that in the moving bed design, the biomass particles are thermally thin. Therefore, the model below ignores any intraparticle thermal gradients. This may not be generally true for thick particles (diameter>1 cm).

2.1 Constitutive Equations

With these assumptions in mind, the axial conservation equations for this model in the domain of the biomass moving bed ($0 \leq z \leq L_r$) can be described as:

Mass fluxes of four solid-phase pseudospecies (A which is also raw biomass, torrefied solid B, torrefied solid C, and bound moisture) as well as three gas/volatile species (volatile V1, volatile V2, and unbound moisture) to be defined in the chemical submodel below:

$$\frac{d\Phi_i}{dz} = r_i,$$

where $\Phi_i$ is the mass flux through the reactor cross-section of the ith species, and $r_i$ is the volumetric creation rate [kg $s^{-1}$ $m^{-3}$] of the ith species and is calculated in the coupled chemical kinetics/thermochemistry submodel. Note that, it is assumed that diffusion of the gas species is negligible compared to convection. It is understood that, in this model, the mass flux of the dry solid through the reactor is $\Phi_s = \Phi_A + \Phi_B + \Phi_C + \Phi_M$.

Elemental composition of the solid species comprising carbon, hydrogen, oxygen, nitrogen, and ash:

$$\frac{d}{dz}(\Phi_s Y_j) = \sum_i r_i Y_{ij},$$

where $Y_j$ is the mass fraction of the jth elemental component, and $Y_{ij}$ is the mass fraction of the jth elemental component in the ith solid pseudospecies.

Solid-phase steady-state energy conservation:

$$\frac{d}{dz}(\Phi_s c_{p,s} T_s) = \frac{d}{dz}\left(k_s \frac{dT_s}{dz}\right) - \sum_i r_i H_i - q_{sg} - q_{sw}.$$

Here, $c_{p,s}$ is the specific heat capacity of the solid phase. $k_s$ is the effective axial thermal conductivity of the bulk solid phase. $H_i$ denotes the enthalpy [J kg$^{-1}$] of the ith pseudospecies. Moreover, the term $q_{sg}$ denotes the solid-gas heat transfer, and $q_{sw}$ denotes the solid-wall heat transfer.

Gas-phase enthalpy conservation:

$$\frac{d}{dz}(\Phi_s c_{p,g} T_g) = \frac{d}{dz}\left(k_g \frac{dT_g}{dz}\right) + q_{sg} - q_{gw}.$$

Here, $c_{p,g}$ is the specific heat capacity of the gas phase. $K_g$ is the effective axial thermal conductivity of the bulk gas phase. Moreover, the term $q_{gw}$ denotes the solid-wall heat transfer.

Axial heat conduction within the wall $$0 = \frac{d}{dz}\left(k_{wall} \frac{dT_{wall}}{dz}\right) + q_{sw} + q_{gw} - q_{wa}.$$

Here, $k_{wall}$ is the axial thermal conductivity of the wall material (in this case, stainless steel 304), and $q_{wa}$ is the heat transfer term between the wall and the outside ambient.

In these constitutive equations above, there are three classes of unknowns: generation rates ($r_e$), thermochemistry ($H_e$), bulk effective thermal conductivity (all the k terms), and heat transfer mechanisms (all the q terms). In the sections below, submodels that were implemented to clarify these different terms in the torrefaction regime are described.

2.2 Species Rate Submodel

In the constitutive equations above, the terms $r_i$ relating to the volumetric creation/destruction rate of the ith species are given by the following chemical pseudo-processes described in Bates and Ghoniem (2012) and shown in FIG. 16A.

This gives the following rate equations for raw biomass (A), solid torrefied pseudospecies B, solid torrefied pseudospecies C, volatile pseudospecies V1, and volatile pseudospecies V2:

$$r_A = -2.48 \times 10^4 \exp(-75976/RT)\rho_A$$

$$r_{V1} = 3.23 \times 10^7 \exp(-75976/RT)\rho_A$$

$$r_{V2} = 1.59 \times 10^{10} \exp(-151711/RT)\rho_B$$

$$r_C = 1.1 \times 10^{10} \exp(-151711/RT)\rho_B$$

$$r_B = -r_A - r_{V2} - r_c$$

Now, to account for moisture, it is assumed that some moisture $\rho_{MB}$ is bound to the biomass, and that at a certain rate, it irreversibly evaporates from the biomass to become unbound moisture $\rho_M$. There are different approaches for modeling this moisture evaporation process. The approach taken in this Example is based on the gasifier modeling approach proposed by Hobbs et al. (1993) and Di Blasi (2004), which assumes that moisture evaporation is diffusion controlled:

$$r_M = -r_{MB} = v_p A_p k_m (\rho_v - \rho_M),$$

where $v_p$ is the volumetric biomass particle density number, $A_p$ the average surface area of a biomass particle, $\rho_v$ is the saturation gas-phase moisture density given by the Clausius-Claperyon relation (Winslow, 1976):

$$\rho_v = MW_{H_2O} \exp(12.61 - 4690/T)/RT,$$

and $k_m$, the solid-gas mass transfer coefficient, is given by $$k_m = \begin{cases} 2.06 \Phi_g Re^{-0.575} Sc^{-2/3}/\varepsilon \rho_g, & k_m < 0.15 \text{ m/s} \\ 0.15, & k_m \geq 0.15 \text{ m/s} \end{cases}.$$

2.3 Reaction Thermochemistry Submodel

The $H_i$ terms for the solid and gas pseudospecies were evaluated using the same approach described in Bates and Ghoniem (2013).

2.4 Bulk Effective Thermal Conductivity

There are three thermal conductivity constants employed in this model: that of the wall $k_{wall}$, the bulk solid phase $k_s$, and the bulk gas phase $k_g$ in the moving bed. As the test reactor's wall is made of stainless steel 304, the empirical correlation for this material, $k_{wall} = 14.6 + 1.27 \times 10^{-2} (T_{wall} - 273.15)$, where $T_{wall}$ is the wall temperature in Kelvins, is employed.

For the bulk solid phase thermal conductivity in the axial direction, it is assumed that a single number $k_s$ can encapsulate a complex interplay amongst different solid heat transfer mechanisms such as particle-to-particle contact conduction, radiation, intra-particle conduction, and so forth. This Example utilizes empirical correlation such as Di Blasi (2013):

$$k_s = 0.0013 + 0.005\left(\frac{T_s}{1000}\right) + 0.63\left(\frac{T_s}{1000}\right)^2.$$

Likewise, the effective bulk gas-phase is given by:

$$k_g = 4.8 \times 10^{-4} T_g^{0.716}.$$

2.5 Heat Transfer Mechanisms

The energy balance equations described above call for various heat transfer mechanisms: between the solid and the gas ($q_{sg}$), between solid and the wall ($q_{sw}$), between gas and the wall ($q_{gw}$), and between wall and the external ambient ($q_{wa}$).

Solid-gas heat transfer. In the model presented in this Example, the volumetric heat flow rate $q_{sg}$ (in units of W m$^{-3}$) from the solid to the gas phase is generally given in the following form:

$$q_{sg} = v_p A_p (1-\varepsilon) \gamma h_{sg} (T_s - T_g),$$

where $v_p$ is the particle density number [m$^{-3}$], $A_p$ is the particle surface area [m$^2$], and y is an adjustable factor proposed by Hobbs et al. (1992) and later generalized by Di Blasi (2000) which may account for unsteady heat transfer and chemical reactivity effects. The magnitude of this adjustable factor may, in some cases, range from 0.02 to 1. The remaining unknown, $h_{sg}$, is the solid-gas heat transfer coefficient. The following empirical heat transfer coefficient proposed by Gupta and Thodos (1963) was utilized:

$$h_{sg} = \frac{2.06 c_{p,g} \rho_g v_g}{\varepsilon}(Re)^{-0.575}(Pr)^{-2/3},$$

where $c_{p,g}$, $\rho_g$, $v_g$, and $\varepsilon$ are the specific heat capacity, mass density, superficial axial velocity of the gas phase, and void fraction in the moving bed, respectively. In the expression above, Re=$d_p v_g / v_g$ and Pr=$c_{p,g} \mu_g / k_g$ are the Reynolds and Prandtl numbers associated with the superficial flow of the gaseous phase in the moving bed, respectively.

Gas-wall and solid-wall heat transfer. It is possible to write the volumetric heat flow rate [W m$^{-3}$] due to heat loss from the gas phase to the wall ($q_{gw}$) and from the solid phase to the wall ($q_{sw}$) as:

$$q_{gw} = \frac{2h_{gw}}{R_r}(T_g - T_{wall}).$$

$$q_{sw} = \frac{2h_{sw}}{R_r}(T_s - T_{wall}).$$

In order to calculate the gas-wall heat transfer coefficient $h_{gw}$, first an overall effective moving bed-to-wall convective heat transfer coefficient $h_w$ is defined Froment and Bischoff (1979):

$$h_w = 0.96 k_r^0 R_r^{-4/3} + 0.033 k_g(Pr)(Re) d_p^{-1},$$

where $k_r^0$ is the static effective thermal conductivity in the radial direction of the moving bed, defined by Froment and Bischoff (1979). These detailed relationships are reproduced Table 24 for reference. If it is assumed that the biomass moving bed is defined by a different bulk effective thermal conductivity in the radial direction for the solid phase $k_{rs}$ and the gas phase $k_{rg}$ (these values may be different from the axial thermal conductivity values $k_s$ and $k_g$), then, it is possible to express the gas-to-wall heat transfer coefficient as a component of the overall effective moving bed-to-wall heat transfer coefficient $h_w$ (DeWasch and Froment, 1971):

$$h_{gw} = \frac{k_{rg}}{k_{rg} + k_{rs}} h_w.$$

By the same reasoning, for the solid phase, it is possible to define a solid-to-wall convective heat transfer coefficient $h_{sw}$ as a component of $h_w$ (DeWasch and Froment, 1971):

$$h_{sw} = \frac{k_{rs}}{k_{rg} + k_{rs}} h_w.$$

Wall-ambient heat transfer. It is possible to write the volumetric heat flow rate $q_{wa}$ [W m$^{-3}$] due to heat loss from the wall at temperature $T_{wall}$ to the ambient at room temperature in the form:

$$q_{wa} = \frac{2h_{wa}}{R_m}(T_{wall} - T_{amb}),$$

where the effective wall-to-ambient heat transfer coefficient $h_{wa}$ is defined as a combination of heat transfer through the metallic wall of thickness $R_m - R_r$, through the outer insulation layer of thickness $R_w - R_m$, and of the heat transfer between the ambient air and the outer surface of the reactor system at $R_w$:

$$h_{wa} = \frac{1}{2R_r - R_m}\left(\frac{\ln(R_m/R_r)}{k_{wall}} + \frac{\ln(R_w/R_m)}{k_{ins}} + \frac{1}{R_w h_{air}}\right)^{-1},$$

where $k_{ins}$=0.0159 W m$^{-1}$ K$^{-1}$ is the thermal conductivity of the insulating material (in the case of the laboratory-scale reactor modeled herein, this material comprises of aluminum silica, McMaster-Carr 93315K71), and where $h_{air}$=10 W m$^{-2}$ K$^{-1}$ is the heat transfer coefficient in static air at room temperature.

TABLE 24

Correlations for bulk homogeneous phase conduction characteristics in a biomass moving bed.

| Characteristics | Correlation |
| --- | --- |
| Gas-to-wall heat transfer coefficient | $h_{gw} = \dfrac{k_{rg}}{k_{rg} + k_{rs}} h_w$ |
| Solid-to-wall heat transfer coefficient | $h_{sw} = \dfrac{k_{rs}}{k_{rg} + k_{rs}} h_w$ |
| Gas bulk effective radial thermal conductivity | $k_{rg} = k_g\left(\epsilon\left(1 + \dfrac{h_{rv} d_p}{k_g}\right) + \dfrac{0.14(Pr)(Re)}{1 + 11.5(d_p/R_r)^2}\right)$ |
| Solid bulk effective radial thermal conductivity | $k_{rs} = \dfrac{k_g(1-\epsilon)}{\left(\dfrac{1}{\phi} + \dfrac{h_{rs} d_p}{k_s}\right)^{-1} + \dfrac{2}{3\kappa}}$ |
| Gas bulk effective axial thermal conductivity | $k_g = 4.8 \times 10^{-4} T_g^{0.716}$ |
| Solid bulk effective axial thermal conductivity | $k_s = 0.0013 + 0.005\left(\dfrac{T_s}{1000}\right) + 0.63\left(\dfrac{T_s}{1000}\right)^2$ |
| Static effective radial conductivity | $k_r^0 = k_g\epsilon\left(1 + \dfrac{d_p h_{rv}}{k_g}\right) + \dfrac{k_g(1-\epsilon)}{\left(\dfrac{1}{\phi} + \dfrac{h_{rs} d_p}{k_g}\right)^{-1} + \dfrac{2}{3\kappa}}$ |
| Void-to-void radiation coefficient | $h_{rv} = \dfrac{2.27 \times 10^{-7} T_g^3}{\left(1 + \dfrac{\epsilon}{2(1-\epsilon)}\dfrac{1-\epsilon'}{\epsilon'}\right)}$ |
| Solid radiation coefficient | $h_{rs} = 2.27 \times 10^{-7}\left(\dfrac{\epsilon'}{2-\epsilon'}\right) T_s^3$ |

TABLE 24-continued

Correlations for bulk homogeneous phase conduction characteristics in a biomass moving bed.

| Characteristics | Correlation |
|---|---|
| Packing parameter | $\phi = \phi_2$, $\epsilon < 0.260$ |
| | $= \phi_1$, $\epsilon > 0.476$ |
| | $= \phi_2 + (\phi_1 - \phi_2)\dfrac{\epsilon - 0.260}{0.476 - 0.260}$, $0.260 \leq \epsilon \leq 0.476$ |
| Loose packing parameter | $\phi_1 = \dfrac{0.3525\left(\dfrac{\kappa - 1}{\kappa}\right)^2}{\ln(\kappa - 0.543(\kappa - 1)) - \dfrac{0.457(\kappa - 1)}{\kappa}} - \dfrac{2}{3\kappa}$ |
| Dense packing parameter | $\phi_2 = \dfrac{0.7217\left(\dfrac{\kappa - 1}{\kappa}\right)^2}{\ln(\kappa - 0.925(\kappa - 1)) - \dfrac{0.075(\kappa - 1)}{\kappa}} - \dfrac{2}{3\kappa}$ |
| Conductivity ratio | $\kappa = k_s/k_g$ |
| Reynolds number | $Re = d_p v_g / \nu_g$ |
| Prandtl number | $Pr = c_{p g} \mu_g / k_g$ |
| Coal emissivity | $\epsilon' = 0.85$ |

2.6 Oxidation Model

After air enters at the bottom of the reactor ($z=L_r$), it is assumed that the oxidation reaction with the volatile species and the torrefied biomass is very rapid, occurring at the bottommost part of the reactor with a negligible reaction zone thickness. This oxidative reaction is assumed to act on a small fraction $O_v$ of the volatile gas released (of characteristic molecular composition $CH_xO_y$) at the very bottom of the, burning it to completion in a one-step irreversible reaction:

$$CH_xO_y + (1 + 0.25x - 0.5y)(O_2 + 3.76N_2) \rightarrow CO_2 + 0.5x\ H_2O + 3.76 \times (1 + 0.25x - 0.5y)N_2.$$

In order to estimate the chemical compositions of the volatile pseudospecies V1 and V2, experimentally fitted results from Bates and Ghoniem (2012) are employed. The composite higher heating value $HHV_v$ of the volatiles is also provided in Bates and Ghoniem (2013). Therefore, the flux of energy release [W m$^{-2}$] from volatile combustion, when measured under standard conditions of formation, is given as $\theta_V \Phi_{Vol} HHV_V$, where $\Phi_{Vol} = \Phi_{V1}(z=L_r) + \Phi_{V2}(z=L_r)$.

After the incoming air combusts the volatile gases, it is possible that any excess air will also react with a fraction $\theta_B$ of the exiting torrefied biomass (of characteristic molecular composition $CH_aO_b$, with a and b determined by the final solid elemental composition at $z=L_r$). The oxidation reaction is once again assumed to be irreversible one-step:

$$CH_aO_b + (1 + 0.25a - 0.5b)(O_2 + 3.76N_2) \rightarrow CO_2 + 0.5a\ H_2O + 3.76 \times (1 + 0.25a - 0.5b)N_2.$$

The higher-heating value $HHV_B$ of oxidizing the torrefied biomass can be inferred from the Boie Equation (1953):

$$HHV_B[J\ kg^{-1}] = 1000 \times (351.69\ Y_C + 1162.46\ Y_H - 110.95 Y_O + 62.8\ Y_N).$$

Therefore, the flux of energy release [W m$^{-2}$] from the combustion of torrefied biomass, when measured under standard conditions of formation, may be given as $\theta_B \Phi_s(z=L_r)\ HHV_B$.

Because it is assumed that these oxidation reactions occur at the very bottom of the reaction, they enter into the reactor model as boundary conditions for the energy balance equations at $z=L_r$. For the gas phase, the boundary condition is written as follows:

$$k_g \dfrac{dT_g}{dz}\bigg|_{z=L_r} =$$

$$(1 - \varepsilon)\theta_B \Phi_s(L_r) HHV_B + (1 - \varepsilon)\theta_V \Phi_{Vol} HHV_V + c_{p,air}\Phi_{air}(T_a - T_0) +$$

$$c_{p,vol}\Phi_{Vol}(T_g(L_r) - T_0) - c_p\Phi_{flue}(T_g(L_r) - T_0) - \eta_{ga}(T_g(L_r) - T_{amb}).$$

The terms on the right-hand side are described one by one below. The first term relates to the energy from the partial combustion of torrefied biomass. The second term relates to the energy from the combustion of volatile gases. The third term relates to the enthalpy carried by the incoming air with respect to the standard reference temperature $T_0$. The fourth term relates to the enthalpy carried by the pre-combusted volatile gases at position $z=L_r$. The fifth term relates to the enthalpy carried away by the flue gases (mixture of $CO_2$, $H_2O$, and some unburned volatiles). The sixth term relates to the heat loss from the bottom of the reactor to the ambient air in the gas phase, with $\eta_{ga}$ defined as:

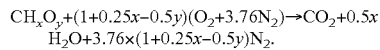

Likewise, at the bottom of the reactor, the solid-phase boundary condition in the model descried herein is given as:

$$k_s \dfrac{dT_s}{dz}\bigg|_{z=L_r} =$$

$$\varepsilon \theta_B \Phi_s(L_r) HHV_B + \varepsilon \theta_V \Phi_{Vol} HHV_V + c_{p,char}\Phi_s(L_r)(T_s(L_r) - T_0) -$$

$$c_{p,char}\theta_B \Phi_s(L_r)(T_s(L_r) - T_0) - \eta_{sa}(T_s(L_r) - T_{amb}).$$

The terms on the right-hand side are interpreted as follows. The first term relates to the energy from the partial combustion of torrefied biomass. The second term relates to the energy from the combustion of volatile gases. The third term relates to the enthalpy carried by the incoming pre-combustion torrefied biomass with respect to the standard reference temperature $T_0$. The fourth term relates to the enthalpy carried away by the post-combusted torrefied biomass with respect to the standard reference temperature $T_0$. The fifth term relates to the heat loss from the bottom of the reactor to the ambient air in the solid phase, with $\eta_{sa}$ defined as:

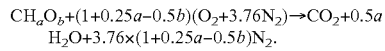

2.7 Initial and Boundary Conditions

In this section, we specify further initial and boundary conditions are specified.

For solid-phase energy balance, the second boundary condition is specified at reactor inlet $z=0$, where the raw biomass enters the reactor at room temperature. At the same position, the exact temperature of the outgoing flue gas is unknown, but the model imposes a convective outflow boundary condition:

$$\left.\frac{dT_g}{dz}\right|_{z=0} = 0.$$

For the energy balance equation governing the wall conduction, at both the top and the bottom of the reactor, there is heat loss from the wall to the surrounding:

$$\left.\frac{dT_{wall}}{dz}\right|_{z=0} = h_{air}(T_{wall} - T_{amb}),$$

$$\left.\frac{dT_{wall}}{dz}\right|_{z=L_r} = -\frac{(T_{wall} - T_{amb})}{\frac{R_m - R_r}{k_{wall}} + \frac{R_w - R_m}{k_{ins}} + \frac{1}{h_{air}}}.$$

The differences in the two boundary conditions above reflect the fact that for the laboratory-scale reactor set-up analyzed herein, the bottom is completely insulated, but the top is not.

For the solid-phase species mass balance equations (A, B, C, and bound moisture), as well as the elemental composition (C, H, O, N, and ash), the initial conditions are given at the top of the reactor z=0 by what is known about the type of biomass, the feeding rate, as well as the laboratory proximate and ultimate analysis results on the raw biomass. These values will be specified for the different experiments that we run below. In contrast, for the gas-phase species mass balance equations (V1, V2, and unbound moisture), the initial conditions are specified at the bottom of the reactor $z=L_r$ by the combustion conditions.

2.8 Solution Procedure

The countercurrent flow results in a split-boundary value problem which was solved iteratively. The iteration begins with a guessed temperature profile of the reactor. Then the mass balance and elemental composition equations were solved in MATLAB using a stiff solver (ODE15s). Then to solve the temperature profiles, the reactor was discretized axially, and the second-order differential equations were implemented using the method of lines. The resultant temperature profile solution was then used to solve the mass balance and elemental composition equations, and so on, until the differences in the temperature profiles in subsequent iterations converge to less than 0.01 Kelvins.

3. Results

In Example 2, four experimental conditions for operating the laboratory-scale reactor were presented, with a radius $R_r$=5.08 cm and length $L_r$=38.15 cm. In this Example, the model proposed above is solved to assess the fit with the experimental data from Example 2. First, Table 25 lists the different experimental parameters used for the four experiments. These values inform the initial conditions of the model described herein.

TABLE 25

Input parameters for the model

| Parameter | Experiment #1 | Experiment #2 | Experiment #3 | Experiment #4 |
|---|---|---|---|---|
| Biomass type | Pine shavings | Pine shavings | Pine shavings | Rice husks |
| Bulk density | 30 kg m$^{-3}$ | 30 kg m$^{-3}$ | 30 kg m$^{-3}$ | 100 kg m$^{-3}$ |
| Particle dimensions | 11 × 6 × 0.2 (mm) (sheet) | 11 × 6 × 0.2 (mm) (sheet) | 11 × 6 × 0.2 (mm) (sheet) | 8 × 2 × 2 (mm) (ellipsoid) |

TABLE 25-continued

Input parameters for the model

| Parameter | Experiment #1 | Experiment #2 | Experiment #3 | Experiment #4 |
|---|---|---|---|---|
| Biomass flux | 0.014 kg m$^{-2}$ s$^{-1}$ | 0.014 kg m$^{-2}$ s$^{-1}$ | 0.004 kg m$^{-2}$ s$^{-1}$ | 0.020 kg m$^{-2}$ s$^{-1}$ |
| Air mass flux | 0.017 kg m$^{-2}$ s$^{-1}$ | 0.027 kg m$^{-2}$ s$^{-1}$ | 0.010 kg m$^{-2}$ s$^{-1}$ | 0.018 kg m$^{-2}$ s$^{-1}$ |
| Ash content | 1.6% | 1.6% | 1.6% | 17% |
| Formula | CH$_{1.36}$O$_{0.68}$ | CH$_{1.36}$O$_{0.68}$ | CH$_{1.36}$O$_{0.68}$ | CH$_{1.23}$O$_{1.16}$ |

Figure 89:
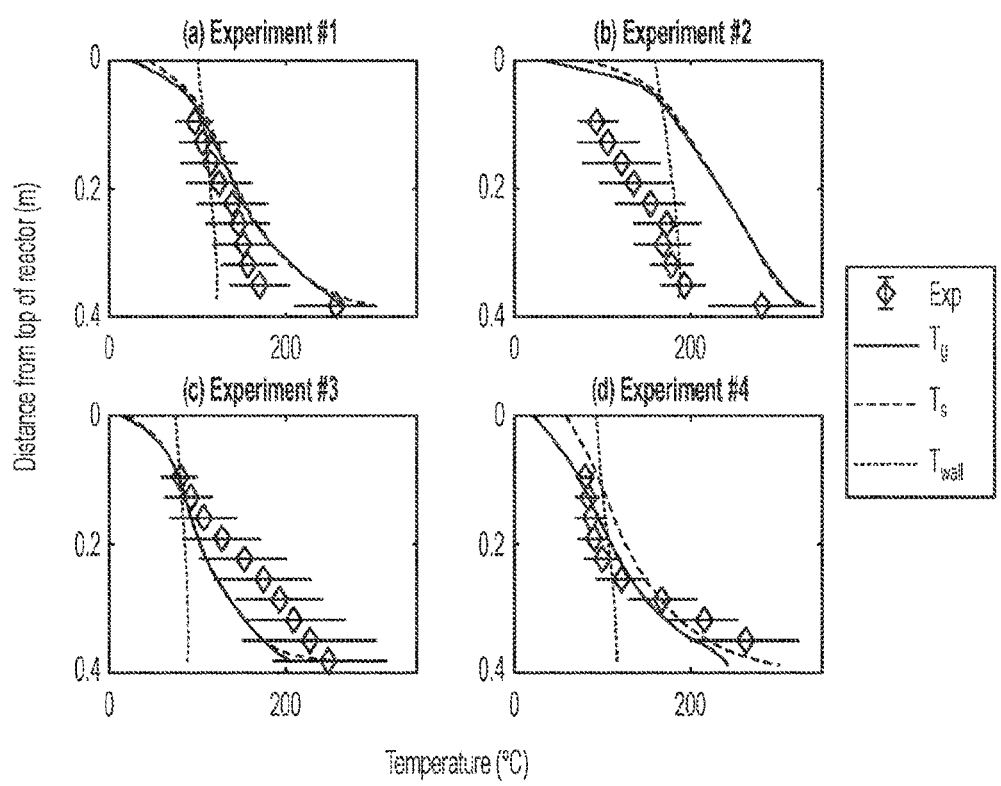
FIG. 89 shows the temperatures at various points inside reactors, according to some embodiments.

For each of the four experimental set-ups, the model was solved for the gas-phase (solid blue lines), solid-phase (red dashed lines), and wall (magenta dotted lines) temperature profiles (FIG. 89). As can be seen, in most cases, the model has a reasonable fit with the experimental data (open black diamonds with horizontal error bars).

In the case of pine shavings, the solid-phase temperature is almost identical to the gas-phase temperature, but in the case of rice husks, possibly due to the larger thermal thickness of the biomass particles, the solid-phase temperature lags by about 10-20 K. However, in all four cases, it was demonstrated that the solid phase successfully reached torrefaction conditions (>200° C.) under steady state. As the air mass flux is increased while keeping the solid mass flux constant (comparing Expt. #2 to Expt. #1), it can be seen that the solid and gas phases reach higher temperatures. As the incoming biomass mass flux is decreased relative to the air mass flux (comparing Expt. #3 to Expt. #1), the temperature profiles become more linear as the relatively weaker downward solid advection allows the countercurrent upward gas advection to deposit more heat further up the moving bed. This also increases the width of the reaction zone, and hence, the solid residence time. Finally, as a switch is made from pine shavings to the rice husks (comparing Expt. #4 to Expt. #1), it is observed that the temperature profile becomes sharper at the bottom of the reactor, as more heat from the gas is deposited to the denser rice husks near the bottom of the reactor.

It is noted that in all four cases, the wall's axial temperature profile is nearly flat, at around 100-150° C. This may imply one or more of the following. First, the thermal conductivity of the reactor wall is high compared to the moving bed, such that there is very little axial temperature inhomogeneity. Second, near the top 5-10 cm of the reactor, the wall temperature is significantly higher than the moving bed, suggesting that in addition to gas-phase advection, wall-to-bed heat transfer plays some role in pre-heating the incoming raw biomass. Third, due to the elevated temperature of the wall, a non-trivial amount of heat loss occurs in the radial direction, which is not surprising given the small diameter of the test reactor.

Furthermore, by tracking the mass balance, the model can also predict the solid higher-heating value and the elemental composition. These numbers are given in Table 26 for the four experimental conditions described previously, and compared with experimental data. It can be seen that, as a validation for the mathematical model, most of these simulated predictions are within 20% of the experimentally measured values. The only drastic difference concerns the higher-heating value of the torrefied rice husks in experiment #4. It is possible that this anomaly can be attributed to the high ash content of torrefied rice husks; it is possible that this correlation breaks down under the high-ash regime.

TABLE 26

Solid elemental analyses and higher
heating values for torrefied products
from simulation and experiments

|  | Expt. #1 (Pine) | Expt. #2 (Pine) | Expt. #3 (Pine) | Expt. #4 (Rice) |
|---|---|---|---|---|
| Carbon: Sim | 71.2% | 62.8% | 55.6% | 43.9% |
| Carbon: Expt | 66.4% | 58.4% | 61.2% | 44.0% |
| Hydrogen: Sim | 4.0% | 4.9% | 5.4% | 2.6% |
| Hydrogen: Expt | 4.1% | 5.0% | 4.0% | 1.7% |
| Oxygen: Sim | 24.8% | 32.2% | 39.0% | 53.4% |
| Oxygen: Expt | 29.5% | 36.6% | 34.8% | 54.2% |
| HHV: Sim | 26.1 MJ $kg^{-1}$ | 23.7 MJ $kg^{-1}$ | 21.1 MJ $kg^{-1}$ | 10.2 MJ $kg^{-1}$ |
| HHV: Expt | 27.3 MJ $kg^{-1}$ | 25.1 MJ $kg^{-1}$ | 23.8 MJ $kg^{-1}$ | 17.6 MJ $kg^{-1}$ |

4. Conclusion and Discussion 4.1 Conclusion

In this Example, a model to describe the experimental torrefaction results is presented, and reactor designs are interrogated under different scaling conditions. It is found at the laboratory scale, heat loss through the side wall is significant, and that the reactor's metal wall serves as an axial heat transfer conduit. These can adversely affect the reactor performance at a small scale. By scaling the reactor in the model, it is found that it is possible to improve the solid mass yield by 10-20% near commercial scale.

4.2 Discussion

While the model captures many details of the reactor set-up with reasonable fidelity, various simplifying assumptions were made. One example is regarding the limited oxidation reaction mechanism that is surmised to happen at the bottom of the reactor. In addition, there were also various quantities, such as the potential thermal gradient in the radial direction, that could not be tested in the initial experimental set-up.

Supplemental Materials

TABLE 27

Chemical composition of the volatile
pseudospecies used in the biomass
devolatilization kinetics model.

| Chemical Component | Mass Percentage for V1 | Mass Percentage for V2 |
|---|---|---|
| Acetic acid | 14.8% | 16.1% |
| Water | 48.1% | 7.6% |
| Formic acid | 5.3% | 5.1% |
| Methanol | 4.2% | 30.1% |
| Lactic acid | 1.3% | 31.3% |
| Furfural | 1.1% | 0.0% |
| Hydroxyacetone | 0.6% | 9.7% |
| Carbon dioxide | 20.4% | 0.0% |
| Carbon monoxide | 4.2% | 0.1% |
| Higher-heating value | 4.43 MJ $kg^{-1}$ | 16.3 MJ $kg^{-1}$ |

TABLE 28

Characteristic dimensions of
sample biomass particles.

| Biomass type | Major axis | Minor axis | Thickness | $d_p$ |
|---|---|---|---|---|
| Pine shavings | 11.1 mm | 6.4 mm | 0.2 mm | 3.0 mm |
| Hay | 22.9 mm | 4.4 mm | 0.3 mm | 9.4 mm |
| Rice husks | 7.6 mm | 1.8 mm | 1.8 mm | 2.9 mm |

Example 4

This Example describes certain features of certain systems and methods described herein.

FIG. 90 shows a schematic depiction of processes that may occur during biomass torrefaction.

FIG. 91 shows different properties of raw biomass pellets and torrefied biomass pellets.

FIG. 92 shows a photograph and schematic depictions of portable systems configured to at least partially decompose biomass.

FIG. 93 shows certain reactions that may occur during biomass decomposition.

Figure 94:
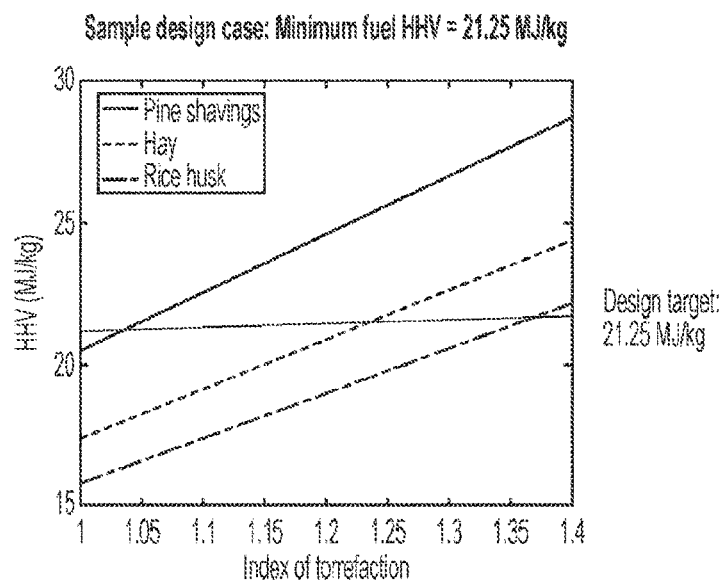
FIG. 94 shows the higher heating value of certain types of biomass as a function of index of torrefaction, according to some embodiments.

FIG. 94 shows the higher heating value of selected types of biomass as a function of index of torrefaction.

Figure 95:
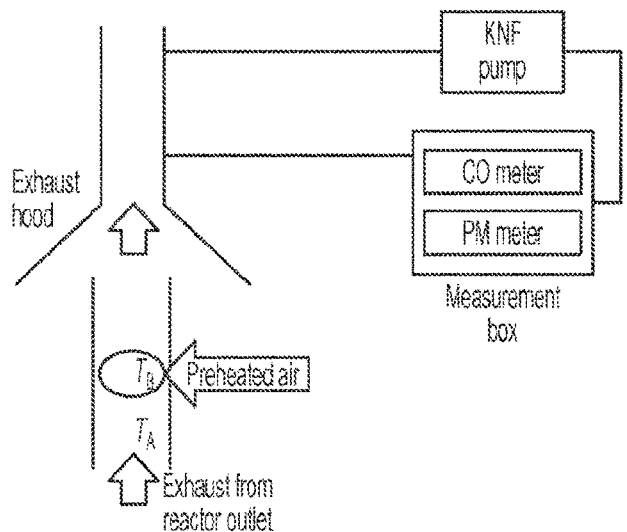
FIG. 95 shows a schematic of a method of analyzing exhaust, according to some embodiments.

FIG. 95 shows a schematic depiction of processes that may be used to quantify exhaust generated during biomass decomposition.

Figures 96, 97:
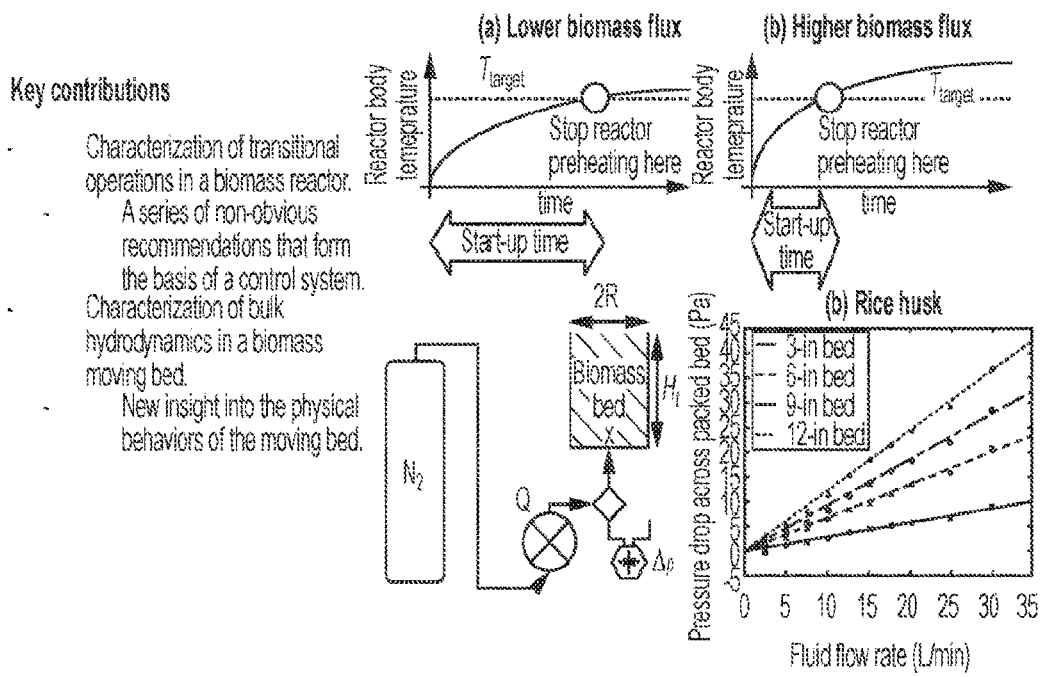
FIG. 96 shows a summary of certain insights developed by the inventors, according to some embodiments.
FIG. 97 shows certain characteristics of various types of biomass, according to some embodiments.

FIG. 96 shows a summary of certain intellectual contributions of Example 1.

FIG. 97 shows a chart showing certain characteristics of certain types of biomass.

Figure 98:
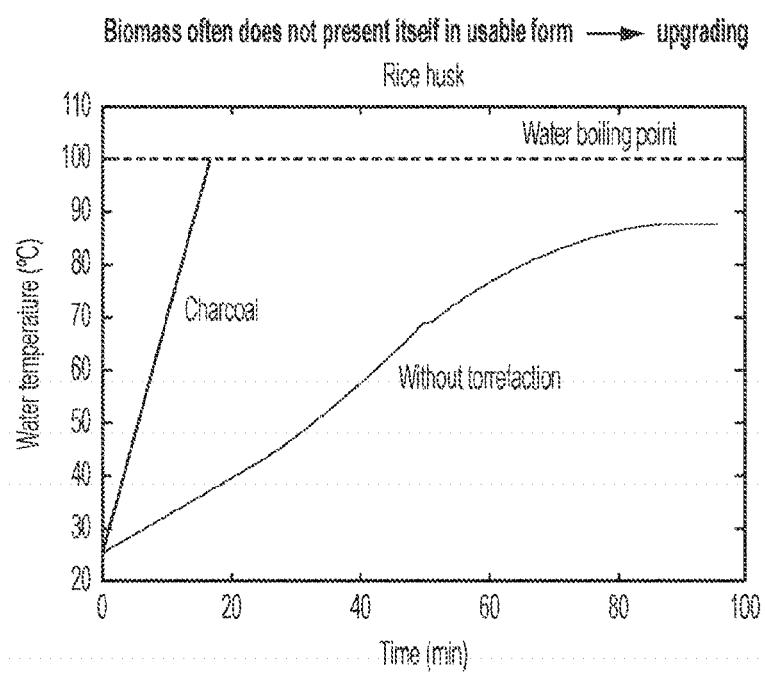
FIG. 98 shows the temperature of water heated by various types of biomass as a function of time, according to some embodiments.

FIG. 98 shows a chart showing the temperature of water as a function of time when heated by biomass decomposed to varying extents.

Figure 99:
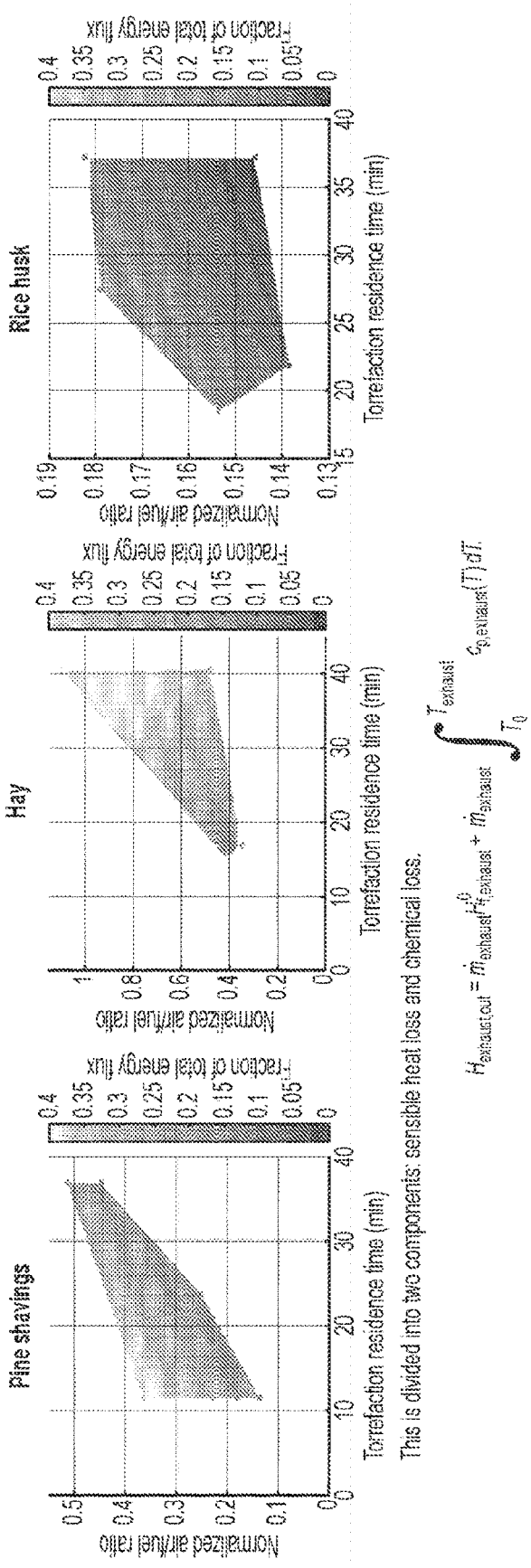
FIG. 99 shows the enthalpy of various exhausts created during biomass decomposition, according to some embodiments.

FIG. 99 shows charts showing the enthalpy in the exhaust produced by decomposition of certain types of biomass as a function of residence time and normalized air to fuel ratio.

FIG. 100 shows charts showing sensible heat loss from different types of biomass.

FIG. 101 shows computed side wall heat loss for reactors of various sizes.

Figure 102:
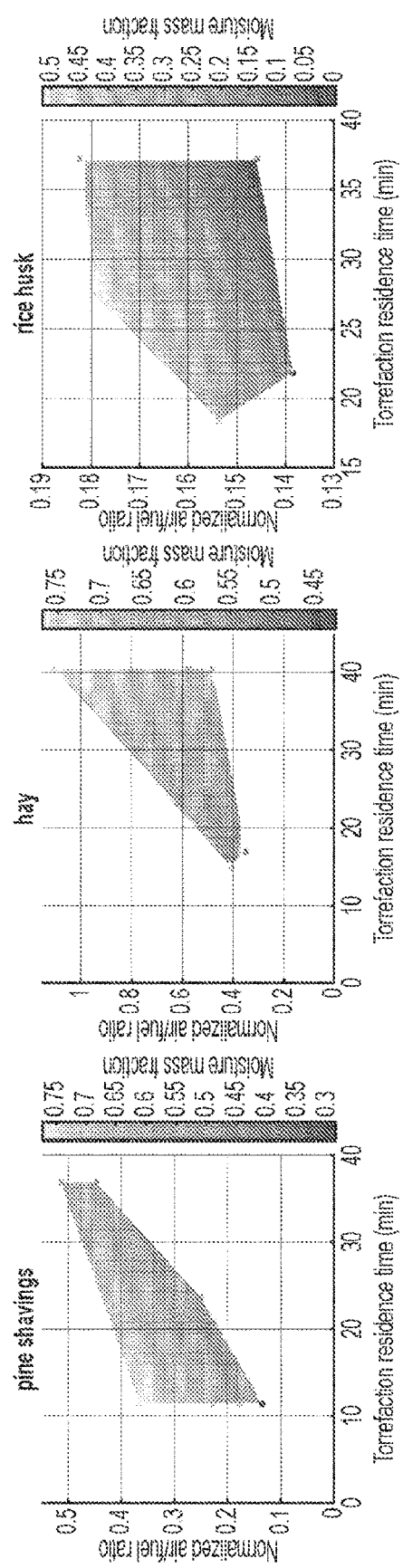
FIG. 102 shows the moisture content of various types of biomass that may undergo decomposition in certain systems, according to some embodiments.

FIG. 102 shows the moisture present in various types of biomass as a function of torrefaction residence time and normalized air to fuel ratio.

Figure 103:
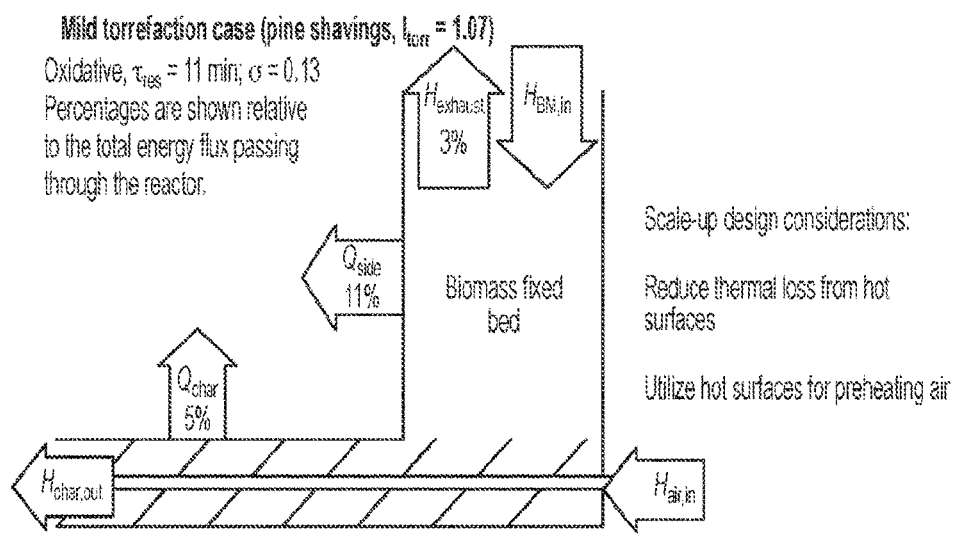
FIGS. 103-105 show schematics of systems configured for biomass decomposition, according to some embodiments.

FIG. 103 shows a schematic of a system for at least partially decomposing biomass and various energy flows into and out of the system under mild torrefaction conditions.

Figure 104:
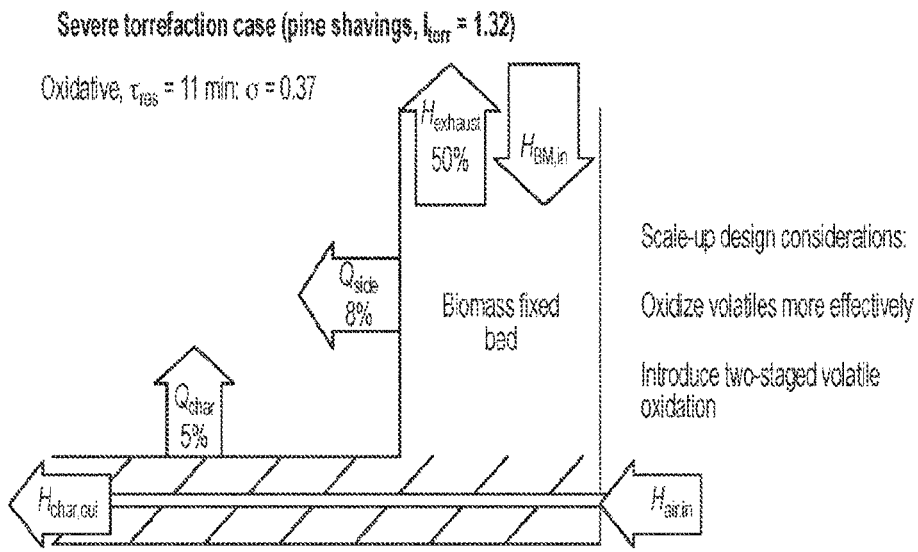

FIG. 104 shows a schematic of a system for at least partially decomposing biomass and various energy flows into and out of the system under severe torrefaction conditions.

Figure 105:
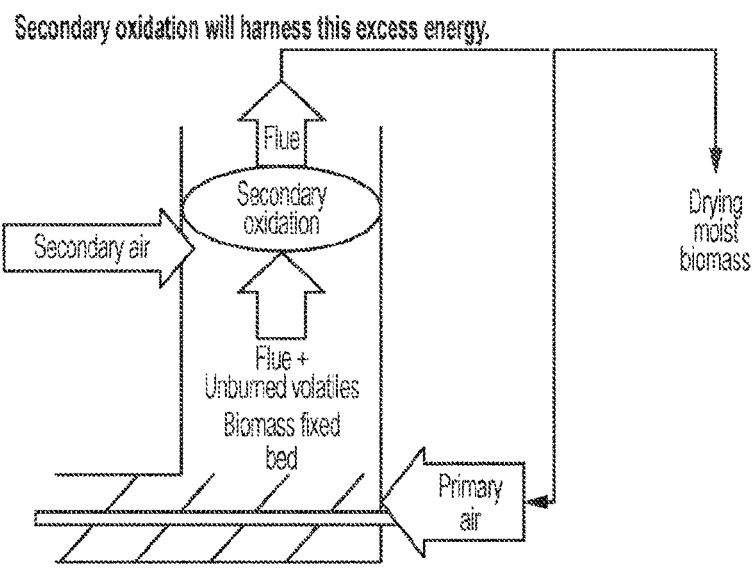

FIG. 105 shows a schematic of a system configured to direct the fluid to a section of the reactor configured to allow for reaction (e.g., oxidation) of a portion of exhaust gas produced by biomass decomposition While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of performing torrefaction of biomass within a reactor to form a primarily solid product, comprising:
   measuring a characteristic of the biomass; and
   adjusting, via a controller, a flow rate of a fluid comprising oxygen into the reactor in which the biomass is torrefied, wherein the adjustment is made, at least in part, based upon the measurement of the characteristic of the biomass.

2. The method of claim 1, wherein the reactor comprises an inlet fluidically connected to a source of the fluid comprising the oxygen.

3. The method of claim 1, wherein the characteristic of the biomass is a moisture content of the biomass.

4. The method of claim 1, wherein the characteristic of the biomass is
   a characteristic of one or more exhaust gases produced during torrefaction of the biomass.

5. The method of claim 1, wherein the reactor is a moving bed reactor.

6. The method of claim 1, wherein the reactor comprises an outlet conduit, and wherein the outlet conduit is configured such that greater than or equal to 75% of its axially projected cross-sectional area is occupied by a conveyor.

7. The method of claim 1, wherein adjusting the flow rate of the fluid comprising the oxygen into the reactor in which the biomass is torrefied comprises increasing the flow rate of the fluid comprising the oxygen into the reactor in which the biomass is torrefied.

8. The method of claim 1, further comprising adjusting a rate at which the biomass is introduced into the reactor.

9. The method of claim 1, wherein the method is performed in a system comprising the reactor, the system further comprises a sensor, and wherein:
   the sensor is configured to perform the measurement of the characteristic of the biomass; and
   the sensor comprises a thermocouple, a mass flow sensor, a gas analyzer, an oxygen sensor, a pressure transducer, a load cell, a rotary encoder, and/or a level detector.

10. The method of claim 1, further comprising adjusting a rate at which the biomass is output from the reactor.

11. The method of claim 1, wherein the characteristic of the biomass is an energy density of the biomass prior to the torrefaction within the reactor.

12. The method of claim 1, wherein the characteristic of the biomass is an energy density of the biomass after the torrefaction within the reactor.

13. The method of claim 1, wherein the characteristic of the biomass is an index of torrefaction of the biomass after torrefaction within the reactor.

14. The method of claim 1, wherein the characteristic of the biomass is a biomass type.

15. The method of claim 1, wherein the characteristic of the biomass is a chemical composition of the biomass prior to and/or after torrefaction within the reactor.

16. The method of claim 1, wherein the characteristic of the biomass is a ratio of a flow rate of torrefied biomass out of the reactor to a flow rate of the biomass into the reactor.

17. The method of claim 1, wherein the characteristic of the biomass is a product of the flow rate of torrefied biomass out of the reactor and an index of torrefaction of the torrefied biomass.

18. The method of claim 1, wherein the characteristic of the biomass is a combustion temperature of the biomass after torrefaction within the reactor.

19. The method of claim 1, wherein adjusting the flow rate of the fluid comprising the oxygen into the reactor in which the biomass is torrefied comprises maintaining the flow rate of the fluid comprising the oxygen into the reactor in which the biomass is torrefied.

20. The method of claim 1, further comprising introducing an ignition source into the reactor.

* * * * *